US 11,716,994 B2

(12) United States Patent
Hahne et al.

(10) Patent No.: US 11,716,994 B2
(45) Date of Patent: Aug. 8, 2023

(54) **COMBINATIONS OF *YERSINIA ENTOMOPHAGA* AND PESTICIDES OR OTHER SUBSTANCES**

(71) Applicant: NOVOZYMES BIOAG A/S, Bagsvaerd (DK)

(72) Inventors: Christopher Hahne, Raleigh, NC (US); Jarrod Leland, Blacksburg, VA (US); Calum Russell, Durham, NC (US)

(73) Assignee: NOVOZYMES BIOAG A/S, Bagsvaerd (DK)

( * ) Notice: Subject to any disclaimer, the term of this patent is extended or adjusted under 35 U.S.C. 154(b) by 562 days.

(21) Appl. No.: 16/495,439

(22) PCT Filed: Mar. 22, 2018

(86) PCT No.: PCT/US2018/023690
§ 371 (c)(1),
(2) Date: Sep. 19, 2019

(87) PCT Pub. No.: WO2018/175677
PCT Pub. Date: Sep. 27, 2018

(65) Prior Publication Data
US 2020/0060284 A1    Feb. 27, 2020

Related U.S. Application Data

(60) Provisional application No. 62/476,233, filed on Mar. 24, 2017.

(51) Int. Cl.
*A01P 7/04* (2006.01)
*A01N 63/20* (2020.01)
*A01N 43/56* (2006.01)
*A01N 57/16* (2006.01)

(52) U.S. Cl.
CPC ............. *A01N 63/20* (2020.01); *A01N 43/56* (2013.01); *A01N 57/16* (2013.01)

(58) Field of Classification Search
None
See application file for complete search history.

(56) References Cited

U.S. PATENT DOCUMENTS

| | | |
|---|---|---|
| 2015/0104417 A1 | 4/2015 | Hellwege et al. |
| 2015/0141244 A1 | 5/2015 | Hellwege et al. |
| 2015/0157025 A1 | 6/2015 | Hellwege et al. |
| 2015/0296797 A1 | 10/2015 | Hellwege et al. |

FOREIGN PATENT DOCUMENTS

| | | |
|---|---|---|
| WO | 2005/063784 A1 | 7/2005 |
| WO | 2007/142543 A2 | 12/2007 |
| WO | 2008/041863 A1 | 4/2008 |
| WO | 2016/113666 A1 | 7/2016 |
| WO | 2016/167668 A2 | 10/2016 |

OTHER PUBLICATIONS

Hurst et al, 2016, Toxins 8(5), 143.
Ferguson et al, 2012, New Zealand plant protection, pp. 166-173.
Hurst et al, 2011, Int Sys Evol Microbiol, vol. 61, No. 4, pp. 844-849.
Hurst et al, 2011, J Bacteriol, vol. 193, No. 8, pp. 1966-1980.
Landsberg et al, 2011, Sciences, vol. 108, No. 51, pp. 20544-20549.
Murros-Kontiainen et al, 2010, Int Sys Evol Microbiol, vol. 61, No. 10, pp. 2368-2372.
Withers et al, 2013, New Zealand plant protection, vol. 66, pp. 138-147.

*Primary Examiner* — Jennifer E Graser
(74) *Attorney, Agent, or Firm* — Adam Rucker

(57) ABSTRACT

Disclosed herein are combinations of *Yersinia entomophaga* and/or *Yersinia nurmii* and/or toxins therefrom, with one or more of a variety of substances, including animal repellents, acaracides, antimicrobials, avicides, bactericides, biostimulants, disinfectants and/or sanitizers, fungicides, gastropodicides, herbicides, insecticides, insect growth regulators, insect repellents, miticides, molluscicides, nematicides, plant signal molecules, plant nutrients, plant fertilizers, predacides, piscicides, rodenticides, termiticides, viricides, and the like. The combinations may have additive effects or unexpected effects on pests, insects being one example, and/or on plant growth and/or plant yield. Also disclosed are methods for using the disclosed combinations.

14 Claims, No Drawings
Specification includes a Sequence Listing.

COMBINATIONS OF *YERSINIA ENTOMOPHAGA* AND PESTICIDES OR OTHER SUBSTANCES

CROSS-REFERENCE TO RELATED APPLICATIONS

This application is a 35 U.S.C. 371 national application of international application no. PCT/US2018/023690 filed Mar. 22, 2018, which claims priority or the benefit under 35 U.S.C. 119 of U.S. provisional application No. 62/476,233 filed Mar. 24, 2017, the contents of which are fully incorporated herein by reference.

BACKGROUND

*Yersinia entomophaga* is a Gram-negative, pesticidal bacterium, belonging to the family Enterobacteriaceae, of the gamma subdivision of Proteobacteria. The bacterium is active against a wide range of insects, including coleopteran, lepidopteran, and orthopteran insects. The bacterium itself is toxic to the insects, but the bacterium also produces a filterable component (i.e., a toxin) that is insecticidal. The bacterium and/or toxin appear(s) to invade the hemocoel of the insect, through the gut, whereupon death of the insect generally occurs within hours or days.

SUMMARY

Disclosed herein are combinations of *Yersinia entomophaga* and/or *Yersinia nurmii* with one or more of a variety of substances, including animal repellents, acaracides, antimicrobials, avicides, bactericides, biostimulants, disinfectants and/or sanitizers, fungicides, gastropodicides, herbicides, insecticides, insect growth regulators, insect repellents, miticides, molluscicides, nematicides, plant signal molecules, plant nutrients, plant fertilizers, predacides, piscicides, rodenticides, termiticides, viricides, and the like. Also disclosed herein are methods for using the combinations, and results obtained using the methods. Generally, the combinations and methods of using the combination may kill an insect, inhibit growth of an insect, or inhibit reproduction of an insect, including insects in contact with plants. In some examples, the combinations and methods may increase growth or yield of the plants.

DETAILED DESCRIPTION

Definitions

The following includes definitions of selected terms that may be used throughout the disclosure and in the claims. The definitions include various examples and/or forms of components that fall within the scope of a term and that may be used for implementation. The examples are not intended to be limiting. Both singular and plural forms of terms fall within the definitions.

As used herein, the terms "acaricide" and "acaricidal" refer to an agent or combination of agents the application of which is toxic to an acarid (i.e., kills an acarid, inhibits the growth of an acarid and/or inhibits the reproduction of an acarid).

As used herein, "additive," when referring to effects of combinations within a composition means that the effects of the combinations are generally about the same as the sum of effects of the individual components of the combination alone. The combination of individual components producing this effect may be called an additive combination.

As used herein, "antagonistic," when referring to effects of combinations within a composition means that the effects of the combinations are generally less than the sum of effects of the individual components of the combination alone. These compositions may be called antagonistic combinations.

As used herein, the term "biologically pure culture" refers to a microbial culture that is free or essentially free of biological contamination and that has genetic uniformity such that different subcultures taken therefrom will exhibit identical or substantially identical genotyopes and phenotypes. In some embodiments, the biologically pure culture is 100% pure (i.e., all subcultures taken therefrom exhibit identical genotypes and phenotypes). In some embodiments, the biologically pure culture is at least 90, 91, 92, 93, 94, 95, 96, 97, 98, 99, 99.5, 99.6, 99.7, 99.8, or 99.9% pure (i.e., at least 90, 91, 92, 93, 94, 95, 96, 97, 98, 99, 99.5, 99.6, 99.7, 99.8, or 99.9% of the subcultures taken therefrom exhibit identical genotypes and phenotypes).

As used herein, the term "biostimulant" refers to an agent or combination of agents the application of which enhances one or more metabolic and/or physiological processes of a plant or plant part (e.g., carbohydrate biosynthesis, ion uptake, nucleic acid uptake, nutrient delivery, photosynthesis and/or respiration).

As used herein, the terms "effective amount," "effective concentration" and "effective amount/concentration" refer to an amount or concentration that is sufficient to cause a desired effect (e.g. killing of insects, enhanced plant yield). The absolute value of the amount/concentration that is sufficient to cause the desired effect may be affected by factors such as the type and magnitude of effect desired, the type, size and volume of material to which the composition will be applied, the type(s) of microorganisms in the composition, the number of microorganisms in the composition, the stability of the microorganism(s) in the composition and the storage conditions (e.g., temperature, relative humidity, duration). Those skilled in the art will understand how to select an effective amount/concentration using routine dose-response experiments. In some examples, an effective amount of a substance when used alone may be different than an effective amount of the same substance when used as part of a combination.

As used herein, the terms "enhanced growth" and "enhanced plant growth" refer to an improvement in one or more characteristics of plant growth and/or development as compared to one or more control plants (e.g., a plant germinated from an untreated seed or an untreated plant). Exemplary plant growth/development characteristics include, but are not limited to, biomass, carbohydrate biosynthesis, chlorophyll content, cold tolerance, drought tolerance, height, leaf length, leaf mass, leaf number, leaf surface area, leaf volume, nutrient uptake (e.g., calcium, magnesium, nitrogen, phosphorous and/or potassium uptake), rate(s) of photosynthesis, root area, root diameter, root length, root mass, root nodulation (e.g., nodule mass, nodule number, nodule volume), root number, root surface area, root volume, salt tolerance, seed germination, seedling emergence, shoot diameter, shoot length, shoot mass, shoot number, shoot surface area, shoot volume, spread, stomatal conductance and survival rate.

As used herein, the terms "enhanced yield" and "enhanced plant yield" refer to an improvement in one or more characteristics of plant yield as compared to one or more control plants (e.g., a control plant germinated from an untreated seed). Exemplary plant yield characteristics include, but are not limited to, biomass; bushels per acre; grain weight per plot (GWTPP); nutritional content; percentage of plants in a given area (e.g., plot) that fail to produce grain; yield at standard moisture percentage (YSMP), such as grain yield at standard moisture percentage (GYSMP); yield per plot (YPP), such as grain weight per plot (GWTPP); and yield reduction (YRED).

As used herein, the term "foliage" refers to those portions of a plant that normally grow above the ground, including, but not limited to, leaves, stalks, stems, flowers, fruiting bodies and fruits.

As used herein, the terms "foliar application" and "foliarly applied" refer to the application of one or more active ingredients to the foliage of a plant (e.g., to the leaves of the plant). Application may be effected by any suitable means, including, but not limited to, spraying the plant with a composition comprising the active ingredient(s). In some embodiments, the active ingredient(s) is/are applied to the leaves, stems and/or stalk of the plant and not to the flowers, fruiting bodies or fruits of the plant.

As used herein, the terms "fungicide" and "fungicidal" refer to an agent or combination of agents the application of which is toxic to a fungus (i.e., kills a fungus, inhibits the growth of a fungus and/or inhibits the reproduction of a fungus).

As used herein, the term "gastropodicide" refers to an agent or combination of agents the application of which is toxic to a mollusk (e.g., snails, slugs). The term "molluscicide" is generally interchangeable with gastropodicide.

As used herein, the terms "herbicide" and "herbicidal" refer to an agent or combination of agents the application of which is toxic to a weed (i.e., kills a weed, inhibits the growth of a weed and/or inhibits the reproduction of a weed).

As used herein, the terms "insecticide" and "insecticidal" refer to an agent or combination of agents the application of which is toxic to an insect (i.e., kills an insect, inhibits the growth of an insect and/or inhibits the reproduction of an insect).

As used herein, the term "isolated microbial strain" refers to a microbe that has been removed from the environment in which it is normally found.

As used herein, the term "miticide" refers to an agent or combination of agents the application of which is toxic to a mite (i.e., kills, inhibits the growth of, and/or inhibits the reproduction of a mite).

As used herein, the term "modified microbial strain" refers to a microbial strain that is modified from a strain isolated from nature. Modified microbial strains may be produced by any suitable method(s), including, but not limited to, chemical or other form of induced mutation to a polynucleotide within any genome within the strain; the insertion or deletion of one or more nucleotides within any genome within the strain, or combinations thereof; an inversion of at least one segment of DNA within any genome within the strain; a rearrangement of any genome within the strain; generalized or specific transduction of homozygous or heterozygous polynucleotide segments into any genome within the strain; introduction of one or more phage into any genome of the strain; transformation of any strain resulting in the introduction into the strain of stably replicating autonomous extrachromosomal DNA; any change to any genome or to the total DNA composition within the strain isolated from nature as a result of conjugation with any different microbial strain; and any combination of the foregoing. The term modified microbial strains includes a strain with (a) one of more heterologous nucleotide sequences, (b) one or more non-naturally occurring copies of a nucleotide sequence isolated from nature (i.e., additional copies of a gene that naturally occurs in the microbial strain from which the modified microbial strain was derived), (c) a lack of one or more nucleotide sequences that would otherwise be present in the natural reference strain by for example deleting nucleotide sequence, and (d) added extrachromosomal DNA. In some embodiments, modified microbial strains comprise a combination of two or more nucleotide sequences (e.g., two or more naturally occurring genes that do not naturally occur in the same microbial strain) or comprise a nucleotide sequence isolated from nature at a locus that is different from the natural locus.

As used herein, the terms "nematicide" and "nematicidal" refer to an agent or combination of agents the application of which is toxic to a nematode (i.e., kills a nematode, inhibits the growth of a nematode and/or inhibits the reproduction of a nematode).

As used herein, the term "pest" includes any organism or virus that negatively affects a plant, including, but not limited to, organisms and viruses that spread disease, damage host plants and/or compete for soil nutrients. The term "pest" encompasses organisms and viruses that are known to associate with plants and to cause a detrimental effect on the plant's health and/or vigor. Plant pests include, but are not limited to, arachnids (e.g., mites, ticks, spiders, etc.), bacteria, fungi, gastropods (e.g., slugs, snails, etc.), invasive plants (e.g., weeds), insects (e.g., white flies, thrips, weevils, etc.), nematodes (e.g., root-knot nematode, soybean cyst nematode, etc.), rodents and viruses (e.g., tobacco mosaic virus (TMV), tomato spotted wilt virus (TSWV), cauliflower mosaic virus (CaMV), etc.).

As used herein, the terms "pesticide" and "pesticidal" refer to agents or combinations of agents the application of which is toxic to a pest (i.e., kills a pest, inhibits the growth of a pest and/or inhibits the reproduction of a pest). Non-limiting examples of pesticides include acaricides, fungicides, herbicides, insecticides, and nematicides, etc.

As used herein, the term "plant" includes all plant populations, including, but not limited to, agricultural, horticultural and silvicultural plants. The term "plant" encompasses plants obtained by conventional plant breeding and optimization methods (e.g., marker-assisted selection) and plants obtained by genetic engineering, including cultivars protectable and not protectable by plant breeders' rights.

As used herein, the term "plant cell" refers to a cell of an intact plant, a cell taken from a plant, or a cell derived from a cell taken from a plant. Thus, the term "plant cell" includes cells within seeds, suspension cultures, embryos, meristematic regions, callus tissue, leaves, shoots, gametophytes, sporophytes, pollen and microspores.

As used herein, the term "plant part" refers to any part of a plant, including cells and tissues derived from plants. Thus, the term "plant part" may refer to any of plant components or organs (e.g., leaves, stems, roots, etc.), plant tissues, plant cells and seeds. Examples of plant parts, include, but are not limited to, anthers, embryos, flowers, fruits, fruiting bodies, leaves, ovules, pollen, rhizomes, roots, seeds, shoots, stems and tubers, as well as scions, rootstocks, protoplasts, calli and the like.

As used herein, "toxin" refers to the filterable, insecticidal components of the *Yersinia* organisms disclosed herein.
Yersinia entomophaga

*Yersinia entomophaga* is a Gram-negative, pesticidal bacterium with activity against a wide range of insects (see WO 2007/142543; WO 2008/041863; Hurst, M. R. H. et al., 2011, *Yersinia entomophaga* sp. nov., isolated from the New Zealand grass grub *Costelytra zealandica*, Int. J. Syst. Evol. Microbiol., 61, 844-849). At least some of the organism's insecticidal activity is due to a toxin complex. In *Yersinia entomophaga*, the toxin complex (TC) is called Yen-TC and is composed of seven subunits. YenA1 and YenA2 and the chitinases Chi1 and Chi2 combine to form a pentameric cage, into which YenB, and one of YenC1 or YenC2, bind to form the active Yen-TC (Busby, J. N. et al., 2012, Structural Analysis of Chi1 Chitinase from Yen-Tc: The Multisubunit Insecticidal ABC Toxin Complex of *Yersinia entomophaga*, J. Mol. Biol., 415, 359-371.) Yen-TC causes loss of epithelial cell integrity in the insect gut, which allows the bacterium to enter into the insect hemocoel.

Generally, the toxin is secreted by *Yersinia entomophaga* and is easily isolated. Genes encoding other putative toxins have been identified in *Yersinia entomophaga* (Hurst, M. R. H. et al., 2016, The Draft Genome Sequence of the *Yersinia entomophaga* Entomophathogenic Type Strain MH96T, Toxins, 8, 143). Toxin or toxin components may be found in supernatants of media in which *Yersinia entomophaga* is grown in the laboratory.

*Yersinia entomophaga* (strain MH96 is exemplary) is very related to *Yersinia nurmii*. The combinations of *Yersinia* and other substances, described herein, may include both *Yersinia entomophaga* and *Yersinia nurmii*. Herein, the use of the word *Yersinia* alone generally is meant to include both *Yersinia entomophaga* and *Yersinia nurmii*.

The type strain of *Yersinia entomophaga* is strain MH96$^T$, also called MH96, and earlier called MH-1 or SpK. The strain has previously been deposited as DSM 22339 (https://www.dsmz.de/de/kataloge/catalogue/culture/DSM-22339.html) and as ATCC BAA-1678 (https://www.atcc.org/products/all/BAA-1678.aspx). The strain is, therefore, available to the public without restriction. The genome sequence of the MH96 strain is published (Hurst, M. R. H. et al., 2016, The Draft Genome Sequence of the *Yersinia entomophaga* Entomophathogenic Type Strain MH96T, Toxins, 8, 143). The 16S rRNA sequence is designated as GenBank Accession No. DQ400782 and is set forth as SEQ ID NO: 1 below:

```
AGTTTGATCCTGGCTCAGATTGAACGCTGGCGGCAGGCCTAACACATGCA
AGTCGAGCGGCAGCGGAAAGTAGCTTGCTACTTTGCCGGCGAGCGGCGGA
CGGGTGAGTAATGTCTGGGAAACTGCCTGATGGAGGGGGATAACTACTGG
AAACGGTAGCTAATACCGCATAACCTCGCAAGAGCAAAGTGGGGGACCTT
AGGGCCTCACGCCATCGGATGTGCCCAGATGGGATTAGCTAGTAGGTGGG
GTAATGGCTCACCTAGGCGACGATCCCTAGCTGGTCTGAGAGGATGACCA
GCCACACTGGAACTGAGACACGGTCCAGACTCCTACGGGAGGCAGCAGTG
GGGAATATTGCACAATGGGCGCAAGCCTGATGCAGCCATGCCGCGTGTGT
GAAGAAGGCCTTCGGGTTGTAAAGCACTTTCAGCGAGGAGGAAGGCATTT
CACCTAATACGTGAAGTGATTGACGTTACTCGCAGAAGAAGCACCGGCTA
ACTCCGTGCCAGCAGCCGCGGTAATACGGAGGGTGCAAGCGTTAATCGGA
ATTACTGGGCGTAAAGCGCACGCAGGCGGTTTGTTAAGTCAGATGTGAAA
TCCCCGAGCTTAACTTGGGAACTGCATTTGAAACTGGCAAGCTAGAGTCT
TGTAGAGGGGGGTAGAATTCCAGGTGTAGCGGTGAAATGCGTAGAGATCT
GGAGGAATACCGGTGGCGAAGGCGGCCCCCTGGACAAAGACTGACGCTCA
GGTGCGAAAGCGTGGGGAGCAAACAGGATTAGATACCCTGGTAGTCCACG
CTGTAAACGATGTCGACTTGGAGGTTGTGCCCTTGAGGCGTGGCTTCCGG
AGCTAACGCGTTAAGTCGACCGCCTGGGGAGTACGGCCGCAAGGTTAAAA
CTCAAATGAATTGACGGGGGCCCGCACAAGCGGTGGAGCATGTGGTTTAA
TTCGATGCAACGCGAAGAACCTTACCTACTCTTGACATCCACAGAACGTA
GCAGAGATGCTTCGGTGCCTTCGGGAACTGTGAGACAGGTGCTGCATGGC
TGTCGTCAGCTCGTGTTGTGAAATGTTGGGTTAAGTCCCGCAACGAGCGC
AACCCTTATCCTTTGTTGCCAGCACGTCATGGTGGGAACTCAAGGGAGAC
TGCCGGTGATAAACCGGAGGAAGGTGGGGATGACGTCAAGTCATCATGGC
CCTTACGAGTAGGGCTACACACGTGCTACAATGGCAGATACAAAGTGAAG
CGAACTCGCGAGAGCAAGCGGACCACATAAAGTCTGTCGTAGTCCGGATT
GGAGTCTGCAACTCGACTCCATGAAGTCGGAATCGCTAGTAATCGTAGAT
CAGAATGCTACGGTGAATACGTTCCCGGGCCTTGTACACACCGCCCGTCA
CACCATGGGAGTGGGTTGCAAAAGAAGTAGGTAGCTTAACCTTCGGGAGG
GCGCTTACCACTTTGTGATTCATGACTGGGGTGAAGTCGTAACAAGGTAA
CCGTAGAATTCTT
```

In some examples, organisms with a 16S rRNA sequence at least 98, 99 or 100% identical to SEQ ID NO: 1 may be *Yersinia entomophaga*. In some examples, organisms with a 16S rRNA sequence at least 98.0, 98.1, 98.2, 98.3, 98.4, 98.5, 98.6, 98.7, 98.8 or 98.9% identical to SEQ ID NO: 1 may be *Yersinia entomophaga*. In some examples, organisms with a 16S rRNA sequence at least 99.0, 99.1, 99.2, 99.3, 99.4, 99.5, 99.6, 99.7, 99.8 or 99.9% identical to SEQ ID NO: 1 may be *Yersinia entomophaga*.

In some examples, organisms with a whole genome sequence that is at least 15, 20, 25, 30, 35, 40, 45, 50, 55, 60, 65, 70, 75, 80, 85, 90, 95, 96, 97, 98 or 99% identical to the whole genome sequence of *Yersinia entomophaga* strain MH96, as published in, Hurst, M. R. H. et al., 2016, The Draft Genome Sequence of the *Yersinia entomophaga* Entomophathogenic Type Strain MH96T, Toxins, 8, 143, may be *Yersinia entomophaga*.

Other information related to *Yersinia entomphaga* and to the MH96 strain may be found here: https://bacdive.dsmz.de/strain/5229.

Taxonomically, *Yersinia entomphaga* and *Yersinia nurmii* are taxonomically distant from other *Yersinia*, including *Yersinia* that are pathogenic for humans. *Yersinia entomphaga* and *Yersinia nurmii* form a distinct clade away from other *Yersinia* species (Reuter, S. et al., 2014, Parallel Independent Evolution of Pathogenicity within the Genus *Yersinia*. PNAS, 111, 6768-6773). Bioinformatic analysis of the *Yersinia entomphaga* genome failed to identify orthologs of know *Yersinia pestis* or *Yersinia pseudotuberculosis* virulence determinants, for example (Hurst, M. R. H. et al., 2016, The Draft Genome Sequence of the *Yersinia entomophaga* Entomophathogenic Type Strain MH96T, Toxins, 8, 143).

Herein, the MH96 strain may be referred to as O43NEW or (NRRL B-67598). Other strains of *Yersinia entomphaga* have been isolated by this laboratory, determined to be strains of *Yersinia entomphaga* using taxonomic methods well-known in the art, and some of those strains have been used in the studies described herein. Examples of these strains may include strains O23ZMJ, O24G3R (NRRL B-67599), O24KEK (NRRL B-67600), O333A4 (NRRL B-67601) and O348UX. Other *Yersinia entomphaga* strains have been isolated.

The whole genome sequence of many of the strains isolated by this laboratory has been determined. Based on comparison of these sequences with the published whole genome sequence of the MH96 strain (Hurst, M. R. H. et al., 2016, The Draft Genome Sequence of the *Yersinia entomophaga* Entomophathogenic Type Strain MH96T, Toxins, 8, 143), the O23ZMJ strain is 99.59% identical to MH96; the O24G3R strain is 99.74% identical to MH96; the O24KEK strain is 99.69% identical to MH96; and the O333A4 strain is 99.7% identical to MH96, based on average nucleotide identity (ANI) scores.

*Yersinia* may be cultured using any suitable method(s), including, but not limited to, liquid-state fermentation and solid-state fermentation. In some examples, *Yersinia entomophaga* may be grown on/in Luria (LB) agar/medium. The compositions described herein may contain *Yersinia* organisms and/or may contain a toxin from the organisms (cell free filtrate). The toxin may be purified or partially purified away from other, non-toxin components. Purification or partial purification of the toxin and/or subunits may use standard protein purification methodologies that are known in the art.

*Yersinia* may be harvested during any suitable growth phase. In some embodiments, *Yersinia* is allowed to reach the stationary growth phase and is harvested as vegetative cells.

*Yersinia* may be harvested and/or concentrated using any suitable method(s), including, but not limited to, centrifugation (e.g., density gradient centrifugation, disc stack centrifugation, tubular bowl centrifugation), coagulation, decanting, felt bed collection, filtration (e.g., drum filtration, sieving, ultrafiltration), flocculation, impaction and trapping (e.g., cyclone spore trapping, liquid impingement).

The present disclosure also provides cultures comprising, consisting essentially of or consisting of the *Yersinia* disclosed herein. In some embodiments, at least 95, 96, 97, 98, 99, 99.5, 99.6, 99.7, 99.8, or 99.9% of subcultures taken from the culture exhibit a genotype that is at least 95, 96, 97, 98, 99%, 99.1%, 99.2%, 99.3%, 99.4%, 99.5%, 99.55%, 99.6%, 99.65%, 99.7%, 99.75%, 99.8%, 99.85%, 99.9%, 99.95%, or 100% identical to that of the *Yersinia* disclosed herein. In some embodiments, the culture is a biologically pure culture of the *Yersinia*.

*Yersinia* may be formulated into any suitable type of composition, including, but not limited to, foliar applications, seed coatings and soil applications. The *Yersinia* compositions may include suitable chemical insecticides. In some embodiments, *Yersinia* is formulated separately from insecticides that will be used in combination or along with *Yersinia*. In that situation, the chemical insecticide formulation is generally compatible with the formulation of *Yersinia*.

In some embodiments, the present disclosure provides compositions comprising *Yersinia* in an agriculturally acceptable carrier.

*Yersinia* may be incorporated into compositions in any suitable amount/concentration. The absolute value of the amount/concentration that is/are sufficient to cause the desired effect(s) may be affected by factors such as the type, size and volume of material to which the composition will be applied and storage conditions (e.g., temperature, relative humidity, duration). Those skilled in the art will understand how to select an effective amount/concentration using routine dose-response experiments.

In some embodiments, compositions of the present disclosure comprise *Yersinia* in an amount ranging from about $1 \times 10^1$ to about $1 \times 10^{15}$ colony-forming units (CFU) per gram and/or milliliter of composition. For example, compositions of the present disclosure may comprise about $1 \times 10^1$, $1 \times 10^2$, $1 \times 10^3$, $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ or more CFU of *Yersinia* per gram and/or milliliter of composition. In some embodiments, compositions of the present disclosure comprise at least $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ CFU of *Yersinia* per gram and/or milliliter of composition.

In some embodiments, *Yersinia* comprise about 0.00000001 to about 95% (by weight) of the composition. For example, compositions of the present disclosure may comprise about 0.0000001, 0.000001, 0.00001, 0.0001, 0.001, 0.01, 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95% or more (by weight) of *Yersinia*. In some embodiments, *Yersinia* comprises about 1 to about 25%, about 5 to about 20%, about 5 to about 15%, about 5 to about 10% or about 8 to about 12% (by weight) of the composition.

In some embodiments, compositions of the present disclosure comprise *Yersinia* in an effective amount/concentration for enhancing plant growth/yield and/or for insecticidal or other pesticidal activity when the composition is introduced into a plant growth medium (e.g., a soil).

In some embodiments, compositions of the present disclosure comprise *Yersinia* in an effective amount/concentration for enhancing plant growth/yield and/or for insecticidal activity when the composition is applied to a plant or plant part.

Compositions Containing Combinations of *Yersinia* and Pesticides or Other Substances The disclosure herein describes *Yersinia entomophaga* and/or *Yersinia nurmii* in combination with one or more pesticides and/or one or more other substances. Pesticidal agents include chemical pesticides and biopesticides or biocontrol agents. Various types of chemical pesticides and biopesticides include acaricides, insecticides, nematicides, fungicides, gastropodicides, herbicides, virucides, bactericides, miticides and combinations thereof. Biopesticides or biocontrol agents may include bacteria, fungi, beneficial nematodes, and viruses that exhibit pesticidal activity. Compositions may comprise other agents for pest control, such as microbial extracts, plant growth activators, and/or plant defense agents. In some examples, one or more toxins from *Yersinia* are added to the combination of *Yersinia* organisms and the pesticidal agents/other substances. In some examples, a toxin from *Yersinia* is combined with one or more pesticidal agents/other substances, in absence of the organisms. Biostimulants and/or plant signal molecules may be part of the compositions in some examples.

In some examples, disclosed herein are combinations of one or more *Yersinia entomophaga*, or *Yersinia nurmii* strains with one or more of a variety of substances, including animal repellents, acaricides, antimicrobials, avicides, bactericides, disinfectants and/or sanitizers, gastropodicides, fungicides, herbicides, insecticides, insect growth regulators, insect repellents, miticides, molluscicides, nematicides, plant signal molecules, predacidse, piscicides, rodenticides, termiticides, virucides, and the like. In some examples, one or more toxins from *Yersinia* are added to the combination of *Yersinia* organisms and the substances above. In some examples, a toxin from *Yersinia* is combined with one or more of the substances above, in absence of the *Yersinia* organisms.

The number of different *Yersinia* organisms or strains in the combinations disclosed here is not limited. Likewise, the number of different pesticides and/or other substances within a disclosed combination is not limited. A composition may contain one *Yersinia* and one pesticide or other substance. A combination may contain multiple *Yersinia* strains and multiple pesticides, insecticides and/or other substances. Individual components of a combination may be combined as part of a manufacturing or formulation process or may be combined immediately prior to use. In some examples, individual components of a combination may not be combined until they are applied to a plant (e.g., individual components are applied separately to plants, but simultaneously or at about the same time).

Generally, the individual components are present in at least an effective amount within the composition. In some examples, the compositions containing these individual components may produce unexpected effects, as compared to the effects of individual components of the combination. These effects may be one or more of pesticidal, insecticidal, enhanced plant growth, enhanced plant yield, and the like. In some examples, the compositions containing these individual components produce additive effects, as compared to the effects of individual components of the combination. The additive effects may be one or more of pesticidal, insecticidal, enhanced plant growth, enhanced plant yield, and the like. In some examples, the compositions containing these individual components produce antagonistic effects, as compared to the effects of individual components of the combination.

In some examples, the *Yersinia entomophaga* and/or *Yersinia nurmii* may be combined with pesticides, including insecticides. In these examples, assays for activity of the combination may examine its effects on insects. Generally, the assays used to determine insecticidal activity (e.g., leaf disk assays) in the laboratory, accurately reflect efficacy/ activity/results of combinations of *Yersinia entomophaga* and chemical insecticides in the field.

The insecticidal activity of the combination (*Yersinia entomophaga*+insecticides, for example) may be unexpected as compared to the activities of the individual components of the combination. The insecticidal activity of the combination may be additive as compared to the activities of the individual components of the combination. The insecticidal activity of the combination may be antagonistic as compared to the activities of the individual components of the combination.

In some examples, the *Yersinia entomophaga* and/or *Yersinia nurmii* may be combined with substances and the combinations may be examined for activity on plant growth or yield. In some examples, the effects of the combinations may be unexpected on plant growth and/or yield (e.g., enhanced plant growth and/or enhanced plant yield). In some examples, the effects may be additive on plant growth and/or yield.

Although unexpected effects of the combinations described herein are advantageous, in some examples there may be advantages in using combinations of *Yersinia* and pesticides and/or other substances that produce additive or even antagonistic effects. For example, an amount of a chemical pesticide may be needed to control a specific pest. However, if the pesticide has detrimental effects, on the environment for example, it may be desirable to reduce the amount of chemical pesticide used, but still retain the level of activity of the full amount of pesticide, by using an agent (e.g., *Yersinia*) that has less of or no detrimental effect on the environment. If a combination of *Yersinia* and a lower amount of the pesticide can produce the same effect on the pest, and/or on plant growth or yield, when the effect is additive, the benefit to the environment may favor use of that combination over use of the higher amount of pesticide alone. Also, because pesticides and/or other substances may have adverse effects on *Yersinia* when in contact with the bacterium (e.g., the pesticides may be toxic to the bacterium; see Example 1), it may not be obvious which pesticide will satisfactorily function with the bacteria.

Below, are described substances that may be combined with *Yersinia* to yield the compositions that are the subject of this patent application. The disclosed pesticides/other substances generally are grouped (e.g., Group 1, fungicides; Group 2, gastropodicides; Group 3, herbicides; Group 4, insecticides and/or nematicides; Group 5, acaracides and/or miticides; Group 6, biostimulants; Group 7, plant signal molecules; Group 8, other microbes) for the purposes of this disclosure. Each group generally contains pesticides/other substances that generally produce similar activities, within the contexts applicable herein (e.g., individual fungicides generally are active against fungi). However, herein, individual substances placed into the same group may have different levels of an activity, may produce their activities under different conditions and/or circumstances, and may have more than one activity (and, therefore, appear in more than one group). The groupings herein, therefore, are generally qualitative rather than quantitative, and facilitate drafting the claims, which are directed to many different combinations.

Fungicides (Group 1)

Herein, the substances described in this section are part of Group 1. Fungicides may be selected to provide effective control against a broad spectrum of phytopathogenic fungi (and fungus-like organisms), including, but not limited to, soil-borne fungi from the classes Ascomycetes, Basidiomycetes, Chytridiomycetes, Deuteromycetes (syn. Fungi imperfecti), Peronosporomycetes (syn. Oomycetes), Plasmodiophoromycetes and Zygomycetes. According to some embodiments, the compositions comprise a fungicide (or combination of fungicides) that is toxic to one or more strains of *Albugo* (e.g., *A. candida*), *Alternaria* (e.g. *A. alternata*), *Aspergillus* (e.g., *A. candidus, A. clavatus, A. flavus, A. fumigatus, A. parasiticus, A. restrictus, A. sojae, A. solani*), *Blumeria* (e.g., *B. graminis*), *Botrytis* (e.g., *B. cinerea*), *Cladosporum* (e.g., *C. cladosporioides*), *Colletotrichum* (e.g., *C. acutatum, C. boninense, C. capsici, C. caudatum, C. coccodes, C. crassipes, C. dematium, C. destructivum, C. fragariae, C. gloeosporioides, C. graminicola, C. kehawee, C. lindemuthianum, C. musae, C. orbiculare, C. spinaceae, C. sublineolum, C. trifolii, C. truncatum*), *Fusarium* (e.g., *F. graminearum, F. moniliforme, F. oxysporum, F. roseum, F. tricinctum*), *Helminthosporium*, *Magnaporthe* (e.g., *M. grisea, M. oryzae*), *Melamspora* (e.g., *M. lini*), *Mycosphaerella* (e.g., *M. graminicola*), *Nematospora*, *Penicillium* (e.g., *P. rugulosum, P. verrucosum*), *Phakopsora* (e.g., *P. pachyrhizi*), *Phomopsis*, *Phytiphtoria* (e.g., *P. infestans*), *Puccinia* (e.g., *P. graminis, P. striiformis, P. tritici, P. triticina*), *Pucivinia* (e.g., *P. graministice*), *Pythium*, *Pytophthora*, *Rhizoctonia* (e.g., *R. solani*), *Scopulariopsis*, *Selerotinia*, *Thielaviopsis* and/or *Ustilago* (e.g., *U. maydis*). Additional examples of fungi may be found in Bradley, *Managing Diseases*, in ILLINOIS AGRONOMY HANDBOOK (2008).

In some embodiments, compositions of the present disclosure comprise one or more chemical fungicides and *Yersinia*. Non-limiting examples of chemical fungicides include strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester and 2-(2-(3-(2,6-dichlorophenyl)-1-methyl-allylideneaminooxymethyl)-phenyl)-2-methoxyimino-N-methyl-acetamide; carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, oxytetracyclin, silthiofam and N-(6-methoxy-pyridin-3-yl) cyclopropanecarboxylic acid amide; azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pirroles (e.g., fenpiclonil, fludioxonil), morpholines (e.g., aldimorph, dodemorph, dodemorph-acetate, fenpropimorph, tridemorph), piperidines (e.g., fenpropidin), dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methyl sulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A); nitrophenyl derivates (e.g., binapacryl, dicloran, dinobuton, dinocap, nitrothal-isopropyl, tecnazen); organometal compounds (e.g., fentin salts, such as fentin-acetate, fentin chloride, fentin hydroxide); sulfur-containing heterocyclyl compounds (e.g., dithianon, isoprothiolane); organophosphorus compounds (e.g., edifenphos, fosetyl, fosetyl-aluminum, iprobenfos, phosphorus acid and its salts, pyrazophos, tolclofos-methyl); organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanate, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In some embodiments, compositions of the present disclosure comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole. In some embodiments, compositions of the present disclosure comprise azoxystrobin, pyraclostrobin, fluoxastrobin, trifloxystrobin, ipconazole, prothioconazole, sedaxane, fludioxonil, metalaxyl, mefenoxam, thiabendazole, fluxapyroxad and/or fluopyram. In some embodiments, compositions of the present disclosure comprise one or more aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides and/or triazoles.

Gastropodicides (Group 2)

Herein, the substances described in this section are part of Group 2. There are a variety of substances that are known in the art to have activity against various gastropods. Some of these substances have activity against organisms other than gastropods. Some of these substances include methiocarb, metaldehyde, carbaryl, spinosad, copper sulfate in combination with lime, boric acid, diatomaceous earth, iron phosphate, and others.

Herbicides (Group 3)

Herein, the substances described in this section are part of Group 3. Herbicides may be selected to provide effective control against a broad spectrum of plants, including, but not limited to, plants from the families Asteraceae, Caryophyllaceae, Poaceae and Polygonaceae. According to some embodiments, the composition comprises an herbicide (or combination of herbicides) that is toxic to one or more strains of *Echinochloa* (e.g., *E. brevipedicellata, E. callopus, E. chacoensis, E. colona, E. crus-galli, E. crus-pavonis, E. elliptica, E. esculenta, E. frumentacea, E. glabrescens, E. haploclada, E. helodes, E. holciformis, E. inundata, E. jaliscana, E. Jubata, E. kimberleyensis, E. lacunaria, E. macrandra, E. muricata, E. obtusiflora, E. oplismenoides, E. orzyoides, E. paludigena, E. picta, E. pithopus, E. polystachya, E. praestans, E. pyramidalis, E. rotundiflora, E. stagnina, E. telmatophila, E. turneriana, E. ugandensis, E. walteri*), *Fallopia* (e.g., *F. baldschuanica, F. japonica, F. sachalinensis*), *Stellaria* (e.g., *S. media*) and/or *Taraxacum* (e.g., *T. albidum, T. aphrogenes, T. brevicorniculatum, T. californicum, T. centrasiatum, T. ceratophorum, T. erythrospermum, T. farinosum, T. holmboei, T. japonicum, T. kok-saghyz, T. laevigatum T. officinale, T. platycarpum*).

Additional species of plants that may be targeted by compositions of the present disclosure may be found in Hager, *Weed Management*, in ILLINOIS AGRONOMY HANDBOOK (2008) and LOUX ET AL., WEED CONTROL GUIDE FOR OHIO, INDIANA AND ILLINOIS (2015).

In some embodiments, compositions of the present disclosure comprise one or more chemical herbicides. Non-limiting examples of chemical herbicides include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diuron, dithiopyr, fenoxaprop, fluazifop, fluazifop-P, fluometuron, flufenpyr-ethyl, flumiclorac-pentyl, flumioxazin, fluoroglycofen, fluthiacet-methyl, fomesafe, fomesafen, glyphosate, glufosinate, haloxyfop, hexazinone, imazamox, imazaquin, imazethapyr, ioxynil, isoproturon, isoxaflutole, lactofen, linuron, mecoprop, mecoprop-P, mesotrion, metamitron, metazochlor, methibenzuron, metolachlor (and S-metolachlor), metoxuron, metribuzin, monolinuron, oxadiargyl, oxadiazon, oxyfluorfen, phenmedipham, pretilachlor, profoxydim, prometon, prometry, propachlor, propanil, propaquizafop, propisochlor, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in U.S. Pat. No. 7,989,393), thenylchlor, tralkoxydim, triclopyr, trietazine, tropramezone, salts and esters thereof; racemic mixtures and resolved isomers thereof and combinations thereof. In some embodiments, compositions of the present disclosure comprise acetochlor, clethodim, dicamba, flumioxazin, fomesafen, glyphosate, glufosinate, mesotrione, quizalofop, saflufenacil, sulcotrione, S-3100 and/or 2,4-D. In some embodiments, compositions of the present disclosure comprise glyphosate, glufosinate, dicamba, 2,4-D, acetochlor, metolachlor, pyroxasulfone, flumioxazin, fomesafen, lactofen, metribuzin, mesotrione, and/or ethyl 2-((3-(2-chloro-4-fluoro-5-(3-methyl-2,6-dioxo-4-(trifluoromethyl)-2,3-dihydropyrimidin-1(6H)-yl)phenoxy)pyridin-2-yl)oxy)acetate. In some embodiments, compositions of the present disclosure comprise one or more acetyl CoA carboxylase (ACCase) inhibitors, acetolactate synthase (ALS) inhibitors, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof.

Insecticides and/or Nematicides (Group 4)

Herein, the substances described in this section are part of Group 4. Insecticides may be selected to provide effective control against a broad spectrum of insects, including, but not limited to, insects from the orders Coleoptera, Dermaptera, Diptera, Hemiptera, Homoptera, Hymenoptera, Lepidoptera, Orthoptera and Thysanoptera. For example, compositions of the present disclosure may comprise one or more insecticides toxic to insects from the families Acrididae, Aleytodidae, Anobiidae, Anthomyiidae, Aphididae, Bostrichidae, Bruchidae, Cecidomyiidae, Cerambycidae, Cercopidae, Chrysomelidae, Cicadellidae, Coccinellidae, Cryllotalpidae, Cucujidae, Curculionidae, Dermestidae, Elateridae, Gelechiidae, Lygaeidae, Meloidae, Membracidae, Miridae, Noctuidae, Pentatomidae, Pyralidae, Scarabaeidae, Silvanidae, Spingidae, Tenebrionidae and/or Thripidae. According to some embodiments, the composition comprises an insecticide (or combination of insecticides) that is toxic to one or more species of *Acalymma*, *Acanthaoscelides* (e.g., *A. obtectus*,), *Anasa* (e.g., *A. tristis*), *Anastrepha* (e.g., *A. ludens*), *Anoplophora* (e.g., *A. glabripennis*), *Anthonomus* (e.g., *A. eugenii*), *Acyrthosiphon* (e.g., *A. pisum*), *Bactrocera* (e.g. *B. dosalis*), *Bemisia* (e.g., *B. argentifolii*, *B. tabaci*), *Brevicoryne* (e.g., *B. brassicae*), *Bruchidius* (e.g., *B. atrolineatus*), *Bruchus* (e.g., *B. atomarius*, *B. dentipes*, *B. lentis*, *B. pisorum* and/or *B. rufipes*), *Callosobruchus* (e.g., *C. chinensis*, *C. maculatus*, *C. rhodesianus*, *C. subinnotatus*, *C. theobromas*), *Caryedon* (e.g., *C. serratus*), *Cassadinae*, *Ceratitis* (e.g., *C. capitata*), *Chrysomelinae*, *Circulifer* (e.g., *C. tenellus*), *Criocerinae*, *Cryptocephalinae*, *Cryptolestes* (e.g., *C. ferrugineus*, *C. pusillis*, *C. pussilloides*), *Cylas* (e.g., *C. formicarius*), *Delia* (e.g., *D. antiqua*), *Diabrotica*, *Diaphania* (e.g., *D. nitidalis*), *Diaphorina* (e.g., *D. citri*), *Donaciinae*, *Ephestia* (e.g, *E. cautella*, *E. elutella*, *E., keuhniella*), *Epilachna* (e.g., *E. varivestris*), *Epiphyas* (e.g., *E. postvittana*), *Eumolpinae*, *Galerucinae*, *Helicoverpa* (e.g., *H. zea*), *Heteroligus* (e.g., *H. metes*), *Iobesia* (e.g., *I. botrana*), *Lamprosomatinae*, *Lasioderma* (e.g., *L. serricorne*), *Leptinotarsa* (e.g., *L. decemlineata*), *Leptoglossus*, *Liriomyza* (e.g., *L. trifolii*), *Manducca*, *Melittia* (e.g., *M. cucurbitae*), *Myzus* (e.g., *M. persicae*), *Nezara* (e.g., *N. viridula*), *Orzaephilus* (e.g., *O. merator*, *O. surinamensis*), *Ostrinia* (e.g., *O. nubilalis*), *Phthorimaea* (e.g., *P. operculella*), *Pieris* (e.g., *P. rapae*), *Plodia* (e.g., *P. interpunctella*), *Plutella* (e.g., *P. xylostella*), *Popillia* (e.g., *P. japonica*), *Prostephanus* (e.g., *P. truncates*), *Psila*, *Rhizopertha* (e.g., *R. dominica*), *Rhopalosiphum* (e.g., *R. maidis*), *Sagrinae*, *Solenopsis* (e.g., *S. Invicta*), *Spilopyrinae*, *Sitophilus* (e.g., *S. granaries*, *S. oryzae* and/or *S. zeamais*), *Sitotroga* (e.g., *S. cerealella*), *Spodoptera* (e.g., *S. frugiperda*), *Stegobium* (e.g., *S. paniceum*), *Synetinae*, *Tenebrio* (e.g., *T. malens* and/or *T. molitor*), *Thrips* (e.g., *T. tabaci*), *Trialeurodes* (e.g., *T. vaporariorum*), *Tribolium* (e.g., *T. castaneum* and/or *T. confusum*), *Trichoplusia* (e.g., *T. ni*), *Trogoderma* (e.g., *T. granarium*) and *Trogossitidae* (e.g., *T. mauritanicus*). Additional species of insects that may be targeted by compositions of the present disclosure may be found in CAPINERA, HANDBOOK OF VEGETABLE PESTS (2001) and Steffey and Gray, *Managing Insect Pests*, in ILLINOIS AGRONOMY HANDBOOK (2008).

Nematicides may be selected to provide effective control against a broad spectrum of nematodes, including, but not limited to, phytoparasitic nematodes from the classes Chromadorea and Enoplea. According to some embodiments, the composition comprises a nematicide (or combination of nematicides) that is toxic to one or more strains of *Anguina*, *Aphelenchoides*, *Belonolaimus*, *Bursaphelenchus*, *Ditylenchus*, *Globodera*, *Helicotylenchus*, *Heterodera*, *Hirschmanniella*, *Meloidogyne*, *Naccobus*, *Pratylenchus*, *Radopholus*, *Rotylenshulus*, *Trichodorus*, *Tylenchulus* and/or *Xiphinema*. Additional species that may be targeted by compositions of the present disclosure may be found in CAPINERA, HANDBOOK OF VEGETABLE PESTS (2001) and Niblack, *Nematodes*, in ILLINOIS AGRONOMY HANDBOOK (2008).

In some embodiments, compositions of the present disclosure comprise one or more chemical insecticides and/or nematicides. Non-limiting examples of chemical insecticides and nematicides include acrinathrin, alpha-cypermethrin, betacyfluthrin, cyhalothrin, cypermethrin, deltamethrin, csfenvalcrate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthri, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, imidaclothiz, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl) methyl](2,2-difluoroethyl)amino}furan-2(5H)-one, cadusaphos, carbaryl, carbofuran, ethoprophos, thiodicarb, aldicarb, aldoxycarb, metamidophos, methiocarb, sulfoxaflor, cyantraniliprole and tioxazofen and combinations thereof. In some embodiments, compositions of the present disclosure comprise abamectin, aldicarb, aldoxycarb, bifenthrin, carbofuran, chlorantraniliporle, chlothianidin, cyfluthrin, cyhalothrin, cypermethrin, cyantraniliprole, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam and/or thiodicarb. In some embodiments, compositions of the present disclosure comprise one or more carbamates, diamides, macrocyclic lactones, neonicotinoids, organophosphates, phenylpyrazoles, pyrethrins, spinosyns, synthetic pyrethroids, tetronic acids and/or tetramic acids. In some embodiments, compositions of the present disclosure comprise an insecticide selected from the group consisting of clothianidin, thiamethoxam, imidacloprid, cyantraniliprole, chlorantraniliprole, fluopyram and tioxazafen.

In some examples, insecticides include methomyl, examples of which are Lannate® and Acinate 24 L, which has activity at least against armyworms; oxamyl, one example of which is Vydate®, which has activity at least against armyworms; carbaryl, one of which is Sevin®, which has activity at least against codling moths; acephate, one of which is Orthene®, which has activity at least against armyworms; Lambda-cyhalothrin, examples of which are Mustang Max®, Baythroid®, and Karate, which have activity at least against armyworms; esfenvalerate, one of which is Asana®; fenpropathrin, one of which is Danitol®, which has activity at least against armyworms; spinosad, examples of which are Entrust®, PESTANAL® and Monterey Garden Insect Spray, which has activity at least against armyworms and/or codling moths; spinetoram, one of which is Radiant®, which has activity at least against codling moths; emamectin benzoate, one of which is Proclaim®; tebufenozide, one of which is Confirm®, which has activity at least against armyworms; methoxyfenozide, one of which is Intrepid®, which has activity at least against armyworms; ryaxypry, examples of which are Prevathon® and Coragen®; chlorantraniliprole, examples of which include Voliam® and Acelepryn™, which have activity at least against armyworms and codling moths; flubendiamide, examples of which include Fenos®, Toursismo®, Synapse™, Vetica™ and BELT®, which have activity at least against armyworms; indoxacarb, examples of which are Avaunt® and Steward®, which have activity at least against armyworms; CYD-X™, which has activity at least against codling moths; and novaluron, examples of which are Romon® and Pedestal®.

Acaracides and/or Miticides (Group 5)

Herein, the substances described in this section are part of Group 5. There are a variety of substances that are known in the art to have activity against various acarides. Some of these substances have activity against organisms other than acarides. Non-limiting examples of acaracides/mitides may include carvacrol, sanguinarine, azobenzene, benzoximate, benzyl benzoate, bromopropylate, chlorbenside, chlorfenethol, chlorfenson, chlorfensulphide, chlorobenzilate, chloropropylate, cyflumetofen, DDT, dicofol, diphenyl sulfone, dofenapyn, fenson, fentrifanil, fluorbenside, genit, hexachlorophene, phenproxide, proclonol, tetradifon, tetrasul, benomyl, carbanolate, carbaryl, carbofuran, methiocarb, metolcarb, promacyl, propoxur, aldicarb, butocarboxim, oxamyl, thiocarboxime, thiofanox, bifenazate, binapacryl, dinex, dinobuton, dinocap-4, dinocap-6, dinocton, dinopenton, dinosulfon, dinoterbon, DNOC, amitraz, chlordimeform, chloromebuform, formetanate, formparanate, medimeform, semiamitraz, afoxolaner, fluralaner, sarolaner, tetranactin ○avermectin acaricides, abamectin, doramectin, eprinomectin, ivermectin, selamectin, milbemectin, milbemycin oxime, moxidectin, clofentezine, cyromazine, diflovidazin, dofenapyn, fluazuron, flubenzimine, flucycloxuron, flufenoxuron, hexythiazox, bromocyclen, camphechlor, DDT, dienochlor, endosulfan, lindane, chlorfenvinphos, crotoxyphos, dichlorvos, heptenophos, mevinphos, monocrotophos, naled, TEPP, tetrachlorvinphos, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton-O, demeton-S, demeton-O-methyl, demeton-S-methyl, demeton-S-methylsulphon, dialifos, diazinon, dimethoate, dioxathion, disulfoton, endothion, ethion, ethoatemethyl, formothion, malathion, mecarbam, methacrifos, omethoate, oxydeprofos, oxydisulfoton, parathion, phenkapton, phorate, phosalone, phosmet, phostin, phoxim, pirimiphos-methyl, prothidathion, prothoate, pyrimitate, quinalphos, quintiofos, sophamide, sulfotep, thiometon, triazophos, trifenofos, vamidothion, trichlorfon, isocarbophos, methamidophos, propetamphos, dimefox, mipafox, schradan, azocyclotin, cyhexatin, fenbutatin oxide, phostin, dichlofluanid, dialifos, phosmet, cyenopyrafen, fenpyroximate, pyflubumide, tebufenpyrad, acetoprole, fipronil, vaniliprole, acrinathrin, bifenthrin, brofluthrinate, cyhalothrin, alpha-cypermethrin, fenpropathrin, fenvalerate, flucythrinate, flumethrin, tau-fluvalinate, permethrin, halfenprox, pyrimidifen, chlorfenapyr, sanguinarine, chinomethionat, thioquinox, bifujunzhi, fluacrypyrim, flufenoxystrobin, pyriminostrobin, aramite, propargite, spirodiclofen, clofentezine, diflovidazin, flubenzimine, hexythiazox, fenothiocarb, chloromethiuron, diafenthiuron, acequinocyl, amidoflumet, arsenous oxide, clenpirin, closantel, crotamiton, cycloprate, cymiazole, disulfiram, etoxazole, fenazaflor, fenazaquin, fluenetil, mesulfen, MNAF, nifluridide, nikkomycins, pyridaben, sulfiram, sulfluramid, sulfur, thuringiensin, and triarathene.

Biostimulants (Group 6)

Herein, the substances described in this section are part of Group 6. Compositions of the present disclosure may comprise any suitable biostimulant(s), including, but not limited to, seaweed extracts (e.g., Ascophyllum nodosum extracts, such as alginate, Ecklonia maxima extracts, etc.), myo-inositol, glycine and combinations thereof.

In some embodiments, compositions of the present disclosure comprise one or more biostimulants in an amount/concentration of about 0.0001 to about 5% or more (by weight) of the composition. In some embodiments, the biostimulant(s) (e.g., glycine and/or seaweed extract) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% or more (by weight) of one or more biostimulants (e.g., glycine and/or seaweed extract).

Plant Signal Molecules (Group 7)

Herein, the substances described in this section are part of Group 7. Compositions of the present disclosure may comprise any suitable plant signal molecule(s), including, but not limited to, lipo-chitooligosaccharides (LCOs), chitooligosaccharides (COs), chitinous compounds, flavonoids, non-flavonoid node-gene inducers, jasmonic acid or derivatives thereof, linoleic acid or derivatives thereof, linolenic acid or derivatives thereof and karrikins.

Compositions of the present disclosure may comprise any suitable LCO(s). LCOs, sometimes referred to as symbiotic nodulation (Nod) signals or Nod factors, consist of an oligosaccharide backbone of β-1,4-linked N-acetyl-D-glucosamine ("GlcNAc") residues with an N-linked fatty acyl chain condensed at the non-reducing end. LCOs differ in the number of GlcNAc residues in the backbone, in the length and degree of saturation of the fatty acyl chain and in the substitutions of reducing and non-reducing sugar residues. See, e.g., Denarie, et al., ANN. REV. BIOCHEM. 65:503 (1996); Hamel, et al., PLANTA 232:787 (2010); Prome, et al., PURE & APPL. CHEM. 70(1):55 (1998).

In some embodiments, compositions of the present disclosure comprise one or more LCOs represented by formula I:

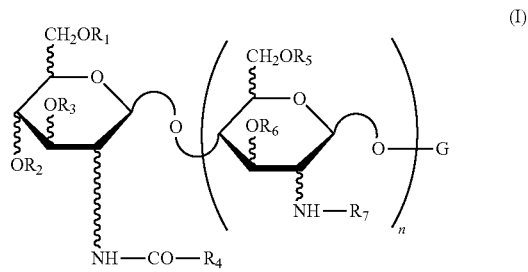

in which G is a hexosamine which can be substituted, for example, by an acetyl group on the nitrogen, a sulfate group, an acetyl group and/or an ether group on an oxygen; $R_1$, $R_2$, $R_3$, $R_5$, $R_6$ and $R_7$, which may be identical or different, represent H, $CH_3CO-$, $C_xH_yCO-$ where x is an integer between 0 and 17 and y is an integer between 1 and 35, or any other acyl group such as, for example, a carbamoyl; $R_4$ represents a saturated or mono-, di- or tri-unsaturated aliphatic chain containing at least 12 carbon atoms; and n is an integer between 1 and 4.

In some embodiments, compositions of the present disclosure comprise one or more LCOs represented by formula II:

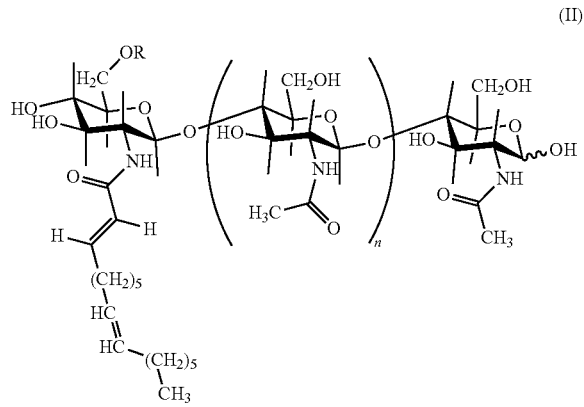

in which R represents H or $CH_3CO-$ and n is equal to 2 or 3. See, e.g., U.S. Pat. No. 5,549,718. A number of Bradyrhizobium japonicum-derived LCOs have also been described, including BjNod-V ($C_{18:1}$), BjNod-V (Ac, $C_{18:1}$), BjNod-V ($C_{16:1}$) and BjNod-V (Ac, $C_{16:0}$) (with "V" indicating the presence of five N-acetylglucosamines, "Ac" an acetylation, the number following the "C" indicating the number of carbons in the fatty acid side chain and the number following the ":" indicating the number of double bonds). See, e.g., U.S. Pat. Nos. 5,175,149 and 5,321,011. Additional LCOs obtained from bacterial strains include NodRM, NodRM-1, NodRM-3. When acetylated (the R=$CH_3CO-$), they become AcNodRM-1 and AcNodRM-3, respectively (U.S. Pat. No. 5,545,718).

In some embodiments, compositions of the present disclosure comprise one or more LCOs represented by formula III:

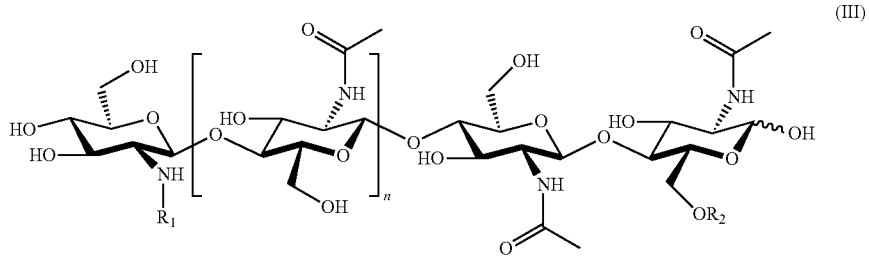

(III)

in which n=1 or 2; $R_1$ represents C16, C16:0, C16:1, C16:2, C18:0, C18:1Δ9Z or C18:1Δ11Z; and $R_2$ represents hydrogen or $SO_3H$.

LCOs included in compositions and methods of the present disclosure may be obtained from any suitable source.

In some embodiments, the LCO is obtained (i.e., isolated and/or purified) from a bacterial strain. For example, in some embodiments, compositions of the present disclosure comprise one or more LCOs obtained from a of *Azorhizobium, Bradyrhizobium* (e.g., *B. japonicum*), *Mesorhizobium, Rhizobium* (e.g., *R. leguminosarum*), or *Sinorhizobium* (e.g., *S. meliloti*).

In some embodiments, the LCO is obtained (i.e., isolated and/or purified) from a mycorrhizal fungus. For example, in some embodiments, compositions of the present disclosure comprise one or more LCOs obtained from a strain of Glomerocycota (e.g., *Glomus intraradicus*). See, e.g., WO 2010/049751 (in which the LCOs are referred to as "Myc factors").

In some embodiments, the LCO is synthetic. For example, in some embodiments, compositions of the present disclosure comprise one or more of the synthetic LCOs described in WO 2005/063784, WO 2007/117500 and/or WO 2008/071674. In some embodiments, the synthetic LCO contains one or more modifications or substitutions, such as those described in Spaink, CRIT. REV. PLANT SCI. 54:257 (2000) and D'Haeze, supra. LCOs and precursors for the construction of LCOs (e.g., COs, which are themselves useful as plant signal molecules) may be synthesized by genetically engineered organisms. See, e.g., Samain et al., CARBOHYDRATE RES. 302:35 (1997); Cottaz, et al., METH. ENG. 7(4):311 (2005); and Samain, et al., J. BIOTECHNOL. 72:33 (1999) (e.g., FIG. 1 therein, which shows structures of COs that can be made recombinantly in *E. coli* harboring different combinations of genes nodBCHL).

Further examples of LCOs (and derivatives thereof) that may be useful in compositions and methods of the present disclosure are provided below as formula IV:

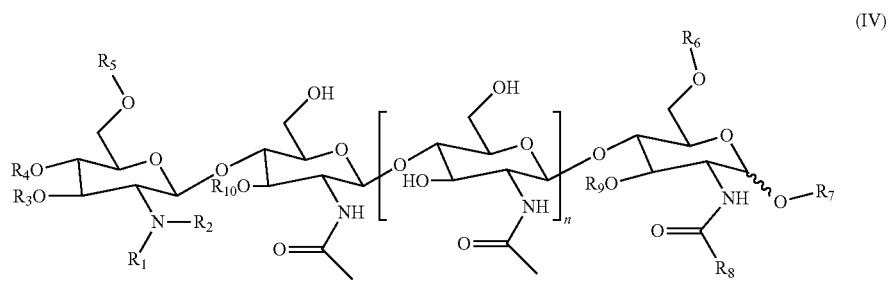

(IV)

in which R₁ represents C14:0, 3OH—C14:0, iso-C15:0, C16:0, 3-OH—C16:0, iso-C15:0, C16:1, C16:2, C16:3, iso-C17:0, iso-C17:1, C18:0, 3OH—C18:0, C18:0/3-OH, C18:1, OH—C18:1, C18:2, C18:3, C18:4, C19:1 carbamoyl, C20:0, C20:1, 3-OH—C20:1, C20:1/3-OH, C20:2, C20:3, C22:1 and C18-26(ω-1)-OH (which according to D'Haeze, et al., Glycobiology 12:79R-105R (2002), includes C18, C20, C22, C24 and C26 hydroxylated species and C16:1Δ9, C16:2 (Δ2,9) and C16:3 (Δ2,4,9)); R₂ represents hydrogen or methyl; R₃ represents hydrogen, acetyl or carbamoyl; R₄ represents hydrogen, acetyl or carbamoyl; R₅ represents hydrogen, acetyl or carbamoyl; R₆ represents hydrogen, arabinosyl, fucosyl, acetyl, SO₃H, sulfate ester, 3-0-S-2-0-MeFuc, 2-0-MeFuc and 4-0-AcFuc; R₇ represents hydrogen, mannosyl or glycerol; R8 represents hydrogen, methyl, or —CH₂OH; R₉ represents hydrogen, arabinosyl, or fucosyl; Rio represents hydrogen, acetyl or fucosyl; and n represents 0, 1, 2 or 3. Naturally occurring LCOs embraced by this structure are described in D'Haeze, et al., supra.

Further examples of LCOs (and derivatives thereof) that may be useful in compositions and methods of the present disclosure are provided below as structures V-XXXIII:

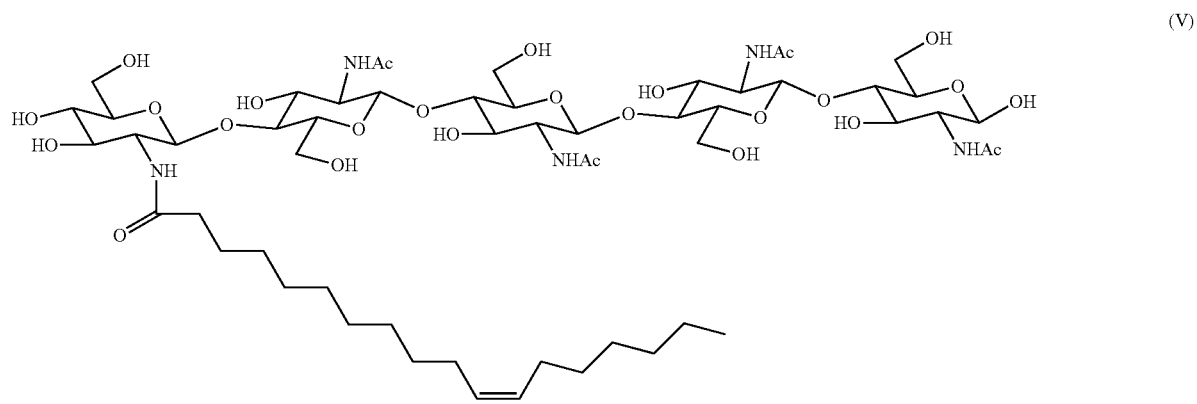

(V)

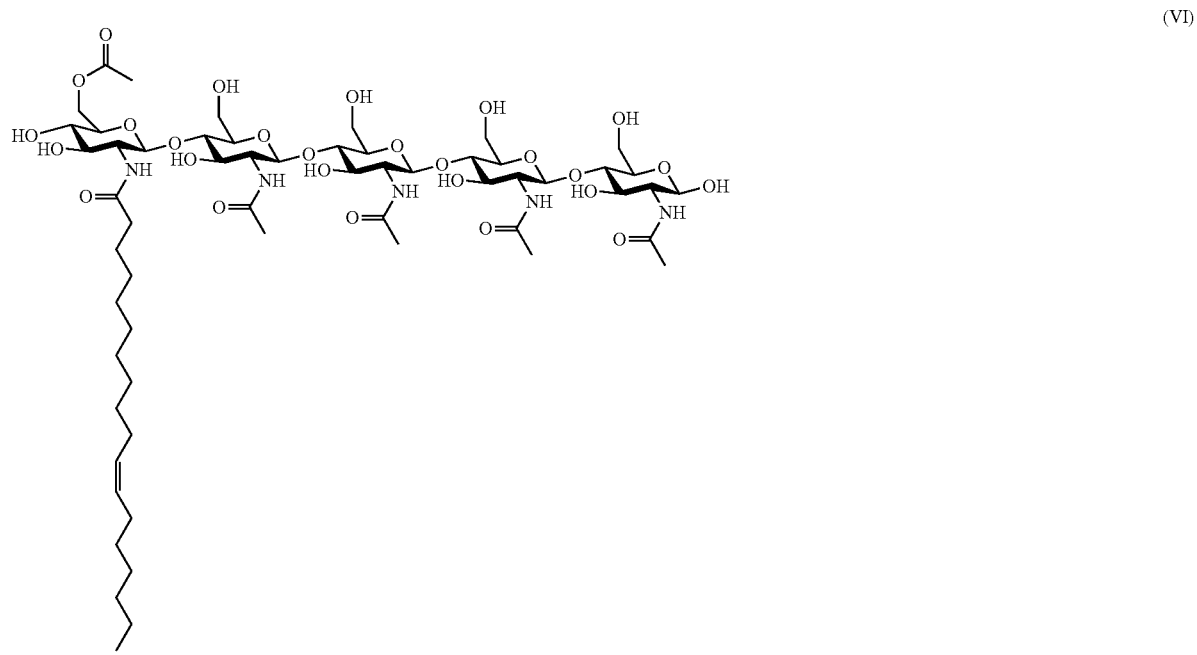

(VI)

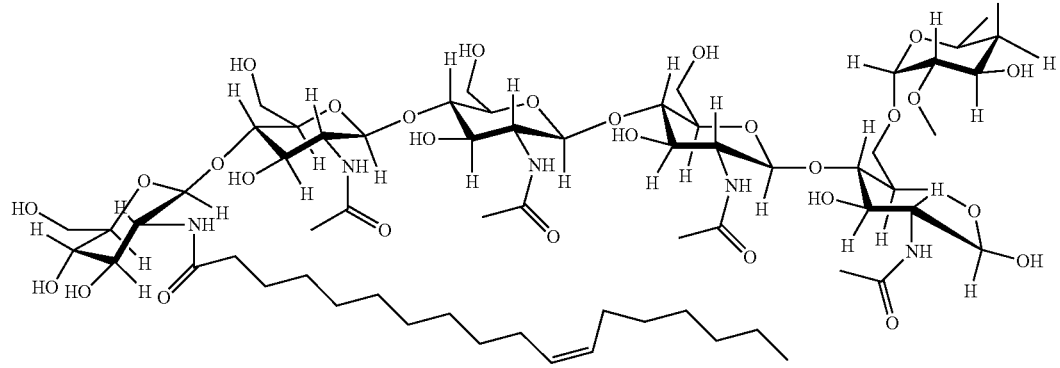
(VII)
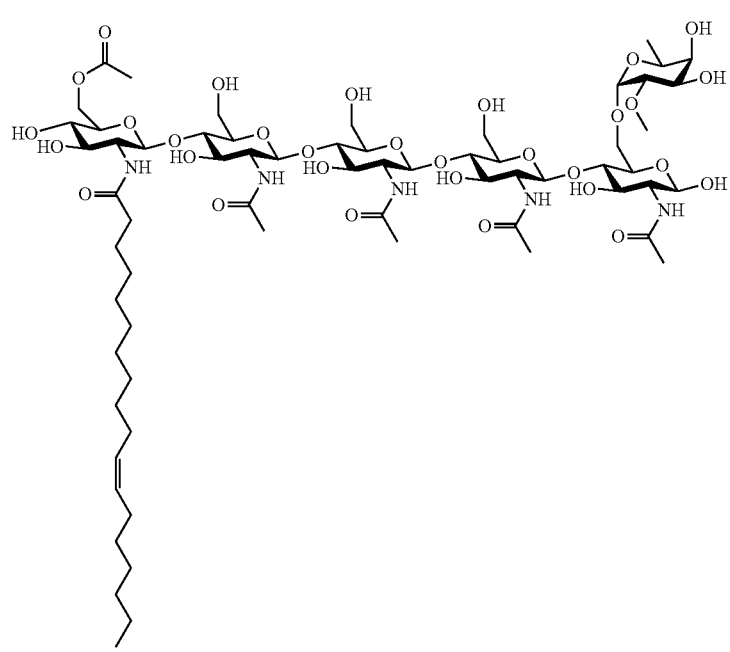
(VIII)
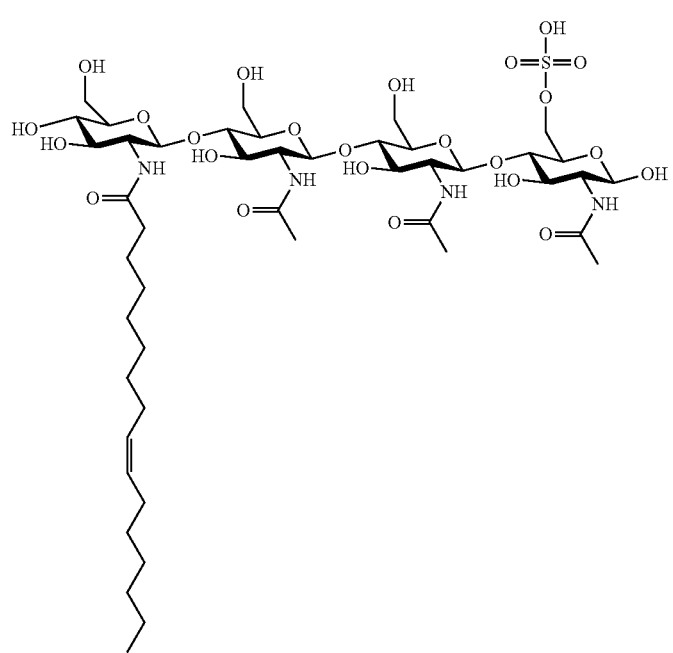
(IX)

-continued
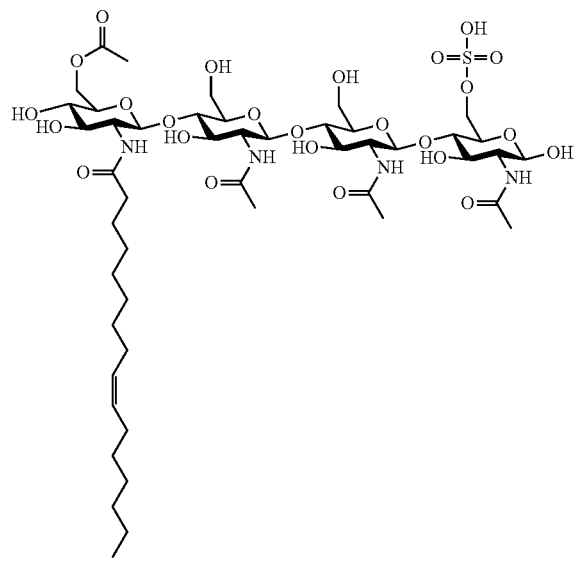
(X)
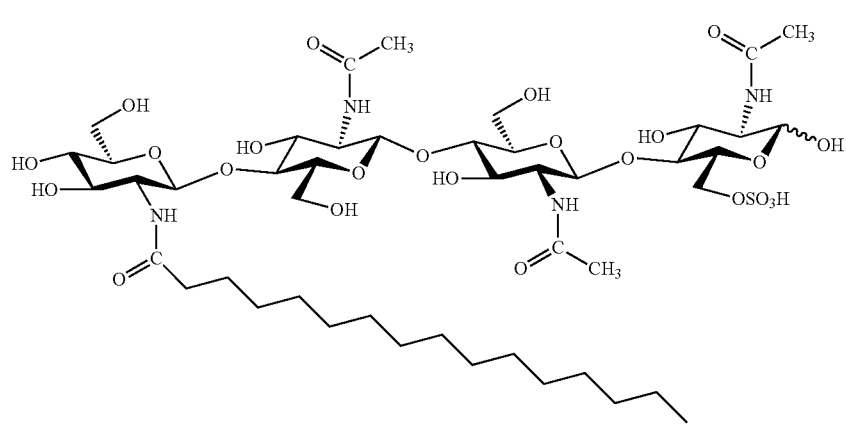
(XI)
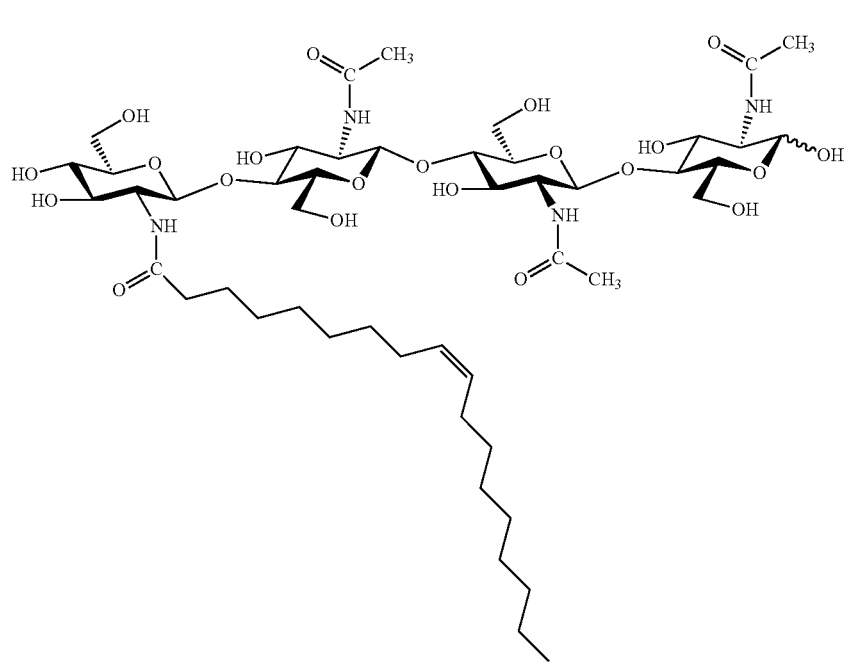
(XII)

-continued
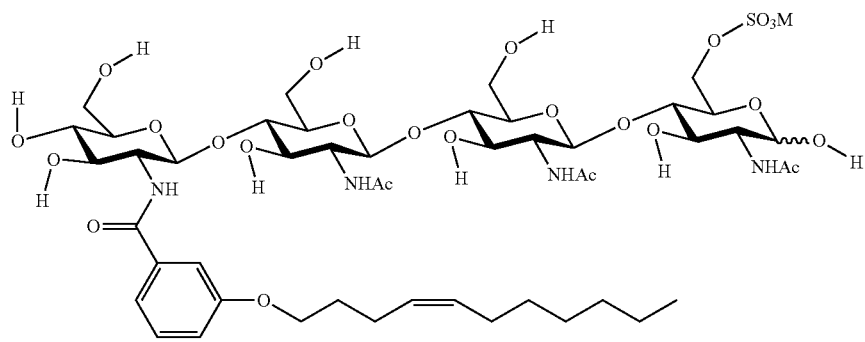
(XIII)
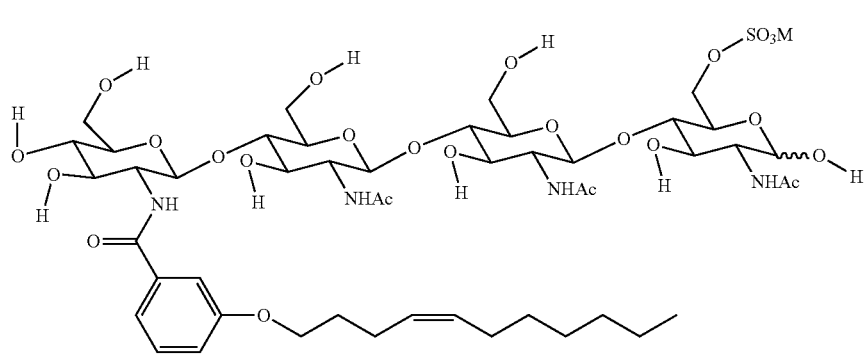
(XIV)
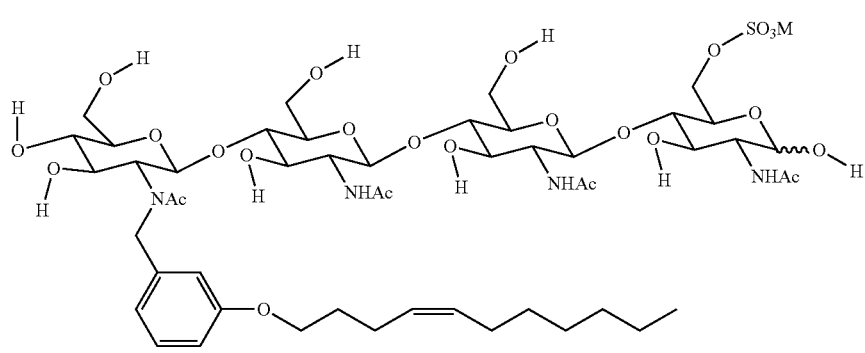
(XV)
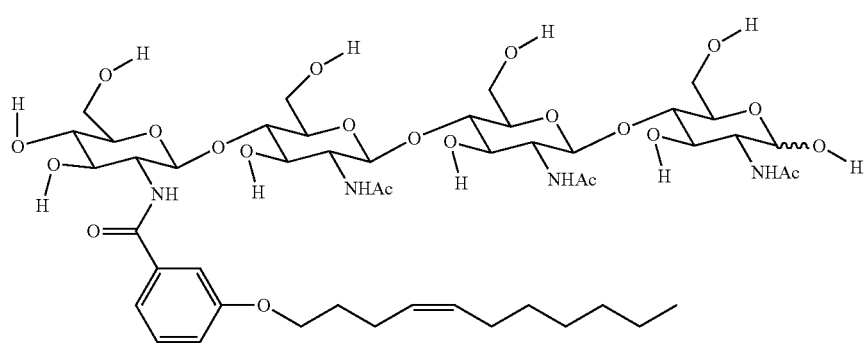
(XVI)

-continued
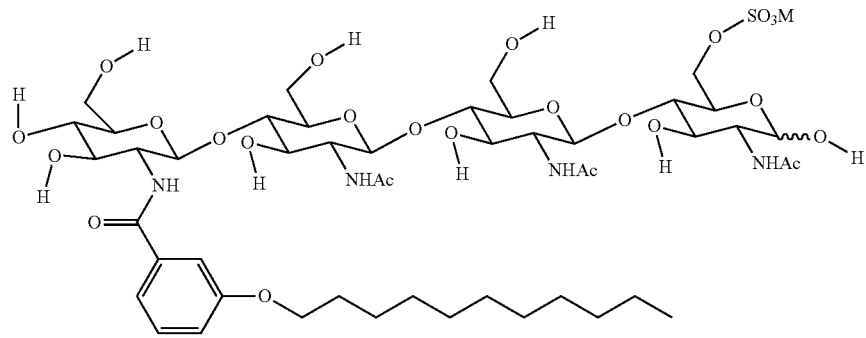
(XVII)
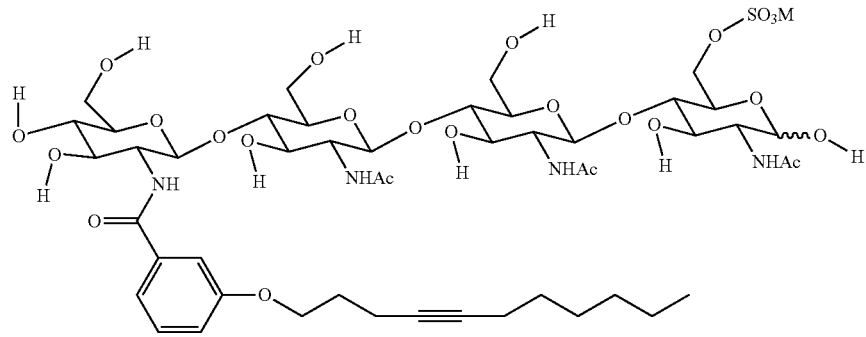
(XVIII)
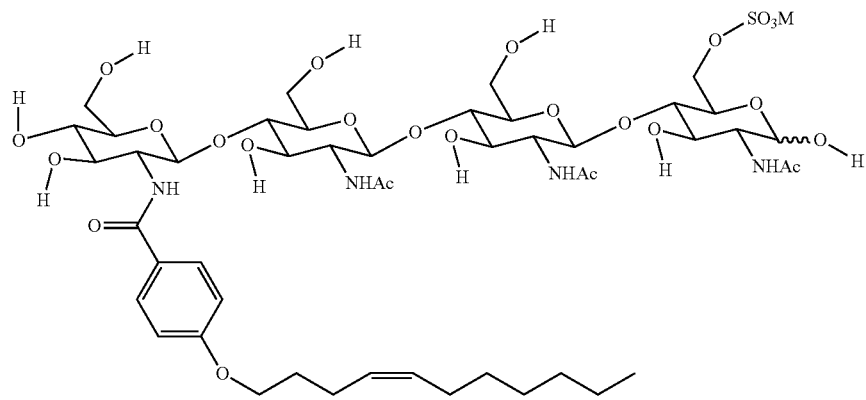
(XIX)
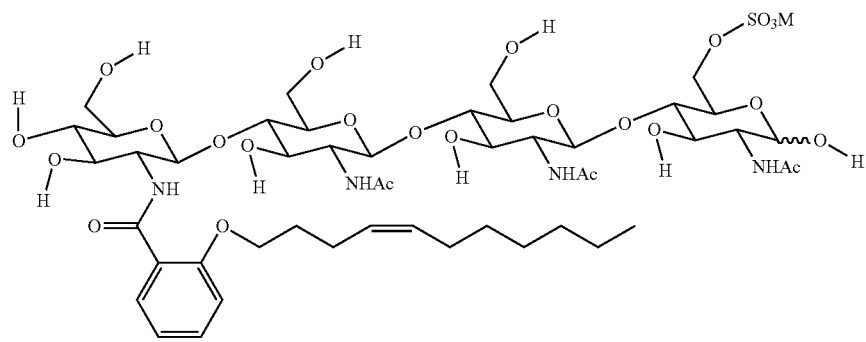
(XX)

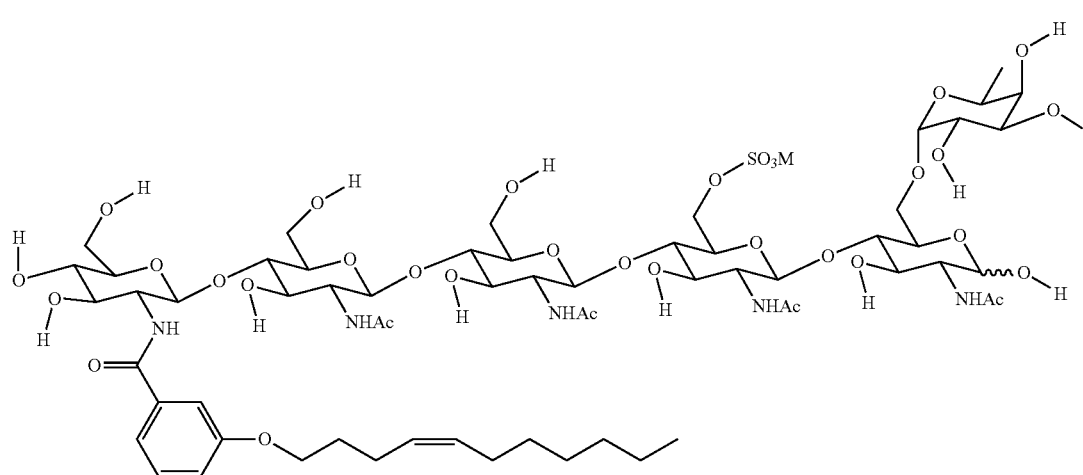
(XXI)
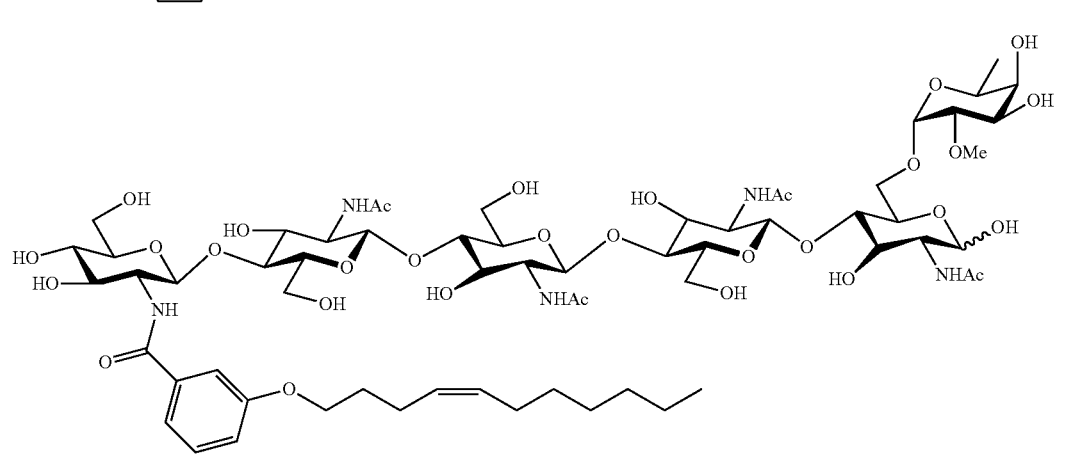
(XXII)
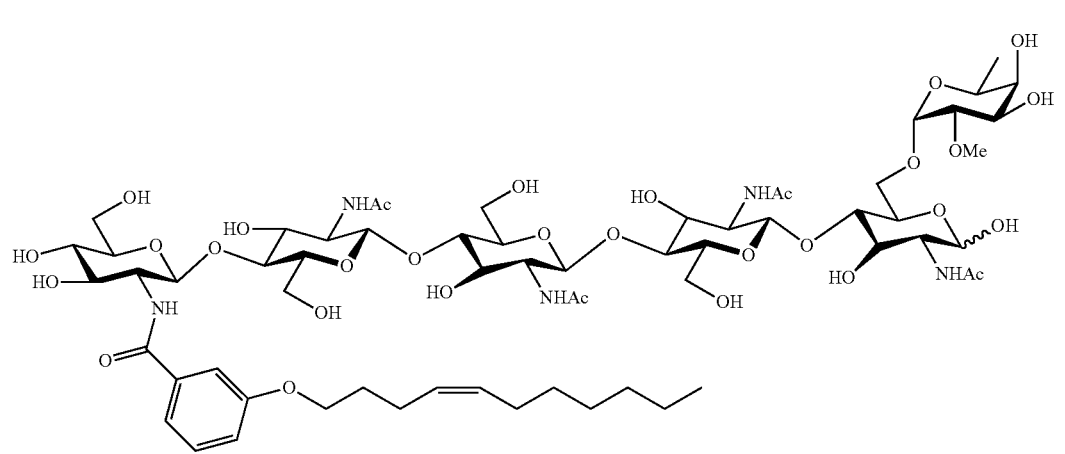
(XXIII)
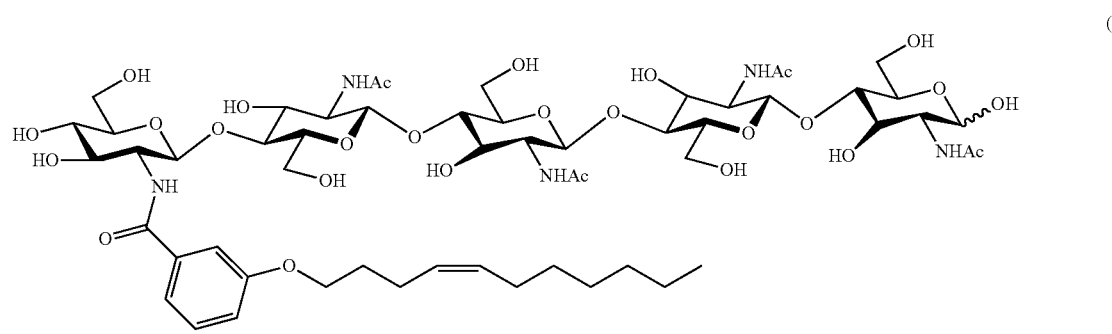
(XXIV)

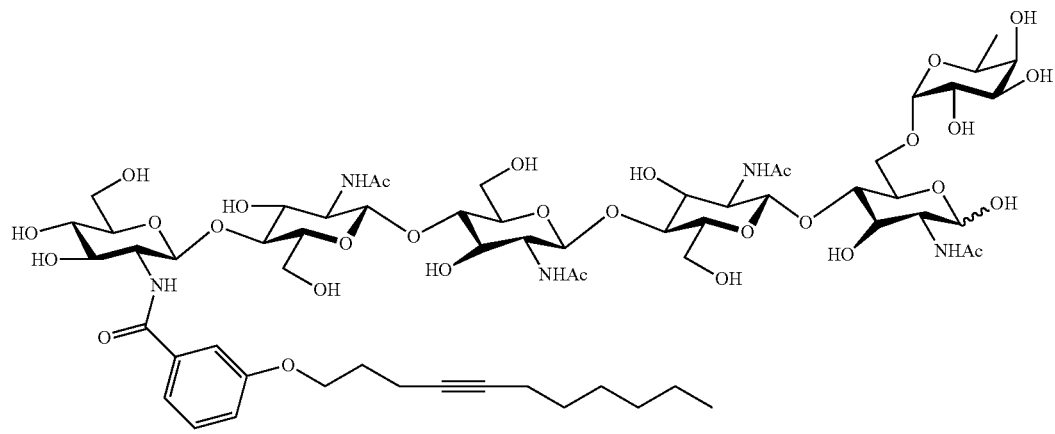
(XXV)
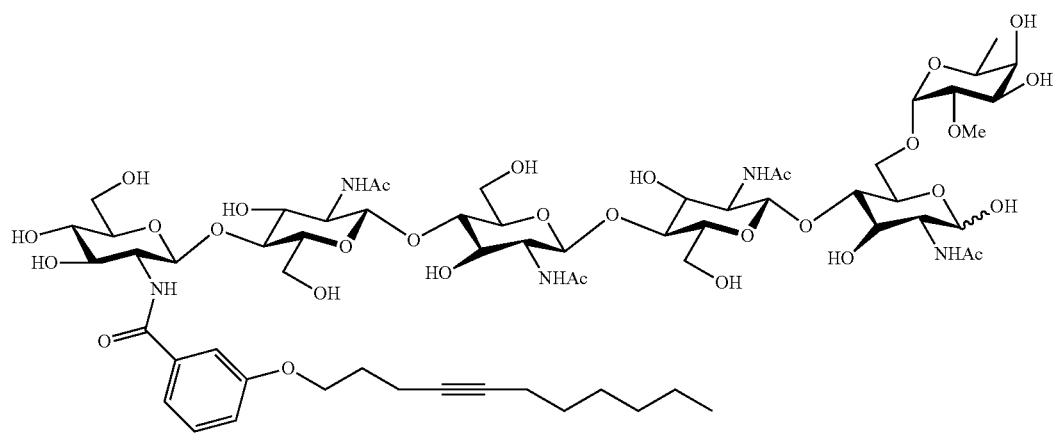
(XXVI)
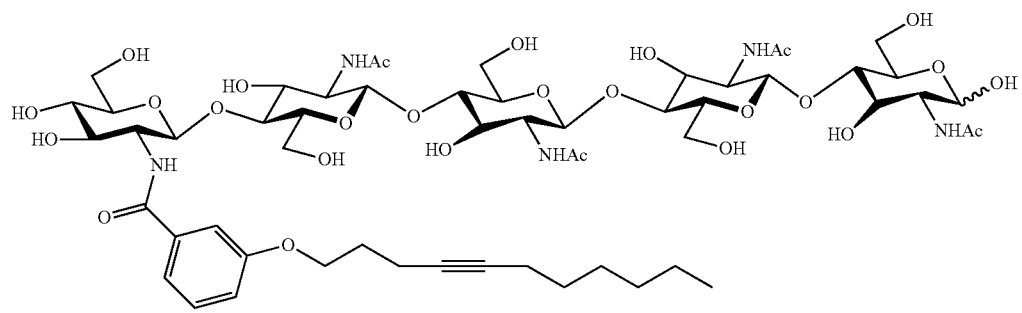
(XXVII)
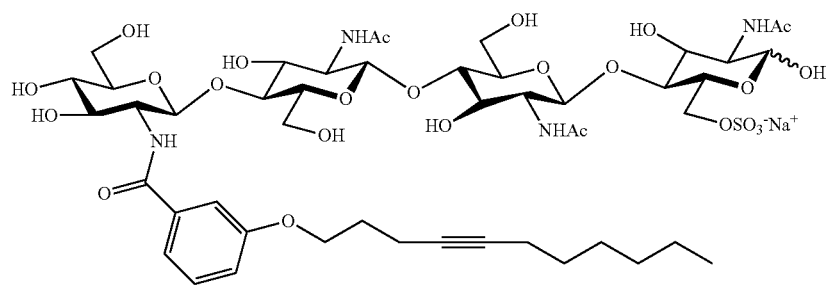
(XXVIII)

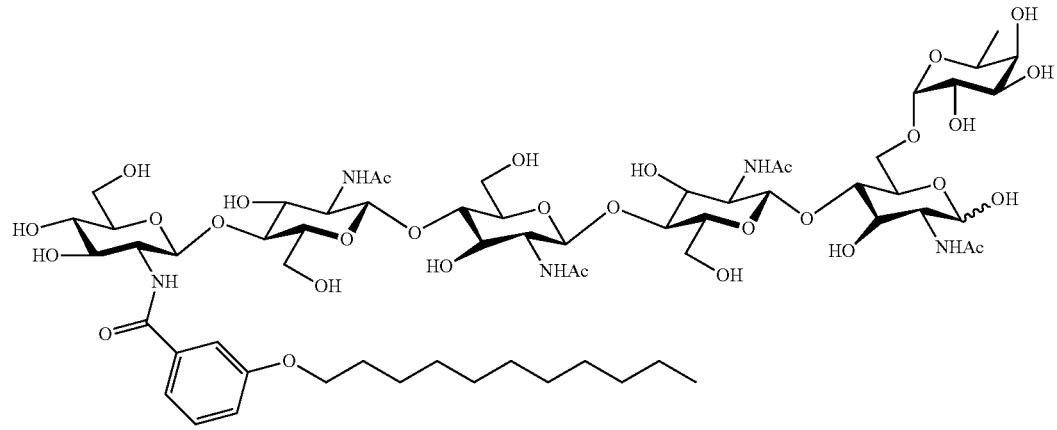
(XXIX)
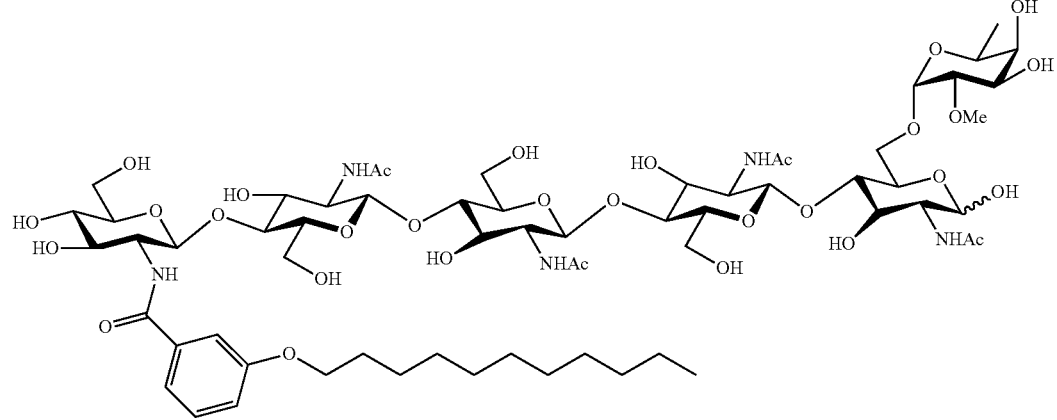
(XXX)
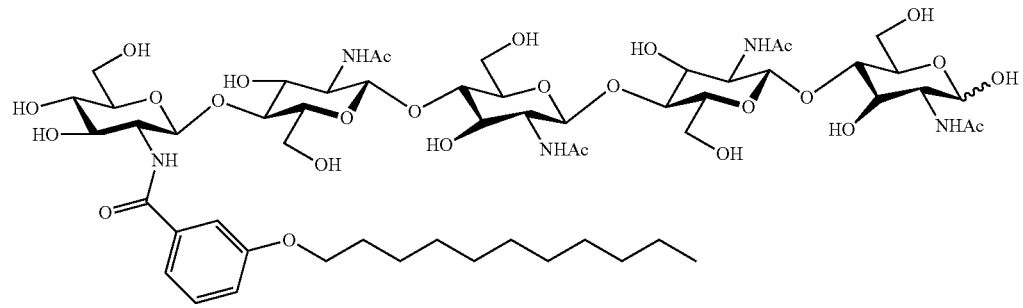
(XXXI)
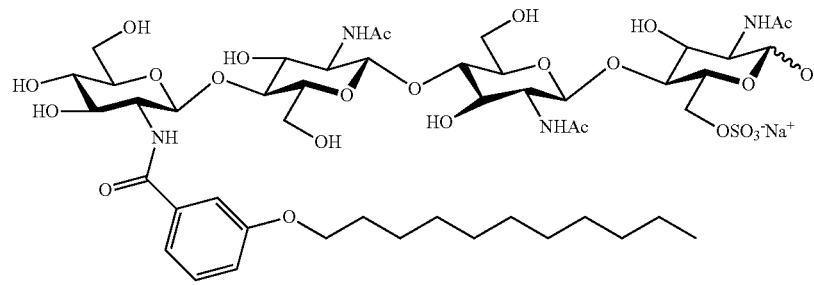
(XXXII)

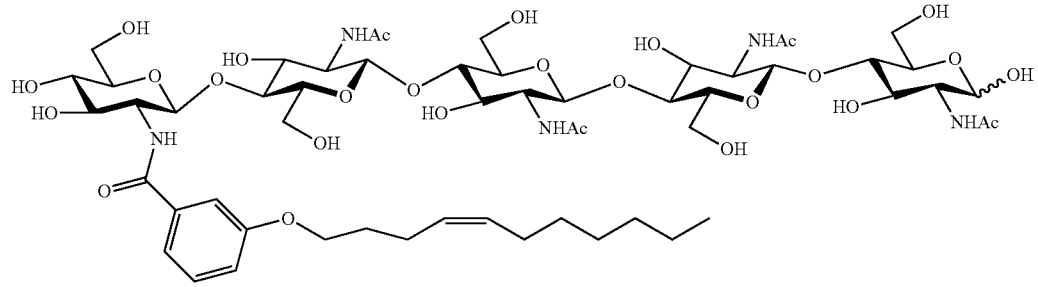
(XXXIII)

It is to be understood that compositions and methods of the present disclosure may comprise analogues, derivatives, hydrates, isomers, salts and/or solvates of LCOs.

Thus, in some embodiments, compositions of the present disclosure comprise one, two, three, four, five, six, seven, eight, nine, ten, or more LCOs represented by one or more of formulas I—IV and/or structures V-XXXIII and/or one, two, three, four, five, six, seven, eight, nine, ten, or more analogues, derivatives, hydrates, isomers, salts and/or solvates of LCOs represented by one or more of formulas I—IV and/or structures V-XXXIII LCOs (and derivatives thereof) may be utilized in various forms of purity and may be used alone or in the form of a culture of LCO-producing bacteria or fungi. In some embodiments, the LCO(s) included in compositions of the present disclosure is/are at least 50%, 55%, 60%, 65%, 70%, 75%, 80%, 85%, 90%, 91%, 92%, 93%, 94%, 95%, 96%, 97%, 98%, 99%, 99.5% or more pure.

In some embodiments, compositions of the present disclosure comprise one or more LCOs at a concentration of about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$M, about $1\times10^{-12}$ M to about $1\times10^{-6}$ M, about $1\times10^{-6}$ M, about $1\times10^{-10}$ M to about $1\times10^{-6}$ M, or about $1\times10^{-8}$M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more of one or more LCOs (e.g., one, two, three, four or more of the LCOs set forth in International Patent Application No. PCT/US2016/050529.

Compositions of the present disclosure may comprise any suitable CO(s). COs, sometimes referred to as N-acetylchitooligosaccharides, are also composed of GlcNAc residues but have side chain decorations that make them different from chitin molecules [$(C_8H_{13}NO_5)_n$, CAS No. 1398-61-4] and chitosan molecules [$(C_5H_{11}NO_4)_n$, CAS No. 9012-76-4]. See, e.g., D'Haeze et al., GLYCOBIOL. 12(6):79R (2002); Demont-Caulet et al., PLANT PHYSIOL. 120(1):83 (1999); Hanel et al., PLANTA 232:787 (2010); Müller et al., PLANT PHYSIOL. 124:733 (2000); Robina et al., TETRAHEDRON 58:521-530 (2002); Rouge et al., Docking of Chitin Oligomers and Nod Factors on Lectin Domains of the LysM-RLK Receptors in the Medicago-Rhizobium Symbiosis, in THE MOLECULAR IMMUNOLOGY OF COMPLEX CARBOHYDRATES-3 (Springer Science, 2011); Van der Holst et al., CURR. OPIN. STRUC. BIOL. 11:608 (2001); Wan et al., PLANT CELL 21:1053 (2009); and PCT/F100/00803 (2000). COs differ from LCOs in that they lack the pendant fatty acid chain that is characteristic of LCOs.

In some embodiments, compositions of the present disclosure comprise one or more COs represented by formula XXXIV:

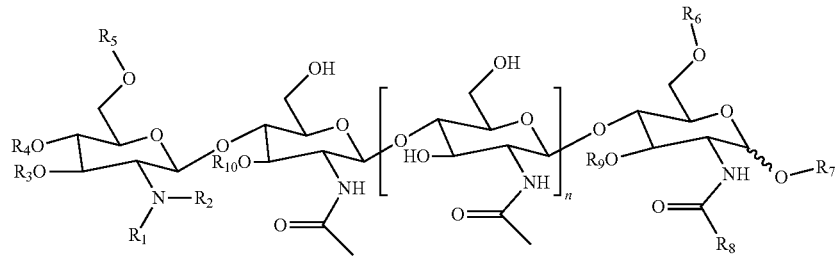
(XXXIV)

in which $R_1$ represents hydrogen or methyl; $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, sulfate ester, 3-0-S-2-0-MeFuc, 2-0-MeFuc and 4-0-AcFuc; $R_7$ represents hydrogen, mannosyl or glycerol; $R_8$ represents hydrogen, methyl, or —CH$_2$OH; $R_9$ represents hydrogen, arabinosyl, or fucosyl; Rio represents hydrogen, acetyl or fucosyl; and n represents 0, 1, 2 or 3.

COs included in compositions and methods of the present disclosure may be obtained from any suitable source.

In some embodiments, the CO is derived from an LCO. For example, in some embodiments, compositions of the present disclosure comprise one or more COs derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungus (e.g., *Glomus intraradicus*). In some embodiments, the CO is derived from an LCO represented by one or more of formulas I—IV and/or structures V-XXXIII Thus, in some embodiments, compositions of the present disclosure may comprise one or more COs represented by one or more of formulas I—IV and/or structures V-XXXIII except that the pendant fatty acid is replaced with a hydrogen or methyl group.

In some embodiments, the CO is synthetic. Methods for the preparation of recombinant COs are known in the art. See, e.g., Cottaz et al., METH. ENG. 7(4):311 (2005); Samain et al., CARBOHYDRATE RES. 302:35 (1997.); and Samain et al., J. BIOTECHNOL. 72:33 (1999).

Examples of COs (and derivatives thereof) that may be useful in compositions and methods of the present disclosure are provided below as formula XXXV:

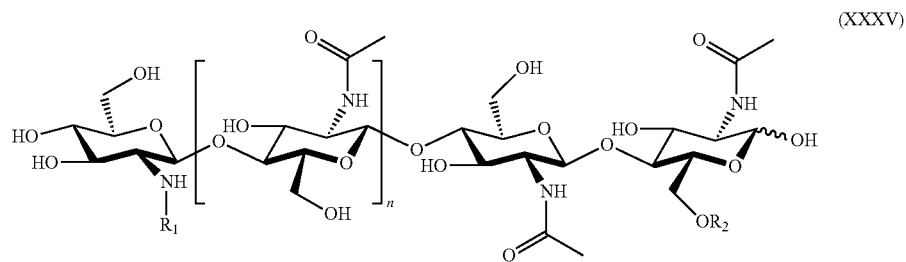

(XXXV)

in which n=1 or 2; $R_1$ represents hydrogen or methyl; and $R_2$ represents hydrogen or SO$_3$H.

Further examples of COs (and derivatives thereof) that may be useful in compositions and methods of the present disclosure are provided below as structures XXXVI-XXXIX:

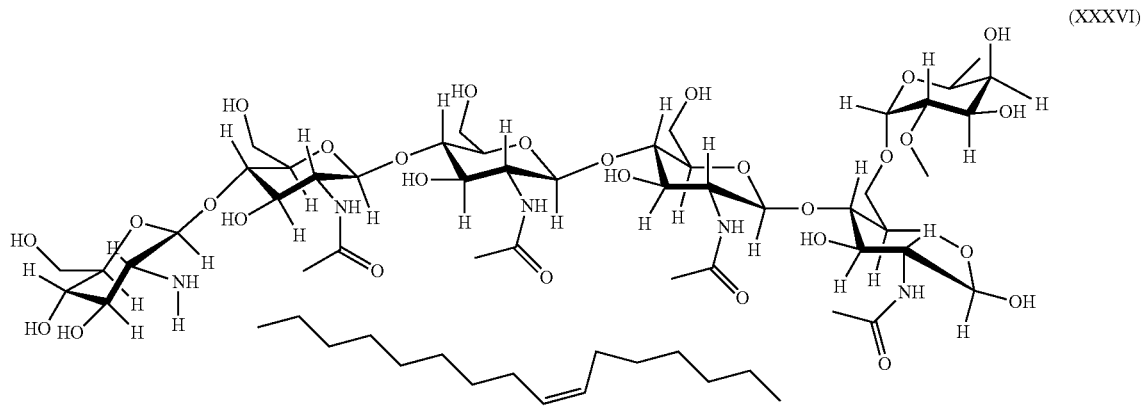

(XXXVI)

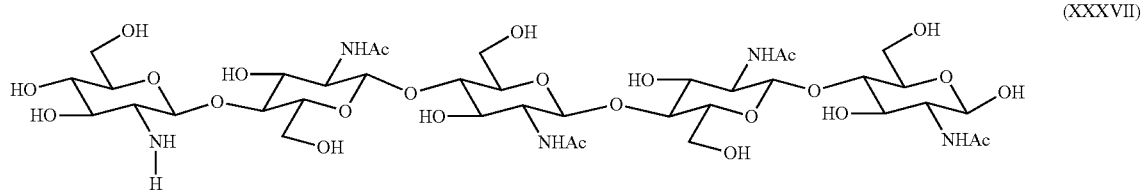

(XXXVII)

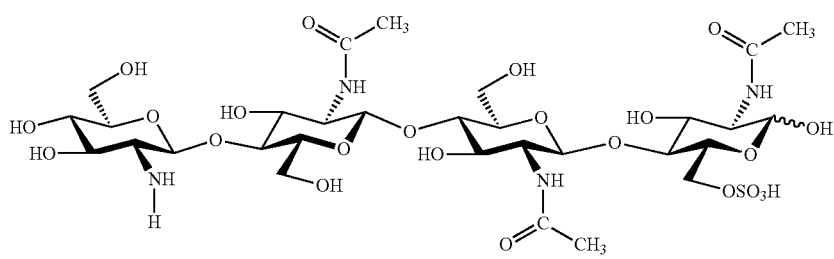

(XXXVIII)

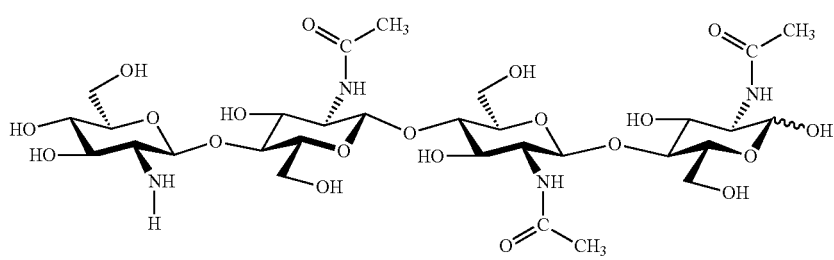

(XXXIX)

COs (and derivatives thereof) may be utilized in various forms of purity and may be used alone or in the form of a culture of CO-producing bacteria or fungi. In some embodiments, the CO(s) included in compositions of the present disclosure is/are at least 50%, 55%, 60%, 65%, 70%, 75%, 80%, 85%, 90%, 91%, 92%, 93%, 94%, 95%, 96%, 97%, 98%, 99%, 99.5% or more pure.

In some embodiments, compositions of the present disclosure comprise one or more COs at a concentration of about $1 \times 10^{-15}$ M to about $1 \times 10^{-10}$ M, about $1 \times 10^{-14}$ M to about $1 \times 10^{-8}$ M, about $1 \times 10^{-14}$ M to about $1 \times 10^{-6}$ M, about $1 \times 10^{-12}$ M to about $1 \times 10^{-8}$ M, about $1 \times 10^{-12}$ M to about $1 \times 10^{-6}$ M, about $1 \times 10^{-10}$ M to about $1 \times 10^{-6}$ M, or about $1 \times 10^{-8}$ M to about $1 \times 10^{-2}$ M. For example, compositions of the present disclosure may comprise about $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times 10^{-12}$ M, $1 \times 10^{-11}$ M, $1 \times 10^{-10}$ M, $1 \times 10^{-9}$ M, $1 \times 10^{-8}$ M, $1 \times 10^{-7}$ M, $1 \times 10^{-6}$ M, $1 \times 10^{-5}$ M, $1 \times 10^{-4}$ M, $1 \times 10^{-3}$ M, $1 \times 10^{-2}$ M, $1 \times 10^{-1}$ M or more of one or more COs (e.g., one, two, three, four or more of the COs set forth in International Patent Application No. PCT/US2016/050529.

Compositions of the present disclosure may comprise any suitable chitinous compound(s), including, but not limited to, chitin (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3-yl]methoxymethyl]-4-hydroxy-6-(hydroxymethyl)oxan-3-ys]ethanamide), chitosan(IUPAC: 5-amino-6-[5-amino-6-[5-amino-4,6-dihydroxy-2(hydroxymethyl)oxan-3-yl]oxy-4-hydroxy-2-(hydroxymethyl)oxan-3-yl]oxy-2(hydroxymethyl)oxane-3,4-diol) and isomers, salts and solvates thereof.

Chitins and chitosans, which are major components of the cell walls of fungi and the exoskeletons of insects and crustaceans, are composed of GlcNAc residues.

Chitins and chitosans may be obtained commercially or prepared from insects, crustacean shells, or fungal cell walls. Methods for the preparation of chitin and chitosan are known in the art. See, e.g., U.S. Pat. No. 4,536,207 (preparation from crustacean shells) and U.S. Pat. No. 5,965,545 (preparation from crab shells and hydrolysis of commercial chitosan); Pochanavanich, et al., LETT. APPL. MICROBIOL. 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

In some embodiments, compositions of the present disclosure comprise one or more chitins at a concentration of about $1 \times 10^{-15}$ M to about $1 \times 10^{-10}$ M, about $1 \times 10^{-14}$ M to about $1 \times 10^{-8}$ M, about $1 \times 10^{-14}$ M to about $1 \times 10^{-6}$ M, about $1 \times 10^{-12}$ M to about $1 \times 10^{-8}$ M, about $1 \times 10^{-12}$ M to about $1 \times 10^{-6}$ M, about $1 \times 10^{-10}$ M to about $1 \times 10^{-12}$ M, or about $1 \times 10^{-8}$ M to about $1 \times 10^{-2}$ M. For example, compositions of the present disclosure may comprise about $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times 10^{-12}$ M, $1 \times 10^{-11}$ M, $1 \times 10^{-10}$ M, $1 \times 10^{-9}$ M, $1 \times 10^{-8}$ M, $1 \times 10^{-7}$ M, $1 \times 10^{-6}$ M, $1 \times 10^{-5}$ M, $1 \times 10^{-4}$ M, $1 \times 10^{-3}$ M, $1 \times 10^{-2}$ M, $1 \times 10^{-1}$ M or more of one or more chitins.

In some embodiments, compositions of the present disclosure comprise one or more chitosans at a concentration of about $1 \times 10^{-15}$ M to about $1 \times 10^{-10}$ M, about $1 \times 10^{-14}$ M to about $1 \times 10^{-8}$ M, about $1 \times 10^{-14}$ M to about $1 \times 10^{-6}$ M, about $1 \times 10^{-12}$ M to about $1 \times 10^{-8}$ M, about $1 \times 10^{-12}$ M to about $1 \times 10^{-6}$ M, about $1 \times 10^{-10}$ M to about $1 \times 10^{-6}$ M, or about $1 \times 10^{-8}$ M to about $1 \times 10^{-2}$ M. For example, compositions of the present disclosure may comprise about $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times 10^{-12}$ M, $1 \times 10^{-11}$ M, $1 \times 10^{-10}$ M, $1 \times 10^{-9}$ M, $1 \times 10^{-8}$ M, $1 \times 10^{-7}$ M, $1 \times 10^{-6}$ M, $1 \times 10^{-5}$ M, $1 \times 10^{-4}$ M, $1 \times 10^{-3}$ M, $1 \times 10^{-2}$ M, $1 \times 10^{-1}$ M or more of one or more chitosans.

Compositions of the present disclosure may comprise any suitable flavonoid(s), including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof.

Flavonoids are phenolic compounds having the general structure of two aromatic rings connected by a three-carbon bridge. Classes of flavonoids include are known in the art. See, e.g., Jain et al., J. PLANT BIOCHEM. & BIOTECHNOL. 11:1 (2002); Shaw et al., ENVIRON. MICROBIOL. 11:1867 (2006). Flavonoid compounds are commercially available, e.g., from Novozymes BioAg, Saskatoon, Canada; Natland International Corp., Research Triangle Park, N.C.; MP Biomedicals, Irvine, Calif.; LC Laboratories, Woburn Mass. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, as described in Ralston et al., PLANT PHYSIOL. 137:1375 (2005).

In some embodiments, compositions of the present disclosure comprise one or more anthocyanidins. According to some embodiments, the composition comprises cyanidin, delphinidin, malvidin, pelargonidin, peonidin and/or petunidin.

In some embodiments, compositions of the present disclosure comprise one or more anthoxanthins. According to some embodiments, the composition comprises one or more flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhamnazin, rhamnetin, robinin, rutin, spiraeoside, troxerutin and/or zanthorhamnin).

In some embodiments, compositions of the present disclosure comprise one or more flavanones. According to some embodiments, the composition comprises butin, eriodictyol, hesperetin, hesperidin, homoeriodictyol, isosakuranetin, naringenin, naringin, pinocembrin, poncirin, sakuranetin, sakuranin and/or sterubin.

In some embodiments, compositions of the present disclosure comprise one or more flavanonols. According to some embodiments, the composition comprises dihydrokaempferol and/or taxifolin.

In some embodiments, compositions of the present disclosure comprise one or more flavans. According to some embodiments, the composition comprises one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins).

In some embodiments, compositions of the present disclosure comprise one or more isoflavonoids. According to some embodiments, the composition comprises one or more isoflavones (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans and/or roetonoids.

Compositions of the present disclosure may comprise any suitable flavonoid derivative, including, but not limited to, neoflavonoids (e.g, calophyllolide, coutareagenin, dalbergichromene, dalbergin, nivetin) and pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin).

Flavonoids and derivatives thereof may be incorporated into compositions of the present disclosure in any suitable form, including, but not limited to, polymorphic and crystalline forms.

Compositions of the present disclosure may comprise any suitable non-flavonoid nod-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and linolenic acid ((Z,Z,Z)-9, 12,15-octadecatrienoic acid), as well as analogues, derivatives, hydrates, isomers, polymers, salts and solvates thereof.

Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibberella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid. Jasmonates, Linoleic acid and linolenic acid (and their derivatives) are reported to be inducers of nod gene expression or LCO production by rhizobacteria. See, e.g., Mabood, et al. PLANT PHYSIOL. BIOCHEM. 44(11):759 (2006); Mabood et al., AGR. J. 98(2): 289 (2006); Mabood, et al., FIELD CROPS RES. 95(2-3):412 (2006); Mabood & Smith, *Linoleic and linolenic acid induce the expression of nod genes in Bradyrhizobium japonicum USDA* 3, PLANT BIOL. (2001). Non-limiting examples of derivatives of jasmonic acid, Linoleic acid, linolenic acid include esters, amides, glycosides and salts. Representative esters are compounds in which the carboxyl group of Linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a C2-C8 unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of Linoleic acid, linolenic acid, or jasmonic acid has been replaced with a —COR group, where R is an NR$^2$R$^3$ group, in which R$^2$ and R$^3$ are independently: hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent such as dicyclohexyl carbodiimide (DCC), under neutral conditions. Suitable salts of Linoleic acid, linolenic acid and jasmonic acid include e.g., base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing together a solution of Linoleic acid, linolenic acid, or jasmonic acid with a solution of the base. The salts may be precipitated from solution and be collected by filtration or may be recovered by other means such as by evaporation of the solvent.

Compositions of the present disclosure may comprise any suitable karrakin(s), including, but not limited to, 2H-furo[2,3-c]pyran-2-ones, as well as analogues, derivatives, hydrates, isomers, polymers, salts and solvates thereof.

In some embodiments, the composition comprises one or more karrakins represented by formula XXXX:

(XXXX)

in which Z is O, S or $NR_5$; $R_1$, $R_2$, $R_3$ and $R_4$ are each independently H, alkyl, alkenyl, alkynyl, phenyl, benzyl, hydroxy, hydroxyalkyl, alkoxy, phenyloxy, benzyloxy, CN, $COR_6$, COOR=, halogen, $NR_6R_7$, or $NO_2$; and $R_5$, $R_6$ and $R_7$ are each independently H, alkyl or alkenyl, or a biologically acceptable salt thereof.

Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Examples of compounds embraced by formula XXXX and which may be suitable for use in the present disclosure include 3-methyl-2H-furo[2,3-c]pyran-2-one (where $R_1$≡$CH_3$, $R_2$, $R_3$, $R_4$=H), 2H-furo[2,3-c]pyran-2-one (where $R_1$, $R_2$, $R_3$, $R_4$=H), 7-methyl-2H-furo[2,3-c]pyran-2-one (where $R_1$, $R_2$, $R_4$=H, $R_3$=$CH_3$), 5-methyl-2H-furo[2,3-c]pyran-2-one (where $R_1$, $R_2$, $R_3$=H, $R_4$=$CH_3$), 3,7-dimethyl-2H-furo[2,3-c]pyran-2-one (where $R_1$, $R_3$=$CH_3$, $R_2$, $R_4$=H), 3,5-dimethyl-2H-furo[2,3-c]pyran-2-one (where $R_1$, $R_4$=$CH_3$, $R_2$, $R_3$=H), 3,5,7-trimethyl-2H-furo[2,3-c]pyran-2-one (where $R_1$, $R_3$, $R_4$=$CH_3$, $R_2$=H), 5-methoxymethyl-3-methyl-2H-furo[2,3-c]pyran-2-one (where $R_1$=$CH_3$, $R_2$, $R_3$=H, $R_4$=$CH_2OCH_3$), 4-bromo-3,7-dimethyl-2H-furo[2,3-c]pyran-2-one (where $R_1$, $R_3$=$CH_3$, $R_2$=Br, $R_4$=H), 3-methylfuro[2,3-c]pyridin-2(3H)-one (where Z=NH, $R_1$=$CH_3$, $R_2$, $R_3$, $R_4$=H) and 3,6-dimethylfuro[2,3-c]pyridin-2(6H)-one (where Z=N—$CH_3$, $R_1$=$CH_3$, $R_2$, $R_3$, $R_4$=H). See, e.g., U.S. Pat. No. 7,576,213; Halford, Smoke Signals, in CHEM. ENG. NEWS (Apr. 12, 2010) (reporting that karrikins or butenolides contained in smoke act as growth stimulants and spur seed germination after a forest fire and can invigorate seeds such as corn, tomatoes, lettuce and onions that had been stored).

Other Microbes (Group 8)

In some embodiments, *Yersinia entomophaga* and/or *Yersinia nurmii* are the only microbes in the compositions of the present disclosure.

In some embodiments, compositions of the present disclosure comprise one or more microorganisms in addition to the *Yersinia* strain(s). Any suitable microorganism(s) may be added, including, but not limited to, agriculturally beneficial microorganisms such as diazotrophs, phosphate-solubilizing microorganisms, mycorrhizal fungi and biopesticides. Selection of additional microbes (if any) will depend on the intended application(s).

Non-limiting examples of bacteria that may be included in compositions of the present disclosure include *Azospirillum brasilense* INTA Az-39, *Bacillus amyloliquefaciens* D747, *Bacillus amyloliquefaciens* NRRL B 50349, *Bacillus amyloliquefaciens* TJ1000, *Bacillus amyloliquefaciens* FZB24, *Bacillus amyloliquefaciens* FZB42, *Bacillus amyloliquefaciens* IN937a, *Bacillus amyloliquefaciens* IT-45, *Bacillus amyloliquefaciens* TJ1000, *Bacillus amyloliquefaciens* MBI600, *Bacillus amyloliquefaciens* BS27 (deposited as NRRL B-5015), *Bacillus amyloliquefaciens* BS2084 (deposited as NRRL B-50013), *Bacillus amyloliquefaciens* 15AP4 (deposited as ATCC PTA-6507), *Bacillus amyloliquefaciens* 3AP4 (deposited as ATCC PTA-6506), *Bacillus amyloliquefaciens* LSSA01 (deposited as NRRL B-50104), *Bacillus amyloliquefaciens* ABP278 (deposited as NRRL B-50634), *Bacillus amyloliquefaciens* 1013 (deposited as NRRL B-50509), *Bacillus amyloliquefaciens* 918 (deposited as NRRL B-50508), *Bacillus amyloliquefaciens* 22CP1 (deposited as ATCC PTA-6508) and *Bacillus amyloliquefaciens* BS18 (deposited as NRRL B-50633), *Bacillus cereus* 1-1562, *Bacillus firmus* I-1582, *Bacillus lichenformis* BA842 (deposited as NRRL B-50516), *Bacillus lichenformis* BL21 (deposited as NRRL B-50134), *Bacillus mycoides* NRRL B-21664, *Bacillus pumilus* NRRL B 21662, *Bacillus pumilus* NRRL B-30087, *Bacillus pumilus* ATCC 55608, *Bacillus pumilus* ATCC 55609, *Bacillus pumilus* GB34, *Bacillus pumilus* KFP9F, *Bacillus pumilus* QST 2808, *Bacillus subtilis* ATCC 55078, *Bacillus subtilis* ATCC 55079, *Bacillus subtilis* MBI 600, *Bacillus subtilis* NRRL B-21661, *Bacillus subtilis* NRRL B-21665, *Bacillus subtilis* CX-9060, *Bacillus subtilis* GB03, *Bacillus subtilis* GB07, *Bacillus subtilis* QST-713, *Bacillus subtilis* FZB24, *Bacillus subtilis* D747, *Bacillus subtilis* 3BP5 (deposited as NRRL B-50510), *Bacillus thuringiensis* ATCC 13367, *Bacillus thuringiensis* GC-91, *Bacillus thuringiensis* NRRL B-21619, *Bacillus thuringiensis* ABTS-1857, *Bacillus thuringiensis* SAN 401 I, *Bacillus thuringiensis* ABG-6305, *Bacillus thuringiensis* ABG-6346, *Bacillus thuringiensis* AM65-52, *Bacillus thuringiensis* SA-12, *Bacillus thuringiensis* SB4, *Bacillus thuringiensis* ABTS-351, *Bacillus thuringiensis* HD-1, *Bacillus thuringiensis* EG 2348, *Bacillus thuringiensis* EG 7826, *Bacillus thuringiensis* EG 7841, *Bacillus thuringiensis* DSM 2803, *Bacillus thuringiensis* NB-125, *Bacillus thuringiensis* NB-176, BRADY, *Pseudomonas jessenii* PS06, *Rhizobium leguminosarum* SO12A-2 (IDAC 080305-01), *Sinorhizobium fredii* CCBAU114, *Sinorhizobium fredii* USDA 205, *Yersinia entomophaga* O82KB8 and combinations thereof, as well as microorganisms having at least at least 75, 80, 85, 90, 95, 96, 97, 97.5, 98, 98.5, 99, 99.5, 99.6, 99.7, 99.8, 99.9% or more identical to any of the aforementioned strains on the basis of 16S rDNA sequence identity.

Non-limiting examples of fungi that may be included in compositions of the present disclosure include *Gliocladium virens* ATCC 52045, *Gliocladium virens* GL-21, *Glomus intraradices* RTI-801, *Metarhizium anisopliae* F52, PENT, *Trichoderma asperellum* SKT-1, *Trichoderma asperellum* ICC 012, *Trichoderma atroviride* LC52, *Trichoderma atroviride* CNCM 1-1237, *Trichoderma fertile* JM41R, *Trichoderma gamsii* ICC 080, *Trichoderma hamatum* ATCC 52198, *Trichoderma harzianum* ATCC 52445, *Trichoderma harzianum* KRL-AG2, *Trichoderma harzianum* T-22, *Trichoderma harzianum* TH-35, *Trichoderma harzianum* T-39, *Trichoderma harzianum* ICC012, *Trichoderma reesi* ATCC 28217, *Trichoderma virens* ATCC 58678, *Trichoderma virens* Gl-3, *Trichoderma virens* GL-21, *Trichoderma virens* G-41, *Trichoderma viridae* ATCC 52440, *Trichoderma viridae* ICC080, *Trichoderma viridae* TV1 and combinations thereof, as well as microorganisms having at least at least 75, 80, 85, 90, 95, 96, 97, 97.5. 98, 98.5, 99, 99.5, 99.6, 99.7, 99.8, 99.9% or more identical to any of the aforementioned strains on the basis of internal transcribed spacer (ITS) and/or cytochrome c oxidase (CO1) sequence identity.

Non-limiting examples of mycorrhizal fungi that may be included in compositions of the present disclosure include mycorrhizal strains such as *Gigaspora margarita*, *Glomus aggregatum*, *Glomus brasilianum*, *Glomus clarum*, *Glomus deserticola*, *Glomus etunicatum*, *Glomus intraradices*, *Glomus monosporum*, *Glomus mosseae*, *Laccaria bicolor*, *Laccaria laccata*, *Paraglomus brazilianum*, *Pisolithus tinctorius*, *Rhizopogon amylopogon*, *Rhizopogon fulvigleba*, *Rhizopogon luteolus*, *Rhizopogon villosuli*, *Scleroderma cepa* and *Scleroderma citrinum* and combinations thereof.

Additional microorganisms may be incorporated into compositions of the present disclosure in any suitable amount(s)/concentration(s). The absolute value of the amount/concentration that is/are sufficient to cause the desired effect(s) may be affected by factors such as the type, size and volume of material to which the composition will be applied, the microorganisms in the composition, the number of microorganisms in the composition, the stability of the microorganisms in the composition and storage conditions (e.g., temperature, relative humidity, duration). Those skilled in the art will understand how to select an effective amount/concentration using routine dose-response experiments. Guidance for the selection of appropriate amounts/concentrations can be found, for example, in International Patent Application Nos. PCT/US2016/050529 and PCT/US2016/050647 and U.S. Provisional Patent Application Nos. 62/296,798; 62/271,857; 62/347,773; 62/343,217; 62/296,784; 62/271,873; 62/347,785; 62/347,794; and 62/347,805.

In some embodiments, one or more additional microorganisms is/are present in an effective amount/concentration for fixing atmospheric nitrogen, solubilizing phosphate, controlling one or more phytopathogenic pests, enhancing stress tolerance and/or enhancing plant growth/yield when the composition is introduced into a plant growth medium (e.g., a soil).

In some embodiments, one or more additional microorganisms is/are present in an effective amount/concentration for fixing atmospheric nitrogen, solubilizing phosphate, controlling one or more phytopathogenic pests, enhancing stress tolerance and/or enhancing plant growth/yield when the composition is applied to a plant or plant part.

In some embodiments, one or more additional microorganisms is/are present in an amount ranging from about $1 \times 10^1$ to about $1 \times 10^{12}$ colony-forming units (CFU) per gram and/or millilitre of composition. According to some embodiments, the composition comprises about $1 \times 10^1$, $1 \times 10^2$, $1 \times 10^3$, $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ or more CFU of one or more additional microorganisms per gram and/or milliliter of composition (e.g., about $1 \times 10^4$ to about $1 \times 10^9$ CFU/g of *Bacillus amyloliquefaciens* TJ1000 (also known as 1BE, isolate ATCC BAA-390), BRADY, *Metarhizium anisopliae* F52, PENI, *Trichoderma virens* G1-3, and/or *Yersinia entomophaga* O82KB8). In some embodiments, compositions of the present disclosure comprise at least $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ CFU of one or more additional microorganisms per gram and/or millilitre of composition.

In some embodiments, spores from one or more additional microorganims comprise about 0.1 to about 90% (by weight) of the composition. According to some embodiments, the composition comprises about 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95% or more (by weight) of microbial spores from one or more additional microorganisms (e.g., about 10% *Bacillus amyloliquefaciens* TJ1000, *Metarhizium anisopliae* F52, *Penicillium bilaiae* ATCC 20851, *Penicillium bilaiae* RS7B-SD1 and/or *Trichoderma virens* G1-3 spores). In some embodiments, the amount/concentration of microbial spores from one or more additional microorganisms is about 1 to about 25%, about 5 to about 20%, about 5 to about 15%, about 5 to about 10% or about 8 to about 12% (by weight) of the composition.

It is to be understood that additional microorganisms in compositions of the present disclosure may comprise vegetative cells and/or dormant spores. According to some embodiments, at least 1, 5, 10, 15, 20, 25, 30, 35, 40, 45, 50, 55, 60, 65, 70, 75, 80, 85, 90, 95, 96, 97, 98, 99% or more additional microorganisms are present in compositions of the present disclosure as vegetative cells. According to some embodiments, at least 1, 5, 10, 15, 20, 25, 30, 35, 40, 45, 50, 55, 60, 65, 70, 75, 80, 85, 90, 95, 96, 97, 98, 99% or more additional microorganisms are present in compositions of the present disclosure as spores.

Compositions of the present disclosure may comprise any suitable microbial extract(s), including, but not limited to, bacterial extracts, fungal extracts and combinations thereof. In some embodiments, compositions of the present disclosure comprise one or more extracts of media comprising one or more diazotrophs, phosphate-solubilizing microorganisms and/or biopesticides. In some embodiments, compositions of the present disclosure comprise an extract of media comprising one or more of the microbial strains.

IRAC Grouping of Insecticides

Insecticides that are used in combination with *Yersinia entomophaga* may be described or categorized by the IRAC (Insecticide Resistance Action Committee) mode of action classification (http://www.irac-online.org/modes-of-action/). Generally, any of the insecticides that are part of the IRAC classification may be used in the compositions and methods disclosed herein.

The substances used in combination with *Yersinia entomophaga* may come from one or more of the IRAC categories or groupings, including:

1) Acetylcholinestrase (ACHE) inhibitors, including A) carbamates; and B) organophosphates.

Example carbamates include alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb.

Example organophosphates include acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, isofenphos, isoxathion, malathion, mecarbam, methamidophos, methidathion, mevinphos, monocrotophos, naled, omethoate, oxydemeton-methyl, parathion, parathion-methyl, phenthoate, phosalone, phorate, phosmet, phosphamidon, phoxim, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, pirimiphos-methyl, imicyafos and isopropyl O-(methoxyaminothio-phosphoryl) salicylate.

2) GABA-gated chloride channel blockers, including A) cyclodiene organochlorines; and B) phenylpyrazoles (fiproles). Example cyclodiene organochlorines include chlordane and endosulfan. Example phenylpyrazoles include ethiprole and fipronil.

3) Sodium channel modulators, including A) pyrethroids, pyrethrins; and B) DDT, methoxychlor.

Example pyrethroids and pyrethrins include acrinathrin, allethrin, d-cis-trans allethrin, d-trans allethrin, bifenthrin, bioallethrin, bioallethrin S-cyclopentenyli, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomers], deltamethrin, empenthrin [(EZ)-(1R)-isomers], esfenvalerate, etofenprox, fenpropathrin, fenvalerate, flucythrinate, flumethrin, tau-fluvalinate, kadathrin, pyrethrins (pyrethrum), halfenprox, phenothrin [(1R)-trans-isomer], prallethrin, resmethrin, silafluofen, tefluthrin, tetramethrin, tetramethrin [(1R)-isomers], tralomethrin, transfluthrin, permethrin. Example DDTs and methoxychlors include DDT and methoxychlor.

4) Nicotinic acetylcholine receptor (NACHR) competitive modulators, including A) neonicotinoids; B) nicotine; C) sulfoximines; D) butenolides; and E) mesoionics.

Example neonicotinoids include acetamiprid, clothianidin, dinotefuran, imidacloprid, nitenpyram, thiacloprid and thiamethoxam. Example nicotines include nicotine. Example sulfoximines include sulfoxaflor. Example butenolides include flupyradifurone. Example mesoionics include triflumezopyrim.

5) Nicotinic acetylcholine receptor (NACHR) allosteric modulators, including A) spinosyns. Example spinosyns include spinetoram and spinosad.

6) Glutamate-gated chloride channel (GLUCL) allosteric modulators, including A) avermectins, milbemycins. Example avermectins and milbemycins include abamectin, emamectin benzoate, lepimectin and milbemectin.

7) Juvenile hormone mimics, including A) juvenile hormone analogues; B) fenoxycarb; and C) pyriproxyfen. Example juvenile hormone analogues include hydroprene, kinoprene and methoprene. Example fenoxycarbs include fenoxycarb. Example pyriproxyfens include pyriproxyfen.

8) Miscellaneous non-specific (multi-site) inhibitors, including A) alkyl halides; B) chloropicrin; C) fluorides; D) borates; E) tartar emetic; and F) methyl isothiocyanate generators.

Example alkly halides include methyl bromide and other alkyl halides. Example chloropicrins include chloropicrin. Example fluorides include cryolite, sulfuryl fluoride. Example borates include borax, boric acid, disodium octaborate, sodium borate and sodium metaborate. Example tartar emetics include tartar emetic. Example methyl isothiocyanate generators include dazomet and metam.

9) Chorodotonal organ TRPV channel modulators, including A) pyridine azomethine derivatives. Example pyridine azomethine derivatives include pymetrozine and pyrifluquinazon.

10) Mite growth inhibitors, including A) clofentezine, diflovidazin, hexythiazox; and B) etoxazole.

11) Microbial disruptors of insect midgut membranes, including A) *Bacillus thuringiensis* and the insecticidal proteins they produce; and B) and *Bacillus sphaericus*.

12) Inhibitors of mitochondrial ATP synthase, including A) diafenthiuron; B) organotin miticides (e.g., azocyclotin, cyhexatin, fenbutatin oxide); C) propargite; and D) tetradifon.

13) Uncouplers of oxidative phosphorylation via distruption of the protein gradient, including A) chlorfenapyr, DNOC and sulfuramid.

14) Nicotinic acetylcholine receptor (NACHR) channel blockers, including nereistoxin analogs, like bensultap, cartap hydrochloride, thiocyclam, and thiosultap-sodium.

15) Inhibitors of chitin biosynthesis, Type 0, including A) benzoylureas. Example benzoylureas include bistrifluron, chlorfluazuron, diflubenzuron, flucycloxuron, flufenoxuron, hexaflumuron, lufenuron, novaluron, noviflumuron, teflubenzuron and triflumuron.

16) Inhibitors of chitin biosynthesis, Type 1, including A) buprofezin.

17) Moulting disrupter, dipteran, including A) cyromazine.

18) Ecdysone receptor agonists, including A) diacylhydrazines. Example diacylhydrazines include chromafenozide, halofenozide, methoxyfenozide and tebufenozide.

19) Octopamine receptor agonists, including A) amitraz.

20) Mitochondrial complex III electron transport inhibitors, including A) hydramethylnon; B) acequinocyl; C) fluacrypyrim; and D) bifenazate.

21) Mitochondrial complex III electron transport inhibitors, including A) meti acaricides and insecticides; and B) rotenone. Example meti acaricides and insecticides include fenazaquin, fenpyroximate, pyrimidifen, pyridaben, tebufenpyrad and tolfenpyrad.

22) Voltage-dependent sodium channel blockers, including A) oxadiazines (e.g., indoxacarb); and B) semicarbazones (e.g., metaflumizone):

23) Inhibitors of Acetyl CoA carboxylase, including A) tetronic and tetramic acid derivatives. Examples include spirodiclofen, spiromesifen and spirotetramat.

24) Mitochondrial complex IV electron transport inhibitors, including A) phosphides; and B) cyanides. Example phosphides include aluminium phosphide, calcium phosphide, phosphine and zinc phosphide. Example cyanides include calcium cyanide, potassium cyanide and sodium cyanide.

25) Mitochondrial complex II electron transport inhibitors, including A) beta-ketonitrile derivatives (e.g., cyenopyrafen and cyflumetofen); and B) carboxanilides (e.g., pyflubumide).

28) Ryanodine receptor modulators, including A) diamides. Example diamides include chlorantraniliprole, cyantraniliprole and flubendiamide.

29) Chordotonal organ modulators—undefined target site, including A) flonicamid.

UN) Compounds of unknown or uncertain MOA, including A) azadirachtin; B) benzoximate; C) bromopropylate; D) chinomethionat; E) dicofol; F) GS-omega/kappa HXTX-Hv1a peptide; G) lime sulfur; H) pyridalyl; and I) sulfur.

In some examples, one or more of the IRAC groups, or one or more of the individual insecticides that are included in an IRAC group, may be excluded from the claimed compositions and/or methods.

Examples of insecticides that can be employed include: antibiotic insecticides such as allosamidin and thuringiensin; macrocyclic lactone insecticides such as spinosad, spinetoram, and other spinosyns including the 21-butenyl spinosyns and their derivatives; avermectin insecticides such as abamectin, doramectin, emamectin, eprinomectin, ivermectin and selamectin; milbemycin insecticides such as lepimectin, milbemectin, milbemycin oxime and moxidectin; arsenical insecticides such as calcium arsenate, copper acetoarsenite, copper arsenate, lead arsenate, potassium arsenite and sodium arsenite; other biological insecticides, plant incorporated protectant insecticides such as Cry1Ab, Cry1Ac, Cry1F, Cry1A.105, Cry2Ab2, Cry3A, mir Cry3A, Cry3Bb1, Cry34, Cry35, and VIP3A; botanical insecticides such as anabasine, azadirachtin, d-limonene, nicotine, pyrethrins, cinerins, cinerin I, cinerin II, jasmolin I, jasmolin II, pyrethrin I, pyrethrin II, quassia, rotenone, ryania and sabadilla; carbamate insecticides such as bendiocarb and carbaryl; benzofuranyl methylcarbamate insecticides such as benfuracarb, carbofuran, carbosulfan, decarbofuran and furathiocarb; dimethylcarbamate insecticides dimitan, dimetilan, hyquincarb and pirimicarb; oxime carbamate insecticides such as alanycarb, aldicarb, aldoxycarb, butocarboxim, butoxycarboxim, methomyl, nitrilacarb, oxamyl, tazimcarb, thiocarboxime, thiodicarb and thiofanox; phenyl methylcarbamate insecticides such as allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC and xylylcarb; dinitrophenol insecticides such as dinex, dinoprop, dinosam and DNOC; fluorine insecticides such as barium hexafluorosilicate, cryolite, sodium fluoride, sodium hexafluorosilicate and sulfluramid; formamidine insecticides such as amitraz, chlordimeform, formetanate and formparanate; fumigant insecticides such as acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride and tetrachloroethane; inorganic insecticides such as borax, calcium polysulfide, copper oleate, mercurous chloride, potassium thiocyanate and sodium thiocyanate; chitin synthesis inhibitors such as bistrifluoron, buprofezin, chlorfluazuron, cyromazine, diflubenzuron, flucycloxuron, flufenoxuron, hexaflumuron, lufenuron, novaluron, noviflumuron, penfluoron, teflubenzuron and triflumuron; juvenile hormone mimics such as epofenonane, fenoxycarb, hydroprene, kinoprene, methoprene, pyriproxyfen and triprene; juvenile hormones such as juvenile hormone I, juvenile hormone II and juvenile hormone III; moulting hormone agonists such as chromafenozide, halofenozide, methoxyfenozide and tebufenozide; moulting hormones such as .alpha.-ecdysone and ecdysterone; moulting inhibitors such as diofenolan; precocenes such as precocene I, precocene II and precocene III; unclassified insect growth regulators such as dicyclanil; nereistoxin analogue insecticides such as bensultap, cartap, thiocyclam and thiosultap; nicotinoid insecticides such as flonicamid; nitroguanidine insecticides such as clothianidin, dinotefuran, imidacloprid and thiamethoxam; nitromethylene insecticides such as nitenpyram and nithiazine; pyridylmethylamine insecticides such as acetamiprid, imidacloprid, nitenpyram and thiacloprid; organochlorine insecticides such as bromo-DDT, camphechlor, DDT, pp'-DDT, ethyl-DDD, HCH, gamma-HCH, lindane, methoxychlor, pentachlorophenol and TDE; cyclodiene insecticides such as aldrin, bromocyclen, chlorbicyclen, chlordane, chlordecone, dieldrin, dilor, endosulfan, endrin, HEOD, heptachlor, HHDN, isobenzan, isodrin, kelevan and mirex; organophosphate insecticides such as bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP and tetrachlorvinphos; organothiophosphate insecticides such as dioxabenzofos, fosmethilan and phenthoate; aliphatic organothiophosphate insecticides such as acethion, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos and thiometon; aliphatic amide organothiophosphate insecticides such as amidithion, cyanthoate, dimethoate, ethoate-methyl, formothion, mecarbam, omethoate, prothoate, sophamide and vamidothion; oxime organothiophosphate insecticides such as chlorphoxim, phoxim and phoxim-methyl; heterocyclic organothiophosphate insecticides such as azamethiphos, coumaphos, coumithoate, dioxathion, endothion, menazon, morphothion, phosalone, pyraclofos, pyridaphenthion and quinothion; benzothiopyran organothiophosphate insecticides such as dithicrofos and thicrofos; benzotriazine organothiophosphate insecticides such as azinphos-ethyl and azinphos-methyl; isoindole organothiophosphate insecticides such as dialifos and phosmet; isoxazole organothiophosphate insecticides such as isoxathion and zolaprofos; pyrazolopyrimidine organothiophosphate insecticides such as chlorprazophos and pyrazophos; pyridine organothiophosphate insecticides such as chlorpyrifos and chlorpyrifos-methyl; pyrimidine organothiophosphate insecticides such as butathiofos, diazinon, etrimfos, lirimfos, pirimiphos-ethyl, pirimiphos-methyl, primidophos, pyrimitate and tebupirimfos; quinoxaline organothiophosphate insecticides such as quinalphos and quinalphos-methyl; thiadiazole organothiophosphate insecticides such as athidathion, lythidathion, methidathion and prothidathion; triazole organothiophosphate insecticides such as isazofos and triazophos; phenyl organothiophosphate insecticides such as azothoate, bromophos, bromophos-ethyl, carbophenothion, chlorthiophos, cyanophos, cythioate, dicapthon, dichlofenthion, etaphos, famphur, fenchlorphos, fenitrothion fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3 and trifenofos; phosphonate insecticides such as butonate and trichlorfon; phosphonothioate insecticides such as mecarphon; phenyl ethylphosphonothioate insecticides such as fonofos and trichloronat; phenyl phenylphosphonothioate insecticides such as cyanofenphos, EPN and leptophos; phosphoramidate insecticides such as crufomate, fenamiphos, fosthietan, imicyafos, mephosfolan, phosfolan and pirimetaphos; phosphoramidothioate insecticides such as acephate, isocarbophos, isofenphos, methamidophos and propetamphos; phosphorodiamide insecticides such as dimefox, mazidox, mipafox and schradan; oxadiazine insecticides such as indoxacarb; phthalimide insecticides such as dialifos, phosmet and tetramethrin; pyrazole insecticides such as acetoprole, ethiprole, fipronil, pyrafluprole, pyriprole, tebufenpyrad, tolfenpyrad and vaniliprole; pyrethroid ester insecticides such as acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, biopermethrin, cismethrin, tefluthrin, terallethrin, tetramethrin, tralomethrin and transfluthrin; pyrethroid ether insecticides such as etofenprox, flufenprox, halfenprox, protrifenbute and silafluofen; pyrimidinamine insecticides such as flufenerim and pyrimidifen; pyrrole insecticides such as chlorfenapyr; tetronic acid insecticides such as spirodiclofen, spiromesifen and spirotetramat; thiourea insecticides such as diafenthiuron; urea insecticides such as flucofuron and sulcofuron; and unclassified insecticides such as AKD-3088, chlorantraniliprole, closantel, crotamiton, cyflumetofen, E2Y45, EXD, fenazaflor, fenazaquin, fenoxacrim, fenpyroximate, FKI-1033, flubendiamide, HGW86, hydramethylnon, IKI-2002, isoprothiolane, malonoben, metaflumizone, metoxadiazone, nifluridide, NNI-9850, NNI-0101, pymetrozine, pyridaben, pyridalyl, pyrifluquinazon, Qcide, rafoxanide, Rynaxypyr™, SYJ-159, triarathene and triazamate and any combinations thereof. In some examples, one or more insecticides in this paragraph may be excluded from the claimed compositions and/or methods.

Insects

Generally, the compositions and methods disclosed herein may be active against any type of insect, including insects that are members of the orders Coleoptera, Diptera, Hymenoptera, Lepidoptera, Orthoptera and Thysanoptera. In some examples, *Yersinia* and/or combinations of *Yersinia* and one or more specific chemical insecticides may not be effective against insects in one or more of these orders.

In some examples, *Yersinia* and/or combinations of *Yersinia* and one or more specific chemical insecticides may be effective against insects that include *Aedes* mosquitoes, cotton leafhoppers, Anopheline mosquitos, melon and cotton aphids, tobacco whiteflys, rice stem borers, bed bugs, cockroaches, house mosquitos, codling moths, Asian citrus psyllids, sugarcane borers, green-belly stink bugs, stink bugs, western flower thrips, tsetse flies, cotton bollworms, corn earworms, tobacco budworms, Colorado potato beetles, eggplant fruit borers, American serpentine leafminers, European grapevine moths, African cowpea thrips, pollen beatles, houseflies, green peach aphids, currant-lettuce aphids, brown planthoppers, European corn borers, European red mites, diamondback moths, cabbage stem flea beetles, birdcherry-oat aphids, sandflies, avocado thrips, blackflies, English grain aphids, white-backed planthoppers, beet armyworms, fall armyworms, cotton leafworms, twospotted spider mites, onion thrips, glasshouse whiteflies, kissing bugs, red flour beetles, tomato leafminers, cabbage loopers, black cutworms, grasshoppers, locusts, ants, and others. This list is not meant to be inclusive of the insects that may be affected by the compositions and methods disclosed herein.

In some examples, the *Yersinia* and/or combinations of *Yersinia* and one or more specific chemical insecticides may not be effective against one or more insects that include *Aedes* mosquitos, cotton leafhoppers, Anopheline mosquitos, melon and cotton aphids, tobacco whiteflys, rice stem borers, bed bugs, cockroaches, house mosquitos, codling moths, Asian citrus psyllids, sugarcane borers, green-belly stink bugs, stink bugs, western flower thrips, tsetse flies, cotton bollworms, corn earworms, tobacco budworms, Colorado potato beetles, eggplant fruit borers, American serpentine leafminers, European grapevine moths, African cowpea thrips, pollen beatles, houseflies, green peach aphids, currant-lettuce aphids, brown planthoppers, European corn borers, European red mites, diamondback moths, cabbage stem flea beetles, birdcherry-oat aphids, sandflies, avocado thrips, blackflies, English grain aphids, white-backed planthoppers, beet armyworms, fall armyworms, cotton leafworms, twospotted spider mites, onion thrips, glasshouse whiteflies, kissing bugs, red flour beetles, tomato leafminers, cabbage loopers, black cutworms, grasshoppers, locusts, ants, and others. Therefore, one or more of these insects may be excluded from the claimed compositions and/or methods.

In some examples, *Yersinia* and/or combinations of *Yersinia* and one or more specific chemical insecticides may be effective against insects that include chewing pests, examples of which include: 1) Lepidoptera—codling moths, sugarcane borers, cotton bollworms, corn earworms, tobacco budworms, eggplant fruit borers, European grapevine moths, European corn borers, diamondback moths, beet armyworms, fall armyworms, cotton leafworms, cabbage loopers, black cutworms, *Agrotis* spp., black cutworm, cutworm, *Helicoverpa* spp., tomato fruitworm, *Heliothis* spp., swift moth, strawberry root worm, Egyptian cotton leafworm, armyworms, velvetbean caterpillar, southwestern corn borer, soybean looper, southern armyworm and green cloverworms; 2) Coleoptera—rice stem borers, Colorado potato beetles, pollen beetles, cabbage stem flea beetles, red flour beetles, emerald ash borer, wireworm, Asian longhorn beetle, black turfgrass ataenius, bean leaf beetle, plum curculio, pecan weevil, banded cucumber beetle, western spotted cucumber beetle, corn rootworm, oriental beetle, annual bluegrass weevil, melonontha, black vine weevil, garden chafer, white grub, flea beetle, Japanese beetle grub, viburnum leaf beetle, cryptomeria bark beetle, weevils, pea weevil, scarab grubs, bluegrass billbug, strophasoma weevil, confused flour beetle, *ambrosia* beetle and blister beetle; 3) Orthoptera—grasshoppers, locusts and crickets; 4) Diptera—*Aedes* mosquitos, Anopheline mosquitos, house mosquitos, tsetse flies, American serpentine leafminers, houseflies, sandflies, blackflies, tomato leafminers, mosquitos, fungus gnat, root maggots, onion maggot, cabbage root maggot, shore fly, cranefly and leatherjacket; 5) Hymenoptera—ants and wasps; 6) Blattodea—German cockroach, oriental cockroach, American cockroach and termites.

In some examples, *Yersinia* and/or combinations of *Yersinia* and one or more specific chemical insecticides may be effective against insects that include rasping pests, examples of which include: 1) Thysanoptera—western flower thrips, African cowpea thrips, avocado thrips, onion thrips, privet thrips, eastern flower thrips and chili thrips.

In some examples, *Yersinia* and/or combinations of *Yersinia* and one or more specific chemical insecticides may be effective against insects that include sucking pests, examples of which include: 1) Hemiptera—cotton leafhoppers, melon and cotton aphids, tobacco whiteflys, bed bugs, asian citrus psyllids, green-belly stink bugs, stink bugs, green peach aphids, currant-lettuce aphids, brown planthoppers, birdcherry-oat aphids, English grain aphids, white-backed planthoppers, glasshouse whiteflies, kissing bugs, root aphids, grape phylloxera, brown marmorated stink bug, lygus, bagruda bug, three cornered alfalfa hopper, chinch bugs, potato psyllid, cabbage aphid, green leafhopper and potato leafhopper; 2) Acari: European red mites, twospotted spider mites, rust mite, livestock ticks, blacklegged tick, pacific spider mite, varroa mite, dog tick and lonestar tick.

In some examples, *Yersinia* and/or combinations of *Yersinia* and one or more specific chemical insecticides may be effective against insects that include root aphids, grape phylloxera, brown marmorated stink bugs, lygus, bagrada bugs, three cornered alfalfa hoppers, green cloverworms, chinch bugs and blister beetles.

Formulations

Compositions of the present disclosure may comprise any suitable carrier(s), including, but not limited to, foliar-compatible carriers, seed-compatible carriers and soil-compatible carriers. Selection of appropriate carrier materials will depend on the intended application(s) and the microorganism(s) present in the composition. In some embodiments, the carrier material(s) will be selected to provide a composition in the form of a liquid, gel, slurry, or solid. In some embodiments, the carrier will consist essentially of or consist of one or more stabilizing compounds.

In some embodiments, the composition comprises one or more solid carriers. According to some embodiments, the composition comprises one or more powders (e.g., wettable powders) and/or granules. Non-limiting examples of solid carriers include clays (e.g., attapulgite clays, montmorillonite clay, etc.), peat-based powders and granules, freeze-dried powders, spray-dried powders, spray-freeze-dried powders and combinations thereof.

In some embodiments, the composition comprises one or more liquid and/or gel carriers. According to some embodiments, the composition comprises one or more non-aqueous solvents. According to some embodiments, the composition comprises one or more aqueous solvents (e.g., water). According to some embodiments, an aqueous solvent, such as water, may be combined with a co-solvent, such as ethyl lactate, methyl soyate/ethyl lactate co-solvent blends (e.g., STEPOSOL™, Stepan), isopropanol, acetone, 1,2-propanediol, n-alkylpyrrolidones (e.g., AGSOLEX™ wetting agents; Ashland, Inc., Covington, Ky.), petroleum based-oils (e.g., AROMATIC™ and SOLVESSO™ fluids; ExxonMobil Chemical Company, Spring, Tex.), isoparrafinic hyydrocarbons (e.g., ISOPAR™ fluids; ExxonMobil Chemical Company, Spring, Tex.), cycloparaffinic hydrocarbons (e.g., NAPPAR™ 6; ExxonMobil Chemical Company, Spring, Tex.), mineral spirits (e.g., VARSOL™; ExxonMobil Chemical Company, Spring, Tex.), and mineral oils (e.g., paraffin oil). According to some embodiments, the composition comprises one or more inorganic solvents, such as decane, dodecane, hexylether and nonane. According to some embodiments, the composition comprises one or more organic solvents, such as acetone, dichloromethane, ethanol, hexane, methanol, propan-2-ol and trichloroethylene. Non-limiting examples of liquid/gel carriers include oils (e.g., mineral oil, olive oil, peanut oil, soybean oil, sunflower oil), polyethylene glycols (e.g., PEG 200, PEG 300, PEG 400, etc.), propylene glycols (e.g., PPG-9, PPG-10, PPG-17, PPG-20, PPG-26, etc.), ethoxylated alcohols (e.g., TOMADOL® (Air Products and Chemicals, Inc., Allentown, Pa.), TERGITOL™ 15-S surfactants such as TERGITOL™15-S-9 (The Dow Chemical Company, Midland, Mich.), etc.), isoparrafinic hyydrocarbons (e.g., ISOPAR™, ISOPAR™ L, ISOPAR™ M, ISOPAR™ V; ExxonMobil Chemical Company, Spring, Tex.), pentadecane, polysorbates (e.g. polysorbate 20, polysorbate 40, polysorbate 60, polysorbate 80, etc.), silicones (siloxanes, trisiloxanes, etc.) and combinations thereof.

Additional examples of carriers may be found in BURGES, FORMULATION OF MICROBIAL BIOPESTICIDES: BENEFICIAL MICROORGANISMS, NEMATODES AND SEED TREATMENTS (Springer Science & Business Media) (2012); Inoue & Horikoshi, J. FERMENTATION BIOENG. 71(3): 194 (1991).

Compositions of the present disclosure may comprise any suitable stabilizing compound(s), including, but not limited to, maltodextrins, monosaccharides, disaccharides, oligosaccharides, sugar alcohols, humic acids, fulvic acids, malt extracts, peat extracts, betaines, prolines, sarcosines, peptones, skim milks, oxidation control components, hygroscopic polymers and UV protectants.

In some embodiments, the composition comprises one or more maltodextrins (e.g., one or more maltodextrins having a dextrose equivalent value (DEV) of about 3, 4, 5, 6, 7, 8, 9, 10, 11, 12, 13, 14, 15, 16, 17, 18, 19, 20, 21, 22, 23, 24, or 25). According to some embodiments, the composition comprises one or more maltodextrins having a DEV of about 5 to about 6, 7, 8, 9, 10, 11, 12, 14, 15, 16, 17, 18, 19 or 20, about 10 to about 11, 12, 14, 15, 16, 17, 18, 19 or 20, or about 15 to about 16, 17, 18, 19 or 20. According to some embodiments, the composition comprises a combination of maltodextrins having a DEV of about 5 to about 6, 7, 8, 9, 10, 11, 12, 14, 15, 16, 17, 18, 19 or 20, about 10 to about 11, 12, 14, 15, 16, 17, 18, 19 or 20, or about 15 to about 16, 17, 18, 19 or 20. Non-limiting examples of maltodextrins include MALTRIN® M040 (DEV=5; molecular weight=3600; Grain Processing Corporation, Muscatine, Iowa), MALTRIN® M100 (DEV=10; molecular weight=1800; Grain Processing Corporation, Muscatine, Iowa), MALTRIN® M150 (DEV=15; molecular weight=1200; Grain Processing Corporation, Muscatine, Iowa), MALTRIN® M180 (DEV=18; molecular weight=1050; Grain Processing Corporation, Muscatine, Iowa), MALTRIN® M200 (DEV=20; molecular weight=900; Grain Processing Corporation, Muscatine, Iowa), MALTRIN® M250 (DEV=25; molecular weight=720; Grain Processing Corporation, Muscatine, Iowa); MALTRIN QD® M580 (DEV=16.5-19.9; Grain Processing Corporation, Muscatine, Iowa); MALTRIN QD® M585 (DEV=15.0-19.9; Grain Processing Corporation, Muscatine, Iowa); MALTRIN QD® M600 (DEV=20.0-23.0; Grain Processing Corporation, Muscatine, Iowa); GLOBE® Plus 15 DE (Ingredion Inc., Westchester, Ill.); and combinations thereof.

In some embodiments, the composition comprises one or more monosaccharides (e.g., allose, altrose, arabinose, fructose, galactose, glucose, gulose, iodose, lyxose, mannose, ribose, talose, threose and/or xylose). According to some embodiments, the composition comprises glucose. According to some embodiments, the composition does not comprise glucose.

In some embodiments, the composition comprises one or more disaccharides (e.g., cellobiose, chitobiose, gentiobiose, gentiobiulose, isomaltose, kojibiose, lactose, lactulose, laminaribiose, maltose (e.g., maltose monohydrate, anhydrous maltose), maltulose, mannobiose, melibiose, melibiulose, nigerose, palatinose, rutinose, rutinulose, sophorose, sucrose, trehalose, turanose and/or xylobiose). According to some embodiments, the composition comprises maltose. According to some embodiments, the composition does not comprise maltose. According to some embodiments, the composition comprises trehalose. According to some embodiments, the composition does not comprise trehalose.

In some embodiments, the composition comprises one or more oligosaccharides (e.g., fructo-oligosaccharides, galacto-oligosaccharides, mannon-oligosaccharides and/or raffinose).

In some embodiments, the composition comprises one or more sugar alcohols (e.g., arabitol, erythritol, fucitol, galactitol, glycerol, iditol, inositol, isomalt, lactitol, maltitol, maltotetraitol, maltotriitol, mannitol, polyglycitol, ribitol, sorbitol, threitol, volemitol and/or xylitol).

In some embodiments, the composition comprises one or more humic acids (e.g., one or more leonardite humic acids, lignite humic acids, peat humic acids and water-extracted humic acids). In some embodiments, the composition comprises ammonium humate, boron humate, potassium humate and/or sodium humate. In some embodiments, one or more of ammonium humate, boron humate, potassium humate and sodium humate is/are excluded from the composition. Non-limiting examples of humic acids that may be useful in embodiments of the present disclosure include MDL Number MFCD00147177 (CAS Number 1415-93-6), MDL Number MFCD00135560 (CAS Number 68131-04-4), MDL Number MFCS22495372 (CAS Number 68514-28-3), CAS Number 93924-35-7, and CAS Number 308067-45-0.

In some embodiments, the composition comprises one or more fulvic acids (e.g., one or more leonardite fulvic acids, lignite fulvic acids, peat fulvic acids and/or water-extracted fulvic acids). In some embodiments, the composition comprises ammonium fulvate, boron fulvate, potassium fulvate and/or sodium fulvate. In some embodiments, one or more of ammonium fulvate, boron fulvate, potassium fulvate and sodium fulvate is/are excluded from compositions of the present disclosure. Nonlimiting examples of fulvic acids that may be useful in embodiments of the present disclosure include MDL Number MFCD09838488 (CAS Number 479-66-3).

In some embodiments, the composition comprises one or more betaines (e.g., trimethylglycine).

In some embodiments, the composition comprises one or more peptones (e.g., bacterial peptones, meat peptones, milk peptones, vegetable peptones and yeast peptones).

In some embodiments, the composition comprises one or more oxidation control components (e.g., one or more antioxidants and/or oxygen scavengers). According to some embodiments, the composition comprises one or more oxygen scavengers, such as ascrobic acid, ascorbate salts, catechol and/or sodium hydrogen carbonate. According to some embodiments, the composition comprises one or more antioxidants, such as ascorbic acid, ascorbyl palmitate, ascorbyl stearate, calcium ascorbate, carotenoids, lipoic acid, phenolic compounds (e.g., flavonoids, flavones, flavonols), potassium ascorbate, sodium ascorbate, thiols (e.g., glutathione, lipoic acid, N-acetyl cysteine), tocopherols, tocotrienols, ubiquinone and/or uric acid. Non-limiting examples of antioxidants include those that are soluble in the cell membrane (e.g., alpha tocopherol (vitamin E), ascorbyl palmitate) and those that are soluble in water (e.g., ascorbic acid and isomers or ascorbic acid, sodium or potassium salts of ascorbic acid or isomers or ascorbic acid, glutathione, sodium or potassium salts of glutathione). In some embodiments, use of a membrane-soluble antioxidant necessitates the addition of one or more surfactants to adequately disperse the antioxidant within the composition. According to some embodiments, the composition is/comprises ascorbic acid and/or glutathione.

In some embodiments, the composition comprises one or more hygroscopic polymers (e.g., hygroscopic agars, albumins, alginates, carrageenans, celluloses, gums (e.g., cellulose gum, guar gum, gum arabic, gum combretum, xantham gum), methyl celluloses, nylons, pectins, polyacrylic acids, polycaprolactones, polycarbonates, polyethylene glycols (PEG), polyethylenimines (PEI), polylactides, polymethylacrylates (PMA), polyurethanes, polyvinyl alcohols (PVA), polyvinylpyrrolidones (PVP), propylene glycols, sodium carboxymethyl celluloses and/or starches). Non-limiting examples of polymers include AGRIMER™ polymers (e.g., 30, AL-10 LC, AL-22, AT/ATF, VA 3E, VA 31, VA 5E, VA 5I, VA 6, VA 6E, VA 7E, VA 71, VEMA AN-216, VEMA AN-990, VEMA AN-1200, VEMA AN-1980, VEMA H-815MS; Ashland Specialty Ingredients, Wilmington, Del.), EASYSPERSE™ polymers (Ashland Specialty Ingredients, Wilmington, Del.); DISCO™ AG polymers (e.g., L-250, L-280, L-285, L-286, L-320, L-323, L-517, L-519, L-520, L800; Incotec Inc., Salinas, Calif.), KELZAN® polymers (Bri-Chem Supply Ltd., Calgary, Alberta, Calif.), SEEDWORX™ polymers (e.g., Bio 200; Aginnovation, LLC, Walnut Groove, Calif.), TICAXAN® xanthan powders, such as PRE-HYDRATED® TICAXAN® Rapid-3 Powder (TIC Gums, White Marsh, Md.) and combinations thereof. Additional examples of polymers may be found in Pouci, et al. AM. J. AGRIC. BIOL. SCI. 3(1):299 (2008).

In some embodiments, the composition comprises one or more UV protectants (e.g., one or more aromatic amino acids (e.g., tryptophan, tyrosine), carotenoids, cinnamates, lignosulfonates (e.g., calcium lignosulfonate, sodium lignosulfonate), melanins, mycosporines, polyphenols and/or salicylates). Non-limiting examples of UV protectants include Borregaard LignoTech™ lignosulfonates (e.g., Borresperse 3A, Borresperse CA, Borresperse NA, Marasperse AG, Norlig A, Norlig 11D, Ufoxane 3A, Ultrazine NA, Vanisperse CB; Borregaard Lignotech, Sarpsborg, Norway) and combinations thereof. Additional examples of UV protectants may be found in BURGES, FORMULATION OF MICROBIAL BIOPESTICIDES: BENEFICIAL MICROORGANISMS, NEMATODES AND SEED TREATMENTS (Springer Science & Business Media) (2012).

Compositions of the present disclosure may comprise any suitable nutrient(s), including, but not limited to, organic acids (e.g., acetic acid, citric acid, lactic acid, malic acid, taurine, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K, carotenoids (α-carotene, β-carotene, cryptoxanthin, lutein, lycopene, zeaxanthin, etc.) and combinations thereof. In some embodiments, compositions of the present disclosure comprise phosphorous, boron, chlorine, copper, iron, manganese, molybdenum and/or zinc.

Compositions of the present disclosure may comprise any suitable pest attractant(s) and/or feeding stimulant(s), including, but not limited to, brevicomin, ceralure, codlelure, cue-lure, disparlure, dominicalure, eugenol, frontalin, gossyplure, grandlure, hexalure, ipsdienol, ipsenol, japonilure, latitlure, lineatin, litlure, looplure, medlure, megatomic acid, methyl eugenol, moguchun, α-multistriatin, muscalure, orfalure, oryctalure, ostramone, rescalure, siglure, sulcatol, trimedlure and/or trunc-call.

Compositions of the present disclosure may comprise gluconolactone and/or one or more analogues, derivatives, hydrates, isomers, polymers, salts and/or solvates thereof.

Compositions of the present disclosure may comprise any suitable excipient(s), including, but not limited to, dispersants, drying agents, anti-freezing agents, seed flowability agents, safeners, anti-settling agents, pH buffers and adhesives.

Compositions of the present disclosure may comprise any suitable agriculturally acceptable dispersant(s), including, but not limited to, surfactants and wetting agents. Selection of appropriate dispersants will depend on the intended application(s) and the microorganism(s) present in the composition. In general, the dispersant(s) will have low toxicity for the microorganism(s) in the composition and for the plant part(s) to which the composition is to be applied. In some embodiments, the dispersant(s) will be selected to wet and/or emulsify one or more soils. Non-limiting examples of dispersants include Atlox™ (e.g., 4916, 4991; Croda International PLC, Edison, N.J.), Atlox METASPERSE™ (Croda International PLC, Edison, N.J.), BIO-SOFT® (e.g., N series, such as N1-3, N1-7, N1-5, N1-9, N23-3, N2.3-6.5, N25-3, N25-7, N25-9, N91-2.5, N91-6, N91-8; Stepan Company, Northfield, Ill.), MAKON® nonionic surfactants (e.g., DA-4, DA-6 and DA-9; Stepan Company, Northfield, Ill.), MORWET® powders (Akzo Nobel Surface Chemistry LLC, Chicago, Ill.), MULTIWET™ surfactants (e.g., MO-85P-PW-(AP); Croda International PLC, Edison, N.J.), SILWET® L-77 (Helena Chemical Company, Collierville, Tenn.), SPAN™ surfactants (e.g., 20, 40, 60, 65, 80 and 85; Croda Inc., Edison N.J.), TAMOL™ dispersants (The Dow Chemical Company, Midland, Mich.), TERGITOL™ surfactants (e.g., TMN-6 and TMN-100X; The Dow Chemical Company, Midland, Mich.), TERSPERSE surfactants (e.g., 2001, 2020, 2100, 2105, 2158, 2700, 4894 and 4896; Hunstman Corp., The Woodlands, Tex.), TRITON™ surfactants (e.g., X-100; The Dow Chemical Company, Midland, Mich.), TWEEN® surfactants (e.g., TWEEN® 20, 21, 22, 23, 28, 40, 60, 61, 65, 80, 81 and 85; Croda International PLC, Edison, N.J.) and combinations thereof. Additional examples of dispersants may be found in BAIRD & ZUBLENA. 1993. SOIL FACTS: USING WETTING AGENTS (NONIONIC SURFACTANTS) ON SOIL (North Carolina Cooperative Extension Service Publication AG-439-25) (1993); BURGES, FORMULATION OF MICROBIAL BIOPESTICIDES: BENEFICIAL MICROORGANISMS, NEMATODES AND SEED TREATMENTS (Springer Science & Business Media) (2012); MCCARTY, WETTING AGENTS (Clemson University Cooperative Extension Service Publication) (2001).

In some embodiments, compositions of the present disclosure comprise one or more anionic surfactants. According to some embodiments, the composition comprises one or more water-soluble anionic surfactants and/or one or more water-insoluble anionic surfactants, optionally one or more anionic surfactants selected from the group consisting of alkyl carboxylates (e.g., sodium stearate), alkyl sulfates (e.g., alkyl lauryl sulfate, sodium lauryl sulfate), alkyl ether sulfates, alkyl amido ether sulfates, alkyl aryl polyether sulfates, alkyl aryl sulfates, alkyl aryl sulfonates, alkyl sulfonates, alkyl amide sulfonates, alkyl aryl sulfonates, alkyl benzene sulfonates, alkyl diphenyloxide sulfonate, alpha-olefin sulfonates, alkyl naphthalene sulfonates, paraffin sulfonates, alkyl sulfosuccinates, alkyl ether sulfosuccinates, alkylamide sulfosuccinates, alkyl sulfosuccinamates, alkyl sulfoacetates, alkyl phosphates, alkyl ether phosphates, acyl sarconsinates, acyl isethionates, N-acyl taurates, N-acyl-N-alkyltaurates, benzene sulfonates, cumene sulfonates, dioctyl sodium sulfosuccinate, ethoxylated sulfosuccinates, lignin sulfonates, linear alkylbenzene sulfonates, monoglyceride sulfates, perfluorobutanesulfonate, perfluorooctanesulfonate, phosphate ester, styrene acrylic polymers, toluene sulfonates and xylene sulfonates.

In some embodiments, compositions of the present disclosure comprise one or more cationic surfactants. According to some embodiments, the composition comprises one or more pH-dependent amines and/or one or more quaternary ammonium cations, optionally one or more cationic surfactants selected from the group consisting of alkyltrimethylammonium salts (e.g., cetyl trimethylammonium bromide, cetyl trimethylammonium chloride), cetylpyridinium chloride, benzalkonium chloride, benzethonium chloride, 5-Bromo-5-nitro-1,3-dioxane, dimethyldioctadecyl ammonium chloride, cetrimonium bromide, dioctadecyldimethylammonium bromide and/or octenidine dihydrochloride.

In some embodiments, compositions of the present disclosure comprise one or more nonionic surfactants. According to some embodiments, the composition comprises one or more water-soluble nonionic surfactants and/or one or more water-insoluble nonionic surfactants, optionally one or more nonionic surfactants selected from the group consisting of alcohol ethoxylates (e.g., TERGITOL™ 15-S surfactants, such as TERGITOL™ 15-S-9 (The Dow Chemical Company, Midland, Mich.)), alkanolamides, alkanolamine condensates, carboxylic acid esters, cetostearyl alcohol, cetyl alcohol, cocamide DEA, dodecyldimethylamine oxides, ethanolamides, ethoxylates of glycerol ester and glycol esters, ethylene oxide polymers, ethylene oxide-propylene oxide copolymers, glucoside alkyl ethers, glycerol alkyl ethers, glycerol esters, glycol alkyl ethers (e.g., polyoxyethylene glycol alkyl ethers, polyoxypropylene glycol alkyl ethers), glycol alkylphenol ethers (e.g., polyoxyethylene glycol alkylphenol ethers,), glycol esters, monolaurin, pentaethylene glycol monododecyl ethers, poloxamer, polyamines, polyglycerol polyricinoleate, polysorbate, polyoxyethylenated fatty acids, polyoxyethylenated mercaptans, polyoxyethylenated polyoxyproylene glycols, polyoxyethylene glycol sorbitan alkyl esters, polyethylene glycol-polypropylene glycol copolymers, polyoxyethylene glycol octylphenol ethers, polyvinyl pynolidones, sugar-based alkyl polyglycosides, sulfoanylamides, sorbitan fatty acid alcohol ethoxylates, sorbitan fatty acid ester ethoxylates, sorbitan fatty acid ester and/or tertiary acetylenic glycols.

In some embodiments, compositions of the present disclosure comprise at least one nonionic surfactant. According to some embodiments, the composition comprises at least one water insoluble nonionic surfactant and at least one water soluble nonionic surfactant. In some embodiments, compositions of the present disclosure comprise a combination of nonionic surfactants having hydrocarbon chains of substantially the same length.

In some embodiments, compositions of the present disclosure comprise one or more zwitterionic surfactants. According to some embodiments, the composition comprises one or more betaines and/or one or more sultaines, optionally one or more zwitterionic surfactants selected from the group consisting of 3-[(3-Cholamidopropyl)dimethylammonio]-1-propanesulfonate, cocamidopropyl betaine, cocamidopropyl hydroxysultaine, phosphatidylserine, phosphatidylethanolamine, phosphatidylcholine and/or one or more sphingomyelins.

In some embodiments, compositions of the present disclosure comprise one or more soaps and/or organosilicone surfactants. According to some embodiments, the composition comprises one or more alkali metal salts of fatty acids.

In some embodiments, compositions of the present disclosure comprise one or more wetting agents. According to some embodiments, the composition comprises one or more naphthalene sulfonates, optionally one or more alkyl naphthalene sulfonates (e.g., sodium alkyl naphthalene sulfonate), one or more isopropyl naphthalene sulfonates (e.g., sodium isopropyl naphthalene sulfonate) and/or one or more butyl naphthalene sulfonates (e.g., sodium n-butyl naphthalene sulfonate).

Compositions of the present disclosure may comprise any suitable drying agent(s), including, but not limited to, drying powders. Non-limiting examples of drying agents include AEROSIL® hydrophobic fumed silica powders (Evonik Corporation, Parsippany, N.J.), BENTOLITE® powders (BYK-Chemie GmbH, Wesel, Germany), INCOTEC® powders (INCOTEC Inc., Salinas, Calif.), SIPERNAT® silica powders (Evonik Corporation, Parsippany, N.J.) and combinations thereof. Additional examples of drying agents may be found in BURGES, FORMULATION OF MICROBIAL BIOPESTICIDES: BENEFICIAL MICROORGANISMS, NEMATODES AND SEED TREATMENTS (Springer Science & Business Media) (2012). In some embodiments, compositions of the present disclosure comprise calcium stearate, clay (e.g., attapulgite clay, montmorillonite clay), graphite, magnesium stearate, magnesium sulfate, powdered milk, silica (e.g., fumed silica, hydrophobically-coated silica, precipitated silica), soy lecithin and/or talc.

Compositions of the present disclosure may comprise any suitable anti-freezing agent(s), including, but not limited to, ethylene glycol, glycerin, propylene glycol and urea.

Compositions of the present disclosure may comprise any seed flowability agent to improve the lubricity of the treated seeds. The flowability agent may comprise one or more liquid lubricants, solid lubricants, liquid emulsions, or suspensions of solid lubricants. Non-limiting examples of flowability agents include, for example, lubricants such as fats and oils, natural and synthetic waxes, graphite, talc, fluoropolymers (e.g., polytetrafluoroethylene), and solid lubricants such as molybdenum disulfide and tungsten disulfide. In some instances, the flowability agent comprises a wax material. Non-limiting examples of wax materials that can be incorporated into the liquid seed treatment composition include plant and animal-derived waxes such as carnauba wax, candelilla wax, ouricury wax, beeswax, spermaceti, and petroleum derived waxes, such as paraffin wax. For example, in some instances, the flowability agent comprises carnauba wax. In some instances, the flowability agent comprises an oil. For example, the flowability agent may comprise soybean oil. Non-limiting examples of commercially available wax materials suitable for use as flowability agents include AQUAKLEAN 418 supplied by Micro Powders, Inc. (an anionic aqueous emulsion comprising extra light carnauba wax at 35% solids content).

Compositions of the present disclosure may comprise any suitable safener(s), including, but not limited to, napthalic anhydride.

Compositions of the present disclosure may comprise any suitable pH buffer(s), including, but not limited to, potassium phosphate monobasic and potassium phosphate dibasic. In some embodiments, the composition comprises one or more pH buffers selected to provide a composition having a pH of less than 10, typically from about 4.5 to about 9.5, from about 6 to about 8, or about 7.

Compositions of the present disclosure may comprise any suitable anti-settling agent(s), including, but not limited to, polyvinyl acetate, polyvinyl alcohols with different degrees of hydrolysis, polyvinylpyrrolidones, polyacrylates, acrylate-, polyol- or polyester-based paint system binders which are soluble or dispersible in water, moreover copolymers of two or more monomers such as acrylic acid, methacrylic acid, itaconic acid, maleic acid, fumaric acid, maleic anhydride, vinylpyrrolidone, ethylenically unsaturated monomers such as ethylene, butadiene, isoprene, chloroprene, styrene, divinylbenzene, ot-methylstyrene or p-methylstyrene, further vinyl halides such as vinyl chloride and vinylidene chloride, additionally vinyl esters such as vinyl acetate, vinyl propionate or vinyl stearate, moreover vinyl methyl ketone or esters of acrylic acid or methacrylic acid with monohydric alcohols or polyols such as methyl acrylate, methyl methacrylate, ethyl acrylate, ethylene methacrylate, lauryl acrylate, lauryl methacrylate, decyl acrylate, N,N-dimethylamino-ethyl methacrylate, 2-hydroxyethyl methacrylate, 2-hydroxypropyl methacrylate or glycidyl methacrylate, furthermore diethyl esters or monoesters of unsaturated dicarboxylic acids, furthermore (meth)acrylamido-N-methylol methyl ether, amides or nitriles such as acrylamide, methacrylamide, N-methylol(meth)acrylamide, acrylonitrile, methacrylonitrile, and also N-substituted maleiraides and ethers such as vinyl butyl ether, vinyl isobutyl ether or vinyl phenyl ether, and combinations thereof.

Compositions of the present disclosure may comprise any suitable adhesive(s), including, but not limited to, adhesive compositions comprising, consisting essentially of or consisting of one or more disaccharides (e.g. maltose), gums (e.g., cellulose gum, guar gum, gum arabic, gum combretum, xantham gum), maltodextrins (e.g., one or more maltodextrins (each and/or collectively) having a DEV of about 10 to about 20), monosaccharides, oils (e.g., mineral oil, olive oil, peanut oil, soybean oil and/or sunflower oil) and/or oligosaccharides.

Compositions of the present disclosure may comprise any suitable effect pigment(s). Effect pigments, which are sometimes also referred to in the art as "pearl pigments," are a class of materials that provide reflectivity, shine, and/or a pearlescent effect when applied as a coating. In some instances, the effect pigment is in the form of a powder comprising a substrate material and a metal oxide coating. For example, the effect pigment may comprise a substrate material including but not limited to talc, silicate materials (e.g., mica), clay minerals, calcium carbonate, kaolin, phlogopite, alumina, and similar substances. In some instances, the substrate material comprises a hydrophilic material. The substrate material may be coated with a semi-transparent layer of a metal oxide, including but not limited to titanium dioxide, iron oxide, chromium oxide, or zirconium oxide. Alternatively, in some instances, the effect pigment comprises metal powder or metal flakes. The metal powder or metal flakes may comprise a metal including, but not limited to aluminum, copper, silver, or bronze. In some instances, the effect pigment comprises a silicate based substrate. Non-limiting examples of particulate silicates that can be incorporated into the dry powder coating include mica coated with titanium dioxide (e.g., SUNMICA FINE WHITE 2800102, which is commercially available from Sun Chemical Corp.). Other non-limiting examples of commercially available effect pigments that can be incorporated into the dry powder include MAGNA PEARL, LUMINA and MEARLIN pigments from BASF Corporation; PHIBRO PEARL from PhibroChem; and IRIDESIUM 120 from Aakash Chemicals. In some instances, the dry powder has a mean particle size of from about 1 to about 25 microns.

Compositions of the present disclosure may comprise any suitable growth medium suitable for culturing one or more of the microorganisms in the composition. For example, in some embodiments, compositions of the present disclosure comprise Czapek-Dox medium, glycerol yeast extract, mannitol yeast extract, potato dextrose broth and/or YEM media.

Carriers, stabilizing compounds, biostimulants, microbial extracts, nutrients, pest attractants and/or feeding stimulants, pesticides, plant signal molecules, dispersants, drying agents, safeners, flowability agents, anti-settling agents, buffers, adhesives, etc. may be incorporated into compositions of the present disclosure in any suitable amount(s)/concentration(s). The absolute value of the amount/concentration that is/are sufficient to cause the desired effect(s) may be affected by factors such as the type, size and volume of material to which the compositon will be applied, the type(s) of microorganisms in the composition, the number of microorganisms in the composition, the stability of the microorganisms in the composition and storage conditions (e.g., temperature, relative humidity, duration). Those skilled in the art will understand how to select effective amounts/concentrations using routine dose-response experiments. Guidance for the selection of appropriate amounts/concentrations can be found, for example, in International Patent Application Nos. PCT/US2016/050529 and PCT/US2016/050647 and U.S. Provisional Patent Application Nos. 62/296,798; 62/271,857; 62/347,773; 62/343,217; 62/296,784; 62/271,873; 62/347,785; 62/347,794; and 62/347,805.

In some embodiments, compositions of the present disclosure comprise one or more carriers in an amount/concentration of about 1 to about 99% or more (by weight, based upon the total weight of the composition). For example, compositions of the present disclosure may comprise about 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98 or 99% (by weight) of one or more non-aqueous carriers.

In some embodiments, compositions of the present disclosure comprise one or more stabilizing compounds in an amount/concentration of about 0.0001 to about 95% or more (by weight, based upon the total of the composition). For example, compositions of the present disclosure may comprise about 0.0001 to about 0.001, about 0.001 to about 1%, about 0.25 to about 5%, about 1 to about 10%, about 5 to about 25%, about 10% to about 30%, about 20% to about 40%, about 25% to about 50%, about 30 to about 60%, about 50 to about 75%, or about 75 to about 95% (by weight), optionally about 0.0005, 0.001, 0.002, 0.003, 0.004, 0.005, 0.0075, 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95%, of one or more maltodextrins, monosaccharides, disaccharides, sugar alcohols, humic acids, betaines, prolines, sarcosines, peptones, oxidation control components, hygroscopic polymers and/or UV protectants.

In some embodiments, compositions of the present disclosure comprise one or more stabilizing compounds at a concentration of about $1\times10^{-20}$ M to about $1\times10^{-1}$ M. For example, compositions of the present disclosure may comprise about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M, optionally about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more, of one or more maltodextrins, monosaccharides, disaccharides, sugar alcohols, humic acids, betaines, prolines, sarcosines, peptones, oxidation control components, hygroscopic polymers and/or UV protectants.

In some embodiments, compositions of the present disclosure comprise one or more monosaccharides in an amount/concentration of about 0.005 to about 50% (by weight) of the composition. For example, compositions of the present disclosure may comprise about/at least/less than 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.75, 1, 1.25, 1.5, 2, 2.5, 3, 3.5, 4, 4.5, 5, 5.5, 6, 6.5, 7, 7.5, 8, 8.5, 9, 10, 15, 20, 25% (by weight) of one or more monosaccharides (e.g., arabinose, fructose and/or glucose). In some embodiments, one or more monosaccharides is/are present in a concentration ranging from about $1\times10^{-20}$ M to about $1\times10^{-1}$ M. For example, one or more monosaccharides may be included at a concentration of about/at least/less than $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M.

In some embodiments, compositions of the present disclosure comprise one or more disaccharides in an amount/concentration of about 0.005 to about 50% (by weight) of the composition. For example, compositions of the present disclosure may comprise about/at least/less than 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.75, 1, 1.25, 1.5, 2, 2.5, 3, 3.5, 4, 4.5, 5, 5.5, 6, 6.5, 7, 7.5, 8, 8.5, 9, 10, 15, 20, 25% (by weight) of one or more disaccharides (e.g., maltose, sucrose and/or trehalose). In some embodiments, one or more disaccharides is/are present in a concentration ranging from about $1\times10^{-20}$ M to about $1\times10^{-1}$ M. For example, one or more disaccharides may be included at a concentration of about/at least/less than $1\times10^{-20}$ M, $1\times10^{19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{11}$ M, $1\times10^{-10}$ M.

In some embodiments, compositions of the present disclosure comprise one or more maltodextrins in an amount/concentration of about 0.001 to about 95% or more (by weight) of the composition. In some embodiments, the maltodextrin(s) comprise(s) about 0.001 to about 1%, about 0.25 to about 5%, about 1 to about 10%, about 5 to about 25%, about 10% to about 30%, about 20% to about 40%, about 25% to about 50%, about 50 to about 75%, or about 75 to about 95% (by weight) of the composition. For example, compositions of the present disclosure may comprise about/at least/less than 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95% or more (by weight) of one or more maltodextrins (e.g., one or more maltodextrins (each and/or collectively) having a DEV value of about 15 to about 20).

In some embodiments, compositions of the present disclosure comprise one or more sugar alcohols in an amount/concentration of about 0.001 to about 95% or more (by weight) of the composition. In some embodiments, the sugar alcohol(s) (e.g., arabitol, mannitol, sorbitol and/or xylitol) comprise(s) about 0.001 to about 1%, about 0.25 to about 5%, about 1 to about 10%, about 5 to about 25%, about 10% to about 30%, about 20% to about 40%, about 25% to about 50%, about 50 to about 75%, or about 75 to about 95% (by weight) of the composition. For example, compositions of the present disclosure may comprise about/at least/less than 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95% or more (by weight) of one or more sugar alcohols (e.g., arabitol, mannitol, sorbitol and/or xylitol).

In some embodiments, compositions of the present disclosure comprise one or more humic acids in an amount/concentration of about 0.001 to about 95% or more (by weight) of the composition. In some embodiments, the humic acid(s) (e.g., potassium humate) comprise(s) about 0.001 to about 1%, about 0.25 to about 5%, about 1 to about 10%, about 5 to about 25%, about 10% to about 30%, about 20% to about 40%, about 25% to about 50%, about 50 to about 75%, or about 75 to about 95% (by weight) of the composition. For example, compositions of the present disclosure may comprise about/at least/less than 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95% or more (by weight) of one or more humic acids (e.g., potassium humate and/or sodium humate).

In some embodiments, compositions of the present disclosure comprise one or more UV protectants in an amount/concentration of about 0.0001 to about 5% or more (by weight) of the composition. In some embodiments, the UV protectant(s) (e.g., calcium lignosulfate and/or sodium lignosulfate) comprise(s) about 0.0001 to about 0.001, about 0.001 to about 1%, about 0.25 to about 5%, (by weight) of the composition. For example, compositions of the present disclosure may comprise about/at least/less than 0.0005, 0.001, 0.002, 0.003, 0.004, 0.005, 0.0075, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.75, 1, 1.25, 1.5, 2, 2.5, 3, 3.5, 4, 4.5, 5% or more (by weight) of one or more UV protectants (e.g., calcium lignosulfate and/or sodium lignosulfate).

In some embodiments, compositions of the present disclosure comprise one or more oxidation control components in an amount/concentration of about 0.0001 to about 5% or more (by weight) of the composition. For example, compositions of the present disclosure may comprise about/at least/less than 0.0005, 0.001, 0.002, 0.003, 0.004, 0.005, 0.0075, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.75, 1, 1.25, 1.5, 2, 2.5, 3, 3.5, 4, 4.5, 5% of one or more oxidation control components. In some embodiments, the amount/concentration of oxidation control components is about 0.005 to about 2% (by weight) of the composition. In some embodiments, the oxidation control component(s) is/are present in a concentration ranging from about $1 \times 10^{-20}$ M to about $1 \times 10^{-1}$ M. For example, one or more oxidation control components may be added at a concentration of about/at least/less than $1 \times 10^{-20}$ M, $1 \times 10^{-19}$ M, $1 \times 10^{-18}$ M, $1 \times 10^{-17}$ M, $1 \times 10^{-16}$ M, $1 \times 10^{-15}$ M, $1 \times 10^{-14}$ M, $1 \times 10^{-13}$ M, $1 \times \times 10^{-12}$ M, $1 \times 10^{-11}$ M, $1 \times 10^{-10}$ M. In some embodiments, compositions of the present disclosure comprise one or more commercial antioxidants used in accordance with the manufacturer's recommended amounts/concentrations. In some embodiments, compositions of the present disclosure comprise one or more commercial oxygen scavengers used in accordance with the manufacturer's recommended amounts/concentrations.

In some embodiments, compositions of the present disclosure comprise one or more stabilizing compounds in an amount/concentration sufficient to ensure *Yersinia* remains viable.

In some embodiments, compositions of the present disclosure comprise one or more stabilizing compounds in an amount/concentration sufficient to ensure the deliquescence relative humidity (DRH) of the composition is less than 5, 10, 15, 20, 25, 30, 35, 40, 45, 50, 55, 60, 65, 70, 75, 80, 85 or 90 at the temperature(s) at which the composition is to be stored (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and/or 40° C.).

Stablizing compounds may be incorporated into compositions of the present disclosure in any suitable ratio(s).

In some embodiments, compositions of the present disclosure comprise one or more maltodextrins and one or more monosaccharides, disaccharides, sugar alcohols and/or humic acids in a maltodextrin:(monosaccharide, disaccharide, sugar alcohol and/or humic acid) ratio of about 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5. For example, compositions of the present disclosure may comprise one or more maltodextrins (e.g., one or more maltodextrins (each and/or collectively) having a DEV of about 15 to about 20) and one or more sugar alcohols (e.g., sorbitol and/or xylitol) and/or humic acids (e.g., potassium humate) in a maltodextrin:(sugar alcohol/humic acid) ratio of about 5:95, about 15:85, about 25:75 or about 50:50.

In some embodiments, compositions of the present disclosure comprise one or more microbial extracts in an amount/concentration of about 0.0001 to about 5% or more (by weight) of the composition. In some embodiments, the microbial extract(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% or more (by weight) of one or more microbial extracts.

In some embodiments, compositions of the present disclosure comprise one or more nutrients in an amount/concentration of about 0.0001 to about 5% or more (by weight) of the composition. In some embodiments, the nutrient(s) (e.g., phosphorous, boron, chlorine, copper, iron, manganese, molybdenum and/or zinc) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% or more (by weight) of one or more the nutrients (e.g., phosphorous, boron, chlorine, copper, iron, manganese, molybdenum and/or zinc).

In some embodiments, compositions of the present disclosure comprise one or more pest attractant(s) and/or feeding stimulant(s) in an amount/concentration of about 0.0001 to about 5% or more (by weight) of the composition. In some embodiments, the pest attractant(s) and/or feeding stimulant(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% or more (by weight) of one or more pest attractants and/or feeding stimulants.

In some embodiments, compositions of the present disclosure comprise one or more dispersants in an amount/concentration of about 0.001 to about 25% or more (by weight) of the composition. In some embodiments, the dispersant(s) comprise(s) 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 6, 7, 8, 9 or 10 to about 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19 or 20% (by weight) of the composition. For example, compositions of the present disclosure may comprise about 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20% or more (by weight) of one or more dispersants (e.g., one or more surfactants and/or wetting agents).

In some embodiments, compositions of the present disclosure comprise one or more drying agents in an amount/concentration of about 0.001 to about 95% or more (by weight) of the composition. In some embodiments, the drying agent(s) comprise(s) about) 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 6, 7, 8, 9 or 10 to about 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19 or 20% (by weight) of the composition. For example, compositions of the present disclosure may comprise about 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95% or more (by weight) of one or more drying agents (e.g., lecithin and/or talc).

In some embodiments, the compositions of the present disclosure comprise about 0.5 to about 10 grams of drying powder per liter of composition. For example, compositions of the present disclosure may comprise about 0.5, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10 grams or more of drying powder per liter of composition.

In some embodiments, compositions of the present disclosure comprise one or more buffers in an amount/concentration of about 0.0001 to about 5% or more (by weight) of the composition. In some embodiments, the buffer(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% or more (by weight) of one or more buffers (e.g., potassium phosphate monobasic and/or potassium phosphate dibasic).

In some embodiments, compositions of the present disclosure comprise one or more commercial carriers, antioxidants, oxygen scavengers, hygroscopic polymers, UV protectants, biostimulants, microbial extracts, nutrients, pest attractants and/or feeding stimulants, pesticides, plant signal molecules, disperants, drying agents, anti-freezing agents, buffers and/or adhesives used in accordance with the manufacturer's recommended amounts/concentrations.

Composition of the present disclosure may be formulated as any suitable type of composition, including, but not limited to, foliar compositions, seed coatings and soil composition.

In some embodiments, compositions of the present disclosure are formulated as amorphous solids.

In some embodiments, compositions of the present disclosure are formulated as amorphous liquids.

In some embodiments, compositions of the present disclosure are formulated as wettable powders.

In some embodiments, compositions of the present disclosure are formulated as liquid compositions that are subsequently dried to produce a powder or granule. For example, in some embodiments, liquid compositions of the present disclosure are drum dried, evaporation dried, fluidized bed dried, freeze dried, spray dried, spray-freeze dried, tray dried and/or vacuum dried to produce powders/granules. Such powders/granules may be further processed using any suitable method(s), including, but not limited to, flocculation, granulation and milling, to achieve a desired particle size or physical format. The precise method(s) and parameters of processing dried powders/granules that are appropriate in a given situation may be affected by factors such as the desired particle size(s), the type, size and volume of material to which the composition will be applied, the type(s) of microorganisms in the composition, the number of microorganisms in the composition, the stability of the microorganisms in the composition and the storage conditions (e.g., temperature, relative humidity, duration). Those skilled in the art will understand how to select appropriate methods and parameters using routine experiments.

In some embodiments, compositions of the present disclosure are frozen for cryopreservation. For example, in some embodiments, liquid compositions of the present disclosure are flash-frozen and stored in a cryopreservation storage unit/facility. The precise method(s) and parameters of freezing and preserving compositions of the present disclosure that are appropriate in a given situation may be affected by factors such as the type(s) of microorganisms in the composition, the number of microorganisms in the composition, the stability of the microorganisms in the composition and the storage conditions (e.g., temperature, relative humidity, duration). Those skilled in the art will understand how to select appropriate methods and parameters using routine experiments.

Compositions of the present disclosure may be formulated as aqueous or non-aqueous compositions. In some embodiments, compositions of the present disclosure comprise no water. In some embodiments, compositions of the present disclosure comprise a trace amount of water. In some embodiments, compositions of the present disclosure comprise less than 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5% water by weight, based upon the total weight of the composition.

In some embodiments, compositions of the present disclosure are formulated to have a pH of about 4.5 to about 9.5. In some embodiments, compositions of the present disclosure have a pH of about 6 to about 7.5. In some embodiments, compositions of the present disclosure have a pH of about 5, 5.5, 6, 6.5, 7, 7.5, 8 or 8.5.

Compositions of the present disclosure may contain a variety of carriers, stabilizers, nutrients, pesticides, plant signal molecules, dispersants, etc. It is to be understood that the components to be included in the composition and the order in which components are incorporated into the composition may be chosen or designed to maintain or enhance the dispersion, stability and/or survival of *Yersinia* bacteria during storage, distribution, and/or application of the composition.

It is to be understood that compositions of the present disclosure are non-naturally occurring compositions. According to some embodiments, the composition comprises one or more non-naturally occurring components. According to some embodiments, the composition comprises a non-naturally occurring combination of naturally occurring components.

Methods

*Yersinia* and the compositions of the present disclosure may be applied to any plant type, including, but not limited to, row crops and vegetables. In some embodiments, the compositions of the present disclosure are formulated for the treatment of one or more plants selected from the families Amaranthaceae (e.g., chard, spinach, sugar beet, quinoa), Asteraceae (e.g., artichoke, asters, chamomile, chicory, chrysanthemums, dahlias, daisies, echinacea, goldenrod, guayule, lettuce, marigolds, safflower, sunflowers, zinnias), Brassicaceae (e.g., arugula, broccoli, bok choy, Brussels sprouts, cabbage, cauliflower, canola, collard greens, daikon, garden cress, horseradish, kale, mustard, radish, rapeseed, rutabaga, turnip, wasabi, watercress, *Arabidopsis thaliana*), Cucurbitaceae (e.g., cantaloupe, cucumber, honeydew, melon, pumpkin, squash (e.g., acorn squash, butternut squash, summer squash), watermelon, zucchini), Fabaceae (e.g., alfalfa, beans, carob, clover, guar, lentils, mesquite, peas, peanuts, soybeans, tamarind, tragacanth, vetch), Malvaceae (e.g., cacao, cotton, durian, hibiscus, kenaf, kola, okra), Poaceae (e.g., bamboo, barley, corn, fonio, lawn grass (e.g., Bahia grass, Bermudagrass, bluegrass, Buffalograss, Centipede grass, Fescue, or Zoysia), millet, oats, ornamental grasses, rice, rye, sorghum, sugar cane, triticale, wheat and other cereal crops, Polygonaceae (e.g., buckwheat), Rosaceae (e.g., almonds, apples, apricots, blackberry, blueberry, cherries, peaches, plums, quinces, raspberries, roses, strawberries), Solanaceae (e.g., bell peppers, chili peppers, eggplant, petunia, potato, tobacco, tomato) and Vitaceae (e.g., grape). In some embodiments, the compositions of the present disclosure are formulated for the treatment of one or more plants with which *Yersinia* is not naturally associated (e.g., one or more plants that does not naturally exist in the geographical location(s) from which *Yersinia* was isolated). In some embodiments, the compositions of the present disclosure are formulated for the treatment of one or more acaricide-, fungicide-, gastropodicide-, herbicide-, insecticide-, nematicide-, rodenticide- and/or virucide-resistant plants (e.g., one or more plants resistant to acetolactate synthase inhibitors (e.g., imidazolinone, pryimidinyoxy(thio)benzoates, sulfonylaminocarbonyltriazolinone, sulfonylurea, triazolopyrimidines), bialaphos, glufosinate, glyphosate, hydroxyphenylpyruvatedioxygenase inhibitors and/or phosphinothricin). Non-limiting examples of plants that may be treated with compositions of the present disclosure include plants sold by Monsanto Company (St. Louis, Mo.) under the BOLLGARD II®, DROUGHTGARD®, GENUITY®, RIB COMPLETE®, ROUNDUP READY®, ROUNDUP READY 2 YIELD®, ROUNDUP READY 2 EXTEND™, SMARTSTAX®, VT DOUBLE PRO®, VT TRIPLE PRO®, YIELDGARD®, YIELDGARD VT ROOTWORM/RR2®, YIELDGARD VT TRIPLE® and/or XTENDFLEX™ tradenames.

The compositions of the present disclosure may be applied to any part/portion of a plant. In some embodiments, the compositions are applied to plant propagation materials (e.g., cuttings, rhizomes, seeds and tubers). In some embodiments, the compositions are applied to the roots of a plant. In some embodiments, the compositions are applied to the foliage of a plant. In some embodiments, the compositions are applied to both the roots and the foliage of a plant. In some embodiments, the compositions are applied to plant propagation materials and to the plants that grow from said plant propagation materials.

The compositions of the present disclosure may be applied to any plant growth medium, including, but not limited to, soil.

The compositions of the present disclosure may be applied to plants, plant parts and/or plant growth media in any suitable manner, including, but not limited to, on-seed application, in-furrow application and foliar application.

The compositions of the present disclosure may be applied using any suitable method(s), including, but not limited to, coating, dripping, dusting, encapsulating, immersing, spraying and soaking. Batch systems, in which predetermined batch sizes of material and composition are delivered into a mixer, may be employed. Continuous treatment systems, which are calibrated to apply composition at a predefined rate in proportion to a continuous flow of material, may also be employed.

In some embodiments, the compositions are applied directly to plant propagation material (e.g., seeds). According to some embodiments, plant propagation materials are soaked in a composition comprising the compositions for at least 0.1, 0.2, 0.3, 0.4, 0.5, 0.6, 0.7, 0.8, 0.9, 1, 1.25, 1.5, 1.75, 2, 3, 4, 5, 6, 9, 12, 15, 18, 21, 24, 36, 48 hours. According to some embodiments, plant propagation materials are coated with the compositions. Plant propagation materials may be coated with one or more additional layers (e.g., one or more protective layers that serve to enhance the stability and/or survival of *Yersinia* and/or one or more sequestration layers comprising substances that may reduce the stability and/or survival of *Yersinia* if included in the same layer as *Yersinia*). In some embodiments, the coating comprises, consists essentially of, or consists of a composition of the present disclosure and a drying powder.

In some embodiments, the compositions are applied directly to a plant growth medium (e.g., a soil). According to some embodiments, the compositions are applied in the vicinity of a plant propagation material (e.g., a seed). According to some embodiments, the compositions are applied to the root zone of a plant. According to some embodiments, the compositions are applied using a drip irrigation system.

In some embodiments, the compositions are applied directly to plants. According to some embodiments, the compositions are sprayed and/or sprinkled on the plant(s) to be treated.

In some embodiments, foliar application (e.g., application to leaves) of the compositions are used. Individual components of the compositions (e.g., *Yersinia* and chemical insecticides) may be separately applied by foliar means, or they may be applied together. Combinations of some components of the compositions may be separately applied by foliar means. All components of the compositions may be applied by foliar means.

In some embodiments, the compositions are freeze-spray- or spray-freeze-dried and then applied to plants/plant parts. For examples, in some embodiments, a composition comprising the compositions and one or more stabilizing components (e.g., one or more maltodextrins having a DEV of about 15 to about 20) is freeze-spray- or spray-freeze-dried, mixed with a drying powder (e.g., a drying powder comprising calcium stearate, attapulgite clay, montmorillonite clay, graphite, magnesium stearate, silica (e.g., fumed silica, hydrophobically-coated silica and/or precipitated silica) and/or talc), then coated on seed that was been pre-treated with one or more adhesives (e.g., an adhesive composition comprising one or more maltodextrins, one or more mono-, di- or oligosaccharides, one or more peptones, etc.), one or more pesticides and/or one or more plant signal molecules (e.g., one or more LCOs).

The compositions of the present disclosure may be applied to plants, plant parts and/or plant growth media in any suitable amount(s)/concentration(s).

In some embodiments, the compositions are applied at a rate of about $1\times10^1$ to about $1\times10^{20}$ CFU per kilogram of plant propagation material. According to some embodiments, the compositions are applied in an amount sufficient to ensure the plant propagation materials are coated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* per kilogram of plant propagation material. According to some embodiments, one or more microbial strains of the present disclosure is/are applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each seed.

In some embodiments, the composition is applied at a rate of about $1\times10^1$ to about $1\times10^{20}$ CFU per plant. According to some embodiments, one or more microbial strains of the present disclosure is/are applied in an amount sufficient to ensure each plant is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, *Yersinia* is applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* are applied to each plant.

In some embodiments, the compositions are applied at a rate of about $1\times10^1$ to about $1\times10^{20}$ CFU per acre of treated crops. According to some embodiments, *Yersinia* is applied in an amount sufficient to ensure each acre of treated crops is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, *Yersinia* is applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each acre of treated crops.

In some embodiments, *Yersinia* is applied at a rate of about $1\times10^1$ to about $1\times10^{20}$ CFU per acre of plant growth media. According to some embodiments, *Yersinia* is applied in an amount sufficient to ensure each acre of plant growth media is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, *Yersinia* is applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each acre of plant growth media.

In some embodiments, compositions of the present disclosure are applied at a rate of about 0.05 to about 100 milliliters and/or grams of composition per kilogram of plant propagation material. According to some embodiments, one or more compositions of the present disclosure is/are applied in an amount sufficient to ensure the plant propagation materials are coated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of compositions per kilogram of plant propagation material. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each seed.

In some embodiments, compositions of the present disclosure are applied at a rate of about 0.5 to about 100 milliliters and/or grams of composition per plant. According to some embodiments, one or more compositions of the present disclosure is/are applied in an amount sufficient to ensure each plant is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each plant.

In some embodiments, compositions of the present disclosure are applied at a rate of about 0.5 to about 100 milliliters and/or grams of composition per acre of treated crops. According to some embodiments, one or more compositions of the present disclosure is/are applied in an amount sufficient to ensure each acre of treated crops is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each acre of treated crops.

In some embodiments, compositions of the present disclosure are applied at a rate of about 0.5 to about 100 milliliters and/or grams of composition per acre of plant growth media. According to some embodiments, one or more compositions of the present disclosure is/are applied in an amount sufficient to ensure each acre of plant growth media is treated with about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 20, 30, 40, 50, 60, 70, 80, 90 or 100 milliliters and/or grams of composition. According to some embodiments, one or more compositions of the present disclosure is/are applied in an amount sufficient to ensure that an average of about/at least 0.05, 0.1, 0.125, 0.15, 0.175, 0.2, 0.225, 0.2.5, 0.275, 0.3, 0.325, 0.35, 0.375, 0.4, 0.425, 0.45, 0.475, 0.5, 0.55, 0.6, 0.65, 0.7, 0.75, 0.8, 0.85, 0.9, 0.95, 1, 1.25, 1.5, 1.75, 2, 2.25, 2.5, 2.75, 3, 3.25, 3.5, 3.75, 4, 4.25, 4.5, 4.75 or 5 milliliters and/or grams of composition is applied to each acre of plant growth media.

In some embodiments, compositions of the present disclosure are applied in an amount sufficient to ensure the plant propagation materials are coated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* per kilogram of plant propagation material. According to some embodiments, one or more compositions of the present disclosure is/are applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *B. megatarium* NRRL B-67357 is applied to each seed.

In some embodiments, compositions of the present disclosure are applied in an amount sufficient to ensure each plant is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, one or more compositions of the present disclosure is/are applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each plant.

In some embodiments, compositions of the present disclosure are applied in an amount sufficient to ensure each acre of treated crops is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, one or more compositions of the present disclosure is/are applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each acre of treated crops.

In some embodiments, compositions of the present disclosure are applied in an amount sufficient to ensure each acre of plant growth media is treated with about/at least $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia*. According to some embodiments, one or more compositions of the present disclosure is/are applied in an amount sufficient to ensure that an average of about/at least $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$ CFU of *Yersinia* is applied to each acre of plant growth media.

The compositions of the present disclosure may be applied to plants, plant parts and/or plant growth media at any time, including, but not limited to, prior to planting, at the time of planting, after planting, prior to germination, at the time of germination, after germination, prior to seedling emergence, at the time of seedling emergence, after seedling emergence, prior to the vegetative stage, during the vegetative stage, after the vegetative stage, prior to the reproductive stage, during the reproductive stage, after the reproductive stage, prior to flowering, at the time of flowering, after flowering, prior to fruiting, at the time of fruiting, after fruiting, prior to ripening, at the time of ripening, and after ripening. In some embodiments, the compositions are applied to plant propagation materials (e.g., seeds) about/at least 1, 2, 3, 4, 5, 6, 7, 8, 9, 10, 11, 12, 13, 14, 15, 16, 17, 18, 19, 20, 21, 22, 23, 24, 28, 32, 36, 40, 44, 48, 52, 56, 60, 64, 68, 72, 76, 80, 84, 88, 92, 96, 100, 104 weeks prior to planting.

In some embodiments, the compositions are applied to plant propagation materials (e.g., seeds) at the time of planting.

In some embodiments, the compositions are applied to plant propagation materials (e.g., seeds) after planting but before germination.

In some embodiments, the compositions are applied to plants following emergence.

The present disclosure extends to plants and plant parts (e.g., coated plant propagation materials) that have been treated with the compositions, to plants that grow from plant parts (e.g., coated plant propagation materials) that have been treated with the compositions, to plant parts harvested from plants that have been treated with the compositions, to plant parts harvested from plants that grow from plant parts (e.g., coated plant propagation materials) that have been treated with the compositions, to processed products derived from plants that have been treated with with the compositions, to processed products derived from plants that grow from plant parts (e.g., coated plant propagation materials) that have been treated with the compositions, to crops comprising a plurality of plants that have been treated with the compositions, and to crops comprising a plurality of plants that grow from plant parts (e.g., coated plant propagation materials) that have been treated with the compositions.

In some embodiments, the present disclosure provides coated plant propagation materials comprising, consisting essentially of, or consisting of a plant propagation material and a coating that covers at least a portion of the outer surface of the plant propagation material, said coating comprising, consisting essentially of, or consisting the compositions of the present disclosure.

In some embodiments, the coating comprises two, three, four, five or more layers. According to some embodiments, the coating comprises an inner layer that contains *Yersinia* and one or more outer layers free or substantially free of microorganisms. In some embodiments, the coating comprises an inner layer that is a composition of the present disclosure and an outer layer that is equivalent to a composition of the present disclosure except that it does not contain *Yersinia*.

In some embodiments, the coating comprises, consists essentially of, or consists of an composition of the present disclosure and a drying powder. Drying powders may be applied in any suitable amount(s)/concentration(s). The absolute value of the amount/concentration that is/are sufficient to cause the desired effect(s) may be affected by factors such as the type, size and volume of material to which the composition will be applied, the type(s) of microorganisms in the composition, the number of microorganisms in the composition, the stability of the microorganisms in the composition and storage conditions (e.g., temperature, relative humidity, duration). Those skilled in the art will understand how to select an effective amount/concentration using routine dose-response experiments. Guidance for the selection of appropriate amounts/concentrations can be found, for example, in International Patent Application Nos. PCT/US2016/050529 and PCT/US2016/050647 and U.S. Provisional Patent Application Nos. 62/296,798; 62/271,857; 62/347,773; 62/343,217; 62/296,784; 62/271,873; 62/347,785; 62/347,794; and 62/347,805. In some embodiments, the drying powder is applied in an amount ranging from about 0.5 to about 10 grams of drying powder per kilogram of plant propagation material. For example, in some embodiments, about 0.5, 1, 1.25, 1.5, 1.75, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10 grams or more of drying powder (e.g., drying powder comprising magnesium stearate, magnesium sulfate, powdered milk, silica, soy lecithin and/or talc) is applied per kilogram of seed. In some embodiments, a drying powder comprising calcium stearate, attapulgite clay, montmorillonite clay, graphite, magnesium stearate, silica (e.g., fumed silica, hydrophobically-coated silica and/or precipitated silica) and/or talc is applied to seeds coated with a composition of the present disclosure at a rate of about 1, 1.25, 1.5, 1.75, 2, 2.25, 2.5, 2.75, or 3 grams per kilogram of seed.

In some embodiments, the coating completely covers the outer surface of the plant propagation material.

In some embodiments, the average thickness of the coating is at least 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.5, 5 μm or more. In some embodiments, the average thickness of the coating is about 1.5 to about 3.0 μm.

The present disclosure extends to kits comprising, consisting essentially of, or consisting of one or more plants and/or plant parts (e.g., coated plant propagation materials) that have been treated with the compositions of the present disclosure and a container housing the treated plant(s) and/or plant part(s). In some embodiments, the kit further comprises one or more oxygen scavengers, such as activated carbon, ascorbic acid, iron powder, mixtures of ferrous carbonate and metal halide catalysts, sodium chloride and/or sodium hydrogen carbonate.

The container may comprise any suitable material(s), including, but not limited to, materials that reduce the amount of light, moisture and/or oxygen that contact the coated plant propagation material when the container is sealed. In some embodiments, the container comprises, consists essentially of, or consists of a material having light permeability of less than about 1, 2, 3, 4, 5, 6, 7, 8, 9, 10, 15, 20, 25, 30, 35, 40, 45, 50, 55, 60, 65, 70 or 75%. In some embodiments, the container comprises, consists essentially of, or consists of a material having an oxygen transmission rate of less than about 5, 10, 15, 20, 25, 30, 35, 40, 45, 50, 60, 70, 80, 90, 100, 125, 150, 175, 200, 225, 250, 275, 300, 325, 350, 375, 400, 425, 450, 475, or 500 cm$^3$/m$^2$·day (as measured in accordance with ASTM D3985).

In some embodiments, the container reduces the amount of ambient light that reaches said coated plant propagation material by about 5, 10, 15, 20, 25, 30, 35, 40, 45, 50, 55, 60, 65, 70, 75, 80, 85, 90, 95 or 100% when sealed.

In some embodiments, the container reduces the amount of ambient moisture that reaches said plant propagation material by about 5, 10, 15, 20, 25, 30, 35, 40, 45, 50, 55, 60, 65, 70, 75, 80, 85, 90, 95 or 100% when sealed.

In some embodiments, the container reduces the amount of ambient oxygen that reaches said plant propagation material by about 5, 10, 15, 20, 25, 30, 35, 40, 45, 50, 55, 60, 65, 70, 75, 80, 85, 90, 95 or 100% when sealed.

In some embodiments, kits of the present disclosure comprise 1, 2, 3, 4, 5 or more additional containers. The additional containers may comprise any suitable component(s) or composition(s), including, but not limited to, agriculturally beneficial microorganisms, biostimulants, drying agents, nutrients, oxidation control components and pesticides. Examples of agriculturally beneficial microorganisms, biostimulants, drying agents, nutrients, oxidation control components and pesticides that may be included in the additional containers are described above.

The present disclosure extends to animal feed compositions comprising, consisting essentially of or consisting of a food component and a microbial component, said microbial component comprising, consisting essentially of, or consisting of the compositions of the present disclosure.

Animal feed compositions of the present disclosure may comprise any suitable food component, including, but not limited to, fodder (e.g., grains, hay, legumes, silage and/or straw) and forage (e.g., grass).

Animal feed compositions of the present disclosure may be fed to any suitable animal, including, but not limited to, farm animals, zoo animals, laboratory animals and/or companion animals. In some embodiments, the animal feed composition is formulated to meet the dietary needs of birds (e.g., chickens, ducks, quails and/or turkeys), bovids (e.g., antelopes, bison, cattle, gazelles, goats, impala, oxen, sheep and/or wildebeests), canines, cervids (e.g., caribou, deer, elk and/or moose), equines (e.g., donkeys, horses and/or zebras), felines, fish, pigs, rabbits, rodents (e.g., guinea pigs, hamsters, mice and/or rats) and the like.

The present disclosure extends to methods and uses for the compositions of the present disclosure.

In some embodiments, methods and uses of the present disclosure comprise, consist essentially of or consist of applying the compositions disclosed herein to a plant or plant part (e.g., plant propagation material). As noted above, the compositions of the present disclosure may be applied to any type of plant, to any part/portion of a plant, in any suitable manner, in any suitable amount(s)/concentration(s) and at any suitable time(s). According to some embodiments, methods and uses of the present disclosure comprise, consist essentially of or consist of applying the compositions to a monocotyledonous plant or plant part (e.g., a cereal or pseudocereal plant or plant part, optionally, barley, buckwheat, corn, millet, oats, *quinoa*, rice, rye, sorghum or wheat).

In some embodiments, methods and uses of the present disclosure comprise, consist essentially of or consist of applying the disclosed compositions to a plant growth medium. As noted above, the compositions of the present disclosure may be applied to any plant growth medium, in any suitable manner, in any suitable amount(s)/concentration(s) and at any suitable time(s).

In some embodiments, methods and uses of the present disclosure comprise, consist essentially of or consist of introducing a plant or plant part (e.g., plant propagation material) that has been treated with the disclosed compositions into a plant growth medium (e.g., a soil). Such methods may further comprise introducing one or more nutrients (e.g., nitrogen and/or phosphorous) into the plant growth medium. Any suitable nutrient(s) may be added to the growth medium, including, but not limited to, rock phosphate, monoammonium phosphate, diammonium phosphate, monocalcium phosphate, super phosphate, triple super phosphate, ammonium polyphosphate, fertilizers comprising one or more phosphorus sources, and combinations thereof.

In some embodiments, methods and uses of the present disclosure comprise, consist essentially of or consist of growing a plant from a plant propagation material that has been treated with the compositions of the present disclosure.

The compositions may be used to kill pests (e.g., insects), retard their grown, or prevent pests from infecting, infesting, killing/destroying or retarding growth of a plant. In some embodiments, the compositions may enhance plant growth. In some embodiments, the compositions disclosed herein are combinations of one or more *Yersinia entomophaga* microbes and one or more substances, like a pesticide or an insecticide. In some embodiments, one or more of the effects of the compositions, on plants or insects for example, are less than additive (e.g., antagonistic) as compared to the effects of the individual components of the composition, or groups of individual of the components that are less than all of the components of the composition. In some embodiments, one or more of the effects of the compositions, on plants or insects for example, are additive as compared to the effects of the individual components of the composition, or groups of individual of the components that are less than all of the components of the composition. In some embodiments, one or more of the effects of the compositions, on plants or insects for example, give unexpected results as compared to the effects of the individual components of the composition, or groups of individual of the components that are less than all of the components of the composition.

In some embodiments, unexpected results of the compositions as compared to individual components or groups of individual components of a composition may be described by a performance index. In some embodiments, the performance index may be the effect of the combination divided by the sum of effects of the individual components of the composition.

The compositions may be used to enhance growth and/or yield of plants. In some embodiments, application of the compositions enhances 1, 2, 3, 4, 5 or more growth characteristics and/or 1, 2, 3, 4, 5 or more yield characteristics by about/at least 5, 10, 15, 20, 25, 30, 35, 40, 45, 50, 55, 60, 65, 70, 75, 80, 85, 90, 95, 100, 105, 110, 115, 120, 125, 150, 175, 200, 225, 250% or more as compared to one or more controls (e.g., untreated control plants and/or plants treated with an alternative microbial strain). For example, in some embodiments, application of the compositions enhances plant yield by about/at least 0.25, 0.5, 0.75, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.1, 4.2, 4.3, 4.4, 4.5, 4.6, 4.7, 4.8, 4.9, or 5 bushels per acre as compared to the yield of untreated control plants and/or plants treated with an alternative microbial strain.

The compositions may likewise be used to enhance plant growth and/or yield. In some embodiments, application of an composition of the present disclosure enhances 1, 2, 3, 4, 5 or more plant growth characteristics and/or 1, 2, 3, 4, 5 or more plant yield characteristics by about/at least 5, 10, 15, 20, 25, 30, 35, 40, 45, 50, 55, 60, 65, 70, 75, 80, 85, 90, 95, 100, 105, 110, 115, 120, 125, 150, 175, 200, 225, 250% or more as compared to a control composition (e.g., a control composition that is identical to the composition of the present disclosure except that it lacks the disclosed compositions). For example, in some embodiments, application of a composition of the present disclosure enhances plant yield by about/at least 0.25, 0.5, 0.75, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.1, 4.2, 4.3, 4.4, 4.5, 4.6, 4.7, 4.8, 4.9, or 5 bushels per acre as compared to a control composition.

Accordingly, in some embodiments, methods and uses of the present disclosure comprise, consist essentially of or consist of applying the disclosed compositions to seeds, to the plant growth medium in which said seeds are being or will be grown, and/or to the plant(s) that grow(s) from said seeds.

In some embodiments, the compositions are applied to seeds in an amount/concentration effective to enhance 1, 2, 3, 4, 5 or more plant growth characteristics (e.g., biomass) and/or 1, 2, 3, 4, 5 or more plant yield characteristics (e.g., bushels per acre) of the plant that grows from said seed by at least about 5, 10, 15, 20, 25, 30, 35, 40, 45, 50, 55, 60, 65, 70, 75, 80, 85, 90, 95, 100, 105, 110, 115, 120, 125, 150, 175, 200, 225, 250% or more as compared to one or more control plants (e.g., plants grown from untreated seeds and/or plants grown from seeds treated with a control). According to some embodiments, the disclosed compositions are applied to seeds in an amount effective to enhance yield by about/at least 0.25, 0.5, 0.75, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.1, 4.2, 4.3, 4.4, 4.5, 4.6, 4.7, 4.8, 4.9, or 5 bushels per acre.

In some embodiments, the compositions are introduced into a plant growth medium (e.g., soil) in an amount/concentration effective to enhance 1, 2, 3, 4, 5 or more plant growth characteristics (e.g., biomass) and/or 1, 2, 3, 4, 5 or more plant yield characteristics (e.g., bushels per acre) of plants grown therein by at least about 5, 10, 15, 20, 25, 30, 35, 40, 45, 50, 55, 60, 65, 70, 75, 80, 85, 90, 95, 100, 105, 110, 115, 120, 125, 150, 175, 200, 225, 250% or more as compared to one or more controls (e.g., plants grown in untreated soil and/or plants grown in soil treated with an alternative microbial strain). According to some embodiments, the compositions are introduced into the plant growth medium in an amount effective to enhance plant yield by about/at least 0.25, 0.5, 0.75, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 4, 4.1, 4.2, 4.3, 4.4, 4.5, 4.6, 4.7, 4.8, 4.9, or 5 bushels per acre.

EXAMPLES

The following examples are for illustrating various embodiments and are not to be construed as limitations.

Example 1. Effect of Chemicals on *Yersinia entomophaga*

To test combinations of *Yersinia entomophaga* and pesticides for their ability to produce a pesticidal effect, or an effect on plant growth or yield, we first put various insecticides in contact with *Yersinia* to identify insecticides that had minimal toxicity to *Yersinia entomophaga*. The logic was that, if *Yersinia entomophaga* is to function well in combination with a chemical insecticide, the chemical insecticide would ideally have low or no effect on the ability of *Yersinia entomophaga* to survive, grow and/or to function.

To perform this study, we selected amounts of various insecticides based on the percent of the specific insecticide in the insecticide composition obtained from a manufacturer. We also considered the application rate of the particular insecticide, as recommended by the manufacturer. For example, for an insecticide that had 240 mg of the insecticide in 1 g or 1 ml of the commercial product, and had a recommended application rate of 26 ml per 20 liters, we multiplied the values to obtain an amount of insecticide of 0.3 g, which was designated as the 1× amount. Generally, the 1× amount was considered possibly the lowest amount of insecticide that may be considered as an effective amount for use in the combinations disclosed herein. For each insecticide, we also used a higher amount of insecticide (generally a 5× or 10× amount).

The 1× and 5×/10× amounts of each insecticide were added to tubes along with 1 ml of ethyl acetate. The tubes were mixed until the insecticides dissolved. The tubes were left open in a fume hood overnight to allow the ethyl acetate to evaporate. The insecticide remained in the tubes, as a solid coat on the interior surface of the tubes.

A growing culture of *Yersinia entomophaga*, grown in LB medium, was diluted and 1 ml of the diluted culture was added to each tube containing the dried insecticide. The tubes were mixed and then left on the bench top for 1 hour. Then, 100 μl from each tube was plated onto LB plates in triplicate in CFU assays. Plates were incubated at 25° C. for 48 hours and colonies were counted. Results are shown below in Table 1.

TABLE 1

CFU counts after exposure of *Yersinia entomophaga* to insecticides

| Insecticide | Amount insecticide used | Average CFU |
| --- | --- | --- |
| Methomyl | 0.3 mg | 192 |
|  | 3.4 mg | 0 |
| Carbaryl | 1.0 mg | 456 |
|  | 9.6 mg | 459 |
| Esfenvalerate | 0.8 mg | 258 |
|  | 5.3 mg | 0 |
| Spinosad | 0.2 mg | 523 |
|  | 1.0 mg | 487 |
| Emamectin benzoate | 1.5 mg | 489 |
|  | 15 mg | 459 |
| Chlorantraniliprole | 0.15 mg | 523 |
|  | 2.0 mg | 387 |
| Flubendiamide | 0.5 mg | 328 |
|  | 5.0 mg | 0 |
| Indoxacarb | 0.2 mg | 452 |
|  | 1.1 mg | 477 |
| Novaluron | 0.1 mg | 528 |
|  | 1.0 mg | 452 |
| Control (no insecticide) | None | 557 |

The data indicated that some insecticides may have had an adverse effect on the *Yersinia entomophaga* used here. However, the adverse effects generally occurred at a concentration of the insecticide well above the concentration that would be used in the field. Even at these high insecticide concentrations, however, some insecticides did not adversely affect *Yersinia*. In the experiments that follow, concentrations of insecticides were used that did not adversely affect *Yersinia entomophaga*.

Example 2. Determining Chemical Insecticide Rates that have a Moderate Level of Activity: Example Flubendiamide and Fall Armyworm Chemical insecticides were first screened against insects at a range of rates/concentrations to determine which concentrations would provide a moderate level of activity against the insects. If the chemical rates are too high, it is difficult to observe additional effects provided by the addition of either live *Y. entomophaga* cells or cell free filtrates of *Y. entomophaga* cultures.

One example is provided for flubendiamide with fall armyworm. An initial rate was selected that would fall within an expected concentration of active ingredient per volume of water, as indicated on the label of insecticide products containing that active ingredient. For flubendiamide, a concentration of 58.5 mg/L was determined based on these criteria. To create this solution, first a 10× concentration solution was made by dissolving 58.5 mg in 100 mL of acetone. Then, 1:10 dilutions of this solution were made into acetone, resulting in concentrations of the compound of 58.5, 5.85, and 0.585 mg/L. Cabbage leaf disks were dipped in either acetone (controls) or concentrations of flubendiamide at 58.5, 5.85, or 0.585 mg/L in acetone. These were set to dry for 1 hr. After the cabbage disks had dried for 1 hr, a single $3^{rd}$ instar fall armyworm was added to each individual cabbage disk. A total of 10 insects were evaluated for each treatment. Insects were observed daily and the number of dead insects was visually determined (% Mortality). The results are shown below in Table 2.

TABLE 2

Mortality of $3^{rd}$ instar fall armyworm treated with three concentrations of flubendiamide

| Treatment | LT50 (95% confidence intervals) in days | % Mort (4DAT) | % Mort (5DAT) | % Mort (6DAT) | % Mort (7DAT) | % Mort (8DAT) | % Mort (11DAT) | % Mort (12DAT) |
|---|---|---|---|---|---|---|---|---|
| Flubendiamide at 58.5 mg/L | 2.88 (2.24-3.64) | 70 | 90 | 100 | 100 | 100 | 100 | 100 |
| Flubendiamide at 5.85 mg/L | 4.61 (3.89-5.42) | 10 | 30 | 90 | 100 | 100 | 100 | 100 |
| Flubendiamide at 0.585 mg/L | 14.38 (12.41-16.82) | 0 | 10 | 10 | 10 | 10 | 20 | 30 |

% Mort is % Mortality
LT50 is the estimated time to kill 50% of the insects based on Probit analysis, % mortality is Abbott's corrected and DAT is the days after treatment Based on these initial screening results, concentrations in the range of 0.585 to 5.85 mg/L of flubendiamide in acetone were appropriate for follow up testing in combination with live *Y. entomophaga* cells and cell free filtrates of *Y. entomophaga* cultures. Similar evaluations were made of all chemical insecticides against the insect species indicated.

Examples 3-13 Used *Yersinia* Cells in Combination with Chemical Insecticides

Example 3. IRAC Group 1A—Carbamates: Examples of *Yersinia entomophaga* with Carbaryl Against Cabbage Looper and Tobacco Budworm, with Methomyl Against Cabbage Looper, and with Thiodicarb Against Cabbage Looper, Corn Earworm, and Tobacco Budworm Carbaryl with Cabbage Looper.

Cabbage disks were dipped either in phosphate buffer solution (controls and cabaryl-alone treatments) or a suspension of *Y. entomophaga* isolate O43NEW at a concentration of $1\times10^5$ cfu/mL in phosphate buffer (*Y. entomophaga* alone or in combination with cabaryl). 50 μl suspensions of either acetone (controls and *Y. entomophaga* alone treatments) or of cabaryl (Sigma 32055) at a concentration of 100 mg/L in acetone were then dropped onto each cabbage disk. These were set to dry for 1 hr. After the disks had dried, one 2nd instar cabbage looper was added to each disk. A total of 24 insects were evaluated for each treatment. Insects were observed daily and scored as live or dead. Results are shown in Table 3.

TABLE 3

| Mortality of 2nd instar cabbage looper treated with cabaryl, *Y. entomophaga* strain O43NEW, and a combination of both | | | |
|---|---|---|---|
| Treatment | LT50 (95% confidence intervals) in days | % Mortality (1DAT) | % Mortality (2DAT) |
| Cabaryl at 100 mg/L | 3.60 (3.12-4.17) | 4 | 21 |
| *Y. entomophaga* isolate O43NEW at $1\times10^5$ cfu/mL | 5.00 (4.28-5.89) | 0 | 8 |
| Cabaryl + *Y. entomophaga* ($1\times10^5$ cfu/mL) | 2.50 (2.15-2.88) | 12 | 50 |

LT50 is the estimated time to kill 50% of the insects based on Probit analysis, % mortality is Abbott's corrected and DAT is the days after treatment The combination of *Y. entomophaga* isolate O43NEW with cabaryl resulted in a significantly lower LT50 than either active alone. This significance is indicated by the fact that the 95% confidence intervals for the LT50 values, as determined by Probit analysis using JMP software, do not overlap between the combination treatment and either of the two actives (*Yersinia* or cabaryl) tested alone. This method of comparing LT values is used in the remaining Examples.

The data in the above table also show the % mortality of cabbage loopers, at 1 day and at 2 days, for *Y. entomophaga* alone, for cabaryl alone, and for combinations of *Y. entomophaga* and cabaryl.

Carbaryl with Tobacco Budworm.

Cabbage disks were dipped either in phosphate buffer solution (controls and cabaryl alone treatments) or a suspension of *Y. entomophaga* isolate O43NEW at a concentration of $1\times10^3$ cfu/mL in phosphate buffer (*Y. entomophaga* alone or in combination with cabaryl). 50 μl suspensions of either acetone (controls and *Y. entomophaga* alone treatments) or of cabaryl (Sigma 32055) at a concentration of 100 mg/L in acetone were then dropped onto each cabbage disk. These were set to dry for 1 hr. After the disks had dried, one 2nd instar tobacco budworm was added to each disk. A total of 24 insects were evaluated for each treatment. Insects were observed daily and scored as live or dead. Results are shown in Table 4.

TABLE 4

| Mortality of 2nd instar tobacco budworm treated with cabaryl, *Y. entomophaga* strain O43NEW, and a combination of both | | | |
|---|---|---|---|
| Treatment | LT50 (95% confidence intervals) in days | % Mortality (4DAT) | % Mortality (5DAT) |
| Cabaryl at 100 mg/L | 4.06 (3.65-4.52) | 50 | 65 |
| *Y. entomophaga* isolate O43NEW at $1\times10^3$ cfu/mL | 6.76 (6.01-7.66) | 16 | 26 |
| Cabaryl + *Y. entomophaga* ($1\times10^3$ cfu/mL) | 3.05 (2.69-3.43) | 87 | 96 |

LT50 is the estimated time to kill 50% of the insects based on Probit analysis, % mortality is Abbott's corrected and DAT is the days after treatment The combination of *Y. entomophaga* isolate O43NEW with cabaryl resulted in a significantly lower LT50 than either active alone. The data in the above table also show the % mortality of tobacco budworms, at 4 days and at 5 days, for *Y. entomophaga* alone, for cabaryl alone, and for combinations of *Y. entomophaga* and cabaryl.

Methomyl with Cabbage Looper.

Cabbage disks were dipped either in phosphate buffer solution (controls and methomyl alone treatments) or a suspension of *Y. entomophaga* isolate O43NEW at a concentration of 1×10$^5$ or 1×10$^3$ cfu/mL in phosphate buffer (*Y. entomophaga* alone or in combination with methomyl). 50 μl suspensions of either acetone (controls and *Y. entomophaga* alone treatments) or of methomyl (Sigma 36159) at a concentration of 30 mg/L in acetone were then dropped onto each cabbage disk. These were set to dry for 1 hr. After the disks had dried, one 2$^{nd}$ instar cabbage looper was added to each disk. A total of 24 insects were evaluated for each treatment. Insects were observed daily and scored as live or dead. Results are shown in Table 5.

TABLE 5

Mortality of 2$^{nd}$ instar cabbage looper treated with methomyl, *Y. entomophaga* isolate O43NEW, and a combination of both

| Treatment | LT50 (95% confidence intervals) in days | % Mortality (1DAT) | % Mortality (2DAT) |
|---|---|---|---|
| Methomyl at 30 mg/L | 5.84 (4.99-6.88) | 4 | 12 |
| *Y. entomophaga* isolate O43NEW at 1 × 10$^5$ cfu/mL | 4.62 (3.97-5.40) | 0 | 0 |
| *Y. entomophaga* isolate O43NEW at 1 × 10$^3$ cfu/mL | 6.15 (5.22-7.30) | 0 | 0 |
| Methomyl + *Y. entomophaga* (1 × 10$^5$ cfu/mL) | 2.99 (2.57-3.47) | 12 | 21 |
| Methomyl + *Y. entomophaga* (1 × 10$^3$ cfu/mL) | 2.93 (2.52-3.39) | 17 | 25 |

LT50 is the estimated time to kill 50% of the insects based on Probit analysis, % mortality is Abbott's corrected and DAT is the days after treatment The combination of *Y. entomophaga* isolate O43NEW with methomyl resulted in a significantly lower LT50 than either active alone. The data in the above table also show the % mortality of cabbage loopers, at 1 day and at 2 days, for *Y. entomophaga* alone, for methomyl alone, and for combinations of *Y. entomophaga* and methomyl.

Thiodicarb with Cabbage Looper.

Cabbage disks were dipped either in phosphate buffer solution (controls and thiodicarb alone treatments) or a suspension of *Y. entomophaga* isolate O43NEW at a concentration of 1×10$^7$ or 1×10$^5$ cfu/mL in phosphate buffer (*Y. entomophaga* alone or in combination with thiodicarb). 50 μl suspensions of either acetone (controls and *Y. entomophaga* alone treatments) of thiodicarb at a concentration of 140 mg/L in acetone were then dropped onto each cabbage disk. These were set to dry for 1 hr. After the disks had dried, one 2$^{nd}$ instar cabbage looper was added to each disk. A total of 12 insects were evaluated for each treatment. Insects were observed daily and scored as live or dead. The data are shown in Table 6.

TABLE 6

Mortality of 2$^{nd}$ instar cabbage looper treated with thiodicarb, *Y. entomophaga* isolate O43NEW, and a combination of both

| Treatment | LT50 (95% confidence intervals) in days | % Mortality (1DAT) | % Mortality (2DAT) |
|---|---|---|---|
| Thiodicarb at 140 mg/L | 1.40 (1.03-1.82) | 25 | 50 |
| *Y. entomophaga* isolate O43NEW at 1 × 10$^7$ cfu/mL | 0.66 (0.41-0.99) | 66 | 100 |

TABLE 6-continued

Mortality of 2$^{nd}$ instar cabbage looper treated with thiodicarb, *Y. entomophaga* isolate O43NEW, and a combination of both

| Treatment | LT50 (95% confidence intervals) in days | % Mortality (1DAT) | % Mortality (2DAT) |
|---|---|---|---|
| *Y. entomophaga* isolate O43NEW at 1 × 10$^5$ cfu/mL | 2.45 (1.93-3.01) | 8 | 42 |
| Thiodicarb + *Y. entomophaga* (1 × 10$^7$ cfu/mL) | 0.03 (N/A) | 100 | 100 |
| Thiodicarb + *Y. entomophaga* (1 × 10$^5$ cfu/mL) | 0.66 (0.41-0.99) | 66 | 100 |

LT50 is the estimated time to kill 50% of the insects based on Probit analysis, % mortality is Abbott's corrected and DAT is the days after treatment The combination of *Y. entomophaga* isolate O43NEW with thiodicarb resulted in a significantly lower LT50 than either active alone. The data in the above table also show the % mortality of cabbage loopers, at 1 day and at 2 days, for *Y. entomophaga* alone, for thiodicarb alone, and for combinations of *Y. entomophaga* and thiodicarb.

Thiodicarb with Corn Earworm.

Cabbage disks were dipped either in phosphate buffer solution (controls and thiodicarb alone treatments) or a suspension of *Y. entomophaga* isolate O43NEW at a concentration of 1×10$^7$ or 1×10$^3$ cfu/mL in phosphate buffer (*Y. entomophaga* alone or in combination with thiodicarb). 50 μl suspensions of either acetone (controls and *Y. entomophaga* alone treatments) or of thiodicarb (Sigma 34375) at a concentration of 140 mg/L in acetone were then dropped onto each cabbage disk. These were set to dry for 1 hr. After the disks had dried, one 2$^{nd}$ instar corn earworm was added to each disk. A total of 12 insects were evaluated for each treatment. Insects were observed daily and scored as live or dead. The data are shown in Table 7.

TABLE 7

Mortality of 2$^{nd}$ instar corn earworm treated with thiodicarb, *Y. entomophaga* isolate O43NEW, and a combination of both

| Treatment | LT50 (95% confidence intervals) in days | % Mortality (1DAT) | % Mortality (2DAT) |
|---|---|---|---|
| Thiodicarb at 140 mg/mL | 2.02 (1.60-2.50) | 0 | 33 |
| *Y. entomophaga* isolate O43NEW at 1 × 10$^7$ cfu/mL | 1.95 (1.53-2.45) | 8 | 58 |
| *Y. entomophaga* isolate O43NEW at 1 × 10$^3$ cfu/mL | 4.32 (3.55-5.26) | 0 | 16 |
| Thiodicarb + *Y. entomophaga* (1 × 10$^7$ cfu/mL) | 0.82 (0.56-1.15) | 58 | 92 |
| Thiodicarb + *Y. entomophaga* (1 × 10$^3$ cfu/mL) | 1.08 (0.79-1.45) | 42 | 75 |

LT50 is the estimated time to kill 50% of the insects based on Probit analysis, % mortality is Abbott's corrected and DAT is the days after treatment The combination of *Y. entomophaga* isolate O43NEW with thiodicarb resulted in a significantly lower LT50 than either active alone. The data in the above table also show the % mortality of corn earworm, at 1 day and at 2 days, for *Y. entomophaga* alone, for thiodicarb alone, and for combinations of *Y. entomophaga* and thiodicarb.

Thiodicarb with Tobacco Budworm.

Cabbage disks were dipped either in phosphate buffer solution (controls and thiodicarb alone treatments) or a suspension of *Y. entomophaga* isolate O43NEW at a concentration of $1\times10^5$ cfu/mL in phosphate buffer (*Y. entomophaga* alone or in combination with thiodicarb). 50 µl suspensions of either acetone (controls and *Y. entomophaga* alone treatments) or of thiodicarb (Sigma 34375) at a concentration of 140 mg/L in acetone were then dropped onto each cabbage disk. These were set to dry for 1 hr. After the disks had dried, one $2^{nd}$ instar tobacco budworm was added to each disk. A total of 12 insects were evaluated for each treatment. Insects were observed daily and scored as live or dead. Results are shown in Table 8.

TABLE 8

Mortality of $2^{nd}$ instar tobacco budworm treated with thiodicarb, *Y. entomophaga* isolate O43NEW, and a combination of both

| Treatment | LT50 (95% confidence intervals) in days | % Mortality (1DAT) | % Mortality (2DAT) |
| --- | --- | --- | --- |
| Thiodicarb at 140 mg/L | 1.98 (1.57-2.45) | 25 | 50 |
| *Y. entomophaga* isolate O43NEW at $1 \times 10^5$ cfu/mL | 2.49 (2.00-3.06) | 0 | 33 |
| Thiodicarb + *Y. entomophaga* ($1 \times 10^5$ cfu/mL) | 0.91 (0.64-1.25) | 58 | 83 |

LT50 is the estimated time to kill 50% of the insects based on Probit analysis, % mortality is Abbott's corrected and DAT is the days after treatment The combination of *Y. entomophaga* isolate O43NEW with thiodicarb resulted in a significantly lower LT50 than either active alone. The data in the above table also show the % mortality of tobacco budworms, at 1 day and at 2 days, for *Y. entomophaga* alone, for thiodicarb alone, and for combinations of *Y. entomophaga* and thiodicarb.

Example 4. IRAC Group 1B—Organophosphates: Example of Chlorpyrifos with Four Isolates of *Y. entomophaga* Against Fall Armyworm Chlorpyrifos with Fall Armyworm.

Cabbage leaf disks were dipped in either acetone (controls and *Y. entomophaga* alone treatments) or chlorpyrifos (Sigma 45395) at 19 mg/L of acetone. These were set to dry for 1 hr. Cabbage disks were then dipped in either phosphate buffer solution (controls and chlorpyrifos alone treatments) or in a suspension of *Y. entomophaga* at a concentration of $1\times10^5$ cfu/mL in phosphate buffer solution (*Y. entomophaga* alone or in combination with chlorpyrifos treatments). After the cabbage disks had dried for 1 hr, a single $3^{rd}$ instar fall armyworm was added to each individual cabbage disk. A total of 20 insects were evaluated for each treatment. Insects were observed daily and scored as live or dead. Results are shown in Tables 9, 10, 11 and 12.

TABLE 9

Mortality of $3^{rd}$ instar fall armyworm treated with chlorpyrifos, *Y. entomophaga* isolate O43NEW, and a combination of both

| Treatment | LT50 (95% confidence intervals) in days | % Mortality (3DAT) | % Mortality (4DAT) |
|---|---|---|---|
| Chlorpyrifos at 19 mg/L | 6.83 (6.09-7.66) | 40% | 45% |
| *Y. entomophaga* isolate O43NEW at 1 × $10^5$ cfu/mL | 9.06 (8.03-10.23) | 0% | 5% |
| Chlorpyrifos + *Y. entomophaga* | 4.41 (3.85-5.02) | 50% | 60% |

LT50 is the estimated time to kill 50% of the insects based on Probit analysis, % mortality is Abbott's corrected and DAT is the days after treatment The combination of *Y. entomophaga* isolate O43NEW with chlorpyrifos resulted in a significantly lower LT50 than either active alone. The data in the above table also show the % mortality of fall armyworms, at 3 days and at 4 days, for *Y. entomophaga* alone, for chlorpyrifos alone, and for combinations of *Y. entomophaga* and chlorpyrifos.

TABLE 10

Mortality of $3^{rd}$ instar fall armyworm treated with chlorpyrifos, *Y. entomophaga* isolate O333A4, and a combination of both

| Treatment | LT50 (95% confidence intervals) in days | % Mortality (4DAT) | % Mortality (5DAT) | % Mortality (6DAT) | % Mortality (7DAT) |
|---|---|---|---|---|---|
| Chlorpyrifos at 19 mg/L | 8.02 (7.22-8.91) | 35 | 35 | 35 | 40 |
| *Y. entomophaga* isolate O333A4 at 1 × $10^5$ cfu/mL | 10.31 (9.20-11.57) | 0 | 5 | 15 | 40 |
| Chlorpyrifos + *Y. entomophaga* | 4.39 (3.87-4.96) | 55 | 75 | 90 | 95 |

LT50 is the estimated time to kill 50% of the insects based on Probit analysis, % mortality is Abbott's corrected and DAT is the days after treatment The combination of *Y. entomophaga* isolate O333A4 with chlorpyrifos resulted in a significantly lower LT50 than either active alone. The data in the above table also show the % mortality of fall armyworms, at 4, 5, 6 and 7 days, for *Y. entomophaga* alone, for chlorpyrifos alone, and for combinations of *Y. entomophaga* and chlorpyrifos.

TABLE 11

Mortality of $3^{rd}$ instar fall armyworm treated with chlorpyrifos, *Y. entomophaga* isolate O24KEK, and a combination of both

| Treatment | LT50 (95% confidence intervals) in days | % Mortality (6DAT) | % Mortality (7DAT) |
|---|---|---|---|
| Chlorpyrifos at 19 mg/L | 8.02 (7.22-8.91) | 35 | 40 |
| *Y. entomophaga* isolate O24KEK at $1 \times 10^5$ cfu/mL | 7.70 (6.90-8.60) | 50 | 50 |
| Chlorpyrifos + *Y. entomophaga* | 6.05 (5.42-6.75) | 90 | 95 |

LT50 is the estimated time to kill 50% of the insects based on Probit analysis, % mortality is Abbott's corrected and DAT is the days after treatment The combination of *Y. entomophaga* isolate O24KEK with chlorpyrifos resulted in a significantly lower LT50 than either active alone. The data in the above table also show the % mortality of fall armyworms, at 6 days and at 7 days, for *Y. entomophaga* alone, for chlorpyrifos alone, and for combinations of *Y. entomophaga* and chlorpyrifos.

TABLE 12

Mortality of $3^{rd}$ instar fall armyworm treated with chlorpyrifos, *Y. entomophaga* isolate O24G3R, and a combination of both

| Treatment | LT50 (95% confidence intervals) in days | % Mortality (5DAT) | % Mortality (6DAT) | % Mortality (7DAT) |
|---|---|---|---|---|
| Chlorpyrifos at 19 mg/L | 8.02 (7.22-8.91) | 35 | 35 | 40 |
| *Y. entomophaga* isolate O24G3R at $1 \times 10^5$ cfu/mL | 9.15 (8.19-10.23) | 20 | 25 | 45 |
| Chlorpyrifos + *Y. entomophaga* | 4.44 (3.92-5.02) | 75 | 75 | 90 |

LT50 is the estimated time to kill 50% of the insects based on Probit analysis, % mortality is Abbott's corrected and DAT is the days after treatment The combination of *Y. entomophaga* isolate O24G3R with chlorpyrifos resulted in a significantly lower LT50 than either active alone. The data in the above table also show the % mortality of fall armyworms, at 5, 6 and 7 days, for *Y. entomophaga* alone, for chlorpyrifos alone, and for combinations of *Y. entomophaga* and chlorpyrifos.

Example 5. IRAC Group 2B—Phenylpyrazoles (Fiproles): Examples of Ethiprole with *Y. entomophaga* Against Colorado Potato Beetle, and Fipronil with Three Isolates of *Y. entomophaga* Against Fall Armyworm Ethiprole with Colorado Potato Beetle.

Tomato leaf disks were dipped in either acetone (controls and *Y. entomophaga* alone treatments) or ethiprole (Sigma 33976) at a concentration of 120 mg/L in acetone. These were set to dry for 1 hr. Tomato disks were then dipped either in phosphate buffer solution (controls and ethiprole alone treatments) or a suspension of *Y. entomophaga* isolate O43NEW at a concentration of $1 \times 10^7$ cfu/mL of phosphate buffer solution (*Y. entomophaga* alone or in combination with ethiprole). After the tomato disks had dried for 1 hr, a single $4^{th}$ instar Colorado potato beetle larva was added to each individual cabbage disk. A total of 20 insects were evaluate for each treatment. Insects were observed daily and scored as live or dead. Results are shown in Table 13.

TABLE 13

Mortality of Colorado potato beetle larvae treated with ethiprole, *Y. entomophaga*, and a combination of both

| Treatment | LT50 (95% confidence intervals) in days | % Mortality (3DAT) | % Mortality (4DAT) | % Mortality (5DAT) | % Mortality (6DAT) |
|---|---|---|---|---|---|
| Ethiprole at 120 mg/L | 8.90 (7.21-11.07) | 21 | 21 | 21 | 37 |
| *Y. entomophaga* at $1 \times 10^7$ cfu/mL | 19.19 (14.96-25.76) | 5 | 11 | 11 | 16 |
| Ethiprole + *Y. entomophaga* | 2.44 (1.76-3.20) | 58 | 63 | 79 | 84 |

LT50 is the estimated time to kill 50% of the insects based on Probit analysis, % mortality is Abbott's corrected and DAT is the days after treatment The combination of *Y. entomophaga* isolate O43NEW with ethiprole resulted in a significantly lower LT50 than either active alone. The data in the above table also show the % mortality of Colorado potato beetles at 3, 4, 5 and 6 days, for *Y. entomophaga* alone, for ethiprole alone, and for combinations of *Y. entomophaga* and ethiprole.

Fipronil with Fall Armyworm.

Cabbage leaf disks were dipped in either acetone (controls and *Y. entomophaga* alone treatments) or fipronil (Sigma 46451) at a concentration of 4 mg/L in acetone. These were set to dry for 1 hr. Cabbage disks were then dipped in either phosphate buffer solution (controls and fipronil alone treatments) or a suspension of *Y. entomophaga* at a concentration of $1 \times 10^5$ cfu/mL of phosphate buffer solution (*Y. entomophaga* alone or in combination with fipronil). After the cabbage disks had dried for 1 hr, a single $3^{rd}$ instar fall armyworm larva was added to each individual cabbage disk. A total of 20 insects were evaluate for each treatment. Insects were observed daily and scored as live or dead. Results are shown in Tables 14, 15, 16 and 17.

TABLE 14

Mortality of $3^{rd}$ instar fall armyworm treated with fipronil, *Y. entomophaga* isolate O43NEW and a combination of both

| Treatment | LT50 (95% confidence intervals) in days | % Mortality (5DAT) | % Mortality (6DAT) |
|---|---|---|---|
| Fipronil at 4 mg/L | 8.86 (7.70-10.24) | 5 | 20 |
| *Y. entomophaga* isolate O43NEW at $1 \times 10^5$ cfu/mL | 10.41 (9.04-12.05) | 10 | 21 |
| Fipronil + *Y. entomophaga* | 5.28 (4.41-6.19) | 30 | 60 |

LT50 is the estimated time to kill 50% of the insects based on Probit analysis, % mortality is Abbott's corrected and DAT is the days after treatment The combination of *Y. entomophaga* isolate O43NEW with fipronil resulted in a significantly lower LT50 than either active alone. The data in the above table also show the % mortality of fall armyworms at 5 and 6 days, for *Y. entomophaga* alone, for fipronil alone, and for combinations of *Y. entomophaga* and fipronil.

TABLE 15

Mortality of $3^{rd}$ instar fall armyworm treated with fipronil, *Y. entomophaga* isolate O24G3R and a combination of both

| Treatment | LT50 (95% confidence intervals) in days | % Mortality (4DAT) | % Mortality (5DAT) |
|---|---|---|---|
| Fipronil at 4 mg/L | 6.71 (6.15-7.32) | 5 | 21 |
| *Y. entomophaga* isolate O24G3R at $1 \times 10^5$ cfu/mL | 6.55 (6.01-7.12) | 10 | 21 |
| Fipronil + *Y. entomophaga* | 5.05 (4.59-5.55) | 20 | 53 |

LT50 is the estimated time to kill 50% of the insects based on Probit analysis, % mortality is Abbott's corrected and DAT is the days after treatment The combination of *Y. entomophaga* isolate O24G3R with fipronil resulted in a significantly lower LT50 than either active alone. The data in the above table also show the % mortality of fall armyworms at 4 and 5 days, for *Y. entomophaga* alone, for fipronil alone, and for combinations of *Y. entomophaga* and fipronil.

TABLE 16

Mortality of $3^{rd}$ instar fall armyworm treated with fipronil, *Y. entomophaga* isolate O24KEK and a combination of both

| Treatment | LT50 (95% confidence intervals) in days | % Mortality (4DAT) | % Mortality (5DAT) | % Mortality (6DAT) |
|---|---|---|---|---|
| Fipronil at 4 mg/L | 6.71 (6.15-7.31) | 5 | 21 | 39 |
| *Y. entomophaga* isolate O24KEK at $1 \times 10^5$ cfu/mL | 6.94 (6.38-7.55) | 10 | 11 | 39 |
| Fipronil + *Y. entomophaga* | 4.07 (3.77-4.51) | 40 | 74 | 94 |

LT50 is the estimated time to kill 50% of the insects based on Probit analysis, % mortality is Abbott's corrected and DAT is the days after treatment The combination of *Y. entomophaga* isolate O24KEK with fipronil resulted in a significantly lower LT50 than either active alone. The data in the above table also show the % mortality of fall armyworms at 4, 5 and 6 days, for *Y. entomophaga* alone, for fipronil alone, and for combinations of *Y. entomophaga* and fipronil.

TABLE 17

Mortality of $3^{rd}$ instar fall armyworm treated with fipronil, *Y. entomophaga* isolate O333A4 and a combination of both

| Treatment | LT50 (95% confidence intervals) in days | % Mortality (4DAT) | % Mortality (5DAT) | % Mortality (6DAT) |
|---|---|---|---|---|
| Fipronil at 4 mg/L | 6.71 (6.15-7.31) | 5 | 21 | 39 |
| *Y. entomophaga* isolate O333A4 at $1 \times 10^5$ cfu/mL | 7.40 (6.81-8.04) | 5 | 16 | 28 |
| Fipronil + *Y. entomophaga* | 4.43 (4.00-4.89) | 30 | 53 | 83 |

LT50 is the estimated time to kill 50% of the insects based on Probit analysis, % mortality is Abbott's corrected and DAT is the days after treatment The combination of *Y. entomophaga* isolate O333A4 with fipronil resulted in a significantly lower LT50 than either active alone. The data in the above table also show the % mortality of fall armyworms at 4, 5 and 6 days, for *Y. entomophaga* alone, for fipronil alone, and for combinations of *Y. entomophaga* and fipronil.

Example 6. IRAC Group 3A—Pyrethroids: Examples of *Y. entomophaga* with Cyfluthrin Against Black Cutworm, *Y. entomophaga* with k-Cyhalothrin Against Fall Armyworm, *Y. entomophaga* with Deltamethrin Against Black Cutworm, Diamondback Moth and Colorado Potato Beetle, and Four *Y. Entomophaga* Isolates with Esfenvalerate Against Black Cutworm, Fall Armyworm, and Cabbage Looper Cyfluthrin with Black Cutworm.

Cabbage leaf disks were dipped in either acetone (controls and *Y. entomophaga* alone treatments) or cyfluthrin (Sigma 33738) at a concentration of 1.3 mg/L in acetone. These were set to dry for 1 hr. Cabbage disks were then dipped in either phosphate buffer solution (controls and cyfluthrin alone treatments) or a suspension of *Y. entomophaga* isolate O43NEW at a concentration of $1 \times 10^4$ cfu/mL in phosphate buffer solution (*Y. entomophaga* alone or in combination with cyfluthrin). After the cabbage disks had dried for 1 hr, a single $3^{rd}$ instar black cutworm larva was added to each individual cabbage disk. A total of 20 insects were evaluate for each treatment. Insects were observed daily and scored as live or dead. Results are shown in Table 18.

TABLE 18

Mortality of black cutworm treated with cyfluthrin, *Y. entomophaga* strain O43NEW, and a combination of both

| Treatment | LT50 (95% confidence intervals) in days | % Mortality (6DAT) | % Mortality (7DAT) | % Mortality (10DAT) |
|---|---|---|---|---|
| Cyfluthrin at 1.3 mg/L | 8.82 (7.87-9.89) | 35 | 40 | 47 |
| *Y. entomophaga* at 1 × $10^4$ cfu/mL | 14.71 (12.88-16.89) | 10 | 15 | 21 |
| Cyfluthrin + *Y. entomophaga* | 6.86 (6.09-7.72) | 55 | 65 | 79 |

LT50 is the estimated time to kill 50% of the insects based on Probit analysis, % mortality is Abbott's corrected and DAT is the days after treatment The combination of *Y. entomophaga* isolate O43NEW with cyfluthrin resulted in a significantly lower LT50 than either active alone. The data in the above table also show the % mortality of black cutworms at 6, 7 and 10 days, for *Y. entomophaga* alone, for cyfluthrin alone, and for combinations of *Y. entomophaga* and cyfluthrin.

Cyfluthrin with Cabbage Looper.

Cabbage leaf disks were dipped in either acetone (controls and *Y. entomophaga* alone treatments) or cyfluthrin (Sigma 33738) at a concentration of 0.0013 mg/L in acetone. These were set to dry for 1 hr. Cabbage disks were then dipped in either phosphate buffer solution (controls and cyfluthrin alone treatments) or a suspension of *Y. entomophaga* isolate O43NEW at a concentration of 1×$10^2$ cfu/mL in phosphate buffer solution (*Y. entomophaga* alone or in combination with cyfluthrin). After the cabbage disks had dried for 1 hr, a single $4^{th}$ instar cabbage looper larva was added to each individual cabbage disk. A total of 20 insects were evaluate for each treatment. Insects were observed daily and scored as live or dead. Results are shown in Table 19.

TABLE 19

Mortality of cabbage looper treated with cyfluthrin, *Y. entomophaga* isolate O43NEW, and a combination of both

| Treatment | LT75 (95% confidence intervals) in days | % Mortality (4DAT) | % Mortality (5DAT) |
|---|---|---|---|
| Cyfluthrin at 0.0013 mg/L | 7.326 (6.591-8.169) | 30 | 50 |
| *Y. entomophaga* at 1 × $10^2$ cfu/mL | 19.705 (17.407-22.673) | 0 | 0 |
| Cyfluthrin + *Y. entomophaga* | 5.849 (5.204-6.585) | 40 | 65 |

LT75 is the estimated time to kill 75% of the insects based on Probit analysis, % mortality is Abbott's corrected and DAT is the days after treatment The combination of *Y. entomophaga* isolate O43NEW with cyfluthrin resulted in a significantly lower LT75 than either active alone. The data in the above table also show the % mortality of cabbage looper at 4 and 5 days, for *Y. entomophaga* alone, for cyfluthrin alone, and for combinations of *Y. entomophaga* and cyfluthrin.

λ-Cyhalothrin with Fall Armyworm.

Cabbage leaf disks were dipped in either acetone (controls and *Y. entomophaga* alone treatments) or λ-cyhalothrin (Sigma 31058) at a concentration of 3.6 mg/L in acetone. These were set to dry for 1 hr. Cabbage disks were then dipped in either phosphate buffer solution (controls and λ-cyhalothrin alone treatments) or a suspension of *Y. entomophaga* isolate O43NEW at a concentration of 1×$10^5$ cfu/mL in phosphate buffer solution (*Y. entomophaga* alone or in combination with λ-cyhalothrin). After the cabbage disks had dried for 1 hr, a single $3^{rd}$ instar fall armyworm larva was added to each individual cabbage disk. A total of 20 insects were evaluate for each treatment. Insects were observed daily and scored as live or dead. Results are shown in Table 20.

TABLE 20

Mortality of fall armyworm treated with λ-cyhalothrin, *Y. entomophaga* isolate O43NEW, and a combination of both

| Treatment | LT50 (95% confidence intervals) in days | % Mortality (3DAT) | % Mortality (4DAT) | % Mortality (5DAT) |
|---|---|---|---|---|
| λ-cyhalothrin at 3.6 mg/L | 5.20 (4.73-5.71) | 0 | 30 | 37 |
| *Y. entomophaga* at 1 × $10^5$ cfu/mL | 7.00 (6.43-7.63) | 0 | 0 | 11 |
| λ-cyhalothrin + *Y. entomophaga* | 4.08 (3.68-4.52) | 15 | 50 | 68 |

LT50 is the estimated time to kill 50% of the insects based on Probit analysis, % mortality is Abbott's corrected and DAT is the days after treatment The combination of *Y. entomophaga* isolate O43NEW with λ-cyhalothrin resulted in a significantly lower LT50 than either the active alone. The data in the above table also show the % mortality of fall armyworm at 3, 4 and 5 days, for *Y. entomophaga* alone, for λ-cyhalothrin alone, and for combinations of *Y. entomophaga* and λ-cyhalothrin.

Deltamethrin with Black Cutworm.

Cabbage leaf disks were dipped in either acetone (controls and *Y. entomophaga* alone treatments) or deltamethrin (Sigma 45423) at a concentration of 1.75 mg/L in acetone (for experiment shown in Table 21) or 0.175 mg/L in acetone (for experiment shown in Table 22). These were set to dry for 1 hr. Cabbage disks were then dipped in either phosphate buffer solution (controls and deltamethrin alone treatments) or a suspension of *Y. entomophaga* isolate O43NEW at a concentration of 1×$10^4$ cfu/mL of phosphate buffer solution (*Y. entomophaga* alone or in combination with deltamethrin). After the cabbage disks had dried for 1 hr, a single $3^{rd}$ instar black cutworm larva was added to each individual cabbage disk. A total of 20 insects were evaluate for each treatment. Insects were observed daily and scored as live or dead. Results are shown in Tables 21 and 22, below.

TABLE 21

Mortality of black cutworm treated with deltamethrin, *Y. entomophaga* isolate O43NEW, and a combination of both

| Treatment | LT50 (95% confidence intervals) in days | % Mortality (3DAT) |
|---|---|---|
| Deltamethrin at 1.75 mg/L | 3.37 (2.88-3.91) | 45 |
| *Y. entomophaga* at 1 × $10^4$ cfu/mL | 14.71 (12.88-16.89) | 0 |
| Deltamethrin + *Y. entomophaga* | 2.36 (1.93-2.84) | 75 |

LT50 is the estimated time to kill 50% of the insects based on Probit analysis, % mortality is Abbott's corrected and DAT is the days after treatment The combination of *Y. entomophaga* isolate O43NEW with deltamethrin at 1.75 mg/L resulted in a significantly lower LT50 than either active alone. The data in the above table also show the % mortality of black cutworm at 3 days, for *Y. entomophaga* alone, for deltamethrin alone, and for combinations of *Y. entomophaga* and deltamethrin.

TABLE 22

Mortality of black cutworm treated with deltamethrin,
*Y. entomophaga* isolate O43NEW, and a combination of both

| Treatment | LT50 (95% confidence intervals) in days | % Mortality (3DAT) | % Mortality (6DAT) | % Mortality (9DAT) | % Mortality (10DAT) |
|---|---|---|---|---|---|
| Deltamethrin at 0.175 mg/L | 7.67 (6.80-8.63) | 5 | 35 | 55 | 63 |
| *Y. entomophaga* at $1 \times 10^4$ cfu/mL | 14.71 (12.88-16.89) | 0 | 10 | 15 | 21 |
| Deltamethrin + *Y. entomophaga* | 5.15 (4.51-5.86) | 10 | 75 | 80 | 95 |

LT50 is the estimated time to kill 50% of the insects based on Probit analysis, % mortality is Abbott's corrected and DAT is the days after treatment The combination of *Y. entomophaga* isolate O43NEW with deltamethrin at 0.175 mg/L resulted in a significantly lower LT50 than either active alone. The data in the above table also show the % mortality of black cutworm at 3, 6, 9 and 10 days, for *Y. entomophaga* alone, for deltamethrin alone, and for combinations of *Y. entomophaga* and deltamethrin.

Deltamethrin with Diamondback Moth.

Cabbage leaf disks were dipped in either acetone (controls and *Y. entomophaga* alone treatments) or deltamethrin (Sigma 45423) at a concentration of 0.29 mg/L in acetone. These were set to dry for 1 hr. Cabbage disks were then dipped either in phosphate buffer solution (controls and deltamethrin alone treatments) or a suspension of *Y. entomophaga* isolate O43NEW at a concentration of $1 \times 10^3$ cfu/mL in phosphate buffer solution (*Y. entomophaga* alone or in combination with deltamethrin). After the cabbage disks had dried for 1 hr, a single $3^{rd}$ instar diamondback moth larva was added to each individual cabbage disk. A total of 20 insects were evaluate for each treatment. Insects were observed daily and scored as live or dead. Results are shown in Table 23.

TABLE 23

Mortality of diamondback moth treated with deltamethrin,
*Y. entomophaga* isolate O43NEW, and a combination of both

| Treatment | LT50 (95% confidence intervals) in days | % Mortality (2DAT) | % Mortality (4DAT) | % Mortality (7DAT) | % Mortality (8DAT) | % Mortality (10DAT) | % Mortality (14DAT) |
|---|---|---|---|---|---|---|---|
| Deltamethrin at 0.29 mg/L | 11.58 (9.71-13.87) | 0 | 16 | 21 | 24 | 32 | 54 |
| *Y. entomophaga* at $1 \times 10^3$ cfu/mL | 13.12 (11.05-15.66) | 5 | 15 | 25 | 21 | 22 | 14 |
| Deltamethrin + *Y. entomophaga* | 4.92 (4.17-5.78) | 10 | 50 | 75 | 79 | 78 | 79 |

LT50 is the estimated time to kill 50% of the insects based on Probit analysis, % mortality is Abbott's corrected and DAT is the days after treatment The combination of *Y. entomophaga* isolate O43NEW with deltamethrin at 0.29 mg/L resulted in a significantly lower LT50 than either active alone. The data in the above table also show the % mortality of diamondback moth at 2, 4, 7, 8, 10 and 14 days, for *Y. entomophaga* alone, for deltamethrin alone, and for combinations of *Y. entomophaga* and deltamethrin.

Deltamethrin with Colorado Potato Beetle.

Tomato leaf disks were dipped in either acetone (controls and *Y. entomophaga* alone treatments) or deltamethrin (Sigma 45423) at a concentration of 0.88 mg/L in acetone. These were set to dry for 1 hr. Tomato disks were then dipped in either phosphate buffer solution (controls and deltamethrin alone treatments) or a suspension of *Y. entomophaga* isolate O43NEW at a concentration of $1 \times 10^7$ cfu/mL in phosphate buffer (*Y. entomophaga* alone or in combination with deltamethrin). After the tomato disks had dried for 1 hr, a single $3^{rd}$ instar Colorado potato beetle larva was added to each individual tomato disk. A total of 20 insects were evaluate for each treatment. Insects were observed daily and scored as live or dead. Results are shown in Table 24.

TABLE 24

Mortality of Colorado potato beetle larvae treated with deltamethrin,
*Y. entomophaga* isolate O43NEW, and a combination of both

| Treatment | LT50 (95% confidence intervals) in days | % Mortality (2DAT) | % Mortality (5DAT) | % Mortality (6DAT) | % Mortality (7DAT) | % Mortality (9DAT) |
|---|---|---|---|---|---|---|
| Deltamethrin at 0.88 mg/L | 11.6 (8.01-17.48) | 30 | 30 | 30 | 30 | 30 |
| *Y. entomophaga* isolate O43NEW at 1 × 10$^7$ CFU/mL | 28.10 (17.72-48.54) | 0 | 10 | 15 | 20 | 30 |
| Deltamethrin + *Y. entomophaga* | 4.60 (3.26-6.56) | 40 | 50 | 55 | 60 | 65 |

LT50 is the estimated time to kill 50% of the insects based on Probit analysis, % mortality is Abbott's corrected and DAT is the days after treatment The combination of *Y. entomophaga* isolate O43NEW with deltamethrin resulted in a significantly lower LT50 than either active alone. The data in the above table also show the % mortality of Colorado potato beetles at 2, 5, 6, 7 and 9 days, for *Y. entomophaga* alone, for deltamethrin alone, and for combinations of *Y. entomophaga* and deltamethrin.

Esfenvalerate with Black Cutworm.

Cabbage leaf disks were dipped in either acetone (controls and *Y. entomophaga* alone treatments) or esfenvalerate (Sigma 46277) at a concentration of 5.6 mg/L in acetone. These were set to dry for 1 hr. Cabbage disks were then dipped in either phosphate buffer solution (controls and esfenvalerate alone treatments) or a suspension of *Y. entomophaga* at a concentration of 1×10$^5$ cfu/mL (*Y. entomophaga* alone or in combination with esfenvalerate). After the cabbage disks had dried for 1 hr, a single 3$^{rd}$ instar black cutworm larva was added to each individual cabbage disk. A total of 20 insects were evaluate for each treatment. Insects were observed daily and scored as live or dead. The data are shown below in Tables 25, 26, 27 and 28.

TABLE 25

Mortality of black cutworm treated with esfenvalerate,
*Y. entomophaga* isolate O43NEW, and a combination of both

| Treatment | LT50 (95% confidence intervals) in days | % Mortality (3DAT) | % Mortality (4DAT) |
|---|---|---|---|
| Esfenvalerate at 5.6 mg/L | 3.97 (3.60-4.38) | 40 | 45 |
| *Y. entomophaga* isolate O43NEW at 1 × 10$^5$ CFU/mL | 5.82 (5.36-6.31) | 0 | 10 |

TABLE 25-continued

Mortality of black cutworm treated with esfenvalerate,
*Y. entomophaga* isolate O43NEW, and a combination of both

| Treatment | LT50 (95% confidence intervals) in days | % Mortality (3DAT) | % Mortality (4DAT) |
|---|---|---|---|
| Esfenvalerate + *Y. entomophaga* | 2.82 (2.50-3.18) | 60 | 90 |

LT50 is the estimated time to kill 50% of the insects based on Probit analysis, % mortality is Abbott's corrected and DAT is the days after treatment The combination of *Y. entomophaga* isolate O43NEW with esfenvalerate resulted in a significantly lower LT50 than either active alone. The data in the above table also show the % mortality of black cutworm at 3 and 4 days, for *Y. entomophaga* alone, for esfenvalerate alone, and for combinations of *Y. entomophaga* and esfenvalerate.

TABLE 26

Mortality of black cutworm treated with esfenvalerate,
*Y. entomophaga* isolate O23ZMJ, and a combination of both

| Treatment | LT50 (95% confidence intervals) in days | % Mortality (3 DAT) | % Mortality (4DAT) |
|---|---|---|---|
| Esfenvalerate at 5.6 mg/L | 3.40 (3.03-3.81) | 42 | 61 |
| *Y. entomophaga* isolate O23ZMJ at 1 × 10$^5$ CFU/mL | 5.22 (4.76-5.73) | 21 | 17 |
| Esfenvalerate + *Y. entomophaga* | 2.48 (2.15-2.85) | 68 | 100 |

LT50 is the estimated time to kill 50% of the insects based on Probit analysis, % mortality is Abbott's corrected and DAT is the days after treatment The combination of *Y. entomophaga* isolate O23ZMJ with esfenvalerate resulted in a significantly lower LT50 than either active alone. The data in the above table also show the % mortality of black cutworm at 3 and 4 days, for *Y. entomophaga* alone, for esfenvalerate alone, and for combinations of *Y. entomophaga* and esfenvalerate.

TABLE 27

Mortality of black cutworm treated with esfenvalerate,
Y. entomophaga isolate O348UX, and a combination of both

| Treatment | LT50 (95% confidence intervals) in days | % Mortality (5DAT) | % Mortality (6DAT) | % Mortality (7DAT) |
|---|---|---|---|---|
| Esfenvalerate at 5.6 mg/L | 5.29 (4.75-5.87) | 50 | 56 | 69 |
| Y. entomophaga isolate O348UX at $1 \times 10^5$ CFU/mL | 9.09 (8.26-10.01) | −6 | 13 | 13 |
| Esfenvalerate + Y. entomophaga | 3.87 (3.44-4.35) | 69 | 75 | 94 |

LT50 is the estimated time to kill 50% of the insects based on Probit analysis, % mortality is Abbott's corrected and DAT is the days after treatment The combination of Y. entomophaga isolate O348UX with esfenvalerate resulted in a significantly lower LT50 than either active alone. The data in the above table also show the % mortality of black cutworm at 5, 6 and 7 days, for Y. entomophaga alone, for esfenvalerate alone, and for combinations of Y. entomophaga and esfenvalerate.

TABLE 28

Mortality of black cutworm treated with esfenvalerate,
Y. entomophaga isolate O24G3R, and a combination of both

| Treatment | LT50 (95% confidence intervals) in days | % Mortality (5DAT) | % Mortality (6DAT) | % Mortality (7DAT) |
|---|---|---|---|---|
| Esfenvalerate at 5.6 mg/L | 5.29 (4.75-5.87) | 50 | 56 | 69 |
| Y. entomophaga isolate O24G3R at $1 \times 10^5$ CFU/mL | 8.51 (7.74-9.34) | 0 | 13 | 19 |
| Esfenvalerate + Y. entomophaga | 4.01 (3.56-4.51) | 75 | 88 | 94 |

LT50 is the estimated time to kill 50% of the insects based on Probit analysis, % mortality is Abbott's corrected and DAT is the days after treatment The combination of Y. entomophaga isolate O24G3R with esfenvalerate resulted in a significantly lower LT50 than either active alone. The data in the above table also show the % mortality of black cutworm at 5, 6 and 7 days, for Y. entomophaga alone, for esfenvalerate alone, and for combinations of Y. entomophaga and esfenvalerate.

Esfenvalerate with Fall Armyworm.

Cabbage leaf disks were dipped in either acetone (controls and Y. entomophaga alone treatments) or esfenvalerate (Sigma 46277) at a concentration of 56 mg/L in acetone for the data in Tables 29, 30, 31 and 32; and 5.6 mg/L for the data in Table 33. These were set to dry for 1 hr. Cabbage disks were then dipped in either phosphate buffer solution (controls and esfenvalerate alone treatments) or in a suspension of Y. entomophaga at a concentration of $1 \times 10^6$ cfu/mL for the data in Table 29; and $1 \times 10^5$ cfu/mL for the data in Tables 30, 31 and 32; and $1 \times 10^4$ cfu/mL for the data in Table 33 (Y. entomophaga alone or in combination with esfenvalerate). After the cabbage disks had dried for 1 hr, a single $3^{rd}$ instar fall armyworm larva was added to each individual cabbage disk for the data in Tables 29 and 33; and $4^{th}$ instar for the data in Tables 30, 31 and 32. A total of 20 insects were evaluate for each treatment. Insects were observed daily and scored as live or dead. The data are shown below.

TABLE 29

Mortality of 3rd instar fall armyworm treated with esfenvalerate,
Y. entomophaga isolate O43NEW, and a combination of both

| Treatment | LT50 (95% confidence intervals) in days | % Mortality (5DAT) | % Mortality (7DAT) | % Mortality (9DAT) | % Mortality (11DAT) |
|---|---|---|---|---|---|
| Esfenvalerate at 56 mg/L | 13.6 (11.43-16.45) | 5 | 5 | 11 | 6 |
| Y. entomophaga isolate O43NEW at $1 \times 10^6$ CFU/mL | 10.19 (8.89-11.81) | 10 | 26 | 35 | 41 |
| Esfenvalerate + Y. entomophaga | 6.97 (6.19-7.86) | 35 | 58 | 71 | 76 |

LT50 is the estimated time to kill 50% of the insects based on Probit analysis, % mortality is Abbott's corrected and DAT is the days after treatment The combination of *Y. entomophaga* isolate O43NEW with esfenvalerate resulted in a significantly lower LT50 than either active alone. The data in the above table also show the % mortality of fall armyworm at 5, 7, 9 and 11 days, for *Y. entomophaga* alone, for esfenvalerate alone, and for combinations of *Y. entomophaga* and esfenvalerate.

TABLE 30

Mortality of $4^{th}$ instar fall armyworm treated with esfenvalerate, *Y. entomophaga* isolate O24G3R, and a combination of both

| Treatment | LT50 (95% confidence intervals) in days | % Mortality (3DAT) |
|---|---|---|
| Esfenvalerate at 56 mg/L | 3.66 (3.28-4.09) | 25 |
| *Y. entomophaga* isolate O24G3R at $1 \times 10^5$ CFU/mL | 6.37 (5.83-6.97) | 0 |
| Esfenvalerate + *Y. entomophaga* | 2.82 (2.47-3.21) | 65 |

LT50 is the estimated time to kill 50% of the insects based on Probit analysis, % mortality is Abbott's corrected and DAT is the days after treatment The combination of *Y. entomophaga* isolate O24G3R with esfenvalerate resulted in a significantly lower LT50 than either active alone. The data in the above table also show the % mortality of fall armyworms at 3 days, for *Y. entomophaga* alone, for esfenvalerate alone, and for combinations of *Y. entomophaga* and esfenvalerate.

TABLE 31

Mortality of $4^{th}$ instar fall armyworm treated with esfenvalerate, *Y. entomophaga* isolate O23ZMJ, and a combination of both

| Treatment | LT50 (95% confidence intervals) in days | % Mortality (3DAT) |
|---|---|---|
| Esfenvalerate at 56 mg/L | 3.66 (3.28-4.09) | 25 |
| *Y. entomophaga* isolate O23ZMJ at $1 \times 10^5$ CFU/mL | 6.23 (5.72-6.78) | 10 |

TABLE 31-continued

Mortality of $4^{th}$ instar fall armyworm treated with esfenvalerate, *Y. entomophaga* isolate O23ZMJ, and a combination of both

| Treatment | LT50 (95% confidence intervals) in days | % Mortality (3DAT) |
|---|---|---|
| Esfenvalerate + *Y. entomophaga* | 2.93 (2.58-3.33) | 60 |

LT50 is the estimated time to kill 50% of the insects based on Probit analysis, % mortality is Abbott's corrected and DAT is the days after treatment The data in the above table show the % mortality of fall armyworms at 3 days, for *Y. entomophaga* isolate O23ZMJ alone, for esfenvalerate alone, and for combinations of *Y. entomophaga* and esfenvalerate.

TABLE 32

Mortality of 4th instar fall armyworm treated with esfenvalerate, *Y. entomophaga* isolate O348UX, and a combination of both

| Treatment | LT50 (95% confidence intervals) in days | % Mortality (3DAT) |
|---|---|---|
| Esfenvalerate at 56 mg/L | 3.66 (3.28-4.09) | 25 |
| *Y. entomophaga* isolate O348UX at $1 \times 10^5$ CFU/mL | 7.00 (6.45-7.60) | 5 |
| Esfenvalerate + *Y. entomophaga* | 3.25 (2.89-3.66) | 45 |

LT50 is the estimated time to kill 50% of the insects based on Probit analysis, % mortality is Abbott's corrected and DAT is the days after treatment The data in the above table show the % mortality of fall armyworms at 3 days, for *Y. entomophaga* isolate O348UX alone, for esfenvalerate alone, and for combinations of *Y. entomophaga* and esfenvalerate.

TABLE 33

Mortality of 3rd instar fall armyworm treated with esfenvalerate, *Y. entomophaga* isolate O24G3R, and a combination of both

| Treatment | LT50 (95% confidence intervals) in days | % Mortality (6DAT) | % Mortality (9DAT) | % Mortality (11DAT) |
|---|---|---|---|---|
| Esfenvalerate at 5.6 mg/L | 20.00 (17.00-23.65) | 0 | −5 | −6 |
| *Y. entomophaga* isolate O24G3R at $1 \times 10^4$ CFU/mL | 11.25 (10.05-12.60) | 10 | 16 | 29 |
| Esfenvalerate + *Y. entomophaga* | 8.74 (7.87-9.72) | 30 | 32 | 59 |

LT50 is the estimated time to kill 50% of the insects based on Probit analysis, % mortality is Abbott's corrected and DAT is the days after treatment The combination of *Y. entomophaga* isolate O24G3R with esfenvalerate resulted in a significantly lower LT50 than either active alone. The data in the above table also show the % mortality of fall armyworms at 6, 9 and 11 days, for *Y. entomophaga* alone, for esfenvalerate alone, and for combinations of *Y. entomophaga* and esfenvalerate.

Esfenvalerate with Cabbage Looper.

Cabbage leaf disks were dipped in either acetone (controls and *Y. entomophaga* alone treatments) or esfenvalerate (Sigma 46277) at a concentration of 0.56 mg/L in acetone. These were set to dry for 1 hr. Cabbage disks were then dipped either in phosphate buffer solution (controls and esfenvalerate alone treatments) or in a suspension of *Y. entomophaga* isolate O43NEW at a concentration of $1 \times 10^2$ cfu/mL in phosphate buffer (*Y. entomophaga* alone or in combination with esfenvalerate). After the cabbage disks had dried for 1 hr, a single $3^{rd}$ instar cabbage looper larva was added to each individual cabbage disk. A total of 20 insects were evaluate for each treatment. Insects were observed daily and scored as live or dead. The data are shown below.

TABLE 34

Mortality of 3rd instar cabbage looper treated with esfenvalerate, *Y. entomophaga* isolate O43NEW, and a combination of both

| Treatment | LT50 (95% confidence intervals) in days | % Mortality (2DAT) | % Mortality (7DAT) |
|---|---|---|---|
| Esfenvalerate at 0.56 mg/L | 5.63 (5.19-6.11) | 5 | 37 |
| *Y. entomophaga* isolate O43NEW at $1 \times 10^2$ CFU/mL | 6.43 (5.94-6.95) | 0 | 16 |
| Esfenvalerate + *Y. entomophaga* | 4.21 (3.83-4.62) | 15 | 68 |

LT50 is the estimated time to kill 50% of the insects based on Probit analysis, % mortality is Abbott's corrected and DAT is the days after treatment The combination of *Y. entomophaga* isolate O43NEW with esfenvalerate resulted in a significantly lower LT50 than either active alone. The data in the above table also show the % mortality of cabbage loopers at 2 and 7 days, for *Y. entomophaga* alone, for esfenvalerate alone, and for combinations of *Y. entomophaga* and esfenvalerate.

Example 7. IRAC Group 4A—Neonicotinoids: Examples of Three Isolates of *Y. entomophaga* with Clothianidin Against Fall Armyworm, Two Isolates of *Y. entomophaga* with Imidacloprid Against Colorado Potato Beetle and Western Flower Thrips, *Y. entomophaga* with Thiacloprid Against Colorado Potato Beetle, and *Y. entomophaga* with Thiamethoxam Against Diamondback Moth Clothianidin with Fall Armyworm.

Cabbage leaf disks were dipped in either acetone (controls and *Y. entomophaga* alone treatments) or clothianidin (Sigma 33589) at a concentration of 60 mg/L in acetone. These were set to dry for 1 hr. Cabbage disks were then dipped in either phosphate buffer solution (controls and clothianidin alone treatments) or in a suspension of *Y. entomophaga* at a concentration of $1 \times 10^5$ cfu/mL of phosphate buffer (*Y. entomophaga* alone or in combination with clothianidin). After the cabbage disks had dried for 1 hr, a single $3^{rd}$ instar fall armyworm larva was added to each individual cabbage disk. A total of 20 insects were evaluate for each treatment. Insects were observed daily and scored as live or dead. Results are shown in the tables below.

TABLE 35

Mortality of 3rd instar fall armyworm treated with clothianidin, *Y. entomophaga* isolate O43NEW, and a combination of both

| Treatment | LT50 (95% confidence intervals) in days | % Mortality (7DAT) | % Mortality (10DAT) | % Mortality (13DAT) |
|---|---|---|---|---|
| Clothianidin at 60 mg/L | 10.94 (9.97-12.03) | 0 | 0 | 11 |
| *Y. entomophaga* isolate O43NEW at $1 \times 10^5$ CFU/mL | 9.94 (9.07-10.91) | 13 | 33 | 33 |
| Clothianidin + *Y. entomophaga* | 7.38 (6.71-8.09) | 38 | 75 | 78 |

LT50 is the estimated time to kill 50% of the insects based on Probit analysis, % mortality is Abbott's corrected and DAT is the days after treatment The combination of *Y. entomophaga* isolate O43NEW with clothianidin resulted in a significantly lower LT50 than either active alone. The data in the above table also show the % mortality of fall armyworms at 7, 10 and 13 days, for *Y. entomophaga* alone, for clothianidin alone, and for combinations of *Y. entomophaga* and clothianidin.

TABLE 36

Mortality of $3^{rd}$ instar fall armyworm treated with clothianidin, *Y. entomophaga* isolate O24G3R, and a combination of both

| Treatment | LT50 (95% confidence intervals) in days | % Mortality (5DAT) | % Mortality (6DAT) |
|---|---|---|---|
| Clothianidin at 60 mg/L | 9.38 (8.57-10.27) | 5 | 11 |
| *Y. entomophaga* isolate O24G3R at $1 \times 10^5$ CFU/mL | 5.53 (5.02-6.08) | 47 | 61 |
| Clothianidin + *Y. entomophaga* | 4.23 (3.79-4.72) | 63 | 83 |

LT50 is the estimated time to kill 50% of the insects based on Probit analysis, % mortality is Abbott's corrected and DAT is the days after treatment The combination of *Y. entomophaga* isolate O24G3R with clothianidin resulted in a significantly lower LT50 than either active alone. The data in the above table also show the % mortality of fall armyworms at 5 and 6 days, for *Y. entomophaga* alone, for clothianidin alone, and for combinations of *Y. entomophaga* and clothianidin.

TABLE 37

Mortality of $3^{rd}$ instar fall armyworm treated with clothianidin, *Y. entomophaga* isolate O333A4, and a combination of both

| Treatment | LT50 (95% confidence intervals) in days | % Mortality (4DAT) | % Mortality (5DAT) | % Mortality (7DAT) |
|---|---|---|---|---|
| Clothianidin at 60 mg/L | 22.94 (19.21-27.62) | 0 | 0 | 5 |
| *Y. entomophaga* isolate O333A4 at $1 \times 10^5$ CFU/mL | 8.30 (7.35-9.36) | 0 | 5 | 45 |
| Clothianidin + *Y. entomophaga* | 6.91 (6.12-7.80) | 15 | 30 | 55 |

LT50 is the estimated time to kill 50% of the insects based on Probit analysis, % mortality is Abbott's corrected and DAT is the days after treatment The data in the above table show the % mortality of fall armyworms at 4, 5 and 7 days, for *Y. entomophaga* isolate O333A4 alone, for clothianidin alone, and for combinations of *Y. entomophaga* and clothianidin.

Imidacloprid with Colorado potato beetle. Tomato leaf disks were dipped in either acetone (controls and *Y. entomophaga* alone treatments) or imidacloprid (Sigma 37894) at a concentration of 0.56 mg/L in acetone. These were set to dry for 1 hr. Tomato disks were then dipped in either phosphate buffer solution (controls and imidacloprid alone treatments) or a suspension of *Y. entomophaga* isolate O43NEW at a concentration of $1 \times 10^7$ cfu/mL in phosphate buffer (*Y. entomophaga* alone or in combination with imidacloprid). After the tomato disks had dried for 1 hr, a single $4^{th}$ instar Colorado potato beetle larva was added to each individual tomato disk. A total of 20 insects were evaluate for each treatment. Insects were observed daily and scored as live or dead. The data are shown in Table 38.

TABLE 38

Mortality of Colorado potato beetle larvae treated with imidacloprid, *Y. entomophaga* isolate O43NEW, and a combination of both

| Treatment | LT50 (95% confidence intervals) in days | % Mortality (3DAT) | % Mortality (10DAT) | % Mortality (13DAT) |
|---|---|---|---|---|
| Imidacloprid at 0.56 mg/L | 20.38 (15.79-27.60) | 0 | 17 | 7 |
| *Y. entomophaga* isolate O43NEW at 1 × 10⁷ CFU/mL | 19.19 (14.96-25.76) | 5 | 17 | 0 |
| Imidacloprid + *Y. entomophaga* | 11.05 (8.92-13.94) | 11 | 44 | 36 |

LT50 is the estimated time to kill 50% of the insects based on Probit analysis, % mortality is Abbott's corrected and DAT is the days after treatment The combination of *Y. entomophaga* isolate O43NEW with imidacloprid resulted in a significantly lower LT50 than either active alone. The data in the above table also show the % mortality of Colorado potato beetles at 3, 10 and 13 days, for *Y. entomophaga* alone, for imidacloprid alone, and for combinations of *Y. entomophaga* and imidacloprid.

Imidacloprid with Western Flower Thrips.

Cabbage disks were dipped either in phosphate buffer solution (controls and imidacloprid alone treatments) or a suspension of *Y. entomophaga* isolate O43NEW (or O333A4) at a concentration of $1 \times 10^5$ cfu/mL in phosphate buffer (*Y. entomophaga* alone or in combination with imidacloprid). 50 µl suspensions of either acetone (controls and *Y. entomophaga* alone treatments) or imidacloprid (Sigma 37894) at a concentration of 100 mg/L in acetone were then dropped onto each cabbage disk. These were set to dry for 1 hr. After the disks had dried, two were placed in individual cups and 12 adult western flower thrips were added. This experiment was repeated and a total of 24 insects were evaluated for each treatment. Insects were observed daily and scored as live or dead. The data are shown in Table 39.

TABLE 39

Mortality of western flower thrips treated with imidacloprid, *Y. entomophaga* isolate O43NEW, and a combination of both

| Treatment | LT50 (95% confidence intervals) in days | % Mortality (2DAT) |
|---|---|---|
| Imidacloprid at 100 mg/L | 2.72 (2.40-3.08) | 29 |
| *Y. entomophaga* isolate O43NEW at 1 × 10⁵ CFU/mL | 4.28 (3.60-5.11) | 21 |

TABLE 39-continued

Mortality of western flower thrips treated with imidacloprid, *Y. entomophaga* isolate O43NEW, and a combination of both

| Treatment | LT50 (95% confidence intervals) in days | % Mortality (2DAT) |
|---|---|---|
| Imidacloprid + *Y. entomophaga* | 1.57 (1.27-1.91) | 50 |

LT50 is the estimated time to kill 50% of the insects based on Probit analysis, % mortality is Abbott's corrected and DAT is the days after treatment The combination of *Y. entomophaga* isolate O43NEW with imidacloprid resulted in a significantly lower LT50 than either active alone.

TABLE 40

Mortality of western flower thrips treated with imidacloprid, *Y. entomophaga* isolate O333A4, and a combination of both

| Treatment | LT50 (95% confidence intervals) in days | % Mortality (1DAT) | % Mortality (2DAT) |
|---|---|---|---|
| Imidacloprid at 100 mg/L | 2.72 (2.40-3.08) | 16 | 29 |
| *Y. entomophaga* isolate O333A4 at 1 × 10⁵ CFU/mL | 4.55 (3.82-5.43) | 0 | 16 |
| Imidacloprid + *Y. entomophaga* | 1.93 (1.60-2.31) | 25 | 54 |

LT50 is the estimated time to kill 50% of the insects based on Probit analysis, % mortality is Abbott's corrected and DAT is the days after treatment The combination of *Y. entomophaga* isolate O333A4 with imidacloprid resulted in a significantly lower LT50 than either active alone. The data in the above table also show the % mortality of western flower thrips at 1 and 2 days, for *Y. entomophaga* alone, for imidacloprid alone, and for combinations of *Y. entomophaga* and imidacloprid.

Thiacloprid with Colorado Potato Beetle.

Tomato leaf disks were dipped in either acetone (controls and *Y. entomophaga* alone treatments) or thiacloprid (Sigma 37905) at a concentration of 1 mg/L in acetone. These were set to dry for 1 hr. Tomato disks were then dipped either in phosphate buffer solution (controls and thiacloprid alone treatments) or in a suspension of *Y. entomophaga* isolate O43NEW at a concentration of $1 \times 10^6$ cfu/mL in phosphate buffer (*Y. entomophaga* alone or in combination with thiacloprid). After the tomato disks had dried for 1 hr, a single $2^{nd}$ instar Colorado potato beetle larva was added to each individual tomato disk. A total of 20 insects were evaluate for each treatment. Insects were observed daily and scored as live or dead. The results are shown in Table 41.

TABLE 41

Mortality of Colorado potato beetle larvae treated with thiacloprid, *Y. entomophaga* isolate O43NEW, and a combination of both

| Treatment | LT50 (95% confidence intervals) in days | % Mortality (4DAT) | % Mortality (5DAT) |
|---|---|---|---|
| Thiacloprid at 1 mg/L | 6.99 (6.44-7.58) | 26 | 26 |
| *Y. entomophaga* isolate O43NEW at 1 × 10⁶ CFU/mL | 7.42 (6.81-8.09) | 0 | 0 |

TABLE 41-continued

Mortality of Colorado potato beetle larvae treated with
thiacloprid, Y. entomophaga isolate O43NEW, and a combination of both

| Treatment | LT50 (95% confidence intervals) in days | % Mortality (4DAT) | % Mortality (5DAT) |
|---|---|---|---|
| Thiacloprid + Y. entomophaga | 5.68 (5.19-6.21) | 32 | 37 |

LT50 is the estimated time to kill 50% of the insects based on Probit analysis, % mortality is Abbott's corrected and DAT is the days after treatment The combination of *Y. entomophaga* isolate O43NEW with thiacloprid resulted in a significantly lower LT50 than either active alone. The data in the above table also show the % mortality of Colorado potato beetles at 4 and 5 days, for *Y. entomophaga* alone, for thiacloprid alone, and for combinations of *Y. entomophaga* and thiacloprid.

Thiamethoxam with Diamondback Moth.

Cabbage leaf disks were dipped in either acetone (controls and *Y. entomophaga* alone treatments) or Thiamethoxam (Sigma 37924) at a concentration of 150 mg/L in acetone. These were set to dry for 1 hr. Cabbage disks were then dipped either in phosphate buffer solution (controls and thiamethoxam alone treatments) or in a suspension of *Y. entomophaga* at a concentration of $1 \times 10^3$ cfu/mL in phosphate buffer (*Y. entomophaga* alone or in combination with thiamethoxam). After the cabbage disks had dried for 1 hr, a single $2^{rd}$ instar diamondback moth larva was added to each individual cabbage disk. A total of 20 insects were evaluate for each treatment. Insects were observed daily and scored as live or dead. Results are shown in Table 42.

TABLE 42

Mortality of $2^{rd}$ instar diamondback moth treated with thiamethoxam, Y. entomophaga isolate O43NEW, and a combination of both

| Treatment | LT50 (95% confidence intervals) in days | % Mortality (5DAT) | % Mortality (6DAT) |
|---|---|---|---|
| Thiamethoxam at 150 mg/L | 10.09 (8.63-12.01) | 11 | 16 |
| Y. entomophaga isolate O43NEW at $1 \times 10^3$ CFU/mL | 10.08 (8.61-11.97) | 11 | 21 |
| Thiamethoxam + Y. entomophaga | 6.96 (5.98-8.12) | 32 | 50 |

LT50 is the estimated time to kill 50% of the insects based on Probit analysis, % mortality is Abbott's corrected and DAT is the days after treatment The data in the above table show the % mortality of diamondback moths at 5 and 6 days, for *Y. entomophaga* isolate O43NEW alone, for thiamethoxam alone, and for combinations of *Y. entomophaga* and thiamethoxam.

Example 8. IRAC Group 5—Spinosyns: Example of *Y. entomophaga* with Spinosad Against Fall Armyworm, Diamondback Moth and Colorado Potato Beetle Spinosad with Fall Armyworm.

Cabbage leaf disks were dipped in either acetone (controls and *Y. entomophaga* alone treatments) or spinosad (Sigma 33706) at a concentration of 25 mg/L in acetone. These were set to dry for 1 hr. Cabbage disks were then dipped either in phosphate buffer solution (controls and spinosad alone treatments) or in a suspension of *Y. entomophaga* at a concentration of $1 \times 10^6$ cfu/mL in phosphate buffer for the data in Table 43, and $1 \times 10^5$ cfu/mL for the data in Tables 44 and 45 (*Y. entomophaga* alone or in combination with spinosad). After the cabbage disks had dried for 1 hr, a single $3^{rd}$ instar fall armyworm larva was added to each individual cabbage disk. A total of 20 insects were evaluated for each treatment. Insects were observed daily and scored as live or dead. The data are shown below.

TABLE 43

Mortality of $3^{rd}$ instar fall armyworm treated with spinosad, Y. entomophaga isolate O43NEW, and a combination of both

| Treatment | LT50 (95% confidence intervals) in days | % Mortality (3DAT) |
|---|---|---|
| Spinosad at 25 mg/L | 4.09 (3.67-4.55) | 40 |
| Y. entomophaga isolate O43NEW at $1 \times 10^6$ CFU/mL | 6.50 (5.89-7.19) | 5 |
| Spinosad + Y. entomophaga | 2.98 (2.62-3.37) | 60 |

LT50 is the estimated time to kill 50% of the insects based on Probit analysis, % mortality is Abbott's corrected and DAT is the days after treatment The combination of *Y. entomophaga* isolate O43NEW with spinosad resulted in a significantly lower LT50 than either active alone. The data in the above table also show the % mortality of fall armyworms at 3 days, for *Y. entomophaga* alone, for spinosad alone, and for combinations of *Y. entomophaga* and spinosad.

TABLE 44

Mortality of $3^{rd}$ instar fall armyworm treated with spinosad, Y. entomophaga isolate O24G3R, and a combination of both

| Treatment | LT50 (95% confidence intervals) in days | % Mortality (3DAT) |
|---|---|---|
| Spinosad at 25 mg/L | 2.43 (2.08-2.84) | 80 |
| Y. entomophaga isolate O24G3R at $1 \times 10^5$ CFU/mL | 6.37 (5.83-6.97) | 0 |
| Spinosad + Y. entomophaga | 0.68 (0-1330) | 100 |

LT50 is the estimated time to kill 50% of the insects based on Probit analysis, % mortality is Abbott's corrected and DAT is the days after treatment The data in the above table show the % mortality of fall armyworms at 3 days, for *Y. entomophaga* isolate O24G3R alone, for spinosad alone, and for combinations of *Y. entomophaga* and spinosad.

TABLE 45

Mortality of $3^{rd}$ instar fall armyworm treated with spinosad, Y. entomophaga isolate O348UX, and a combination of both

| Treatment | LT50 (95% confidence intervals) in days | % Mortality (3DAT) |
|---|---|---|
| Spinosad at 25 mg/L | 2.43 (2.08-2.84) | 80 |
| Y. entomophaga isolate O348UX at $1 \times 10^5$ CFU/mL | 7.00 (6.45-7.60) | 5 |

TABLE 45-continued

Mortality of 3$^{rd}$ instar fall armyworm treated with spinosad, *Y. entomophaga* isolate O348UX, and a combination of both

| Treatment | LT50 (95% confidence intervals) in days | % Mortality (3DAT) |
|---|---|---|
| Spinosad + *Y. entomophaga* | 0.68 (0-1330) | 100 |

LT50 is the estimated time to kill 50% of the insects based on Probit analysis, % mortality is Abbott's corrected and DAT is the days after treatment The data in the above table also show the % mortality of fall armyworms at 3 days, for *Y. entomophaga* isolate O348UX alone, for spinosad alone, and for combinations of *Y. entomophaga* and spinosad.

Spinosad with Diamondback Moth.

Cabbage leaf disks were dipped in either acetone (controls and *Y. entomophaga* alone treatments) or spinosad (Sigma 33706) at a concentration of 0.25 mg/L in acetone. These were set to dry for 1 hr. Cabbage disks were then dipped either in phosphate buffer solution (controls and spinosad alone treatments) or in a suspension of *Y. entomophaga* at a concentration of 1×10$^3$ cfu/mL in phosphate buffer (*Y. entomophaga* alone or in combination with spinosad). After the cabbage disks had dried for 1 hr, a single 2$^{rd}$ instar diamondback moth larva was added to each individual cabbage disk. A total of 20 insects were evaluate for each treatment. Insects were observed daily and scored as live or dead. Results are shown in Table 46.

TABLE 46

Mortality of 2$^{nd}$ instar diamondback moth treated with spinosad, *Y. entomophaga* isolate O43NEW, and a combination of both

| Treatment | LT50 (95% confidence intervals) in days | % Mortality (2DAT) | % Mortality (3DAT) | % Mortality (4DAT) | % Mortality (7DAT) | % Mortality (9DAT) | % Mortality (11DAT) |
|---|---|---|---|---|---|---|---|
| Spinosad at 0.25 mg/L | 8.16 (6.95-9.60) | 0 | 10 | 15 | 40 | 39 | 65 |
| *Y entomophaga* isolate O43NEW at 1 × 10$^3$ CFU/mL | 13.12 (11.05-15.66) | 5 | 15 | 15 | 25 | 17 | 18 |
| Spinosad + *Y. entomophaga* | 3.52 (2.94-4.19) | 15 | 35 | 50 | 90 | 94 | 94 |

LT50 is the estimated time to kill 50% of the insects based on Probit analysis, % mortality is Abbott's corrected and DAT is the days after treatment The combination of *Y. entomophaga* isolate O43NEW with spinosad resulted in a significantly lower LT50 than either active alone. The data in the above table also show the % mortality of diamond moths at 2, 3, 4, 7, 9 and 11 days, for *Y. entomophaga* alone, for spinosad alone, and for combinations of *Y. entomophaga* and spinosad.

Spinosad with Colorado Potato Beetle.

Tomato leaf disks were dipped in either acetone (controls and *Y. entomophaga* alone treatments) or spinosad (Sigma 33706) at a concentration of 2.5 mg/L in acetone. These were set to dry for 1 hr. Tomato disks were then dipped either in phosphate buffer solution (controls and spinosad alone treatments) or in a suspension of *Y. entomophaga* isolate O43NEW at a concentration of 1×10$^7$ cfu/mL in phosphate buffer (*Y. entomophaga* alone or in combination with spinosad). After the tomato disks had dried for 1 hr, a single 3$^{rd}$ instar Colorado potato beetle larva was added to each individual tomato disk. A total of 20 insects were evaluate for each treatment. Insects were observed daily and scored as live or dead. Results are shown in Table 47.

TABLE 47

Mortality of 3$^{rd}$ instar Colorado potato beetle treated with spinosad, *Y. entomophaga* isolate O43NEW, and a combination of both

| Treatment | LT50 (95% confidence intervals) in days | % Mortality (3DAT) | % Mortality (4DAT) | % Mortality (5DAT) |
|---|---|---|---|---|
| Spinosad at 2.5 mg/L | 6.01 (4.93-7.28) | 15 | 20 | 40 |
| *Y. entomophaga* isolate O43NEW at 1 × 10$^7$ CFU/mL | 12.58 (10.33-15.50) | 0 | 0 | 20 |
| Spinosad + *Y. entomophaga* | 3.33 (2.63-4.13) | 40 | 55 | 70 |

LT50 is the estimated time to kill 50% of the insects based on Probit analysis, % mortality is Abbott's corrected and DAT is the days after treatment The combination of *Y. entomophaga* isolate O43NEW with spinosad resulted in a significantly lower LT50 than either active alone. The data in the above table also show the % mortality of Colorado potato beetles at 3, 4 and 5 days, for *Y. entomophaga* alone, for spinosad alone, and for combinations of *Y. entomophaga* and spinosad.

Example 9. IRAC Group 6—Avermectins, Mibemycin: Examples of Two Isolates of *Y. entomophaga* with Emamectin Benzoate Against Fall Armyworm, Cabbage Looper and Diamondback Moth Emamectin Benzoate with Fall Armyworm.

Cabbage leaf disks were dipped in either acetone (controls and *Y. entomophaga* alone treatments) or emamectin benzoate (Sigma 31733) at a concentration of 2 mg/L of acetone for the data in Table 47 and 0.67 mg/L of acetone for the data in Table 48. These were set to dry for 1 hr. Cabbage disks were then dipped either in phosphate buffer solution (controls and emamectin benzoate alone treatments) or a suspension of *Y. entomophaga* at a concentration of $1\times10^6$ cfu/mL of phosphate buffer for Table 47 and $1\times10^5$ cfu/mL of phosphate buffer for Table 48 (*Y. entomophaga* alone or in combination with emamectin benzoate). After the cabbage disks had dried for 1 hr, a single $3^{rd}$ instar fall armyworm larva was added to each individual cabbage disk. A total of 20 insects were evaluate for each treatment. Insects were observed daily and scored as live or dead. The data are shown below.

TABLE 48

Mortality of $3^{rd}$ instar fall armyworm treated with emamectin benzoate, *Y. entomophaga* isolate O43NEW, and a combination of both

| Treatment | LT75 (95% confidence intervals) in days |
|---|---|
| Emamectin benzoate at 2 mg/L | 6.54 (5.76-7.44) |
| *Y. entomophaga* isolate O43NEW at 1 × 10⁶ CFU/mL | 14.20 (12.23-16.84) |
| Emamectin benzoate + *Y. entomophaga* | 4.94 (4.24-5.73) |

LT75 is the estimated time to kill 75% of the insects based on Probit analysis, % mortality is Abbott's corrected and DAT is the days after treatment)

The combination of *Y. entomophaga* isolate O43NEW with emamectin benzoate resulted in a significantly lower LT75 than either active alone.

TABLE 49

Mortality of $3^{rd}$ instar fall armyworm treated with emamectin benzoate, *Y. entomophaga* isolate O23ZMJ, and a combination of both

| Treatment | LT50 (95% confidence intervals) in days | % Mortality (4DAT) |
|---|---|---|
| Emamectin benzoate at 0.67 mg/L | 5.10 (4.65-5.59) | 20 |
| *Y. entomophaga* isolate O23ZMJ at 1 × 10⁵ CFU/mL | 6.23 (5.72-6.78) | 10 |
| Emamectin benzoate + *Y. entomophaga* | 3.98 (3.60-4.41) | 40 |

LT50 is the estimated time to kill 50% of the insects based on Probit analysis, % mortality is Abbott's corrected and DAT is the days after treatment The combination of *Y. entomophaga* isolate O23ZMJ with emamectin benzoate resulted in a significantly lower LT50 than either active alone. The data in the above table also show the % mortality of fall armyworms at 4 days, for *Y. entomophaga* alone, for emamectin benzoate alone, and for combinations of *Y. entomophaga* and emamectin benzoate.

Emamectin Benzoate with Cabbage Looper.

Cabbage leaf disks were dipped in either acetone (controls and *Y. entomophaga* alone treatments) or emamectin benzoate (Sigma 31733) at a concentration of 0.02 mg/L in acetone. These were set to dry for 1 hr. Cabbage disks were then dipped either in phosphate buffer solution (controls and emamectin benzoate alone treatments) or in a suspension of *Y. entomophaga* isolate O43NEW at a concentration of $1\times10^2$ cfu/mL in phosphate buffer (*Y. entomophaga* alone or in combination with emamectin benzoate). After the cabbage disks had dried for 1 hr, a single $3^{rd}$ instar cabbage looper larva was added to each individual cabbage disk. A total of 20 insects were evaluate for each treatment. Insects were observed daily and scored as live or dead. The data are shown in Table 50.

TABLE 50

Mortality of $3^{rd}$ instar cabbage looper treated with emamectin benzoate, *Y. entomophaga* isolate O43NEW, and a combination of both

| Treatment | LT50 (95% confidence intervals) in days | % Mortality (7DAT) |
|---|---|---|
| Emamectin benzoate at 0.02 mg/L | 7.61 (7.08-8.19) | 13 |
| *Y. entomophaga* isolate O43NEW at 1 × 10² CFU/mL | 6.43 (5.94-6.95) | 69 |
| Emamectin benzoate + *Y. entomophaga* | 5.22 (4.78-5.71) | 94 |

LT50 is the estimated time to kill 50% of the insects based on Probit analysis, % mortality is Abbott's corrected and DAT is the days after treatment The combination of *Y. entomophaga* isolate O43NEW with emamectin benzoate resulted in a significantly lower LT50 than either active alone. The data in the above table also show the % mortality of cabbage loopers at 7 days, for *Y. entomophaga* alone, for emamectin benzoate alone, and for combinations of *Y. entomophaga* and emamectin benzoate.

Emamectin Benzoate with Diamondback Moth.

Cabbage leaf disks were dipped in either acetone (controls and *Y. entomophaga* alone treatments) or emamectin benzoate (Sigma 31733) at a concentration of 0.002 mg/L of acetone. These were set to dry for 1 hr. Cabbage disks were then dipped either in phosphate buffer solution (controls and emamectin benzoate alone treatments) or in a suspension of *Y. entomophaga* isolate O43NEW at a concentration of $1\times10^3$ cfu/mL in phosphate buffer (*Y. entomophaga* alone or in combination with emamectin benzoate). After the cabbage disks had dried for 1 hr, a single $3^{rd}$ instar diamondback moth larva was added to each individual cabbage disk. A total of 20 insects were evaluate for each treatment. Insects were observed daily and scored as live or dead. Data are shown in Table 51.

TABLE 51

Mortality of $3^{rd}$ instar diamondback moth treated with emamectin benzoate, *Y. entomophaga* isolate O43NEW, and a combination of both

| Treatment | LT50 (95% confidence intervals) in days | % Mortality (4DAT) |
|---|---|---|
| Emamectin benzoate at 0.002 mg/L | 6.21 (5.38-7.14) | 5 |
| *Y. entomophaga* isolate O43NEW at 1 × 10³ CFU/mL | 8.16 (7.09-9.41) | 16 |
| Emamectin benzoate + *Y. entomophaga* | 4.57 (3.91-5.31) | 22 |

LT50 is the estimated time to kill 50% of the insects based on Probit analysis, % mortality is Abbott's corrected and DAT is the days after treatment The combination of *Y. entomophaga* isolate O43NEW with emamectin benzoate resulted in a significantly lower LT50 than either active alone. The data in the above table also show the % mortality of diamondback moths at 4 days, for *Y. entomophaga* alone, for emamectin benzoate alone, and for combinations of *Y. entomophaga* and emamectin benzoate.

Example 10. IRAC Group 15—Benzoylureas: Examples of *Y. entomophaga* with Novaluron Against Black Cutworm and Cabbage Looper Novaluron with Cabbage Looper.

Cabbage leaf disks were dipped in either acetone (controls and *Y. entomophaga* alone treatments) or novaluron (Sigma 32419) at a concentration of 1 mg/L of acetone. These were set to dry for 1 hr. Cabbage disks were then dipped in either phosphate buffer solution (controls and novaluron alone treatments) or a suspension of *Y. entomophaga* isolate O43NEW at a concentration of $1\times10^2$ cfu/mL in phosphate buffer (*Y. entomophaga* alone or in combination with novaluron). After the cabbage disks had dried for 1 hr, a single $3^{rd}$ instar cabbage looper larva was added to each individual cabbage disk. A total of 20 insects were evaluate for each treatment. Insects were observed daily and scored as live or dead. Results are shown in Table 52.

TABLE 52

Mortality of $3^{rd}$ instar cabbage looper treated with novaluron, *Y. entomophaga* isolate O43NEW, and a combination of both

| Treatment | LT50 (95% confidence intervals) in days | % Mortality (5DAT) | % Mortality (6DAT) |
|---|---|---|---|
| Novaluron at 1 mg/L | 7.55 (7.01-8.13) | 11 | 21 |
| *Y. entomophaga* isolate O43NEW at $1 \times 10^2$ CFU/mL | 6.43 (5.94-6.95) | 16 | 42 |
| Novaluron + *Y. entomophaga* | 4.77 (4.34-5.22) | 53 | 84 |

LT50 is the estimated time to kill 50% of the insects based on Probit analysis, % mortality is Abbott's corrected and DAT is the days after treatment The combination of *Y. entomophaga* isolate O43NEW with novaluron resulted in a significantly lower LT50 than either active alone. The data in the above table also show the % mortality of cabbage loopers at 5 and 6 days, for *Y. entomophaga* alone, for novaluron alone, and for combinations of *Y. entomophaga* and novaluron.

Novaluron with Black Cutworm.

Cabbage leaf disks were dipped in either acetone (controls and *Y. entomophaga* alone treatments) or novaluron (Sigma 32419) at a concentration of 0.33 mg/L in acetone. These were set to dry for 1 hr. Cabbage disks were then dipped either in phosphate buffer solution (controls and novaluron alone treatments) or a suspension of *Y. entomophaga* isolate O43NEW at a concentration of $1\times10^4$ cfu/mL of phosphate buffer (*Y. entomophaga* alone or in combination with novaluron). After the cabbage disks had dried for 1 hr, a single $3^{rd}$ instar black cutworm larva was added to each individual cabbage disk. A total of 20 insects were evaluate for each treatment. Insects were observed daily and scored as live or dead. Results are shown in Table 53.

TABLE 53

Mortality of $3^{rd}$ instar black cutworm treated with novaluron, *Y. entomophaga* isolate O43NEW, and a combination of both

| Treatment | LT50 (95% confidence intervals) in days | % Mortality (6DAT) | % Mortality (7DAT) |
|---|---|---|---|
| Novaluron at 0.33 mg/L | 9.40 (8.58-10.32) | 0 | 0 |
| *Y. entomophaga* isolate O43NEW at $1 \times 10^4$ CFU/mL | 9.34 (8.49-10.27) | 0 | 13 |
| Novaluron + *Y. entomophaga* | 6.69 (6.08-7.35) | 13 | 19 |

LT50 is the estimated time to kill 50% of the insects based on Probit analysis, % mortality is Abbott's corrected and DAT is the days after treatment The combination of *Y. entomophaga* isolate O43NEW with novaluron resulted in a significantly lower LT50 than either active alone. The data in the above table also show the % mortality of black cutworms at 6 and 7 days, for *Y. entomophaga* alone, for novaluron alone, and for combinations of *Y. entomophaga* and novaluron.

Example 11. IRAC Group 22A—Oxadiazines: Examples of *Y. entomophaga* with Indoxacarb Against Black Cutworm and Fall Armyworm Indoxacarb with Black Cutworm.

Cabbage leaf disks were dipped in either acetone (controls and *Y. entomophaga* alone treatments) or indoxacarb (Sigma 33969) at a concentration of 0.53 mg/L of acetone. These were set to dry for 1 hr. Cabbage disks were then dipped either in phosphate buffer solution (controls and indoxacarb alone treatments) or in a suspension of *Y. entomophaga* isolate O43NEW at a concentration of $1\times10^4$ cfu/mL in phosphate buffer (*Y. entomophaga* alone or in combination with indoxacarb). After the cabbage disks had dried for 1 hr, a single $3^{rd}$ instar black cutworm larva was added to each individual cabbage disk. A total of 20 insects were evaluate for each treatment. Insects were observed daily and scored as live or dead. The results are shown in Table 54.

TABLE 54

Mortality of $3^{rd}$ instar black cutworm treated with indoxacarb, *Y. entomophaga* isolate O43NEW, and a combination of both

| Treatment | LT50 (95% confidence intervals) in days | % Mortality (3DAT) | % Mortality (4DAT) | % Mortality (5DAT) | % Mortality (6DAT) |
|---|---|---|---|---|---|
| Indoxacarb at 0.53 mg/L | 7.64 (7.01-8.32) | 11 | 6 | 0 | 6 |
| *Y. entomophaga* isolate O43NEW at $1 \times 10^4$ CFU/mL | 7.85 (7.23-8.53) | 0 | 0 | 11 | 18 |
| Indoxacarb + *Y. entomophaga* | 5.97 (5.47-6.51) | 21 | 28 | 33 | 29 |

LT50 is the estimated time to kill 50% of the insects based on Probit analysis, % mortality is Abbott's corrected and DAT is the days after treatment The combination of *Y. entomophaga* isolate O43NEW with indoxacarb resulted in a significantly lower LT50 than either active alone. The data in the above table also show the % mortality of black cutworms at 3, 4, 5 and 6 days, for *Y. entomophaga* alone, for indoxacarb alone, and for combinations of *Y. entomophaga* and indoxacarb.

Indoxacarb with Fall Armyworm.

Cabbage leaf disks were dipped in either acetone (controls and *Y. entomophaga* alone treatments) or indoxacarb (Sigma 33969) at a concentration of 0.53 mg/L in acetone for the results in Table 55, or 1.6 mg/L in acetone for the results in Table 56. These were set to dry for 1 hr. Cabbage disks were then dipped in either phosphate buffer solution (controls and indoxacarb alone treatments) or in a suspension of *Y. entomophaga* at a concentration of $1 \times 10^6$ cfu/mL of phosphate buffer for Table 55 or $1 \times 10^5$ cfu/mL of phosphate buffer for Table 56 (*Y. entomophaga* alone or in combination with indoxacarb). After the cabbage disks had dried for 1 hr, a single $3^{rd}$ instar fall armyworm larva was added to each individual cabbage disk. A total of 20 insects were evaluate for each treatment. Insects were observed daily and scored as live or dead. The data are shown below.

TABLE 55

Mortality of $3^{rd}$ instar fall armyworm treated with indoxacarb, *Y. entomophaga* isolate O43NEW, and a combination of both

| Treatment | LT50 (95% confidence intervals) in days | % Mortality (5DAT) | % Mortality (6DAT) |
|---|---|---|---|
| Indoxacarb at 0.53 mg/L | 9.65 (8.62-10.82) | 5 | 10 |
| *Y. entomophaga* isolate O43NEW at $1 \times 10^6$ CFU/mL | 6.50 (5.89-7.19) | 30 | 45 |
| Indoxacarb + *Y. entomophaga* | 5.03 (4.52-5.60) | 45 | 85 |

LT50 is the estimated time to kill 50% of the insects based on Probit analysis, % mortality is Abbott's corrected and DAT is the days after treatment The combination of *Y. entomophaga* isolate O43NEW with indoxacarb resulted in a significantly lower LT50 than either active alone. The data in the above table also show the % mortality of fall armyworms at 5 and 6 days, for *Y. entomophaga* alone, for indoxacarb alone, and for combinations of *Y. entomophaga* and indoxacarb.

TABLE 56

Mortality of $3^{rd}$ instar fall armyworm treated with indoxacarb, *Y. entomophaga* isolate O23ZMJ, and a combination of both

| Treatment | LT50 (95% confidence intervals) in days | % Mortality (5DAT) |
|---|---|---|
| Indoxacarb at 1.6 mg/L | 5.14 (4.67-5.66) | 45 |
| *Y. entomophaga* isolate O23ZMJ at $1 \times 10^5$ CFU/mL | 6.23 (5.72-6.78) | 40 |
| Indoxacarb + *Y. entomophaga* | 4.26 (3.82-4.75) | 95 |

LT50 is the estimated time to kill 50% of the insects based on Probit analysis, % mortality is Abbott's corrected and DAT is the days after treatment The data in the above table show the % mortality of fall armyworms at 5 days, for *Y. entomophaga* isolate O23ZMJ alone, for indoxacarb alone, and for combinations of *Y. entomophaga* and indoxacarb.

Example 12. IRAC Group 23—Tetronic and Tetramic Acid Derivatives: Examples of *Y. entomophaga* with Spirotetramat Against Fall Armyworm Spirotetramat with Fall Armyworm.

Cabbage leaf disks were dipped in either acetone (controls and *Y. entomophaga* alone treatments) or spirotetramat (Sigma 32713) at a concentration of 300 mg/L in acetone. These were set to dry for 1 hr. Cabbage disks were then dipped either in phosphate buffer solution (controls and spirotetramat alone treatments) or in a suspension of *Y. entomophaga* isolate O43NEW at a concentration of $1 \times 10^5$ cfu/mL of phosphate buffer (*Y. entomophaga* alone or in combination with spirotetramat). After the cabbage disks had dried for 1 hr, a single $3^{rd}$ instar fall armyworm larva was added to each individual cabbage disk. A total of 20 insects were evaluated for each treatment. Insects were observed daily and scored as live or dead. Results are shown in Table 57.

TABLE 57

Mortality of $3^{rd}$ instar fall armyworm treated with spirotetramat, *Y. entomophaga* isolate O43NEW, and a combination of both

| Treatment | LT50 (95% confidence intervals) in days | % Mortality (5DAT) | % Mortality (6DAT) | % Mortality (7DAT) |
|---|---|---|---|---|
| Spirotetramat at 300 mg/L | 10.29 (9.39-11.29) | −5 | 6 | 13 |
| *Y. entomophaga* isolate O43NEW at $1 \times 10^5$ CFU/mL | 9.94 (9.07-10.91) | 5 | 0 | 6 |
| Spirotetramat + *Y. entomophaga* | 7.80 (7.13-8.54) | 16 | 33 | 38 |

LT50 is the estimated time to kill 50% of the insects based on Probit analysis, % mortality is Abbott's corrected and DAT is the days after treatment The combination of *Y. entomophaga* isolate O43NEW with spirotetramat resulted in a significantly lower LT50 than either active alone. The data in the above table also show the % mortality of fall armyworms at 5, 6 and 7 days, for *Y. entomophaga* alone, for spirotetramat alone, and for combinations of *Y. entomophaga* and spirotetramat.

Example 13. IRAC Group 28—Diamides: Examples of *Y. entomophaga* with Chlorantraniliprole Against Cabbage Looper, Corn Earworm, and Tobacco Budworm, and Four Isolates of *Y. entomophaga* with Flubendiamide Against Fall Armyworm and Black Cutworm Chlorantraniliprole with Cabbage Looper.

Cabbage disks were dipped either in phosphate buffer solution (controls and chlorantraniliprole alone treatments) or in a suspension of *Y. entomophaga* isolate O43NEW at a concentration of $1 \times 10^7$, $1 \times 10^5$ or $1 \times 10^3$ cfu/mL in phosphate buffer (*Y. entomophaga* alone or in combination with chlorantraniliprole). 50 µl suspensions of either acetone (controls and *Y. entomophaga* alone treatments) or of chlorantraniliprole (Sigma 32510) at a concentration of 18 mg/L in acetone were then dropped onto each cabbage disk. These were set to dry for 1 hr. After the disks had dried, one $2^{nd}$ instar cabbage looper was added to each disk. A total of 24 insects were evaluated for each treatment. Insects were observed daily and scored as live or dead. Results are shown in Table 58.

TABLE 58

Mortality of $2^{nd}$ instar cabbage looper treated with chlorantraniliprole, Y. entomophaga isolate O43NEW, and a combination of both

| Treatment | LT50 (95% confidence intervals) in days | % Mortality (1DAT) | % Mortality (2DAT) |
| --- | --- | --- | --- |
| Chlorantraniliprole at 18 mg/L | 2.39 (2.10-2.70) | 8 | 38 |
| Y. entomophaga isolate O43NEW at $1 \times 10^7$ cfu/mL | 1.19 (0.99-1.42) | 17 | 100 |
| Y. entomophaga isolate O43NEW at $1 \times 10^5$ cfu/mL | 3.78 (3.35-4.29) | 0 | 21 |
| Y. entomophaga isolate O43NEW at $1 \times 10^3$ cfu/mL | 4.59 (4.03-5.26) | 0 | 8 |
| Chlorantraniliprole + Y. entomophaga ($1 \times 10^7$ cfu/mL) | 0.76 (0.60-0.95) | 71 | 100 |
| Chlorantraniliprole + Y. entomophaga ($1 \times 10^5$ cfu/mL) | 0.90 (0.73-1.09) | 54 | 100 |
| Chlorantraniliprole + Y. entomophaga ($1 \times 10^3$ cfu/mL) | 1.17 (0.97-1.39) | 25 | 96 |

LT50 is the estimated time to kill 50% of the insects based on Probit analysis, % mortality is Abbott's corrected and DAT is the days after treatment The combination of Y. entomophaga isolate O43NEW with chlorantraniliprole resulted in a significantly lower LT50 than either active alone. The data in the above table also show the % mortality of cabbage loopers at 1 and 2 days, for Y. entomophaga alone, for chlorantraniliprole alone, and for combinations of Y. entomophaga and chlorantraniliprole.

Chlorantraniliprole with Corn Earworm.

Cabbage disks were dipped either in phosphate buffer solution (controls and chlorantraniliprole alone treatments) or in a suspension of Y. entomophaga isolate O43NEW at a concentration of $1 \times 10^5$ or $1 \times 10^3$ cfu/mL in phosphate buffer (Y. entomophaga alone or in combination with chlorantraniliprole). 50 µl suspensions of either acetone (controls and Y. entomophaga alone treatments) or of chlorantraniliprole (Sigma 32510) at a concentration of 18 mg/L in acetone were then dropped onto each cabbage disk. These were set to dry for 1 hr. After the disks had dried, one $2^{nd}$ instar corn earworm was added to each disk. A total of 24 insects were evaluated for each treatment. Insects were observed daily and scored as live or dead. Results are shown in Table 59.

TABLE 59

Mortality of $2^{nd}$ instar corn earworm treated with chlorantraniliprole, Y. entomophaga isolate O43NEW, and a combination of both

| Treatment | LT50 (95% confidence intervals) in days | % Mortality (1DAT) | % Mortality (2DAT) |
| --- | --- | --- | --- |
| Chlorantraniliprole at 18 mg/L | 3.29 (2.85-3.77) | 0 | 0 |
| Y. entomophaga isolate O43NEW at $1 \times 10^5$ cfu/mL | 3.44 (3.00-3.95) | 0 | 17 |
| Y. entomophaga isolate O43NEW at $1 \times 10^3$ cfu/mL | 4.16 (3.60-4.83) | 0 | 0 |
| Chlorantraniliprole + Y. entomophaga ($1 \times 10^5$ cfu/mL) | 1.98 (1.65-2.35) | 8 | 25 |
| Chlorantraniliprole + Y. entomophaga ($1 \times 10^3$ cfu/mL) | 1.91 (1.59-2.27) | 8 | 33 |

LT50 is the estimated time to kill 50% of the insects based on Probit analysis, % mortality is Abbott's corrected and DAT is the days after treatment The combination of Y. entomophaga isolate O43NEW with chlorantraniliprole resulted in a significantly lower LT50 than either active alone. The data in the above table also show the % mortality of corn earworms at 1 and 2 days, for Y. entomophaga alone, for chlorantraniliprole alone, and for combinations of Y. entomophaga and chlorantraniliprole.

Chlorantraniliprole with Tobacco Budworm.

Cabbage disks were dipped either in phosphate buffer solution (controls and chlorantraniliprole alone treatments) or in a suspension of Y. entomophaga isolate O43NEW at a concentration of $1 \times 10^5$ cfu/mL in phosphate buffer (Y. entomophaga alone or in combination with chlorantraniliprole). 50 µl suspensions of either acetone (controls and Y. entomophaga alone treatments) or of chlorantraniliprole (Sigma 32510) at a concentration of 18 mg/L in acetone were then dropped onto each cabbage disk. These were set to dry for 1 hr. After the disks had dried, one $2^{nd}$ instar tobacco budworm was added to each disk. A total of 24 insects were evaluated for each treatment. Insects were observed daily and scored as live or dead. Results are shown in Table 60.

TABLE 60

Mortality of $2^{nd}$ instar tobacco budworm treated with chlorantraniliprole, Y. entomophaga isolate O43NEW, and a combination of both

| Treatment | LT50 (95% confidence intervals) in days | % Mortality (1DAT) | % Mortality (2DAT) |
| --- | --- | --- | --- |
| Chlorantraniliprole at 18 mg/L | 2.20 (1.91-2.53) | 8 | 25 |
| Y. entomophaga isolate O43NEW at $1 \times 10^5$ cfu/mL | 2.89 (2.53-3.29) | 0 | 21 |
| Chlorantraniliprole + Y. entomophaga ($1 \times 10^5$ cfu/mL) | 1.57 (1.33-1.84) | 25 | 42 |

LT50 is the estimated time to kill 50% of the insects based on Probit analysis, % mortality is Abbott's corrected and DAT is the days after treatment The combination of Y. entomophaga isolate O43NEW with chlorantraniliprole resulted in a significantly lower LT50 than either active alone. The data in the above table also show the % mortality of tobacco budworms at 1 and 2 days, for Y. entomophaga alone, for chlorantraniliprole alone, and for combinations of Y. entomophaga and chlorantraniliprole.

Flubendiamide with Fall Armyworm.

Cabbage leaf disks were dipped in either acetone (controls and *Y. entomophaga* alone treatments) or flubendiamide (Sigma 32801) at a concentration of 0.59 mg/L of acetone. These were set to dry for 1 hr. Cabbage disks were then dipped either in phosphate buffer solution (controls and flubendiamide alone treatments) or in a suspension of *Y. entomophaga* at a concentration of $1 \times 10^6$ cfu/mL in phosphate buffer for the data in Table 61, and $1 \times 10^5$ cfu/mL in phosphate buffer for the data in Tables 62, 63, and 4 (*Y. entomophaga* alone or in combination with flubendiamide). After the cabbage disks had dried for 1 hr, a single $3^{rd}$ instar fall armyworm larva for Table 61, and $4^{th}$ instar fall armyworm larva for Tables 62, 63 and 64 was added to each individual cabbage disk. A total of 20 insects were evaluate for each treatment. Insects were observed daily and scored as live or dead. The results are shown below.

TABLE 61

Mortality of $3^{rd}$ instar fall armyworm treated with flubendiamide, *Y. entomophaga* isolate O43NEW, and a combination of both

| Treatment | LT50 (95% confidence intervals) in days | % Mortality (6DAT) | % Mortality (7DAT) | % Mortality (8DAT) | % Mortality (10DAT) | % Mortality (11DAT) |
|---|---|---|---|---|---|---|
| Flubendiamide at 0.59 mg/L | 18.28 (14.32-23.94) | 0 | 0 | 5 | −6 | 18 |
| *Y. entomophaga* isolate O43NEW at $1 \times 10^6$ CFU/mL | 10.19 (8.89-11.81) | 25 | 26 | 32 | 35 | 41 |
| Flubendiamide + *Y. entomophaga* | 6.78 (6.02-7.65) | 30 | 58 | 79 | 82 | 88 |

LT50 is the estimated time to kill 50% of the insects based on Probit analysis, % mortality is Abbott's corrected and DAT is the days after treatment The combination of *Y. entomophaga* isolate O43NEW with flubendiamide resulted in a significantly lower LT50 than either active alone. The data in the above table also show the % mortality of fall armyworms at 6, 7, 8, 10 and 11 days, for *Y. entomophaga* alone, for flubendiamide alone, and for combinations of *Y. entomophaga* and flubendiamide.

TABLE 62

Mortality of 4th instar fall armyworm treated with flubendiamide, *Y. entomophaga* isolate O348UX, and a combination of both

| Treatment | LT50 (95% confidence intervals) in days | % Mortality (4DAT) | % Mortality (5DAT) | % Mortality (6DAT) |
|---|---|---|---|---|
| Flubendiamide at 0.59 mg/L | 7.46 (6.86-8.10) | 0 | 30 | 26 |
| *Y. entomophaga* isolate O348UX at $1\times10^5$ CFU/mL | 7.00 (6.45-7.60) | 5 | 35 | 37 |
| Flubendiamide + *Y. entomophaga* | 4.32 (3.90-4.79) | 10 | 85 | 90 |

LT50 is the estimated time to kill 50% of the insects based on Probit analysis, % mortality is Abbott's corrected and DAT is the days after treatment The combination of *Y. entomophaga* isolate O348UX with flubendiamide resulted in a significantly lower LT50 than either active alone. The data in the above table also show the % mortality of fall armyworms at 4, 5 and 6 days, for *Y. entomophaga* alone, for flubendiamide alone, and for combinations of *Y. entomophaga* and flubendiamide.

TABLE 63

Mortality of 4th instar fall armyworm treated with flubendiamide, *Y. entomophaga* isolate O24G3R, and a combination of both

| Treatment | LT50 (95% confidence intervals) in days | % Mortality (4DAT) | % Mortality (6DAT) |
|---|---|---|---|
| Flubendiamide at 0.59 mg/L | 7.46 (6.86-8.10) | 0 | 26 |
| *Y. entomophaga* isolate O24G3R at $1\times10^5$ CFU/mL | 6.37 (5.83-6.97) | 0 | 37 |
| Flubendiamide + *Y. entomophaga* | 5.16 (4.71-5.64) | 20 | 68 |

LT50 is the estimated time to kill 50% of the insects based on Probit analysis, % mortality is Abbott's corrected and DAT is the days after treatment The combination of *Y. entomophaga* isolate O24G3R with flubendiamide resulted in a significantly lower LT50 than either active alone. The data in the above table also show the % mortality of fall armyworms at 4 and 6 days, for *Y. entomophaga* alone, for flubendiamide alone, and for combinations of *Y. entomophaga* and flubendiamide.

TABLE 64

Mortality of 4th instar fall armyworm treated with flubendiamide, *Y. entomophaga* isolate O23ZMJ, and a combination of both

| Treatment | LT50 (95% confidence intervals) in days | % Mortality (4DAT) |
|---|---|---|
| Flubendiamide at 0.59 mg/L | 7.46 (6.86-8.10) | 0 |
| *Y. entomophaga* isolate O23ZMJ at $1\times10^5$ CFU/mL | 6.23 (5.72-6.78) | 10 |
| Flubendiamide + *Y. entomophaga* | 5.22 (4.77-5.71) | 20 |

LT50 is the estimated time to kill 50% of the insects based on Probit analysis, % mortality is Abbott's corrected and DAT is the days after treatment The combination of *Y. entomophaga* isolate O23ZMJ with flubendiamide resulted in a significantly lower LT50 than either active alone. The data in the above table also show the % mortality of fall armyworms at 4 days, for *Y. entomophaga* alone, for flubendiamide alone, and for combinations of *Y. entomophaga* and flubendiamide.

Flubendiamide with Black Cutworm.

Cabbage leaf disks were dipped in either acetone (controls and *Y. entomophaga* alone treatments) or flubendiamide (Sigma 32801) at a concentration of 0.59 mg/L of acetone for the data in Table 65, and 0.20 mg/L of acetone for examples the data in Tables 66, 67, and 68. These were set to dry for 1 hr. Cabbage disks were then dipped in either phosphate buffer solution (controls and flubendiamide alone treatments) or a suspension of *Y. entomophaga* at a concentration of $1\times10^4$ cfu/mL in phosphate buffer (*Y. entomophaga* alone or in combination with flubendiamide). After the cabbage disks had dried for 1 hr, a single $3^{rd}$ instar black cutworm larva was added to each individual cabbage disk. A total of 20 insects were evaluate for each treatment. Insects were observed daily and scored as live or dead. The results are shown below.

TABLE 65

Mortality of $3^{rd}$ instar black cutworm treated with flubendiamide, *Y. entomophaga* isolate O43NEW, and a combination of both

| Treatment | LT50 (95% confidence intervals) in days | % Mortality (4DAT) | % Mortality (5DAT) | % Mortality (6DAT) |
|---|---|---|---|---|
| Flubendiamide at 0.59 mg/L | 4.99 (4.53-5.48) | 21 | 22 | 44 |
| *Y. entomophaga* isolate O43NEW at $1 \times 10^4$ CFU/mL | 7.85 (7.23-8.53) | 0 | 11 | 18 |
| Flubendiamide + *Y. entomophaga* | 3.77 (3.37-4.22) | 33 | 31 | 100 |

LT50 is the estimated time to kill 50% of the insects based on Probit analysis, % mortality is Abbott's corrected and DAT is the days after treatment The combination of *Y. entomophaga* isolate O43NEW with flubendiamide resulted in a significantly lower LT50 than either active alone. The data in the above table also show the % mortality of black cutworms at 4, 5 and 6 days, for *Y. entomophaga* alone, for flubendiamide alone, and for combinations of *Y. entomophaga* and flubendiamide.

TABLE 66

Mortality of $3^{rd}$ instar black cutworm treated with flubendiamide, *Y. entomophaga* isolate O348UX, and a combination of both

| Treatment | LT50 (95% confidence intervals) in days | % Mortality (5DAT) | % Mortality (6DAT) | % Mortality (7DAT) |
|---|---|---|---|---|
| Flubendiamide at 0.20 mg/L | 4.83 (4.34-5.37) | 31 | 44 | 69 |
| *Y. entomophaga* isolate O348UX at $1 \times 10^4$ CFU/mL | 9.09 (8.26-10.01) | −6 | 13 | 13 |
| Flubendiamide + *Y. entomophaga* | 3.53 (3.13-3.98) | 75 | 88 | 88 |

LT50 is the estimated time to kill 50% of the insects based on Probit analysis, % mortality is Abbott's corrected and DAT is the days after treatment The combination of *Y. entomophaga* isolate O348UX with flubendiamide resulted in a significantly lower LT50 than either active alone. The data in the above table also show the % mortality of black cutworms at 5, 6 and 7 days, for *Y. entomophaga* alone, for flubendiamide alone, and for combination of *Y. entomophaga* and flubendiamide.

TABLE 67

Mortality of $3^{rd}$ instar black cutworm treated with flubendiamide, *Y. entomophaga* isolate O23ZMJ, and a combination of both

| Treatment | LT50 (95% confidence intervals) in days | % Mortality (5DAT) | % Mortality (6DAT) | % Mortality (7DAT) |
|---|---|---|---|---|
| Flubendiamide at 0.20 mg/L | 4.83 (4.34-5.37) | 31 | 44 | 69 |
| *Y. entomophaga* isolate O23ZMJX at $1 \times 10^4$ CFU/mL | 8.61 (7.82-9.47) | −13 | −6 | 0 |
| Flubendiamide + *Y. entomophaga* | 4.29 (3.82-4.81) | 81 | 94 | 94 |

LT50 is the estimated time to kill 50% of the insects based on Probit analysis, % mortality is Abbott's corrected and DAT is the days after treatment The data in the above table show the % mortality of black cutworms at 5, 6 and 7 days, for *Y. entomophaga* isolate O23ZMJ alone, for flubendiamide alone, and for combinations of *Y. entomophaga* and flubendiamide.

TABLE 68

Mortality of $3^{rd}$ instar black cutworm treated with flubendiamide, *Y. entomophaga* isolate O24G3R, and a combination of both

| Treatment | LT50 (95% confidence intervals) in days | % Mortality (5DAT) | % Mortality (6DAT) | % Mortality (7DAT) |
|---|---|---|---|---|
| Flubendiamide at 0.20 mg/L | 4.83 (4.34-5.37) | 31 | 44 | 69 |
| *Y. entomophaga* isolate O24G3R at $1 \times 10^4$ CFU/mL | 8.51 (7.74-9.34) | 0 | 13 | 19 |
| Flubendiamide + *Y. entomophaga* | 4.14 (3.68-4.64) | 50 | 75 | 94 |

LT50 is the estimated time to kill 50% of the insects based on Probit analysis, % mortality is Abbott's corrected and DAT is the days after treatment The data in the above table show the % mortality of black cutworms at 5, 6 and 7 days, for *Y. entomophaga* isolate O24G3R alone, for flubendiamide alone, and for combinations of *Y. entomophaga* and flubendiamide.

Example 14. Summary of Insect Killing (% Mortality) Using Combinations of *Yersinia entomophaga* Cells and Chemical Insecticides The table below is a summary of selected, but representative data, from Examples 3-13. Each row of the table includes data from a selected experiment described in one of the Examples 3-13. The columns in the table, from left to right, indicate the IRAC group of the chemical insecticide; the specific chemical insectide and concentration used in the experiment; the insect that the chemical insecticide, *Yersinia*, or chemical insecticide+*Yersinia* was tested against; the isolate of *Yersinia entomophaga* used and concentration; the % mortality of the insect exposed to the chemical insecticide alone; the % mortality of the insect exposed to the *Yersinia entomophaga* alone; the % mortality of the insect exposed to the combination of chemical insecticide and *Yersinia entomophaga*; a calculated index of performance for the combination as compared to the individual components of the combination tested alone (performance index=actual mortality of insects exposed to the combination of chemical insecticide and *Yersinia entomophaga* divided by the cumulative mortality of insects exposed to the chemical insecticide and *Y. entomophaga* individually); and the time point of insect killing (days after treatment) at which the data to calculate the performance index were collected.

TABLE 69

Summary of data from Examples 3-13 using *Yersinia* cells and insecticides

| IRAC Group | Chemical (mg/L) | Insect | *Yersinia* Isolate (cfu/mL) | % Mort. Chem. | % Mort. *Yersinia* | % Mort. Chem. + *Yersinia* | Performance Index | DAT |
|---|---|---|---|---|---|---|---|---|
| 1A | Carbaryl (100) | Cabbage Looper | O43NEW ($1 \times 10^5$) | 21 | 8 | 50 | 1.7 | 2 |
| 1A | Carbaryl (100) | Tobacco budworm | O43NEW ($1 \times 10^3$) | 50 | 16 | 87 | 1.3 | 4 |
| 1A | Methomyl (30) | Cabbage Looper | O43NEW ($1 \times 10^5$) | 12 | 0 | 21 | 1.8 | 2 |
| 1A | Methomyl (30) | Cabbage Looper | O43NEW ($1 \times 10^3$) | 12 | 0 | 25 | 2.1 | 2 |
| 1A | Thiodicarb (140) | Cabbage Looper | O43NEW ($1 \times 10^7$) | 25 | 66 | 100 | 1.1 | 1 |
| 1A | Thiodicarb (140) | Cabbage Looper | O43NEW ($1 \times 10^5$) | 25 | 8 | 66 | 2.0 | 1 |
| 1A | Thiodicarb (140) | Corn earworm | O43NEW ($1 \times 10^7$) | 0 | 8 | 58 | 7.3 | 1 |
| 1A | Thiodicarb (140) | Corn earworm | O43NEW ($1 \times 10^3$) | 33 | 16 | 75 | 1.5 | 2 |
| 1A | Thiodicarb (140) | Tobacco budworm | O43NEW ($1 \times 10^5$) | 25 | 0 | 58 | 2.3 | 1 |
| 1B | Chlorpyrifos (19) | Fall armyworm | O43NEW ($1 \times 10^5$) | 40 | 0 | 50 | 1.3 | 3 |
| 1B | Chlorpyrifos (19) | Fall armyworm | O333A4 ($1 \times 10^5$) | 35 | 15 | 90 | 1.8 | 6 |
| 1B | Chlorpyrifos (19) | Fall armyworm | O24KEK ($1 \times 10^5$) | 35 | 50 | 90 | 1.1 | 6 |
| 1B | Chlorpyrifos (19) | Fall armyworm | O24G3R ($1 \times 10^5$) | 35 | 20 | 75 | 1.4 | 5 |
| 2B | Ethiprole (120) | Colorado potato beetle | O43NEW ($1 \times 10^7$) | 21 | 11 | 79 | 2.5 | 5 |
| 2B | Fipronil (4) | Fall armyworm | O43NEW ($1 \times 10^5$) | 5 | 10 | 30 | 2.0 | 5 |
| 2B | Fipronil (4) | Fall armyworm | O333A4 ($1 \times 10^5$) | 5 | 5 | 30 | 3.0 | 4 |
| 2B | Fipronil (4) | Fall armyworm | O24KEK ($1 \times 10^5$) | 5 | 10 | 40 | 2.7 | 4 |
| 2B | Fipronil (4) | Fall armyworm | O24G3R ($1 \times 10^5$) | 21 | 21 | 53 | 1.3 | 5 |
| 3A | Cyfluthrin (1.3) | Black cutworm | O43NEW ($1 \times 10^4$) | 35 | 10 | 55 | 1.2 | 6 |
| 3A | Cyfluthrin (0.0013) | Cabbage looper | O43NEW ($1 \times 10^2$) | 30 | 0 | 40 | 1.3 | 4 |
| 3A | λ-cyhalothrin (3.6) | Fall armyworm | O43NEW ($1 \times 10^5$) | 30 | 0 | 50 | 1.7 | 4 |
| 3A | Deltamethrin (0.175) | Black cutworm | O43NEW ($1 \times 10^4$) | 35 | 10 | 75 | 1.7 | 6 |
| 3A | Deltamethrin (1.75) | Black cutworm | O43NEW ($1 \times 10^4$) | 45 | 0 | 75 | 1.7 | 3 |
| 3A | Deltamethrin (0.29) | Diamond-back moth | O43NEW ($1 \times 10^3$) | 24 | 21 | 79 | 1.8 | 8 |
| 3A | Deltamethrin (0.88) | Colorado potato beetle | O43NEW ($1 \times 10^7$) | 30 | 10 | 50 | 1.3 | 5 |
| 3A | Esfenvalerate (5.6) | Black cutworm | O43NEW ($1 \times 10^5$) | 45 | 10 | 90 | 1.6 | 4 |
| 3A | Esfenvalerate (5.6) | Black cutworm | O23ZMJ ($1 \times 10^5$) | 61 | 17 | 100 | 1.3 | 4 |
| 3A | Esfenvalerate (1.87) | Black cutworm | O348UX ($1 \times 10^4$) | 50 | 0 | 69 | 1.4 | 5 |
| 3A | Esfenvalerate (1.87) | Black cutworm | O24G3R ($1 \times 10^4$) | 50 | 0 | 75 | 1.5 | 5 |
| 3A | Esfenvalerate (56) | Fall armyworm | O43NEW ($1 \times 10^6$) | 5 | 10 | 35 | 2.3 | 5 |
| 3A | Esfenvalerate (56) | Fall armyworm | O23ZMJ ($1 \times 10^5$) | 25 | 10 | 60 | 1.7 | 3 |
| 3A | Esfenvalerate (56) | Fall armyworm | O348UX ($1 \times 10^5$) | 25 | 5 | 45 | 1.5 | 3 |
| 3A | Esfenvalerate (56) | Fall armyworm | O24G3R ($1 \times 10^5$) | 25 | 0 | 65 | 2.6 | 3 |
| 3A | Esfenvalerate (56) | Fall armyworm | O24G3R ($1 \times 10^4$) | 0 | 10 | 30 | 3 | 6 |
| 3A | Esfenvalerate (0.56) | Cabbage looper | O43NEW ($1 \times 10^2$) | 37 | 16 | 68 | 1.3 | 7 |
| 4A | Clothianidin (60) | Fall armyworm | O43NEW ($1 \times 10^5$) | 0 | 33 | 75 | 2.3 | 10 |

TABLE 69-continued

Summary of data from Examples 3-13 using *Yersinia* cells and insecticides

| IRAC Group | Chemical (mg/L) | Insect | *Yersinia* Isolate (cfu/mL) | % Mort. Chem. | % Mort. *Yersinia* | % Mort. Chem. + *Yersinia* | Performance Index | DAT |
|---|---|---|---|---|---|---|---|---|
| 4A | Clothianidin (60) | Fall armyworm | O333A4 ($1 \times 10^5$) | 5 | 45 | 55 | 1.1 | 7 |
| 4A | Clothianidin (60) | Fall armyworm | O24G3R ($1 \times 10^5$) | 5 | 47 | 63 | 1.2 | 5 |
| 4A | Imidacloprid (0.56) | Colorado potato beetle | O43NEW ($1 \times 10^7$) | 17 | 17 | 44 | 1.3 | 10 |
| 4A | Imidacloprid (100) | Western flower thrips | O43NEW ($1 \times 10^5$) | 29 | 21 | 50 | 1.0 | 2 |
| 4A | Imidacloprid (100) | Western flower thrips | O333A4 ($1 \times 10^5$) | 16 | 0 | 25 | 1.6 | 2 |
| 4A | Thiacloprid (1) | Colorado potato beetle | O43NEW ($1 \times 10^6$) | 26 | 0 | 37 | 1.4 | 5 |
| 4A | Thiamethoxam (150) | Diamond-back moth | O43NEW ($1 \times 10^3$) | 16 | 21 | 50 | 1.4 | 6 |
| 5 | Spinosad (25) | Fall armyworm | O43NEW ($1 \times 10^6$) | 40 | 5 | 60 | 1.3 | 3 |
| 5 | Spinosad (25) | Fall armyworm | 024G3R ($1 \times 10^5$) | 80 | 0 | 100 | 1.3 | 3 |
| 5 | Spinosad (25) | Fall armyworm | O348UX ($1 \times 10^5$) | 80 | 5 | 100 | 1.2 | 3 |
| 5 | Spinosad (0.25) | Diamond-back moth | O43NEW ($1 \times 10^3$) | 15 | 15 | 50 | 1.7 | 4 |
| 5 | Spinosad (2.5) | Colorado potato beetle | O43NEW ($1 \times 10^7$) | 20 | 0 | 55 | 2.8 | 4 |
| 6 | Emamectin benzoate (2) | Fall armyworm | O43NEW ($1 \times 10^6$) | | | | 1.0 or less | |
| 6 | Emamectin benzoate (0.67) | Fall armyworm | O23ZMJ ($1 \times 10^5$) | 20 | 10 | 40 | 1.3 | 4 |
| 6 | Emamectin benzoate (0.02) | Cabbage looper | O43NEW ($1 \times 10^2$) | 13 | 69 | 94 | 1.1 | 7 |
| 6 | Emamectin benzoate (0.002) | Diamond-back moth | O43NEW ($1 \times 10^3$) | 5 | 16 | 22 | 1.0 | 4 |
| 15 | Novaluron (1) | Cabbage looper | O43NEW ($1 \times 10^2$) | 11 | 16 | 53 | 2.0 | 5 |
| 15 | Novaluron (0.33) | Black cutworm | O43NEW ($1 \times 10^4$) | 0 | 13 | 19 | 1.5 | 7 |
| 22A | Indoxacarb (0.53) | Fall armyworm | O43NEW ($1 \times 10^6$) | 10 | 45 | 85 | 1.5 | 6 |
| 22A | Indoxacarb (1.6) | Fall armyworm | O23ZMJ ($1 \times 10^5$) | 45 | 40 | 95 | 1.1 | 5 |
| 22A | Indoxacarb (0.53) | Black cutworm | O43NEW ($1 \times 10^4$) | 0 | 11 | 33 | 3.0 | 5 |
| 23 | Spirotetramat (300) | Fall armyworm | O43NEW ($1 \times 10^5$) | 6 | 0 | 33 | 5.5 | 6 |
| 28 | Chlorantra-niliprole (18) | Cabbage looper | O43NEW ($1 \times 10^7$) | 8 | 17 | 71 | 2.8 | 1 |
| 28 | Chlorantra-niliprole (18) | Cabbage looper | O43NEW ($1 \times 10^5$) | 38 | 21 | 100 | 1.7 | 2 |
| 28 | Chlorantra-niliprole (18) | Cabbage looper | O43NEW ($1 \times 10^3$) | 38 | 8 | 96 | 2.1 | 2 |
| 28 | Chlorantra-niliprole (18) | Corn earworm | O43NEW ($1 \times 10^5$) | 0 | 17 | 25 | 1.5 | 2 |
| 28 | Chlorantra-niliprole (18) | Corn earworm | O43NEW ($1 \times 10^3$) | 0 | 0 | 33 | 1.0 or less | 2 |
| 28 | Chlorantra-niliprole (18) | Tobacco budworm | O43NEW ($1 \times 10^5$) | 8 | 0 | 25 | 3.1 | 1 |
| 28 | Flubendia-mide (0.59) | Fall armyworm | O43NEW ($1 \times 10^6$) | 0 | 26 | 58 | 2.2 | 7 |
| 28 | Flubendia-mide (0.59) | Fall armyworm | O23ZMJ ($1 \times 10^5$) | 0 | 10 | 20 | 2.0 | 6 |
| 28 | Flubendia-mide (0.59) | Fall armyworm | O348UX ($1 \times 10^5$) | 26 | 37 | 90 | 1.4 | 6 |
| 28 | Flubendia-mide (0.59) | Fall armyworm | O24G3R ($1 \times 10^5$) | 26 | 37 | 68 | 1.1 | 4 |
| 28 | Flubendia-mide (0.59) | Black cutworm | O43NEW ($1 \times 10^4$) | 44 | 18 | 100 | 1.6 | 6 |

TABLE 69-continued

Summary of data from Examples 3-13 using *Yersinia* cells and insecticides

| IRAC Group | Chemical (mg/L) | Insect | *Yersinia* Isolate (cfu/mL) | % Mort. Chem. | % Mort. *Yersinia* | % Mort. Chem. + *Yersinia* | Performance Index | DAT |
|---|---|---|---|---|---|---|---|---|
| 28 | Flubendiamide (0.2) | Black cutworm | O23ZMJ ($1 \times 10^4$) | 31 | 0 | 81 | 2.6 | 5 |
| 28 | Flubendiamide (0.2) | Black cutworm | O348UX ($1 \times 10^4$) | 31 | 0 | 75 | 2.4 | 5 |
| 28 | Flubendiamide (0.2) | Black cutworm | O24G3R ($1 \times 10^4$) | 31 | 0 | 50 | 1.6 | 5 |

Example 15. Summary of Insect Killing (Using LT50) Using Combinations of *Yersinia entomophaga* Cells and Chemical Insecticides The table below is a summary of selected, but representative data, from Examples 3-13. Each row of the table includes data from a selected experiment described in one of the Examples 3-13. The columns in the table, from left to right, indicate the IRAC group of the chemical insecticide; the specific chemical insecticide and concentration used in the experiment; the insect that the chemical insecticide, *Yersinia*, or chemical insecticide+*Yersinia* was tested against; the isolate of *Yersinia entomophaga* used and concentration; the LT50 of the insect exposed to the chemical insecticide alone; the LT50 of the insect exposed to the *Yersinia entomophaga* alone; the LT50 of the insect exposed to the combination of chemical insecticide and *Yersinia entomophaga*; the reduction in LT50 (equal to the lowest LT50 of a single active minus the LT50 of the combination; and the % reduction in the LT50 (equal to the LT50 reduction divided by the lowest LT50 of a single active×100%).

TABLE 70

Summary of data from Examples 3-13 using *Yersinia* cells and insecticides

| IRAC Group | Chemical (mg/L) | Insect | *Yersinia* Isolate (cfu/mL) | LT50 Chem. (days) | LT50 *Yersinia* (days) | LT50 Chem. + *Yersinia* (days) | LT50 Reduction (days) | LT50 Reduction (%) |
|---|---|---|---|---|---|---|---|---|
| 1A | Carbaryl (100) | Cabbage Looper | O43NEW ($1 \times 10^5$) | 3.60 | 5.00 | 2.50 | 1.10 | 31 |
| 1A | Carbaryl (100) | Tobacco budworm | O43NEW ($1 \times 10^3$) | 4.06 | 6.76 | 3.05 | 1.01 | 25 |
| 1A | Methomyl (30) | Cabbage Looper | O43NEW ($1 \times 10^5$) | 5.84 | 4.62 | 2.99 | 1.63 | 35 |
| 1A | Methomyl (30) | Cabbage Looper | O43NEW ($1 \times 10^3$) | 5.84 | 6.15 | 2.93 | 2.91 | 50 |
| 1A | Thiodicarb (140) | Cabbage Looper | O43NEW ($1 \times 10^7$) | 1.40 | 0.66 | 0.03 | 0.63 | 95 |
| 1A | Thiodicarb (140) | Cabbage Looper | O43NEW ($1 \times 10^5$) | 1.40 | 2.45 | 0.66 | 0.74 | 53 |
| 1A | Thiodicarb (140) | Corn earworm | O43NEW ($1 \times 10^7$) | 2.02 | 1.95 | 0.82 | 1.13 | 58 |
| 1A | Thiodicarb (140) | Corn earworm | O43NEW ($1 \times 10^3$) | 2.02 | 4.32 | 1.08 | 0.94 | 47 |
| 1A | Thiodicarb (140) | Tobacco budworm | O43NEW ($1 \times 10^5$) | 1.98 | 2.49 | 0.91 | 1.07 | 54 |
| 1B | Chlorpyrifos (19) | Fall armyworm | O43NEW ($1 \times 10^5$) | 6.83 | 9.06 | 4.41 | 2.42 | 35 |
| 1B | Chlorpyrifos (19) | Fall armyworm | O333A4 ($1 \times 10^5$) | 8.02 | 10.31 | 4.39 | 3.63 | 45 |
| 1B | Chlorpyrifos (19) | Fall armyworm | O24KEK ($1 \times 10^5$) | 8.02 | 7.70 | 6.05 | 1.65 | 21 |
| 1B | Chlorpyrifos (19) | Fall armyworm | O24G3R ($1 \times 10^5$) | 8.02 | 9.15 | 4.44 | 3.58 | 45 |
| 2B | Ethiprole (120) | Colorado potato beetle | O43NEW ($1 \times 10^7$) | 8.90 | 19.19 | 2.44 | 6.46 | 73 |
| 2B | Fipronil (4) | Fall armyworm | O43NEW ($1 \times 10^5$) | 8.86 | 10.41 | 5.28 | 3.58 | 40 |
| 2B | Fipronil (4) | Fall armyworm | O333A4 ($1 \times 10^5$) | 6.71 | 7.40 | 4.43 | 2.28 | 34 |
| 2B | Fipronil (4) | Fall armyworm | O24KEK ($1 \times 10^5$) | 6.71 | 6.94 | 4.07 | 2.64 | 39 |
| 2B | Fipronil (4) | Fall armyworm | O24G3R ($1 \times 10^5$) | 6.71 | 6.55 | 5.05 | 1.50 | 23 |
| 3A | Cyfluthrin (1.3) | Black cutworm | O43NEW ($1 \times 10^4$) | 8.82 | 14.71 | 6.86 | 1.96 | 22 |
| 3A | Cyfluthrin (0.0013) | Cabbage looper | O43NEW ($1 \times 10^2$) | 7.33 | 19.71 | 5.85 | 1.48 | 20 |

TABLE 70-continued

Summary of data from Examples 3-13 using *Yersinia* cells and insecticides

| IRAC Group | Chemical (mg/L) | Insect | *Yersinia* Isolate (cfu/mL) | LT50 Chem. (days) | LT50 *Yersinia* (days) | LT50 Chem. + *Yersinia* (days) | LT50 Reduction (days) | LT50 Reduction (%) |
|---|---|---|---|---|---|---|---|---|
| 3A | λ-cyhalothrin (3.6) | Fall armyworm | O43NEW ($1 \times 10^5$) | 5.20 | 7.00 | 4.08 | 1.12 | 22 |
| 3A | Deltamethrin (0.175) | Black cutworm | O43NEW ($1 \times 10^4$) | 7.67 | 14.71 | 5.15 | 2.52 | 33 |
| 3A | Deltamethrin (1.75) | Black cutworm | O43NEW ($1 \times 10^4$) | 3.37 | 14.71 | 2.36 | 1.01 | 30 |
| 3A | Deltamethrin (0.29) | Diamondback moth | O43NEW ($1 \times 10^3$) | 11.58 | 13.12 | 4.92 | 6.66 | 58 |
| 3A | Deltamethrin (0.88) | Colorado potato beetle | O43NEW ($1 \times 10^7$) | 11.60 | 28.10 | 4.60 | 7.00 | 60 |
| 3A | Esfenvalerate (5.6) | Black cutworm | O43NEW ($1 \times 10^5$) | 3.97 | 5.82 | 2.82 | 1.15 | 29 |
| 3A | Esfenvalerate (5.6) | Black cutworm | O23ZMJ ($1 \times 10^5$) | 3.40 | 5.22 | 2.48 | 0.92 | 27 |
| 3A | Esfenvalerate (1.87) | Black cutworm | O348UX ($1 \times 10^4$) | 5.29 | 9.09 | 3.87 | 1.42 | 27 |
| 3A | Esfenvalerate (1.87) | Black cutworm | O24G3R ($1 \times 10^4$) | 5.29 | 8.51 | 4.01 | 1.28 | 24 |
| 3A | Esfenvalerate (56) | Fall armyworm | O43NEW ($1 \times 10^6$) | 13.60 | 10.19 | 6.97 | 3.22 | 32 |
| 3A | Esfenvalerate (56) | Fall armyworm | O23ZMJ ($1 \times 10^5$) | 3.66 | 6.23 | 2.93 | 0.73 | 20 |
| 3A | Esfenvalerate (56) | Fall armyworm | O348UX ($1 \times 10^5$) | 3.66 | 7.00 | 3.25 | 0.41 | 11 |
| 3A | Esfenvalerate (56) | Fall armyworm | O24G3R ($1 \times 10^5$) | 3.66 | 6.37 | 2.82 | 0.84 | 23 |
| 3A | Esfenvalerate (56) | Fall armyworm | O24G3R ($1 \times 10^4$) | 20.00 | 11.25 | 8.74 | 2.51 | 22 |
| 3A | Esfenvalerate (0.56) | Cabbage looper | O43NEW ($1 \times 10^2$) | 5.63 | 6.43 | 4.21 | 1.42 | 25 |
| 4A | Clothianidin (60) | Fall armyworm | O43NEW ($1 \times 10^5$) | 10.94 | 9.94 | 7.38 | 2.56 | 26 |
| 4A | Clothianidin (60) | Fall armyworm | O333A4 ($1 \times 10^5$) | 22.94 | 8.30 | 6.91 | 1.39 | 17 |
| 4A | Clothianidin (60) | Fall armyworm | O24G3R ($1 \times 10^5$) | 9.38 | 5.53 | 4.23 | 1.30 | 24 |
| 4A | Imidacloprid (0.56) | Colorado potato beetle | O43NEW ($1 \times 10^7$) | 20.38 | 19.19 | 11.05 | 8.14 | 42 |
| 4A | Imidacloprid (100) | Western flower thrips | O43NEW ($1 \times 10^5$) | 2.72 | 4.28 | 1.57 | 1.15 | 42 |
| 4A | Imidacloprid (100) | Western flower thrips | O333A4 ($1 \times 10^5$) | 2.72 | 4.55 | 1.93 | 0.79 | 29 |
| 4A | Thiacloprid (1) | Colorado potato beetle | O43NEW ($1 \times 10^6$) | 6.99 | 7.42 | 5.68 | 1.31 | 19 |
| 4A | Thiamethoxam (150) | Diamondback moth | O43NEW ($1 \times 10^3$) | 10.09 | 10.08 | 6.96 | 3.12 | 31 |
| 5 | Spinosad (25) | Fall armyworm | O43NEW ($1 \times 10^6$) | 4.09 | 6.50 | 2.98 | 1.11 | 27 |
| 5 | Spinosad (25) | Fall armyworm | O24G3R ($1 \times 10^5$) | 2.43 | 6.37 | 0.68 | 1.75 | 72 |
| 5 | Spinosad (25) | Fall armyworm | O348UX ($1 \times 10^5$) | 2.43 | 7.00 | 0.68 | 1.75 | 72 |
| 5 | Spinosad (0.25) | Diamondback moth | O43NEW ($1 \times 10^3$) | 8.16 | 13.12 | 3.52 | 4.64 | 57 |
| 5 | Spinosad (2.5) | Colorado potato beetle | O43NEW ($1 \times 10^7$) | 6.01 | 12.58 | 3.33 | 2.68 | 45 |
| 6 | Emamectin benzoate (2) | Fall armyworm | O43NEW ($1 \times 10^6$) | 6.54 | 14.20 | 4.94 | 1.60 | 24 |
| 6 | Emamectin benzoate (0.67) | Fall armyworm | O23ZMJ ($1 \times 10^5$) | 5.10 | 6.23 | 3.98 | 1.12 | 22 |
| 6 | Emamectin benzoate (0.02) | Cabbage looper | O43NEW ($1 \times 10^2$) | 7.61 | 6.43 | 5.22 | 1.21 | 19 |

TABLE 70-continued

Summary of data from Examples 3-13 using *Yersinia* cells and insecticides

| IRAC Group | Chemical (mg/L) | Insect | *Yersinia* Isolate (cfu/mL) | LT50 Chem. (days) | LT50 *Yersinia* (days) | LT50 Chem. + *Yersinia* (days) | LT50 Reduction (days) | LT50 Reduction (%) |
|---|---|---|---|---|---|---|---|---|
| 6 | Emamectin benzoate (0.002) | Diamondback moth | O43NEW ($1 \times 10^3$) | 6.21 | 8.16 | 4.57 | 1.64 | 26 |
| 15 | Novaluron (1) | Cabbage looper | O43NEW ($1 \times 10^2$) | 7.55 | 6.43 | 4.77 | 1.66 | 26 |
| 15 | Novaluron (0.33) | Black cutworm | O43NEW ($1 \times 10^4$) | 9.40 | 9.34 | 6.69 | 2.65 | 28 |
| 22A | Indoxacarb (0.53) | Fall armyworm | O43NEW ($1 \times 10^6$) | 9.65 | 6.50 | 5.03 | 1.47 | 23 |
| 22A | Indoxacarb (1.6) | Fall armyworm | O23ZMJ ($1 \times 10^5$) | 5.14 | 6.23 | 4.26 | 0.88 | 17 |
| 22A | Indoxacarb (0.53) | Black cutworm | O43NEW ($1 \times 10^4$) | 7.64 | 7.85 | 5.97 | 1.67 | 22 |
| 23 | Spirotetramat (300) | Fall armyworm | O43NEW ($1 \times 10^5$) | 10.29 | 9.94 | 7.80 | 2.14 | 22 |
| 28 | Chlorantraniliprole (18) | Cabbage looper | O43NEW ($1 \times 10^7$) | 2.39 | 1.19 | 0.76 | 0.43 | 36 |
| 28 | Chlorantraniliprole (18) | Cabbage looper | O43NEW ($1 \times 10^5$) | 2.39 | 3.78 | 0.90 | 1.49 | 62 |
| 28 | Chlorantraniliprole (18) | Cabbage looper | O43NEW ($1 \times 10^3$) | 2.39 | 4.59 | 1.17 | 1.22 | 51 |
| 28 | Chlorantraniliprole (18) | Corn earworm | O43NEW ($1 \times 10^5$) | 3.29 | 3.44 | 1.98 | 1.31 | 40 |
| 28 | Chlorantraniliprole (18) | Corn earworm | O43NEW ($1 \times 10^3$) | 3.44 | 4.16 | 1.91 | 1.53 | 44 |
| 28 | Chlorantraniliprole (18) | Tobacco budworm | O43NEW ($1 \times 10^5$) | 2.20 | 2.89 | 1.57 | 0.63 | 29 |
| 28 | Flubendiami-de (0.59) | Fall armyworm | O43NEW ($1 \times 10^6$) | 18.28 | 10.19 | 6.78 | 3.41 | 33 |
| 28 | Flubendiami-de (0.59) | Fall armyworm | O23ZMJ ($1 \times 10^5$) | 7.46 | 6.23 | 5.22 | 1.01 | 16 |
| 28 | Flubendiami-de (0.59) | Fall armyworm | O348UX ($1 \times 10^5$) | 7.46 | 7.00 | 4.32 | 2.68 | 38 |
| 28 | Flubendiami-de (0.59) | Fall armyworm | O24G3R ($1 \times 10^5$) | 7.46 | 6.37 | 5.16 | 1.21 | 19 |
| 28 | Flubendiami-de (0.59) | Black cutworm | O43NEW ($1 \times 10^4$) | 4.99 | 7.85 | 3.77 | 1.22 | 24 |
| 28 | Flubendiami-de (0.2) | Black cutworm | O23ZMJ ($1 \times 10^4$) | 4.83 | 8.61 | 4.29 | 0.54 | 11 |
| 28 | Flubendiami-de (0.2) | Black cutworm | O348UX ($1 \times 10^4$) | 4.83 | 9.09 | 3.53 | 1.30 | 27 |
| 28 | Flubendiami-de (0.2) | Black cutworm | O24G3R ($1 \times 10^4$) | 4.83 | 8.51 | 4.14 | 0.69 | 14 |

Examples 16-26 Used Cell Free Filtrates from *Yersinia* Cells in Combination with Chemical Insecticides Example 16. Preparation and Titration of *Yersinia entomophaga* Cell Free Filtrates To produce cell free filtrates, cultures of *Yersinia entomophaga* grown in LB medium were centrifuged at 11,448 (g) for 10 minutes. The supernatant was decanted from the centrifuged pellet and filtered through a 0.22 μm filter. Assays were performed to determine concentrations of Yen-TC (toxin complex) using ELISA, and chitinase by measuring chitinase activity on specific substrates. All filtrates contained Yen-TC and chitinase activity, based on these assays. This was done to estimate relative potency of the cell free filtrates. Insects were first pre-screened with a range of dilutions of cell free filtrates to select a concentration that provided moderate activity. The logic is similar to that used in Example 2 to determine a rate of chemical insecticide to use. Based on these initial screens, undiluted cell free filtrate was used for cabbage looper, fall armyworm, black cutworm, and Colorado potato beetle. A 1:100 dilution of cell free filtrate in phosphate buffer was used for diamondback moth. In each of the Examples below, this is expressed as 1%.

As was done for titration of chemical insecticides, as described in Example 2, use of these amounts of cell free filtrates allowed for detection of additional insecticidal activity from a chemical insectide when combinations of cell free filtrates and chemical pesticides were used in the assays.

Example 17. IRAC Group 1B—Organophosphates: Example of Combination of Cell Free Filtrate of *Y. entomophaga* with Chlorpyrifos Against Diamondback Moth Chlorpyrifos with Cell Free Filtrate Against Diamondback Moth.

Cabbage leaf disks were dipped in either acetone (controls and *Y. entomophaga* alone treatments) or chlorpyrifos (Sigma 45395) at 3.8 mg/L in acetone. These were set to dry for 1 hr. Cabbage disks were then dipped either in 1% Luria broth (LB) media solution (controls and chlorpyrifos alone treatments) or 1% cell free filtrate from a culture *Y. entomophaga* isolate O43NEW (*Y. entomophaga* alone or in combination with chlorpyrifos treatments). After the cabbage disks had dried for 1 hr, a single $2^{nd}$ instar diamondback moth was added to each individual cabbage disk. A total of 20 insects were evaluated for each treatment. Insects were observed daily and scored as live or dead. Results are shown in Table 71.

TABLE 71

Mortality of $2^{nd}$ instar diamondback moth treated with chlorpyrifos, a 1% concentration of cell free filtrate from *Y. entomophaga* isolate O34NEW culture, and a combination of both

| Treatment | LT50 (95% confidence intervals) in days | % Mortality (4DAT) |
|---|---|---|
| Chlorpyrifos at 3.8 mg/L | 3.72 (3.01-4.52) | 74 |
| *Y. entomophaga* isolate O43NEW filtrate at 1% | 19.37 (15.64-24.42) | 5 |
| Chlorpyrifos + *Y. entomophaga* filtrate | 2.58 (2.00-3.23) | 84 |

LT50 is the estimated time to kill 50% of the insects based on Probit analysis, % mortality is Abbott's corrected and DAT is the days after treatment The data in the above table show the % mortality of diamondback moths at 4 days, for *Y. entomophaga* cell free filtrate alone, for chlorpyrifos alone, and for combinations of the cell free filtrate and chlorpyrifos.

Example 18. IRAC Group 2B—Phenylpyrazoles: Example of Combination of Cell Free Filtrate of *Y. entomophaga* with Fipronil Against Fall Army Worm Fipronil with Cell Free Filtrate Against Fall Armyworm.

Cabbage leaf disks were dipped in either acetone (controls and *Y. entomophaga* alone treatments) or fipronil (Sigma 46451) at 12 mg/L in acetone. These were set to dry for 1 hr. Cabbage disks were then dipped in either undiluted Luria broth (LB) media solution (controls and fipronil alone treatments) or undiluted cell free filtrate from a culture *Y. entomophaga* isolate O43NEW (*Y. entomophaga* alone or in combination with fipronil treatments). After the cabbage disks had dried for 1 hr, a single $3^{rd}$ instar fall armyworm was added to each individual cabbage disk. A total of 20 insects were evaluated for each treatment. Insects were observed daily and scored as live or dead. Results are shown in Table 72.

TABLE 72

Mortality of $3^{rd}$ instar fall armyworm treated with fipronil, undiluted cell free filtrate from *Y. entomophaga* isolate O34NEW culture, and a combination of both

| Treatment | LT50 (95% confidence intervals) in days | % Mortality (5DAT) | % Mortality (6DAT) | % Mortality (7DAT) | % Mortality (8DAT) |
|---|---|---|---|---|---|
| Fipronil at 12 mg/L | 51.74 (34.99-79.58) | 0 | 0 | 0 | 0 |
| *Y. entomophaga* isolate O43NEW undiluted filtrate | 36.80 (27.34-51.16) | 0 | 0 | 0 | 0 |
| Fipronil + *Y. entomophaga* filtrate | 16.64 (13.79-20.37) | 5 | 10 | 15 | 30 |

LT50 is the estimated time to kill 50% of the insects based on Probit analysis, % mortality is Abbott's corrected and DAT is the days after treatment The combination of cell free filtrate of *Y. entomophaga* isolate O43NEW with fipronil resulted in a significantly lower LT50 than either active alone. The data in the above table also show the % mortality of fall armyworm at 5, 6, 7 and 8 days, for *Y. entomophaga* cell free filtrate alone, for fipronil alone, and for combinations of the cell free filtrate and fipronil.

Example 19. IRAC Group 3A—Pyrethroids: Example of Combination of Cell Free Filtrate of *Y. entomophaga* with Esfenvalerate Against Cabbage Looper, Fall Armyworm and Black Cutworm; and Cell Free Filtrate of *Y. entomophaga* with Deltamethrin Against Diamondback Moth Esfenvalerate with Cell Free Filtrate Against Cabbage Looper.

Cabbage leaf disks were dipped in either acetone (controls and *Y. entomophaga* alone treatments) or esfenvalerate (Sigma 46277) at 0.56 mg/L in acetone. These were set to dry for 1 hr. Cabbage disks were then dipped in either undiluted Luria broth (LB) media solution (controls and esfenvalerate alone treatments) or undiluted cell free filtrate from a culture *Y. entomophaga* isolate O43NEW (*Y. entomophaga* alone or in combination with esfenvalerate treatments). After the cabbage disks had dried for 1 hr, a single $3^{rd}$ instar cabbage looper was added to each individual cabbage disk. A total of 20 insects were evaluate for each treatment. Insects were observed daily and scored as live or dead. Results are shown in Table 73.

TABLE 73

Mortality of 3$^{rd}$ instar cabbage looper treated with esfenvalerate, undiluted cell free filtrate *Y. entomophaga* isolate O34NEW culture, and a combination of both

| Treatment | LT50 (95% confidence intervals) ind ays | % Mortality (5DAT) | % Mortality (6DAT) | % Mortality (7DAT) | % Mortality (8DAT) |
|---|---|---|---|---|---|
| Esfenvalerate at 0.56 mg/L | 5.23 (4.69-5.79) | 40 | 70 | 72 | 83 |
| *Y. entomophaga* isolate O43NEW undiluted filtrate | 17.58 (15.41-20.02) | 0 | 0 | −11 | −6 |
| Esfenvalerate + *Y. entomophaga* filtrate | 3.48 (2.97-4.02) | 85 | 90 | 94 | 100 |

LT50 is the estimated time to kill 50% of the insects based on Probit analysis, % mortality is Abbott's corrected and DAT is the days after treatment The combination of cell free filtrate of *Y. entomophaga* isolate O43NEW with esfenvalerate resulted in a significantly lower LT50 than either active alone. The data in the above table also show the % mortality of cabbage loopers at 5, 6, 7 and 8 days, for *Y. entomophaga* cell free filtrate alone, for esfenvalerate alone, and for combinations of the cell free filtrate and esfenvalerate.

Esfenvalerate with Cell Free Filtrate Against Fall Armyworm.

Cabbage leaf disks were dipped in either acetone (controls and *Y. entomophaga* alone treatments) or esfenvalerate (Sigma 46277) at 56 mg/L in acetone. These were set to dry for 1 hr. Cabbage disks were then dipped in either undiluted Luria broth (LB) media solution (controls and esfenvalerate alone treatments) or undiluted cell free filtrate from a culture *Y. entomophaga* isolate O43NEW (*Y. entomophaga* alone or in combination with esfenvalerate treatments). After the cabbage disks had dried for 1 hr, a single 3$^{rd}$ instar fall armyworm was added to each individual cabbage disk. A total of 20 insects were evaluate for each treatment. Insects were observed daily and scored as live or dead. Results are shown in Table 74.

TABLE 74

Mortality of 3$^{rd}$ instar fall armyworm treated with esfenvalerate, undiluted cell free filtrate from *Y. entomophaga* isolate O34NEW culture, and a combination of both

| Treatment | LT50 (95% confidence intervals) in days | % Mortality (5DAT) | % Mortality (7DAT) |
|---|---|---|---|
| Esfenvalerate at 56 mg/L | 9.84 (8.37-11.60) | 40 | 45 |
| *Y. entomophaga* isolate O43NEW undiluted filtrate | 36.80 (27.34-51.16) | 0 | 0 |
| Esfenvalerate + *Y. entomophaga* filtrate | 8.97 (7.64-10.55) | 45 | 50 |

LT50 is the estimated time to kill 50% of the insects based on Probit analysis, % mortality is Abbott's corrected and DAT is the days after treatment The data in the above table show the % mortality of fall armyworms at 5 and 7 days, for *Y. entomophaga* isolate O43NEW cell free filtrate alone, for esfenvalerate alone, and for combinations of the cell free filtrate and esfenvalerate.

Esfenvalerate with Cell Free Filtrate Against Black Cutworm.

Cabbage leaf disks were dipped in either acetone (controls and *Y. entomophaga* alone treatments) or esfenvalerate (Sigma 46277) at 5.6 mg/L in acetone. These were set to dry for 1 hr. Cabbage disks were then dipped in either undiluted Luria broth (LB) media solution (controls and esfenvalerate alone treatments) or undiluted cell free filtrate from a culture *Y. entomophaga* isolate O43NEW (*Y. entomophaga* alone or in combination with esfenvalerate treatments). After the cabbage disks had dried for 1 hr, a single 3$^{rd}$ instar black cutworm was added to each individual cabbage disk. A total of 20 insects were evaluate for each treatment. Insects were observed daily and scored as live or dead. Results are shown in Table 75.

TABLE 75

Mortality of 3$^{rd}$ instar black cutworm treated with esfenvalerate, undiluted cell free filtrate *Y. entomophaga* isolate O34NEW culture, and a combination of both

| Treatment | LT50 (95% confidence intervals) in days | % Mortality (6DAT) |
|---|---|---|
| Esfenvalerate at 5.6 mg/L | 3.68 (3.16-4.26) | 84 |
| *Y. entomophaga* isolate O43NEW undiluted filtrate | 16.81 (14.63-19.44) | 5 |
| Esfenvalerate + *Y. entomophaga* filtrate | 3.01 (2.5-3.57) | 100 |

LT50 is the estimated time to kill 50% of the insects based on Probit analysis, % mortality is Abbott's corrected and DAT is the days after treatment The data in the above table show the % mortality of black cutworms at 6 days, for *Y. entomophaga* isolate O43NEW cell free filtrate alone, for esfenvalerate alone, and for combinations of the cell free filtrate and esfenvalerate.

Deltamethrin with Cell Free Filtrate Against Diamondback Moth.

Cabbage leaf disks were dipped in either acetone (controls and *Y. entomophaga* alone treatments) or deltamethrin (Sigma 45423) at 0.29 mg/L in acetone. These were set to dry for 1 hr. Cabbage disks were then dipped in either 1% Luria broth (LB) media solution (controls and deltamethrin alone treatments) or 1% cell free filtrate from a culture of *Y. entomophaga* isolate O43NEW (*Y. entomophaga* alone or in combination with deltamethrin treatments). After the cabbage disks had dried for 1 hr, a single 2$^{nd}$ instar diamondback moth was added to each individual cabbage disk. A total of 20 insects were evaluate for each treatment. Insects were observed daily and scored as live or dead. Results are shown in Table 76.

TABLE 76

Mortality of $2^{rd}$ instar diamondback moth treated with deltamethrin, a 1% concentration of cell free filtrate of *Y. entomophaga* isolate O34NEW culture, and a combination of both

| Treatment | LT50 (95% confidence intervals) in days | % Mortality (2DAT) | % Mortality (3DAT) | % Mortality (4DAT) | % Mortality (7DAT) | % Mortality (9DAT) |
|---|---|---|---|---|---|---|
| Deltamethrin at 0.29 mg/L | 11.58 (9.71-13.87) | 0 | 5 | 16 | 21 | 25 |
| *Y. entomophaga* isolate O43NEW filtrate at 1% | 18.98 (15.53-23.43) | 0 | 0 | 0 | 15 | 11 |
| Deltamethrin + *Y. entomophaga* filtrate | 8.62 (7.37-10.11) | 5 | 20 | 30 | 40 | 44 |

LT50 is the estimated time to kill 50% of the insects based on Probit analysis, % mortality is Abbott's corrected and DAT is the days after treatment The data in the above table show the % mortality of diamondback moths at 2, 3, 4, 7 and 9 days, for *Y. entomophaga* isolate O43NEW cell free filtrate alone, for deltamethrin alone, and for combinations of the cell free filtrate and deltamethrin.

Deltamethrin with Cell Free Filtrate Against Diamondback Moth.

Cabbage leaf disks were dipped in either acetone (controls and *Y. entomophaga* alone treatments) or deltamethrin (Sigma 45423) at 0.22 mg/L in acetone. These were set to dry for 1 hr. Cabbage disks were then dipped in either 1% Luria broth (LB) media solution (controls and deltamethrin alone treatments) or in 1% cell free filtrate from a culture *Y. entomophaga* isolate O333A4 (*Y. entomophaga* alone or in combination with deltamethrin treatments). After the cabbage disks had dried for 1 hr, a single $2^{nd}$ instar diamondback moth was added to each individual cabbage disk. A total of 20 insects were evaluate for each treatment. Insects were observed daily and scored as live or dead. Results are shown in Table 77.

filtrate alone, for deltamethrin alone, and for combinations of the cell free filtrate and deltamethrin.

Example 20. IRAC Group 4A—Neonicotinoids: Examples of Combination of Cell Free Filtrate of *Y. entomophaga* with Clothianidin Against Diamondback Moth and Cabbage Looper; Cell Free Filtrate of *Y. entomophaga* with Imidacloprid and Thiacloprid Against Colorado Potato Beetle; Cell Free Filtrate with Thiacloprid Against Diamondback Moth; and Cell Free Filtrate with Thiamethoxam Against Cabbage Looper Clothianidin with Cell Free Filtrate Against Diamondback Moth.

Cabbage leaf disks were dipped in either acetone (controls and *Y. entomophaga* alone treatments) or clothianidin (Sigma 33589) at 60 mg/L in acetone. These were set to dry for 1 hr. Cabbage disks were then dipped in either 1% Luria broth (LB) media solution (controls and clothianidin alone

TABLE 77

Mortality of $2^{rd}$ instar diamondback moth treated with deltamethrin, a 1% concentration of cell free filtrate of *Y. entomophaga* isolate O333A4 culture, and a combination of both

| Treatment | LT50 (95% confidence intervals) in days | % Mort (3DAT) | % Mort (5DAT) | % Mort (6DAT) | % Mort (7DAT) | % Mort (10DAT) | % Mort (11DAT) | % Mort (12DAT) |
|---|---|---|---|---|---|---|---|---|
| Deltamethrin at 0.22 mg/L | 12.78 (10.77-15.34) | 5 | 20 | 25 | 30 | 30 | 35 | 40 |
| *Y. entomophaga* isolate O333A4 filtrate at 1% | 36.68 (27.48-50.89) | 5 | 5 | 5 | 5 | 5 | 5 | 5 |
| Deltamethrin + *Y. entomophaga* filtrate | 8.66 (7.38-10.19) | 15 | 40 | 40 | 40 | 50 | 60 | 60 |

% Mort is % Mortality
LT50 is the estimated time to kill 50% of the insects based on Probit analysis, % mortality is Abbott's corrected and DAT is the days after treatment The combination of cell free filtrate of *Y. entomophaga* isolate O333A4 with deltamethrin resulted in a significantly lower LT50 than either active alone. The data in the above table also show the % mortality of diamondback moths at 3, 5, 6, 7, 10, 11 and 12 days, for *Y. entomophaga* cell free treatments) or in 1% cell free filtrate from a culture *Y. entomophaga* isolate O43NEW (*Y. entomophaga* alone or in combination with clothianidin treatments). After the cabbage disks had dried for 1 hr, a single $2^{nd}$ instar diamondback moth was added to each individual cabbage disk. A total of 20 insects were evaluate for each treatment. Insects were observed daily and scored as live or dead. Results are shown in Table 78.

TABLE 78

Mortality of $2^{nd}$ instar diamondback moth treated with clothianidin, a 1% concentration of cell free filtrate from a *Y. entomophaga* isolate O34NEW culture, and a combination of both

| Treatment | LT50 (95% confidence intervals) in days | % Mortality (4DAT) | % Mortality (5DAT) |
|---|---|---|---|
| Clothianidin at 60 mg/L | 6.120 (5.092-7.321) | 47 | 53 |
| Y. entomophaga isolate O43NEW filtrate at 1% | 19.365 (15.642-24.427) | 5 | 11 |
| Clothianidin + Y. entomophaga filtrate | 4.193 (3.415-5.086) | 58 | 68 |

LT50 is the estimated time to kill 50% of the insects based on Probit analysis, % mortality is Abbott's corrected and DAT is the days after treatment The combination of cell free filtrate of *Y. entomophaga* isolate O43NEW with chlothianidin resulted in a significantly lower LT50 than either active alone. The data in the above table also show the % mortality of diamondback moths at 4 and 5 days, for *Y. entomophaga* cell free filtrate alone, for clothianidin alone, and for combinations of the cell free filtrate and clothianidin.

Clothianidin with Cell Free Filtrate Against Cabbage Looper.

Cabbage leaf disks were dipped in either acetone (controls and *Y. entomophaga* alone treatments) or clothianidin (Sigma 33589) at 60 mg/L in acetone. These were set to dry for 1 hr. Cabbage disks were then dipped in either Luria broth (LB) media solution (controls and clothianidin alone treatments) or in undiluted cell free filtrate from a culture *Y. entomophaga* isolate O43NEW (*Y. entomophaga* alone or in combination with clothianidin treatments). After the cabbage disks had dried for 1 hr, a single 3rd instar cabbage looper was added to each individual cabbage disk. A total of 20 insects were evaluate for each treatment. Insects were observed daily and scored as live or dead. Results are shown in Table 79.

TABLE 79

Mortality of 3rd instar cabbage looper treated with clothianidin, undiluted cell free filtrate of *Y. entomophaga* isolate O34NEW culture, and a combination of both

| Treatment | LT50 (95% confidence intervals) in days | % Mortality (2DAT) | % Mortality (5DAT) | % Mortality (6DAT) | % Mortality (8DAT) | % Mortality (9DAT) | % Mortality (12DAT) |
|---|---|---|---|---|---|---|---|
| Clothianidin at 60 mg/L | 9.07 (7.93-10.38) | 0 | 30 | 40 | 45 | 50 | 56 |
| *Y. entomophaga* isolate O43NEW undiluted filtrate | 29.56 (23.20-38.36) | 0 | 0 | 0 | 0 | 0 | 6 |
| Clothianidin + *Y. entomophaga* filtrate | 6.03 (5.23-6.91) | 5 | 55 | 65 | 70 | 75 | 72 |

(LT50 is the estimated time to kill 50% of the insects based on Probit analysis, % mortality is Abbott's corrected and DAT is the days after treatment)

The combination of cell free filtrate of *Y. entomophaga* isolate O43NEW with chlothianidin resulted in a significantly lower LT50 than either active alone. The data in the above table also show the % mortality of cabbage loopers at 2, 5, 6, 8, 9 and 12 days, for Y. *entomophaga* cell free filtrate alone, for clothianidin alone, and for combinations of the cell free filtrate and clothianidin.

Imidacloprid with Cell Free Filtrate Against Colorado Potato Beetle.

Tomato leaf disks were dipped in either acetone (controls and *Y. entomophaga* alone treatments) or imidacloprid (Sigma 37894) at 0.56 mg/L in acetone. These were set to dry for 1 hr. Tomato disks were then dipped either in undiluted Luria broth (LB) media solution (controls and imidacloprid alone treatments) or in undiluted cell free filtrate from a culture. After the tomato disks had dried for 1 hr, a single 3rd instar Colorado potato beetle was added to each individual cabbage disk. A total of 20 insects were evaluate for each treatment. Insects were observed daily and scored as live or dead. Results are shown in Table 80.

TABLE 80

Mortality of Colorado potato beetle larve treated with imidacloprid, undiluted cell free filtrate of *Y. entomophaga* isolate O34NEW culture, and a combination of both

| Treatment | LT50 (95% confidence intervals) in days | % Mortality (5DAT) | % Mortality (6DAT) | % Mortality (7DAT) | % Mortality (8DAT) | % Mortality (9DAT) |
|---|---|---|---|---|---|---|
| Imidacloprid at 0.56 mg/L | 18.03 (15.28-21.71) | 0 | 5 | 5 | 11 | 11 |
| *Y. entomophaga* isolate O43NEW undiluted filtrate | 6.29 (5.48-7.19) | 47 | 47 | 58 | 61 | 61 |
| Imidacloprid + *Y. entomophaga* filtrate | 3.85 (3.16-4.63) | 72 | 86 | 86 | 85 | 93 |

LT50 is the estimated time to kill 50% of the insects based on Probit analysis, % mortality is Abbott's corrected and DAT is the days after treatment The combination of cell free filtrate of *Y. entomophaga* isolate O43NEW with imidacloprid resulted in a significantly lower LT50 than either active alone. The data in the above table also show the % mortality of Colorado potato beetles at 5, 6, 7, 8 and 9 days, for *Y. entomophaga* cell free filtrate alone, for imidacloprid alone, and for combinations of the cell free filtrate and imidacloprid.

Thiacloprid with Cell Free Filtrate Against Colorado Potato Beetle.

Tomato leaf disks were dipped in either acetone (controls and *Y. entomophaga* alone treatments) or thiacloprid (Sigma 37905) at 1 mg/L in acetone. These were set to dry for 1 hr. Tomato disks were then dipped either in undiluted Luria broth (LB) media solution (controls and imidacloprid alone treatments) or in undiluted cell free filtrate from a culture *Y. entomophaga* isolate O43NEW (*Y. entomophaga* alone or in combination with imidacloprid treatments). After the tomato disks had dried for 1 hr, a single 3$^{rd}$ instar Colorado potato beetle was added to each individual cabbage disk. A total of 20 insects were evaluate for each treatment. Insects were observed daily and scored as live or dead. Results are shown in Table 81.

The combination of cell free filtrate of *Y. entomophaga* isolate O43NEW with thiacloprid resulted in a significantly lower LT50 than either active alone. The data in the above table also show the % mortality of Colorado potato beetles at 5, 6, 7, 8 and 9 days, for *Y. entomophaga* cell free filtrate alone, for thiacloprid alone, and for combinations of the cell free filtrate and thiacloprid.

Thiacloprid with Cell Free Filtrate Against Diamondback Moth.

Cabbage leaf disks were dipped in either acetone (controls and *Y. entomophaga* alone treatments) or thiacloprid (Sigma 37905) at 100 mg/L in acetone. These were set to dry for 1 hr. Cabbage disks were then dipped in either 1% Luria broth (LB) media solution (controls and thiacloprid alone treatments) or in 1% cell free filtrate from a culture *Y. entomophaga* isolate O24G3R (*Y. entomophaga* alone or in combination with thiacloprid treatments). After the cabbage disks had dried for 1 hr, a single 2$^{nd}$ instar diamondback moth was added to each individual cabbage disk. A total of 20 insects were evaluate for each treatment. Insects were observed daily and scored as live or dead. Results are shown in Table 82.

TABLE 81

Mortality of Colorado potato beetle larve treated with thiacloprid, undiluted cell free filtrate of an *Y. entomophaga* isolate O34NEW culture, and a combination of both

| Treatment | LT50 (95% confidence intervals) in days | % Mortality (5DAT) | % Mortality (6DAT) | % Mortality (7DAT) | % Mortality (8DAT) | % Mortality (9DAT) |
|---|---|---|---|---|---|---|
| Thiacloprid at 1 mg/L | 12.71 (10.77-15.13) | 13 | 13 | 18 | 19 | 25 |
| *Y. entomophaga* isolate O43NEW undiluted filtrate | 6.29 (5.48-7.19) | 47 | 47 | 58 | 61 | 61 |
| Thiacloprid + *Y. entomophaga* filtrate | 3.58 (2.92-4.34) | 73 | 86 | 86 | 85 | 92 |

LT50 is the estimated time to kill 50% of the insects based on Probit analysis, % mortality is Abbott's corrected and DAT is the days after treatment

TABLE 82

Mortality of 2$^{rd}$ instar diamondback moth treated with thiacloprid, a 1% concentration of a cell free filtrate of an *Y. entomophaga* isolate O24G3R culture, and a combination of both

| Treatment | LT50 (95% confidence intervals) in days | % Mortality (4DAT) | % Mortality (5DAT) | % Mortality (6DAT) | % Mortality (7DAT) | % Mortality (12DAT) | % Mortality (13DAT) |
|---|---|---|---|---|---|---|---|
| Thiacloprid at 100 mg/L | 12.58 (10.86-14.62) | 5 | 10 | 10 | 17 | 27 | 33 |
| *Y. entomophaga* isolate O24G3R filtrate at 1% | 21.82 (18.11-26.53) | 5 | 5 | 0 | 0 | 0 | 0 |
| Thiacloprid + *Y. entomophaga* filtrate | 9.31 (8.11-10.69) | 15 | 30 | 26 | 39 | 47 | 53 |

LT50 is the estimated time to kill 50% of the insects based on Probit analysis, % mortality is Abbott's corrected and DAT is the days after treatment The combination of cell free filtrate of *Y. entomophaga* isolate O24G3R with thiacloprid resulted in a significantly lower LT50 than either active alone. The data in the above table also show the % mortality of diamondback moths at 4, 5, 6, 7, 12 and 13 days, for *Y. entomophaga* cell free filtrate alone, for thiacloprid alone, and for combinations of the cell free filtrate and thiacloprid.

Thiamethoxam with Cell Free Filtrate Against Cabbage Looper.

Cabbage leaf disks were dipped in either acetone (controls and *Y. entomophaga* alone treatments) or thiamethoxam (Sigma 37924) at 150 mg/L in acetone. These were set to dry for 1 hr. Cabbage disks were then dipped in either undiluted phosphate buffer (controls and thiamethoxam alone treatments) or undiluted cell free filtrate from a culture *Y. entomophaga* isolate O43NEW (*Y. entomophaga* alone or in combination with thiamethoxam treatments). After the cabbage disks had dried for 1 hr, a single 3$^{rd}$ instar cabbage looper was added to each individual cabbage disk. A total of 20 insects were evaluated for each treatment. Insects were observed daily and scored as live or dead. Results are shown in Table 83.

TABLE 83

Mortality of 3$^{rd}$ instar cabbage looper treated with thiamethoxam, undiluted cell free filtrate from *Y. entomophaga* isolate O43NEW culture, and a combination of both

| Treatment | LT50 (95% confidence intervals) in days | % Mortality (5DAT) | % Mortality (7DAT) |
|---|---|---|---|
| Thiamethoxam at 150 mg/L | 6.97 (5.92-8.22) | 39 | 31 |
| *Y. entomophaga* isolate O43NEW filtrate undiluted | 7.33 (6.24-8.65) | 22 | 31 |

TABLE 83-continued

Mortality of 3$^{rd}$ instar cabbage looper treated with thiamethoxam, undiluted cell free filtrate from *Y. entomophaga* isolate O43NEW culture, and a combination of both

| Treatment | LT50 (95% confidence intervals) in days | % Mortality (5DAT) | % Mortality (7DAT) |
|---|---|---|---|
| Thiamethoxam + *Y. entomophaga* filtrate | 4.39 (3.64-5.21) | 67 | 69 |

LT50 is the estimated time to kill 50% of the insects based on Probit analysis, % mortality is Abbott's corrected and DAT is the days after treatment The combination of cell free filtrate of *Y. entomophaga* isolate O43NEW with Thiamethoxam resulted in a significantly lower LT50 than either active alone. The data in the above table also show the % mortality of cabbage loopers at 5 and 7 days, for *Y. entomophaga* cell free filtrate alone, for thiamethoxam alone, and for combinations of the cell free filtrate and thiamethoxam.

Example 21. IRAC Group 5—Spinosyns: Example of Combination of Cell Free Filtrate of *Y. entomophaga* with Spinosad Against Diamondback Moth, Cabbage Looper and Colorado Potato Beetle Spinosad with Cell Free Filtrate Against Diamondback Moth.

Cabbage leaf disks were dipped in either acetone (controls and *Y. entomophaga* alone treatments) or spinosad (Sigma 33706) at 0.25 mg/L in acetone. These were set to dry for 1 hr. Cabbage disks were then dipped in either 1% Luria broth (LB) media solution (controls and spinosad alone treatments) or in 1% cell free filtrate from a culture *Y. entomophaga* isolate O43NEW (*Y. entomophaga* alone or in combination with spinosad treatments). After the cabbage disks had dried for 1 hr, a single 2$^{nd}$ instar diamondback moth was added to each individual cabbage disk. A total of 20 insects were evaluate for each treatment. Insects were observed daily and scored as live or dead. Results are shown in Table 84.

TABLE 84

Mortality of 2$^{nd}$ instar diamondback moth treated with spinosad, 1% concentration of cell free filtrate of a *Y. entomophaga* isolate O34NEW culture, and a combination of both

| Treatment | LT50 (95% confidence intervals) in days | % Mortality (2DAT) | % Mortality (3DAT) | % Mortality (4DAT) | % Mortality (9DAT) | % Mortality (11DAT) |
|---|---|---|---|---|---|---|
| Spinosad at 0.25 mg/L | 8.16 (6.95-9.60) | 0 | 10 | 15 | 42 | 65 |
| *Y. entomophaga* isolate O43NEW 1% filtrate | 18.98 (15.53-23.43) | 0 | 0 | 0 | 11 | 12 |
| Spinosad + *Y. entomophaga* filtrate | 6.15 (5.22-7.25) | 5 | 15 | 31 | 54 | 87 |

LT50 is the estimated time to kill 50% of the insects based on Probit analysis, % mortality is Abbott's corrected and DAT is the days after treatment The data in the above table show the % mortality of diamondback moths at 2, 3, 4, 9 and 11 days, for *Y. entomophaga* isolate O43NEW cell free filtrate alone, for spinosad alone, and for combinations of the cell free filtrate and spinosad.

Spinosad with Cell Free Filtrate Against Cabbage Looper.

Cabbage leaf disks were dipped in either acetone (controls and *Y. entomophaga* alone treatments) or spinosad (Sigma 33706) at 7.5 mg/L in acetone. These were set to dry for 1 hr. Cabbage disks were then dipped in either undiluted Luria broth (LB) media solution (controls and spinosad alone treatments) or undiluted cell free filtrate from a culture *Y. entomophaga* isolate O43NEW (*Y. entomophaga* alone or in combination with spinosad treatments). After the cabbage disks had dried for 1 hr, a single 3$^{rd}$ instar cabbage looper was added to each individual cabbage disk. A total of 20 insects were evaluated for each treatment. Insects were observed daily and scored as live or dead. Results are shown in Table 85.

TABLE 85

Mortality of 3$^{rd}$ instar cabbage looper treated with spinosad, undiluted cell free filtrate from an *Y. entomophaga* isolate O34NEW culture, and a combination of both

| Treatment | LT50 (95% confidence intervals) in days | % Mortality (2DAT) | % Mortality (5DAT) | % Mortality (6DAT) | % Mortality (8DAT) | % Mortality (9DAT) |
|---|---|---|---|---|---|---|
| Spinosad at 7.5 mg/L | 7.01 (6.11-8.03) | 10 | 25 | 50 | 55 | 55 |
| *Y. entomophaga* isolate O43NEW undiluted filtrate | 29.56 (23.20-38.36) | 0 | 0 | 0 | 0 | 0 |
| Spinosad + *Y. entomophaga* filtrate | 5.68 (4.92-6.52) | 15 | 45 | 70 | 70 | 75 |

LT50 is the estimated time to kill 50% of the insects based on Probit analysis, % mortality is Abbott's corrected and DAT is the days after treatment The data in the above table show the % mortality of cabbage loopers at 2, 5, 6, 8 and 9 days, for *Y. entomophaga* isolate O43NEW cell free filtrate alone, for spinosad alone, and for combinations of the cell free filtrate and spinosad.

Spinosad with Cell Free Filtrate Against Colorado Potato Beetle.

Tomato leaf disks were dipped in either acetone (controls and *Y. entomophaga* alone treatments) or spinosad (Sigma 33706) at 2.5 mg/L in acetone. These were set to dry for 1 hr. Tomato disks were then dipped in either undiluted Luria broth (LB) media solution (controls and imidacloprid alone treatments) or in undiluted cell free filtrate from a culture of *Y. entomophaga* isolate O43NEW (*Y. entomophaga* alone or in combination with imidacloprid treatments. After the tomato disks had dried for 1 hr, a single $3^{rd}$ instar Colorado potato beetle was added to each individual cabbage disk. A total of 20 insects were evaluate for each treatment. Insects were observed daily and scored as live or dead. Results are shown in Table 86.

TABLE 86

Mortality of Colorado potato beetle larve treated with spino sad, undiluted cell free filtrate of an *Y. entomophaga* isolate O34NEW culture, and a combination of both

| Treatment | LT50 (95% confidence intervals) in days | % Mortality (1DAT) | % Mortality (2DAT) | % Mortality (5DAT) | % Mortality (6DAT) | % Mortality (7DAT) | % Mortality (8DAT) | % Mortality (9DAT) |
|---|---|---|---|---|---|---|---|---|
| Spinosad at 2.5 mg/L | 78.3 (40.51-172.84) | 0 | 0 | 5 | 5 | 5 | 10 | 10 |
| *Y. entomophaga* isolate O43NEW undiluted filtrate | 7.70 (5.38-11.26) | 0 | 0 | 30 | 50 | 55 | 60 | 75 |
| Spinosad + *Y. entomophaga* filtrate | 1.4 (0.88-2.09) | 5 | 10 | 95 | 100 | 100 | 100 | 100 |

LT50 is the estimated time to kill 50% of the insects based on Probit analysis, % mortality is Abbott's corrected and DAT is the days after treatment The combination of cell free filtrate of *Y. entomophaga* isolate O43NEW with spinosad resulted in a significantly lower LT50 than either active alone. The data in the above table also show the % mortality of Colorado potato beetles at 1, 2, 5, 6, 7, 8 and 9 days, for *Y. entomophaga* cell free filtrate alone, for spinosad alone, and for combinations of the cell free filtrate and spinosad.

Example 22. IRAC Group 6—Avermectins, Mibemycin: Example of Combination of Cell Free Filtrate of *Y. entomophaga* with Emamectin Benzoate Against Cabbage Looper and Diamondback Moth Emamectin Benzoate with Cell Free Filtrate Against Cabbage Looper.

Cabbage leaf disks were dipped in either acetone (controls and *Y. entomophaga* alone treatments) or emamectin benzoate (Sigma 31733) at 0.02 mg/L in acetone. These were set to dry for 1 hr. Cabbage disks were then dipped in either undiluted Luria broth (LB) media solution (controls and emamectin benzoate alone treatments) or undiluted cell free filtrate from a culture of *Y. entomophaga* isolate O43NEW (*Y. entomophaga* alone or in combination with emamectin benzoate treatments). After the cabbage disks had dried for 1 hr, a single $3^{rd}$ instar cabbage looper was added to each individual cabbage disk. A total of 20 insects were evaluate for each treatment. Insects were observed daily and scored as live or dead. Results are shown in Table 87.

TABLE 87

Mortality of $3^{rd}$ instar cabbage looper treated with emamectin benzoate, undiluted cell free filtrate *Y. entomophaga* isolate O34NEW culture, and a combination of both

| Treatment | LT50 (95% confidence intervals) in days | % Mortality (5DAT) | % Mortality (12DAT) |
|---|---|---|---|
| Emamectin benzoate at 0.02 mg/L | 7.22 (6.57-7.91) | 5 | 94 |
| *Y. entomophaga* isolate O43NEW undiluted filtrate | 17.48 (15.41-20.02) | 0 | 0 |

TABLE 87-continued

Mortality of $3^{rd}$ instar cabbage looper treated with emamectin benzoate, undiluted cell free filtrate *Y. entomophaga* isolate O34NEW culture, and a combination of both

| Treatment | LT50 (95% confidence intervals) in days | % Mortality (5DAT) | % Mortality (12DAT) |
|---|---|---|---|
| Emamectin benzoate + *Y. entomophaga* filtrate | 7.10 (6.44-7.80) | 10 | 100 |

LT50 is the estimated time to kill 50% of the insects based on Probit analysis, % mortality is Abbott's corrected and DAT is the days after treatment The data in the above table show the % mortality of cabbage loopers at 5 and 12 days, for *Y. entomophaga* isolate O43NEW cell free filtrate alone, for emamectin benzoate alone, and for combinations of the cell free filtrate and emamectin benzoate.

Emamectin Benzoate with Cell Free Filtrate Against Diamondback Moth.

Cabbage leaf disks were dipped in either acetone (controls and *Y. entomophaga* alone treatments) or emamectin benzoate (Sigma 31733) at 0.002 mg/L in acetone. These were set to dry for 1 hr. Cabbage disks were then dipped in either 1% Luria broth (LB) media solution (controls and emamectin benzoate alone treatments) or 1% cell free filtrate from a culture *Y. entomophaga* isolate O43NEW (*Y. entomophaga* alone or in combination with emamectin benzoate treatments). After the cabbage disks had dried for 1 hr, a single $3^{rd}$ instar diamondback moth was added to each individual cabbage disk. A total of 20 insects were evaluate for each treatment. Results are shown in Table 88.

TABLE 88

Mortality of $3^{rd}$ instar diamondback moth treated with emamectin benzoate, 1% concentration of cell free filtrate of a *Y. entomophaga* isolate O34NEW culture, and a combination of both

| Treatment | LT50 (95% confidence intervals) in days |
|---|---|
| Emamectin benzoate at 0.002 mg/L | 6.21 (5.38-7.14) |
| *Y. entomophaga* isolate O43NEW 1% filtrate | 7.63 (6.69-8.71) |
| Emamectin benzoate + *Y. entomophaga* filtrate | 4.57 (3.91-5.31) |

LT50 is the estimated time to kill 50% of the insects based on Probit analysis, % mortality is Abbott's corrected and DAT is the days after treatment The combination of cell free filtrate of *Y. entomophaga* isolate O43NEW with emamectin benzoate resulted in a significantly lower LT50 than either active alone.

Example 23. IRAC Group 15—Benzoylureas: Example of Combination of Cell Free Filtrate of *Y. Entomophaga* with Novaluron Against Cabbage Looper Novaluron with Cell Free Filtrate Against Cabbage Looper.

Cabbage leaf disks were dipped in either acetone (controls and *Y. entomophaga* alone treatments) or novaluron (Sigma 32419) at 1.0 mg/L in acetone. These were set to dry for 1 hr. Cabbage disks were then dipped in either undiluted Luria broth (LB) media solution (controls and novaluron alone treatments) or undiluted cell free filtrate from a culture of *Y. entomophaga* isolate O43NEW (*Y. entomophaga* alone or in combination with novaluron treatments). After the cabbage disks had dried for 1 hr, a single $3^{rd}$ instar cabbage looper was added to each individual cabbage disk. A total of 20 insects were evaluate for each treatment. Insects were observed daily and scored as live or dead. Results are shown in Table 89.

TABLE 89

Mortality of $3^{rd}$ instar cabbage looper treated with novaluron, undiluted cell free filtrate of an *Y. entomophaga* isolate O34NEW culture, and a combination of both

| Treatment | LT50 (95% confidence intervals) in days | % Mortality (5DAT) | % Mortality (6DAT) |
|---|---|---|---|
| Novaluron at 1.0 mg/L | 7.31 (6.65-8.04) | 0 | 0 |
| *Y. entomophaga* isolate O43NEW undiluted filtrate | 17.48 (15.41-20.02) | 0 | 10 |
| Novaluron + *Y. entomophaga* filtrate | 7.00 (6.36-7.67) | 20 | 25 |

LT50 is the estimated time to kill 50% of the insects based on Probit analysis, % mortality is Abbott's corrected and DAT is the days after treatment The data in the above table also show the % mortality of cabbage loopers at 5 and 6 days, for *Y. entomophaga* isolate O43NEW cell free filtrate alone, for novaluron alone, and for combinations of the cell free filtrate and novaluron.

Example 24. IRAC Group 22A—Oxadiazines: Example of Combination of Cell Free Filtrate of *Y. entomophaga* with Indoxacarb Against Diamondback Moth, Black Cutworm and Cabbage Looper Indoxacarb with Cell Free Filtrate Against Diamondback Moth.

Cabbage leaf disks were dipped in either acetone (controls and *Y. entomophaga* alone treatments) or in indoxacarb (Sigma 33969) at 1.6 mg/L in acetone. These were set to dry for 1 hr. Cabbage disks were then dipped in either 1% Luria broth (LB) media solution (controls and indoxacarb alone treatments) or in 1% cell free filtrate from a culture *Y. entomophaga* isolate O43NEW (*Y. entomophaga* alone or in combination with indoxacarb treatments). After the cabbage disks had dried for 1 hr, a single $2^{nd}$ instar diamondback moth was added to each individual cabbage disk. A total of 20 insects were evaluate for each treatment. Insects were observed daily and scored as live or dead. Results are shown in Table 90.

TABLE 90

Mortality of $2^{nd}$ instar diamondback moth treated with indoxacarb, a 1% concentration of cell free filtrate *Y. entomophaga* isolate O43NEW culture, and a combination of both

| Treatment | LT50 (95% confidence intervals) in days | % Mortality (4DAT) | % Mortality (5DAT) |
|---|---|---|---|
| Indoxacarb at 1.6 mg/L | 3.47 (2.77-4.29) | 0 | 53 |
| *Y. entomophaga* isolate O43NEW 1% filtrate | 19.37 (15.64-24.42) | 5 | 11 |
| Indoxacarb + *Y. entomophaga* filtrate | 2.52 (1.95-3.19) | 26 | 79 |

LT50 is the estimated time to kill 50% of the insects based on Probit analysis, % mortality is Abbott's corrected and DAT is the days after treatment The data in the above table show the % mortality of diamondback moths at 4 and 5 days, for *Y. entomophaga* O43NEW cell free filtrate alone, for indoxacarb alone, and for combinations of the cell free filtrate and indoxacarb.

Indoxacarb with Cell Free Filtrate Against Black Cutworm.

Cabbage leaf disks were dipped in either acetone (controls and *Y. entomophaga* alone treatments) or in indoxacarb (Sigma 33969) at 0.53 mg/L in acetone. These were set to dry for 1 hr. Cabbage disks were then dipped in either undiluted Luria broth (LB) media solution (controls and indoxacarb alone treatments) or in undiluted cell free filtrate from a culture of *Y. entomophaga* isolate O43NEW (*Y. entomophaga* alone or in combination with indoxacarb treatments). After the cabbage disks had dried for 1 hr, a single $2^{nd}$ instar black cutworm was added to each individual cabbage disk. A total of 20 insects were evaluate for each treatment. Insects were observed daily and scored as live or dead. Results are shown in Table 91.

TABLE 91

Mortality of 2$^{nd}$ instar black cutworm treated with indoxacarb, undiluted cell free filtrate of an *Y. entomophaga* isolate O43NEW culture, and a combination of both

| Treatment | LT50 (95% confidence intervals) in days | % Mortality (2DAT) | % Mortality (6DAT) | % Mortality (8DAT) | % Mortality (9DAT) |
|---|---|---|---|---|---|
| Indoxacarb at 0.53 mg/L | 10.99 (9.75-12.42) | 0 | 0 | 11 | 21 |
| *Y. entomophaga* isolate O43NEW undiluted filtrate | 16.81 (14.63-19.44) | 0 | 5 | 5 | 11 |
| Indoxacarb + *Y. entomophaga* filtrate | 9.03 (8.05-10.13) | 5 | 11 | 26 | 53 |

LT50 is the estimated time to kill 50% of the insects based on Probit analysis, % mortality is Abbott's corrected and DAT is the days after treatment The data in the above table show the % mortality of black cutworm at 2, 6, 8 and 9 days, for *Y. entomophaga* O43NEW cell free filtrate alone, for indoxacarb alone, and for combinations of the cell free filtrate and indoxacarb.

Indoxacarb with Cell Free Filtrate Against Cabbage Looper.

Cabbage leaf disks were dipped in either acetone (controls and *Y. entomophaga* alone treatments) or indoxacarb (Sigma 33969) at 0.53 mg/L in acetone. These were set to dry for 1 hr. Cabbage disks were then dipped in either undiluted Luria broth (LB) media solution (controls and indoxacarb alone treatments) or in undiluted cell free filtrate from a culture of *Y. entomophaga* isolate O43NEW (*Y. entomophaga* alone or in combination with indoxacarb treatments). After the cabbage disks had dried for 1 hr, a single 2$^{nd}$ instar cabbage looper was added to each individual cabbage disk. A total of 20 insects were evaluate for each treatment. Insects were observed daily and scored as live or dead. Results are shown in Table 92.

TABLE 92

Mortality of 2$^{rd}$ instar cabbage looper treated with indoxacarb, undiluted cell free filtrate of an *Y. entomophaga* isolate O43NEW culture, and a combination of both

| Treatment | LT50 (95% confidence intervals) in days | % Mortality (2DAT) | % Mortality (6DAT) | % Mortality (7DAT) | % Mortality (8DAT) | % Mortality (9DAT) | % Mortality (12DAT) | % Mortality (14DAT) |
|---|---|---|---|---|---|---|---|---|
| Indoxacarb at 0.53 mg/L | 11.98 (10.38-13.89) | 0 | 15 | 15 | 25 | 25 | 61 | 59 |
| *Y. entomophaga* isolate O43NEW undiluted filtrate | 29.56 (23.20-38.36) | 0 | 0 | 0 | 0 | 0 | 6 | 0 |
| Indoxacarb + *Y. entomophaga* filtrate | 6.96 (6.05-7.99) | 5 | 25 | 50 | 65 | 80 | 83 | 82 |

LT50 is the estimated time to kill 50% of the insects based on Probit analysis, % mortality is Abbott's corrected and DAT is the days after treatment The combination of cell free filtrate of *Y. entomophaga* isolate O43NEW with indoxacarb resulted in a significantly lower LT50 than either active alone. The data in the above table also show the % mortality of cabbage loopers at 2, 4, 6, 7, 8, 9, 12 and 14 days, for *Y. entomophaga* cell free filtrate alone, for indoxacarb alone, and for combinations of the cell free filtrate and indoxacarb.

Example 25. IRAC Group 23—Tetronic and Tetramic Acid Derivatives: Example of Combination of Cell Free Filtrate of *Y. entomophaga* with Spirotetramat Against Diamondback Moth Spirotetramat with Cell Free Filtrate Against Diamondback Moth.

Cabbage leaf disks were dipped in either acetone (controls and *Y. entomophaga* alone treatments) or in spirotetramat (Sigma 32713) at 30 mg/L in acetone. These were set to dry for 1 hr. Cabbage disks were then dipped either in 1% Luria broth (LB) media solution (controls and indoxacarb alone treatments) or in a 1% cell free filtrate from a culture of *Y. entomophaga* isolate O43NEW (*Y. entomophaga* alone or in combination with spirotetramat treatments). After the cabbage disks had dried for 1 hr, a single $2^{nd}$ instar diamondback moth was added to each individual cabbage disk. A total of 20 insects were evaluate for each treatment. Insects were observed daily and scored as live or dead. Results are shown in Table 93.

TABLE 93

Mortality of $2^{nd}$ instar diamondback moth treated with spirotetramat, a 1% concentration of cell free filtrate *Y. entomophaga* isolate O43NEW culture, and a combination of both

| Treatment | LT50 (95% confidence intervals) in days | % Mortality (4DAT) | % Mortality (5DAT) | % Mortality (6DAT) | % Mortality (7DAT) |
|---|---|---|---|---|---|
| Spirotetramat at 30 mg/L | 21.02 (16.86-26.76) | 5 | 5 | 11 | 16 |
| *Y. entomophaga* isolate O43NEW 1% filtrate | 19.37 (15.64-24.42) | 5 | 11 | 16 | 16 |
| Spirotetramat + *Y. entomophaga* filtrate | 8.21 (6.85-9.83) | 16 | 32 | 48 | 53 |

LT50 is the estimated time to kill 50% of the insects based on Probit analysis, % mortality is Abbott's corrected and DAT is the days after treatment The combination of cell free filtrate of *Y. entomophaga* isolate O43NEW with spirotetramat resulted in a significantly lower LT50 than either active alone. The data in the above table also show the % mortality of diamondback moths at 4, 5, 6 and 7 days, for *Y. entomophaga* cell free filtrate alone, for spirotetramat alone, and for combinations of the cell free filtrate and spirotetramat.

Spirotetramat with Cell Free Filtrate Against Diamondback Moth.

Cabbage leaf disks were dipped in either acetone (controls and *Y. entomophaga* alone treatments) or spirotetramat (Sigma 32713) at 30 mg/L in acetone. These were set to dry for 1 hr. Cabbage disks were then dipped either in 1% Luria broth (LB) media solution (controls and indoxacarb alone treatments) or in 1% cell free filtrate from a culture of *Y. entomophaga* isolate O24G3R (*Y. entomophaga* alone or in combination with spirotetramat treatments). After the cabbage disks had dried for 1 hr, a single $2^{nd}$ instar diamondback moth was added to each individual cabbage disk. A total of 20 insects were evaluated for each treatment. Insects were observed daily and scored as live or dead. Results are shown in Table 94.

TABLE 94

Mortality of $2^{nd}$ instar diamondback moth treated with spirotetramat, a 1% concentration of cell free filtrate of an *Y. entomophaga* isolate O24G3R culture, and a combination of both

| Treatment | LT50 (95% confidence intervals) in days | % Mortality (6DAT) | % Mortality (10DAT) | % Mortality (11DAT) | % Mortality (14DAT) |
|---|---|---|---|---|---|
| Spirotetramat at 30 mg/L | 23.41 (19.1-28.86) | 0 | 0 | 0 | 0 |
| *Y. entomophaga* isolate O24G3R filtrate | 21.82 (18.12-26.53) | 0 | 0 | 0 | 3 |
| Spirotetramat + *Y. entomophaga* filtrate | 13.49 (11.60-15.76) | 5 | 31 | 38 | 33 |

LT50 is the estimated time to kill 50% of the insects based on Probit analysis, % mortality is Abbott's corrected and DAT is the days after treatment The combination of cell free filtrate of *Y. entomophaga* isolate O24G3R with spirotetramat resulted in a significantly lower LT50 than either active alone. The data in the above table also show the % mortality of diamondback moths at 6, 10, 11 and 14 days, for *Y. entomophaga* cell free filtrate alone, for spirotetramat alone, and for combinations of the cell free filtrate and spirotetramat.

Example 26. IRAC Group 28—Diamides: Example of Combination of Cell Free Filtrate of *Y. entomophaga* with Flubendiamide Against Diamondback Moth and Black Cutworm Flubendiamide with Cell Free Filtrate Against Diamondback Moth.

Cabbage leaf disks were dipped in either acetone (controls and *Y. entomophaga* alone treatments) or flubendiamide (Sigma 32801) at 0.059 mg/L in acetone. These were set to dry for 1 hr. Cabbage disks were then dipped either in 1% Luria broth (LB) media solution (controls and flubendiamide alone treatments) or in a 1% cell free filtrate from a culture of *Y. entomophaga* isolate O43NEW (*Y. entomophaga* alone or in combination with flubendiamide treatments. After the cabbage disks had dried for 1 hr, a single $2^{nd}$ instar diamondback moth was added to each individual cabbage disk. A total of 20 insects were evaluate for each treatment. Insects were observed daily and scored as live or dead. Results are shown in Table 95.

TABLE 95

Mortality of $2^{rd}$ instar diamondback moth treated with flubendiamide, a 1% concentration of cell free filtrate of an *Y. entomophaga* isolate O43NEW culture, and a combination of both

| Treatment | LT50 (95% confidence intervals) in days | % Mortality (4DAT) | % Mortality (5DAT) | % Mortality (6DAT) | % Mortality (7DAT) | % Mortality (11DAT) |
|---|---|---|---|---|---|---|
| Flubendiamide at 0.059 mg/L | 6.52 (5.40-7.83) | 16 | 32 | 32 | 58 | 67 |
| *Y. entomophaga* isolate O43NEW 1% filtrate | 19.37 (15.64-24.42) | 5 | 11 | 16 | 16 | 17 |
| Flubendiamide + *Y. entomophaga* filtrate | 3.25 (2.58-4.03) | 26 | 53 | 84 | 89 | 100 |

LT50 is the estimated time to kill 50% of the insects based on Probit analysis, % mortality is Abbott's corrected and DAT is the days after treatment The combination of cell free filtrate of *Y. entomophaga* isolate O43NEW with flubendiamide resulted in a significantly lower LT50 than either active alone. The data in the above table also show the % mortality of diamondback moths at 4, 5, 6, 7 and 11 days, for *Y. entomophaga* cell free filtrate alone, for flubendiamide alone, and for combinations of the cell free filtrate and flubendiamide.

Flubendiamide with Cell Free Filtrate Against Black Cutworm.

Cabbage leaf disks were dipped in either acetone (controls and *Y. entomophaga* alone treatments) or in flubendiamide (Sigma 32801) at 0.59 mg/L in acetone. These were set to dry for 1 hr. Cabbage disks were then dipped either in undiluted Luria broth (LB) media solution (controls and flubendiamide alone treatments) or in undiluted filtrate from a culture of *Y. entomophaga* isolate O43NEW (*Y. entomophaga* alone or in combination with flubendiamide treatments). After the cabbage disks had dried for 1 hr, a single $2^{nd}$ instar black cutworm was added to each individual cabbage disk. A total of 20 insects were evaluate for each treatment. Insects were observed daily and scored as live or dead. Results are shown in Table 96.

TABLE 96

Mortality of $2^{rd}$ instar black cutworm treated with flubendiamide, an undiluted cell free filtrate of an *Y. entomophaga* isolate O43NEW culture, and a combination of both

| Treatment | LT50 (95% confidence intervals) in days | % Mortality (5DAT) | % Mortality (6DAT) | % Mortality (7DAT) | % Mortality (8DAT) | % Mortality (9DAT) |
|---|---|---|---|---|---|---|
| Flubendiamide at 0.59 mg/L | 7.05 (6.27-7.93) | 0 | 37 | 42 | 53 | 74 |
| *Y. entomophaga* isolate O43NEW undiluted filtrate | 16.81 (14.63-19.44) | 5 | 5 | 5 | 5 | 11 |
| Flubendiamide + *Y. entomophaga* filtrate | 5.97 (5.28-6.75) | 11 | 53 | 63 | 74 | 79 |

LT50 is the estimated time to kill 50% of the insects based on Probit analysis, % mortality is Abbott's corrected and DAT is the days after treatment The data in the above table also show the % mortality of black cutworm at 5, 6, 7, 8 and 9 days, for *Y. entomophaga* cell free filtrate alone, for flubendiamide alone, and for combinations of the cell free filtrate and flubendiamide.

Example 27. Summary of Insect Killing (% Mortality) Using Combinations of *Yersinia entomophaga* Cell-Free Filtrates and Chemical Insecticides The table below is a summary of selected, but representative data, from Examples 17-26. Each row of the table includes data from a selected experiment described in one of the Examples 17-26. The columns in the table, from left to right, indicate the IRAC group of the chemical insecticide; the specific chemical insectide and concentration used in the experiment; the insect that the chemical insecticide, filtrate, or chemical insecticide+filtrate was tested against; the isolate of *Yersinia entomophaga* from which the filtrate was obtained and whether it was used undiluted or diluted 1:100; the % mortality of the insect exposed to the chemical insecticide alone; the % mortality of the insect exposed to the *Yersinia entomophaga* filtrate alone; the % mortality of the insect exposed to the combination of chemical insecticide and filtrate; a calculated index of performance for the combination as compared to the individual components of the combination tested alone (performance index=actual mortality of insects exposed to the combination of chemical insecticide and filtrate divided by the cumulative mortality of insects exposed to the chemical insecticide and filtrate individually); and the time point of insect killing (days after treatment) at which the data to calculate the performance index were collected.

TABLE 97

Summary of data from Examples 17-26 using *Yersinia* cell free filtrates and insecticides

| IRAC Group | Chemical (mg/L) | Insect | *Yersinia* Cell Free Filtrate (% w/w) | % Mort. Chem. | % Mort. Filtrate | % Mort. Chem. + Filtrate | Performance Index | DAT |
|---|---|---|---|---|---|---|---|---|
| 1B | Chlorpyrifos (3.8) | Diamondback moth | O43NEW (1%) | 74 | 5 | 84 | 1.1 | 4 |
| 2B | Fipronil (12) | Fall armyworm | O43NEW (100%) | 0 | 0 | 30 | 1.0 or less | 8 |
| 3A | Esfenvalerate (0.56) | Cabbage Looper | O43NEW (100%) | 40 | 0 | 85 | 2.1 | 5 |
| 3A | Esfenvalerate (56) | Fall armyworm | O43NEW (100%) | 40 | 0 | 45 | 1.1 | 5 |
| 3A | Esfenvalerate (5.6) | Black cutworm | O43NEW (100%) | 84 | 5 | 100 | 1.1 | 6 |
| 3A | Deltamethrin (0.29) | Diamondback moth | O43NEW (1%) | 16 | 0 | 30 | 1.88 | 4 |
| 3A | Deltamethrin (0.22) | Diamondback moth | O333A4 (1%) | 20 | 5 | 40 | 1.6 | 5 |
| 4A | Clothianidin (60) | Diamondback moth | O43NEW (1%) | 47 | 5 | 58 | 1.12 | 4 |
| 4A | Clothianidin (60) | Cabbage Looper | O43NEW (100%) | 30 | 0 | 55 | 1.83 | 5 |
| 4A | Imidacloprid (0.56) | Colorado potato beetle | O43NEW (100%) | 5 | 47 | 86 | 1.7 | 6 |
| 4A | Thiacloprid (1) | Colorado potato beetle | O43NEW (100%) | 13 | 47 | 86 | 1.4 | 6 |
| 4A | Thiacloprid (100) | Diamondback moth | O24G3R (1%) | 17 | 0 | 39 | 2.3 | 7 |
| 4A | Thiamethoxam (150) | Cabbage Looper | O43NEW (100%) | 1.1 | 31 | 31 | 69 | 62 |
| 5 | Spinosad (0.25) | Diamondback moth | O43NEW (1%) | 15 | 0 | 31 | 2.1 | 4 |
| 5 | Spinosad (7.5) | Cabbage Looper | O43NEW (100%) | 25 | 0 | 45 | 1.8 | 5 |
| 5 | Spinosad (2.5) | Colorado potato beetle | O43NEW (100%) | 5 | 30 | 95 | 2.7 | 5 |
| 6 | Emamectin benzoate (0.02) | Cabbage Looper | O43NEW (100%) | 94 | 0 | 100 | 1.1 | 5 |
| 6 | Emamectin benzoate (0.002) | Diamondback moth | O43NEW (1%) | | | | 1.0 or less | |
| 15 | Novaluron (1) | Cabbage Looper | O43NEW (100%) | 0 | 10 | 25 | 2.5 | 6 |
| 22A | Indoxacarb (1.6) | Diamondback moth | O43NEW (1%) | 53 | 11 | 79 | 1.2 | 5 |
| 22A | Indoxacarb (0.53) | Black cutworm | O43NEW (100%) | 21 | 11 | 53 | 1.7 | 9 |
| 22A | Indoxacarb (0.53) | Cabbage Looper | O43NEW (100%) | 25 | 0 | 80 | 3.2 | 9 |
| 23 | Spirotetramat (30) | Diamondback moth | O43NEW (1%) | 11 | 16 | 48 | 1.8 | 6 |
| 23 | Spirotetramat (30) | Diamondback moth | O24G3R (1%) | 0 | 0 | 31 | 1.0 or less | 10 |
| 28 | Flubendiamide (0.059) | Diamondback moth | O43NEW (1%) | 32 | 16 | 84 | 1.75 | 6 |
| 28 | Flubendiamide (0.59) | Black cutworm | O43NEW (100%) | 42 | 5 | 63 | 1.3 | 7 |

Example 28. Summary of Insect Killing (Using LT50) Using Combinations of *Yersinia Entomophaga* Cell-Free Filtrates and Chemical Insecticides The table below is a summary of selected, but representative data, from Examples 17-26. Each row of the table includes data from a selected experiment described in one of the Examples 17-26. The columns in the table, from left to right, indicate the IRAC group of the chemical insecticide; the specific chemical insecticide and concentration used in the experiment; the insect that the chemical insecticide, filtrate, or chemical insecticide+filtrate was tested against; the isolate of *Yersinia entomophaga* to obtain the filtrate and concentration of filtrate (undiluted or 1:100 dilution); the LT50 of the insect exposed to the chemical insecticide alone; the LT50 of the insect exposed to the *Yersinia entomophaga* cell free filtrate alone; the LT50 of the insect exposed to the combination of chemical insecticide and *Yersinia entomophaga* cell free filtrate; the reduction in LT50 (equal to the lowest LT50 of a single active minus the LT50 of the combination); and the % reduction in the LT50 (equal to the LT50 reduction divided by the lowest LT50 of a single active×100%).

TABLE 98

Summary of data from Examples 17-26 using *Yersinia* cell free filtrates and insecticides

| IRAC Group | Chemical (mg/L) | Insect | *Yersinia* Cell Free Filtrate (% w/w) | LT50 Chem. (days) | LT50 filtrate (days) | LT50 Chem. + filtrate (days) | LT50 Reduction (days) | LT50 Reduction (%) |
|---|---|---|---|---|---|---|---|---|
| 1B | Chlorpyrifos (3.8) | Diamondback moth | O43NEW (1%) | 3.72 | 19.37 | 2.58 | 1.14 | 31 |
| 2B | Fipronil (12) | Fall armyworm | O43NEW (100%) | 51.74 | 36.80 | 16.64 | 20.16 | 55 |
| 3A | Esfenvalerate (0.56) | Cabbage Looper | O43NEW (100%) | 5.23 | 17.58 | 3.48 | 1.75 | 33 |
| 3A | Esfenvalerate (56) | Fall armyworm | O43NEW (100%) | 9.84 | 36.80 | 8.97 | 0.87 | 9 |
| 3A | Esfenvalerate (5.6) | Black cutworm | O43NEW (100%) | 3.68 | 16.81 | 3.01 | 0.67 | 18 |
| 3A | Deltamethrin (0.29) | Diamondback moth | O43NEW (1%) | 11.58 | 18.98 | 8.62 | 2.96 | 26 |
| 3A | Deltamethrin (0.22) | Diamondback moth | O333A4 (1%) | 12.78 | 36.68 | 8.66 | 4.12 | 32 |
| 4A | Clothianidin (60) | Diamondback moth | O43NEW (1%) | 6.12 | 19.37 | 4.19 | 1.93 | 31 |
| 4A | Clothianidin (60) | Cabbage Looper | O43NEW (100%) | 9.07 | 29.56 | 6.03 | 3.04 | 34 |
| 4A | Imidacloprid (0.56) | Colorado potato beetle | O43NEW (100%) | 18.03 | 6.29 | 3.85 | 2.44 | 39 |
| 4A | Thiacloprid (1) | Colorado potato beetle | O43NEW (100%) | 12.71 | 6.29 | 3.58 | 2.71 | 43 |
| 4A | Thiacloprid (100) | Diamondback moth | O24G3R (1%) | 12.58 | 21.82 | 9.31 | 3.27 | 26 |
| 4A | Thiamethoxam (150) | Cabbage Looper | O43NEW (100%) | 6.97 | 7.33 | 4.39 | 2.58 | 37 |
| 5 | Spinosad (0.25) | Diamondback moth | O43NEW (1%) | 8.16 | 18.98 | 6.15 | 2.01 | 25 |
| 5 | Spinosad (7.5) | Cabbage Looper | O43NEW (100%) | 7.01 | 29.56 | 5.68 | 1.33 | 19 |
| 5 | Spinosad (2.5) | Colorado potato beetle | O43NEW (100%) | 78.30 | 7.70 | 1.40 | 6.30 | 82 |
| 6 | Emamectin benzoate (0.02) | Cabbage Looper | O43NEW (100%) | 7.22 | 17.48 | 7.10 | 0.12 | 2 |
| 6 | Emamectin benzoate (0.002) | Diamondback moth | O43NEW (1%) | 6.21 | 7.63 | 4.57 | 1.64 | 26 |
| 15 | Novaluron (1) | Cabbage Looper | O43NEW (100%) | 7.31 | 17.48 | 7.00 | 0.31 | 4 |
| 22A | Indoxacarb (1.6) | Diamondback moth | O43NEW (1%) | 3.47 | 19.37 | 2.52 | 0.95 | 27 |
| 22A | Indoxacarb (0.53) | Black cutworm | O43NEW (100%) | 10.99 | 16.81 | 9.03 | 1.96 | 18 |
| 22A | Indoxacarb (0.53) | Cabbage Looper | O43NEW (100%) | 11.98 | 29.56 | 6.96 | 5.02 | 42 |
| 23 | Spirotetramat (30) | Diamondback moth | O43NEW (1%) | 21.02 | 19.37 | 8.21 | 11.16 | 58 |
| 23 | Spirotetramat (30) | Diamondback moth | O24G3R (1%) | 23.41 | 21.82 | 13.49 | 8.33 | 38 |
| 28 | Flubendiamide (0.059) | Diamondback moth | O43NEW (1%) | 6.52 | 19.37 | 3.25 | 3.27 | 50 |
| 28 | Flubendiamide (0.59) | Black cutworm | O43NEW (100%) | 7.05 | 16.81 | 5.97 | 1.08 | 15 |

While example compositions, methods, and so on have been illustrated by description, and while the descriptions are in considerable detail, it is not the intention of the applicants to restrict or in any way limit the scope of the application. It is, of course, not possible to describe every conceivable combination of components or methodologies for purposes of describing the compositions, methods, and so on described herein. Additional advantages and modifications will readily appear to those skilled in the art. Therefore, the invention is not limited to the specific details and illustrative examples shown and described. Thus, this application is intended to embrace alterations, modifications, and variations that fall within the scope of the application. Furthermore, the preceding description is not meant to limit the scope of the invention.

DEPOSIT OF BIOLOGICAL MATERIAL

The following biological material has been deposited on Mar. 15, 2018, under the terms of the Budapest Treaty with the Agricultural Research Service Patent Culture Collection (NRRL), Agricultural Research Service, U.S. Department of Agriculture, 1815 North University Street, Peoria, Ill. 61604, USA, and identified as follows: *Yersinia entomophaga* strain O43NEW (NRRL B-67598), *Yersinia entomophaga* strain O24G3R (NRRL B-67599), *Yersinia entomophaga* strain O24KEK (NRRL B-67600) and *Yersinia entomophaga* strain O333A4 (NRRL B-67601).

REFERENCE TO A SEQUENCE LISTING

This application contains a Sequence Listing in computer readable format, which is incorporated herein by reference.

We claim:

1. A method for controlling a target insect on a plant or plant part, said method comprising applying to said plant or plant part a composition that comprises a *Yersinia entomophaga* and a chemical insecticide, said *Yersinia entomophaga* having a first activity against said target insect, said chemical insecticide having a second activity against said target insect, said composition having a third activity against said target insect, said third activity reflecting a synergistic interaction of said *Yersinia entomophaga* and said chemical insecticide against said target insect, and said chemical insecticide comprising carbaryl, methomyl, thiodicarb, chlorpyrifos, ethiprole, fipronil, cyfluthrin, λ-cyhalothrin, deltamethrin, esfenvalerate, clothianidin, imidacloprid, thiacloprid, thiamethoxam, Spinosad, emamectin, novaluron, indoxacarb, spiroteramat, chlorantaniliprole and/or flubendiamide.

2. The method of claim 1, wherein said composition comprises about $1\times10^2$ to about $1\times10^7$ colony forming units of said *Yersinia entomophaga* per milliliter of said composition.

3. The method of claim 1, wherein said *Yersinia entomophaga* is *Yersinia entomophaga* NRRL B-67598.

4. The method of claim 1, wherein said *Yersinia entomophaga* comprises a whole genome sequence that is at least 95% identical to the whole genome sequence of *Yersinia entomophaga* NRRL B-67598.

5. The method of claim 1, wherein said *Yersinia entomophaga* comprises a whole genome sequence that is at least 99.5% identical to the whole genome sequence of *Yersinia entomophaga* NRRL B-67598.

6. The method of claim 1, wherein said *Yersinia entomophaga* is *Yersinia entomophaga* NRRL B-67599.

7. The method of claim 6, wherein said insecticide is selected from the group consisting of chlorpyrifos, fipronil, esfenvalerate, clothianidin, spinosad, flubendiamide, thiacloprid and spirotetramat.

8. The method of claim 1, wherein said *Yersinia entomophaga* is *Yersinia entomophaga* NRRL B-67600.

9. The method of claim 8, wherein said insecticide is selected from the group consisting of chlorpyrifos and fipronil.

10. The method of claim 1, wherein said *Yersinia entomophaga* is *Yersinia entomophaga* NRRL B-67601.

11. The method of claim 10, wherein said insecticide is selected from the group consisting of chlorpyrifos, fipronil, imidacloprid and deltamethrin.

12. The method of claim 1, wherein said composition is foliarly applied to a plant.

13. The method of claim 1, wherein said insecticide and said *Yersinia entomophaga* are applied to a plant seed.

14. The method of claim 1, wherein said pest is black cutworm, cabbage looper, Colorado potato beetle, corn earworm, diamondback moth, fall armyworm, tobacco budworm or western flower thrips.

* * * * *

```
                        SEQUENCE LISTING

<160> NUMBER OF SEQ ID NOS: 1

<210> SEQ ID NO 1
<211> LENGTH: 1513
<212> TYPE: DNA
<213> ORGANISM: Yersinia entomophaga

<400> SEQUENCE: 1
agtttgatcc tggctcagat tgaacgctgg cggcaggcct aacacatgca agtcgagcgg      60
cagcggaaag tagcttgcta ctttgccggc gagcggcgga cgggtgagta atgtctggga     120
aactgcctga tggaggggga taactactgg aaacggtagc taataccgca taacctcgca     180
agagcaaagt gggggacctt agggcctcac gccatcggat gtgcccagat gggattagct     240
agtaggtggg gtaatggctc acctaggcga cgatccctag ctggtctgag aggatgacca     300
gccacactgg aactgagaca cggtccagac tcctacggga ggcagcagtg gggaatattg     360
cacaatgggc gcaagcctga tgcagccatg ccgcgtgtgt gaagaaggcc ttcgggttgt     420
aaagcacttt cagcgaggag gaaggcattt cacctaatac gtgaagtgat tgacgttact     480
cgcagaagaa gcaccggcta actccgtgcc agcagccgcg gtaatacgga gggtgcaagc     540
gttaatcgga attactgggc gtaaagcgca cgcaggcggt ttgttaagtc agatgtgaaa     600
tccccgagct taacttggga actgcatttg aaactggcaa gctagagtct tgtagagggg     660
ggtagaattc caggtgtagc ggtgaaatgc gtagagatct ggaggaatac cggtggcgaa     720
ggcggccccc tggacaaaga ctgacgctca ggtgcgaaag cgtggggagc aaacaggatt     780
agataccctg gtagtccacg ctgtaaacga tgtcgacttg gaggttgtgc ccttgaggcg     840
tggcttccgg agctaacgcg ttaagtcgac cgcctgggga gtacggccgc aaggttaaaa     900
ctcaaatgaa ttgacggggg cccgcacaag cggtggagca tgtggtttaa ttcgatgcaa     960
cgcgaagaac cttacctact cttgacatcc acagaacgta gcagagatgc ttcggtgcct    1020
tcgggaactg tgagacaggt gctgcatggc tgtcgtcagc tcgtgttgtg aaatgttggg    1080
ttaagtcccg caacgagcgc aaccccttatc ctttgttgcc agcacgtcat ggtgggaact    1140
caagggagac tgccggtgat aaaccggagg aaggtgggga tgacgtcaag tcatcatggc    1200
ccttacgagt agggctacac acgtgctaca atggcagata caaagtgaag cgaactcgcg    1260
agagcaagcg gaccacataa agtctgtcgt agtccggatt ggagtctgca actcgactcc    1320
atgaagtcgg aatcgctagt aatcgtagat cagaatgcta cggtgaatac gttcccgggc    1380
cttgtacaca ccgcccgtca caccatggga gtgggttgca aaagaagtag gtagcttaac    1440
cttcgggagg gcgcttacca ctttgtgatt catgactggg gtgaagtcgt aacaaggtaa    1500
ccgtagaatt ctt                                                        1513
```